(12) United States Patent
Fant

(10) Patent No.: US 8,365,137 B2
(45) Date of Patent: Jan. 29, 2013

(54) SYSTEMS AND METHODS USING AN INVOCATION MODEL OF PROCESS EXPRESSION

(75) Inventor: Karl Fant, Mountain View, CA (US)

(73) Assignee: Wave Semiconductor, Inc., San Jose, CA (US)

(*) Notice: Subject to any disclaimer, the term of this patent is extended or adjusted under 35 U.S.C. 154(b) by 1484 days.

(21) Appl. No.: 11/896,075

(22) Filed: Aug. 29, 2007

(65) Prior Publication Data

US 2008/0059773 A1 Mar. 6, 2008

Related U.S. Application Data

(60) Provisional application No. 60/840,725, filed on Aug. 29, 2006.

(51) Int. Cl.
G06F 9/44 (2006.01)
G06F 7/38 (2006.01)
H03K 19/173 (2006.01)

(52) U.S. Cl. ............ 717/104; 717/114; 326/38; 326/46

(58) Field of Classification Search .................. None
See application file for complete search history.

(56) References Cited

U.S. PATENT DOCUMENTS

| | | | | |
|---|---|---|---|---|
| 5,305,463 A * | 4/1994 | Fant et al. | | 712/36 |
| 5,355,496 A * | 10/1994 | Fant et al. | | 717/141 |
| 5,497,113 A * | 3/1996 | Uber | | 327/170 |
| 5,572,732 A * | 11/1996 | Fant et al. | | 717/104 |
| 5,640,105 A * | 6/1997 | Sobelman et al. | | 326/36 |
| 5,656,948 A * | 8/1997 | Sobelman et al. | | 326/35 |
| 5,664,211 A * | 9/1997 | Sobelman et al. | | 345/441 |
| 5,793,662 A * | 8/1998 | Duncan et al. | | 708/670 |
| 5,796,962 A * | 8/1998 | Fant et al. | | 710/100 |
| 5,805,461 A | 9/1998 | Fant | | |
| 5,896,541 A * | 4/1999 | Fant et al. | | 712/18 |
| 5,930,522 A * | 7/1999 | Fant | | 712/25 |
| 5,977,663 A * | 11/1999 | Fant et al. | | 235/462.24 |
| 6,031,390 A * | 2/2000 | Fant et al. | | 326/36 |
| 6,043,682 A * | 3/2000 | Dabral et al. | | 326/86 |
| 6,106,569 A * | 8/2000 | Bohrer et al. | | 717/100 |
| 6,327,607 B1 | 12/2001 | Fant | | |
| 6,384,621 B1 * | 5/2002 | Gibbs et al. | | 326/30 |
| 6,493,394 B2 * | 12/2002 | Tamura et al. | | 375/257 |
| 6,505,342 B1 * | 1/2003 | Hartmann et al. | | 717/104 |
| 6,691,301 B2 * | 2/2004 | Bowen | | 717/114 |
| 6,815,982 B2 * | 11/2004 | Buhr | | 326/93 |
| 6,900,658 B1 * | 5/2005 | Sobelman et al. | | 326/35 |
| 7,002,931 B2 * | 2/2006 | Chou et al. | | 370/286 |
| 7,138,835 B1 * | 11/2006 | Gaboury | | 327/77 |
| 7,239,173 B1 * | 7/2007 | Voogel | | 326/38 |
| 7,248,636 B2 * | 7/2007 | Martinez | | 375/257 |
| 7,308,567 B2 * | 12/2007 | Yamamoto et al. | | 713/1 |
| 7,446,557 B2 * | 11/2008 | Mauthe et al. | | 326/30 |
| 7,478,222 B2 * | 1/2009 | Fant | | 712/10 |
| 7,757,219 B2 * | 7/2010 | Ball et al. | | 717/132 |
| 2002/0124236 A1 * | 9/2002 | Ruths et al. | | 717/104 |
| 2005/0091642 A1 * | 4/2005 | Miller | | 717/124 |
| 2006/0116783 A1 * | 6/2006 | Aghili et al. | | 700/97 |
| 2006/0197550 A1 * | 9/2006 | Mauthe et al. | | 326/30 |
| 2006/0282736 A1 * | 12/2006 | Schroth et al. | | 714/742 |
| 2007/0044074 A1 * | 2/2007 | Fant | | 717/114 |
| 2007/0266366 A1 * | 11/2007 | Bucuvalas | | 717/104 |
| 2009/0182993 A1 * | 7/2009 | Fant | | 712/225 |

OTHER PUBLICATIONS

Fant et al., NULL Convention Logic: A Complete and Consistent Logic for Asynchronous Digital Cirtuit Synthesis, Published by IEEE, 1996, pp. 261-273.*
Zhou et al., Cost-aware synthesis of asynchronous circuits based on partial acknowledgement, Published by ICCAD'06, 2006, ACM, pp. 158-163.*
Fant et al., NULL Convention Logic, published by Theseus Research, Inc, 2002, pp. 1-35.*

(Continued)

Primary Examiner — Tuan Q Dam
Assistant Examiner — Zheng Wei
(74) Attorney, Agent, or Firm — Connolly Bove Lodge & Hutz LLP

(57) ABSTRACT

Invocation language is described that is suitable for controlling a machine to perform a process having concurrent parts. Each concurrent part has an association relationship, a completeness relation, and an invocation expression.

14 Claims, 47 Drawing Sheets

OTHER PUBLICATIONS

Fant et al., Considerations of Completeness in to Expression of Combinational Processes, published by Theseus Research, Inc, 2002, pp. 1-23.*

Karl M. Fant, Logically Determined system Design, Draft 1.1 Nov. 20, 2002, pp. 1-24 and 235-239.*

Sima et al., *Advanced Computer Architectures: A Design Space Approach*, 1997, Addison Wesley Longman Limited.

Fountain, T.J., *Parallel Computing: Principles and Practice*, 1994, Cambridge University Press.

Schneider, Fred B., *On Concurrent Programming*, 1997, Springer-Verlag New York.

Culler et al., *Parallel Computer Architecture: A Hardware/Software Approach*, 1999, Morgan Kaufman Publishers.

Hwang et al., *Computer Architecture and Parallel Processing*, 1984, McGraw-Hill.

El-Rewini et al., *Distributed and Parallel Computing*, 1998, Manning Publications Co.

Dershem et al., *Programming Languages: Structures and Models*, 1990, Wadsworth Publishing Co.

Friedman et al., *Essentials of Programming Languages*, 1992, Massachusetts Institute of Technology.

* cited by examiner a. Boolean functions    b. Enhanced Boolean functions a. Partitioned at full-adder level     b. Partitioned at function level

FIGURE 24

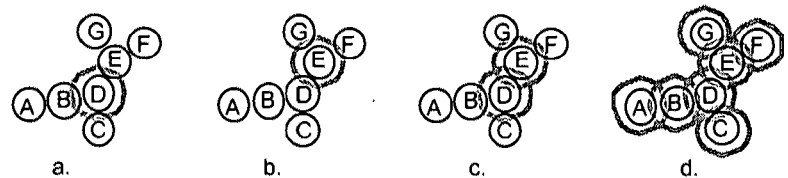

FIGURE 25

| | | | |
|---|---|---|---|
| ⒶⒶⒶ | | ⒶⒷⒸ | |
| Theng A | Theng A | Theng B | Theng C |
| 00[0] | 00XS[X] | X0S[S] | SX0[0] |
| 01[1] | 00YS[X] | X1S[S] | SY0[0] |
| 11[1] | 00XT[X] | X0T[S] | SX1[0] |
| | 00YT[X] | X1T[S] | SY1[0] |
| a. Undirected interaction | 01XS[Y] | Y0S[T] | TX0[1] |
| | 01YS[Y] | Y1S[T] | TY0[1] |
| | 01XT[Y] | Y0T[T] | TX1[1] |
| | 01YT[Y] | Y1T[T] | TY1[1] |
| | 11XS[Y] | | |
| | 11YS[Y] | | |
| | 11XT[Y] | | |
| | 11YT[Y] | | | b. Directed interaction

| ⒶⒷⒸ | | |
|---|---|---|
| Theng A | Theng B | Theng C |
| 00[X] | X[S] | S[0] |
| 01[Y] | Y[T] | T[1] |
| 11[Y] | | | c. Directed interaction

FIGURE 26

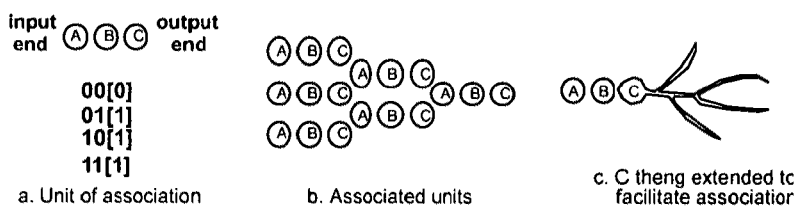

a. Unit of association     b. Associated units     c. C theng extended to facilitate association

FIGURE 27

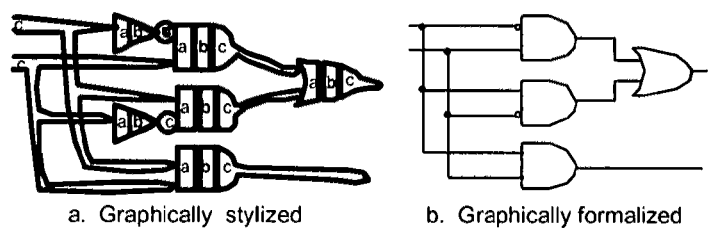

a. Graphically stylized     b. Graphically formalized

FIGURE 28

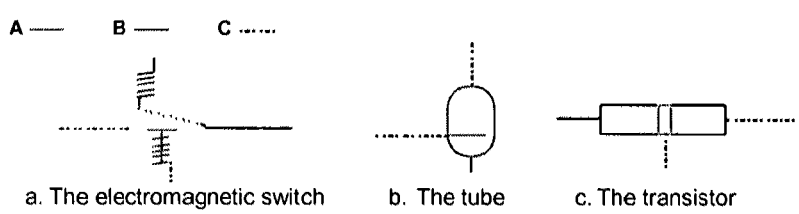

a. The electromagnetic switch     b. The tube     c. The transistor

FIGURE 29
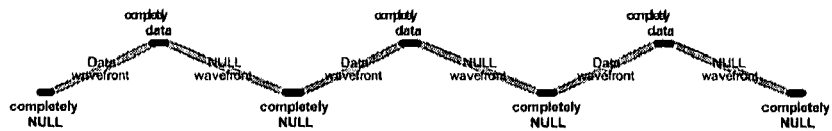
FIGURE 30
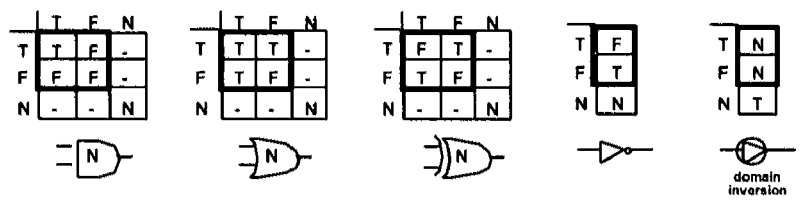
FIGURE 31
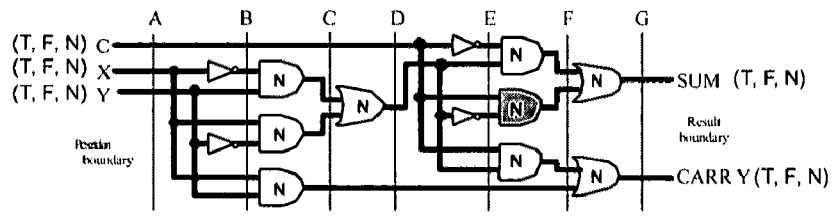
FIGURE 32
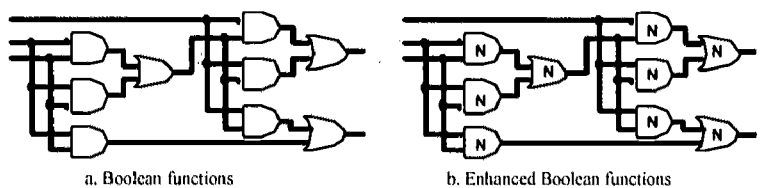
a. Boolean functions         b. Enhanced Boolean functions
FIGURE 33
```
      Process meaning variable
              Place meanings    Variable
              TRUE   FALSE      meanings
      Place    #1      #2
      Value    N       N        NULL
      Value    D       N        TRUE
      Value    N       D        FALSE
      Value    D       D        Illegal
```

FIGURE 34

Logical variable

| | Place meanings | | Variable meanings |
|---|---|---|---|
| | TRUE | FALSE | |
| Place | #1 | #2 | |
| Value | N | N | NULL |
| Value | D | N | TRUE |
| Value | N | D | FALSE |

Numeric base 2 variable (binary)

| | Place meanings | | Variable meanings |
|---|---|---|---|
| | 0 | 1 | |
| Place | #1 | #2 | |
| Value | N | N | NULL |
| Value | D | N | 0 |
| Value | N | D | 1 |

General three value variable

| | Place meanings | | | Variable meanings |
|---|---|---|---|---|
| | Animal | Vegetable | Mineral | |
| Place | #1 | #2 | #3 | |
| Value | N | N | N | NULL |
| Value | D | N | N | Animal |
| Value | N | D | N | Vegetable |
| Value | N | N | D | Mineral |

Numeric base 4 variable (quaternary)

| | Place meanings | | | | Variable meanings |
|---|---|---|---|---|---|
| | 0 | 1 | 2 | 3 | |
| Place | #1 | #2 | #3 | #4 | |
| Value | N | N | N | N | NULL |
| Value | D | N | N | N | 0 |
| Value | N | D | N | N | 1 |
| Value | N | N | D | N | 2 |
| Value | N | N | N | D | 3 |

FIGURE 35

Input — Output

FIGURE 36

| transition to data value | No value transform rule for formed name | transition to NULL value |
|---|---|---|
| DD[D] | DN[-] | NN[N] |
| | ND[-] | |

FIGURE 37

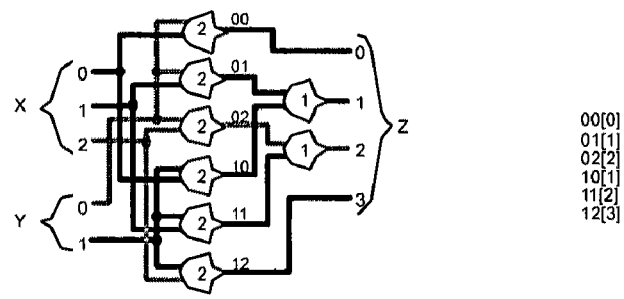

a. Pure association expression

00[0]
01[1]
02[2]
10[1]
11[2]
12[3]

b. Pure value expression

FIGURE 38

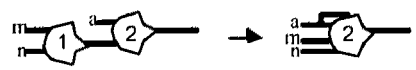

FIGURE 56
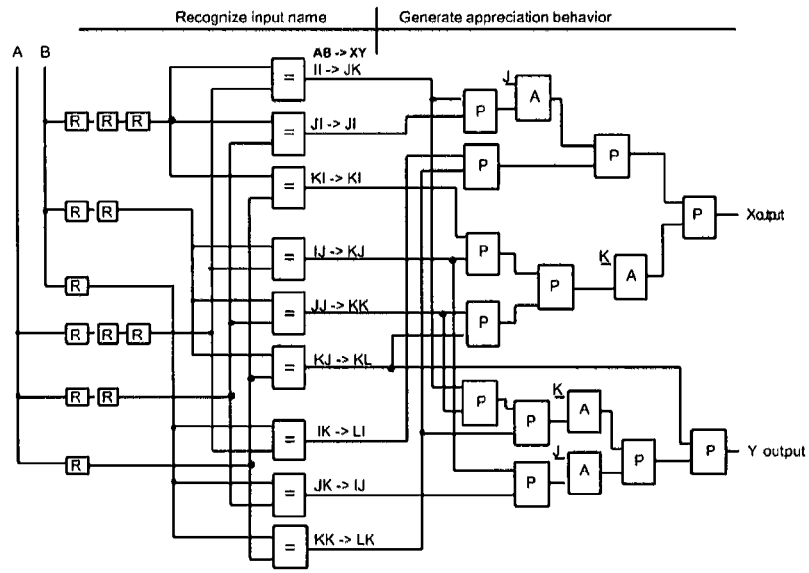
FIGURE 57
FIGURE 58
FIGURE 59
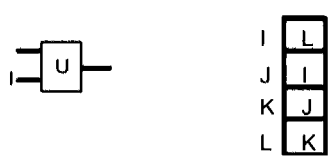

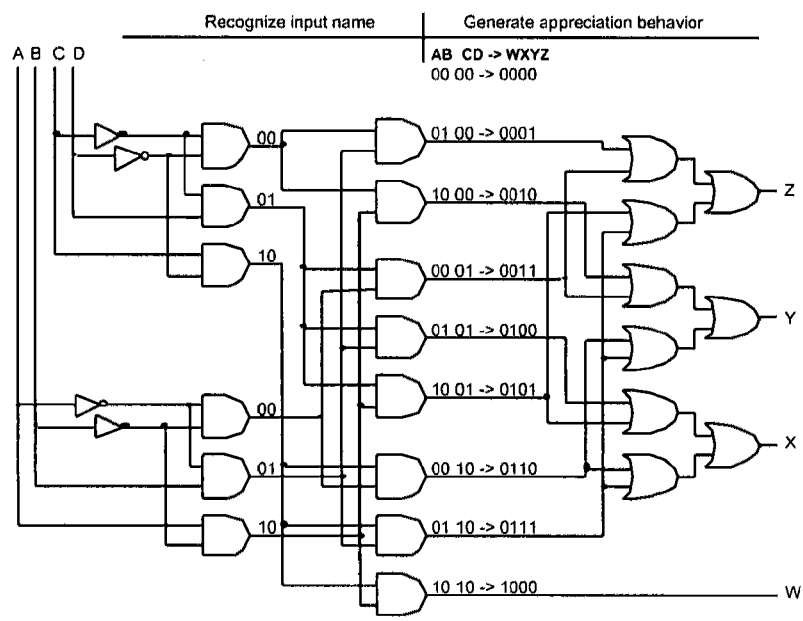

FIGURE 80
"fan-out input values
A[g,k,o] B[h,l,p]
C[G,K,O] D[H,L,P]
E[I,M,Q] F[J,N,R]
GI[S] GJ[T] HI[S] HJ[S]
KM[U] KN[U] LM[V] LN[U]
OQ[W] OR[W] PQ[W] PR[X]
"fan out input to second half-adder"
SU[a,c,e] SV[b,d,f] TU[b,d,f] TV[b,d,f]
ga[i] gb[j] ha[i] hb[i]
kc[m] kd[m] lc[n] ld[m]
oe[q] of[q] pe[q] pf[r]
im[ s ] in[ t ] jm[ t ] jn[ t ]   "sum"
qW[ u ] qX[ v ] rW[ v ] rX[ v ]   "carry out"
FIGURE 81
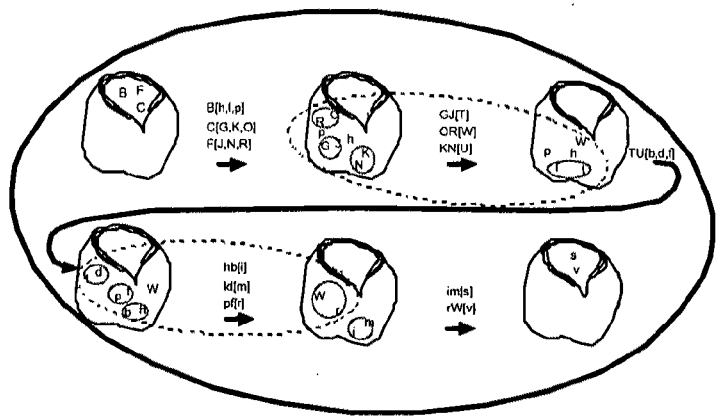
FIGURE 82
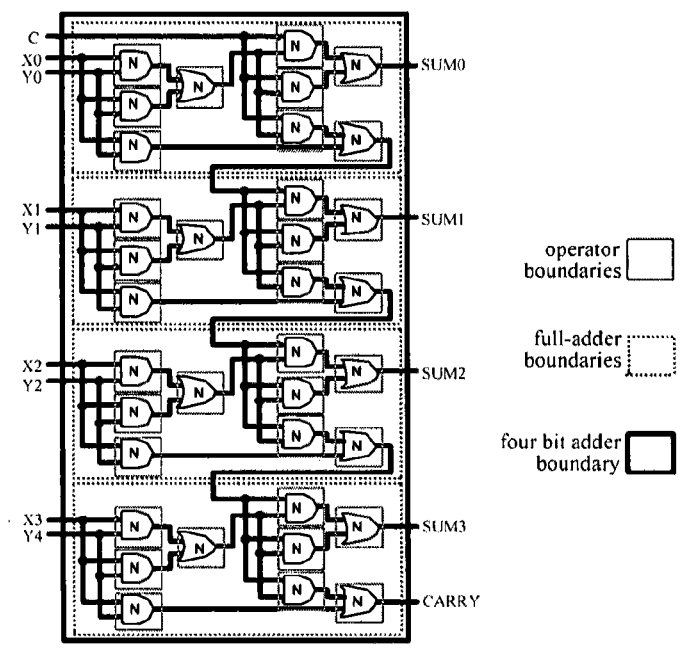
operator boundaries
full-adder boundaries
four bit adder boundary FIGURE 123
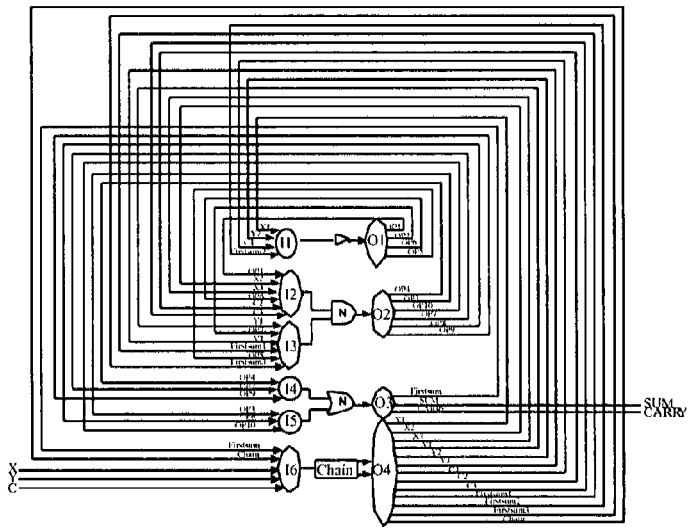
FIGURE 124
| AND | | | | OR | | |
|---|---|---|---|---|---|---|
| Fan-in | | Fan-out | | Fan-in | | Fan-out |
| I2 | I3 | O2 | | I4 | I5 | O3 |
| OP1 | Y1 | OP4 | | OP4 | OP3 | Firstsum |
| X2 | OP2 | OP3 | | OP7 | OP8 | Sum |
| X3 | Y3 | OP10 | | OP9 | OP10 | CARRY |
| OP6 | Firstsum1 | OP7 | | | | |
| C2 | OP5 | OP8 | | | | |
| C3 | Firstsum3 | OP9 | | | | |
| NOT | | | Chain | | |
|---|---|---|---|---|---|
| Fan-in | Fan-out | | Fan-in | Fan-out | |
| I1 | O1 | | I6 | O4 | |
| X1 | OP1 | | X | X1 | Chain |
| Y2 | OP2 | | Chain | X2 | Chain |
| C1 | OP6 | | Chain | X3 | - |
| Firstsum2 | OP5 | | Y | Y1 | Chain |
| | | | Chain | Y2 | Chain |
| | | | Chain | Y3 | - |
| | | | C | C1 | Chain |
| | | | Chain | C2 | Chain |
| | | | Chain | C3 | - |
| | | | Firstsum | Firstsum1 | Chain |
| | | | Chain | Firstsum2 | Chain |
| | | | Chain | Firstsum3 | - |
FIGURE 125
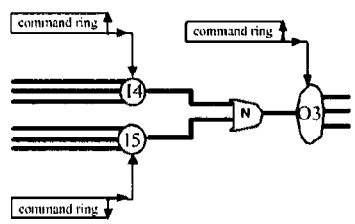

| data fan-out commands | data fan-in commands | |
|---|---|---|
| X1 | X | |
| X2 | Chainin | |
| X3 | Chainin | |
| Y1 | Y | |
| Y2 | Chainin | |
| Y3 | Chainin | |
| C1 | C | |
| C2 | Chainin | |
| C3 | Chainin | |
| OP1 | X1 | |
| OP2 | Y2 | |
| OP4 | OP1 | Y1 |
| OP3 | X2 | OP2 |
| OP10 | X3 | Y3 |
| Firstsum | OP4 | OP3 |
| Firstsum1 | Firstsum | |
| Firstsum2 | Chainin | |
| Firstsum3 | Chainin | |
| OP6 | Firstsum | |
| OP5 | C | |
| OP7 | OP6 | Firstsum1 |
| OP8 | C2 | OP5 |
| OP9 | C3 | Firstsum3 |
| SUM | OP7 | OP8 |
| CARRY | OP9 | OP10 |

FIGURE 130

| data fan-out commands | | data fan-in commands | | Operator fan-in commands | | Operator fan-out commands | |
|---|---|---|---|---|---|---|---|
| X1 | Chain | X | - | Chain | - | ChainA | ChainB |
| X2 | Chain | Chainin | - | Chain | - | ChainA | ChainB |
| X3 | - | Chainin | - | Chain | - | ChainA | - |
| Y1 | Chain | Y | - | Chain | - | ChainA | ChainB |
| Y2 | Chain | Chainin | - | Chain | - | ChainA | ChainB |
| Y3 | - | Chainin | - | Chain | - | ChainA | - |
| C1 | Chain | C | - | Chain | - | ChainA | ChainB |
| C2 | Chain | Chainin | - | Chain | - | ChainA | ChainB |
| C3 | - | Chainin | - | Chain | - | ChainA | - |
| OP1 | - | X1 | - | NOT | - | NOT | - |
| OP2 | - | Y2 | - | NOT | - | NOT | - |
| OP4 | - | OP1 | Y1 | ANDA | ANDB | AND | - |
| OP3 | - | X2 | OP2 | ANDA | ANDB | AND | - |
| OP10 | - | X3 | Y3 | ANDA | ANDB | AND | - |
| Firstsum | - | OP4 | OP3 | ORA | ORB | OR | - |
| Firstsum1 | Chain | Firstsum | - | Chain | - | ChainA | ChainB |
| Firstsum2 | Chain | Chainin | - | Chain | - | ChainA | ChainB |
| Firstsum3 | - | Chainin | - | Chain | - | ChainA | - |
| OP6 | - | Firstsum2 | - | NOT | - | NOT | - |
| OP5 | - | C1 | - | NOT | - | NOT | - |
| OP7 | - | OP6 | Firstsum1 | ANDA | ANDB | AND | - |
| OP8 | - | C2 | OP5 | ANDA | ANDB | AND | - |
| OP9 | - | C3 | Firstsum3 | ANDA | ANDB | AND | - |
| SUM | - | OP7 | OP8 | ORA | ORB | OR | - |
| CARRY | - | OP9 | OP10 | ORA | ORB | OR | - |

FIGURE 131

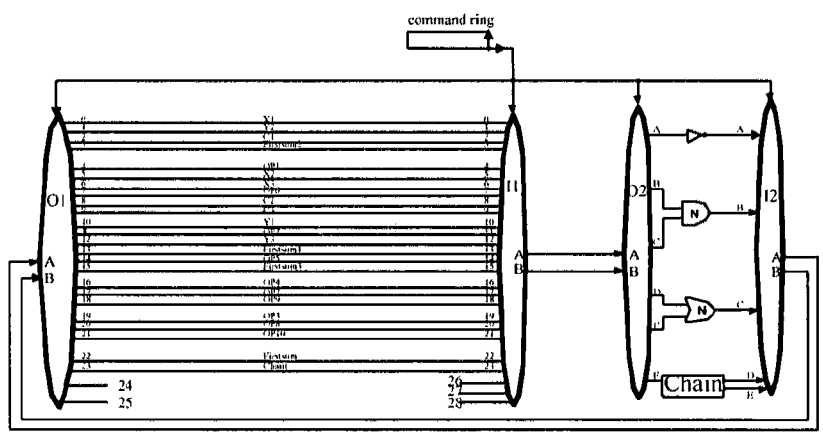

FIGURE 132
| data fan-out | | data fan-in | | Operator fan-in | | Operator fan-out | |
|---|---|---|---|---|---|---|---|
| A | B | A | B | A | B | A | B |
| 0 | 23 | 26 | - | F | - | D | E |
| 5 | 23 | 23 | - | F | - | D | E |
| 6 | - | 23 | - | F | - | D | - |
| 10 | 23 | 27 | - | F | - | D | E |
| 1 | 23 | 23 | - | F | - | D | E |
| 12 | - | 23 | - | F | - | D | - |
| 2 | 23 | 28 | - | F | - | D | E |
| 8 | 23 | 23 | - | F | - | D | E |
| 9 | - | 23 | - | F | - | D | - |
| 4 | - | 0 | - | A | - | A | - |
| 11 | - | 1 | - | A | - | A | - |
| 16 | - | 4 | 10 | B | C | B | - |
| 19 | - | 5 | 11 | B | C | B | - |
| 21 | - | 6 | 12 | B | C | B | - |
| 22 | - | 16 | 19 | D | E | C | - |
| 13 | 23 | 22 | - | F | - | D | E |
| 3 | 23 | 23 | - | F | - | D | E |
| 15 | - | 23 | - | F | - | D | - |
| 7 | - | 3 | - | A | - | A | - |
| 14 | - | 2 | - | A | - | A | - |
| 17 | - | 7 | 13 | B | C | B | - |
| 20 | - | 8 | 14 | B | C | B | - |
| 18 | - | 9 | 15 | B | C | B | - |
| 24 | - | 17 | 20 | D | E | C | - |
| 25 | - | 18 | 21 | D | E | C | - |
FIGURE 133
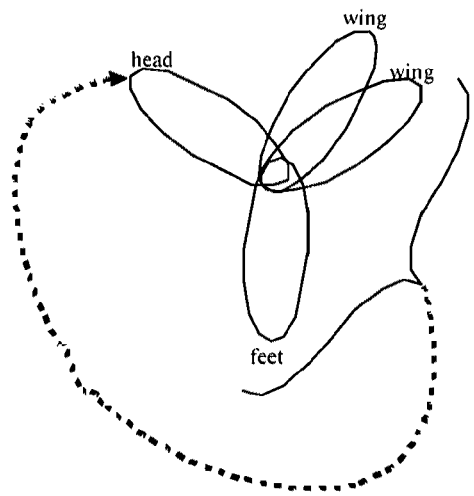
FIGURE 134
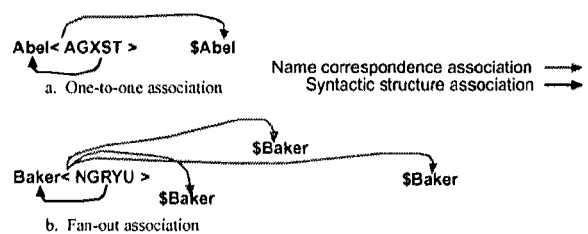
a. One-to-one association
Name correspondence association ⟶
Syntactic structure association ⟶
b. Fan-out association ABC[(A<$place1> B<$place2> C<$place3>)(placeA<$result1> placeB< $result2>) ... : ... ]

c. Merged string representation

FIGURE 139
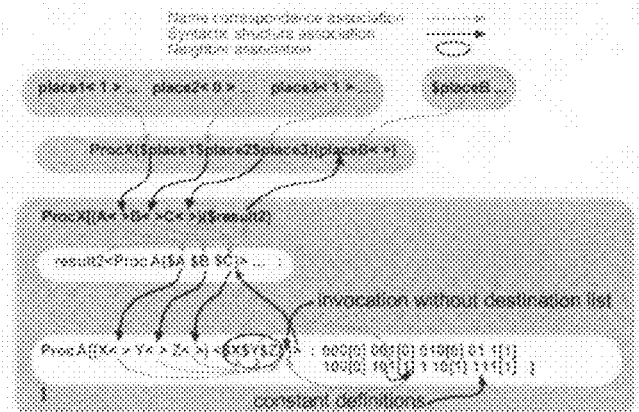
FIGURE 140
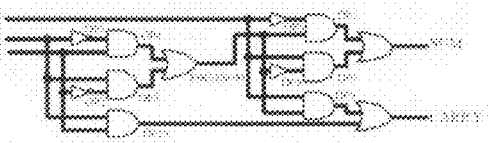
FIGURE 141

FIGURE 142
invocation  FULLADD(0, 1, 0)(< > CARRYOUT< >) ... $CARRYOUT
definition  FULLADD[(X< >Y< >C< >)( $SUM $CARRY)
NOT($X)(OP1< >)   AND($OP1 $Y)(OP4< >)
NOT($Y)(OP2< >)   AND($X $OP2)(OP3< >)
OR($OP4 $OP3)(FIRSTSUM< >)
NOT($FIRSTSUM)(OP6< >)   AND($C $OP6)(OP7< >)
NOT($C)(OP5< >)   AND($OP5 $FIRSTSUM)(OP8< >)
OR($OP7 $OP8)(SUM< >)
AND($X $Y)(OP10< >)   AND($C $FIRSTSUM)(OP9< >)
OR($OP10 $OP9)(CARRY< >)
OR[(A< > B< >)($res) res<$A$B()> :00[0] 01[1] 10[1] 11[1] ]
AND[(A< > B< >)($res) res<$A$B()> :00[0] 01[0] 10[0] 11[1] ]
NOT[(A< >)($res) res<$A()> :1[0] 0[1] ]
FIGURE 143
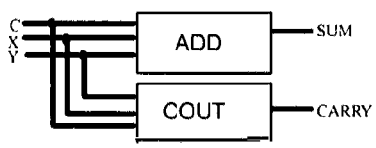
FIGURE 144
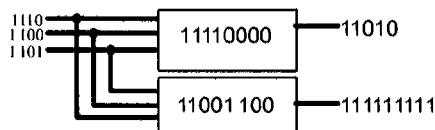
FIGURE 145
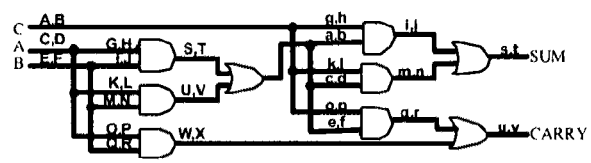
FIGURE 146
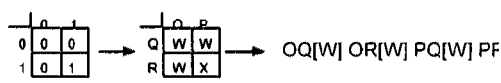
FIGURE 147
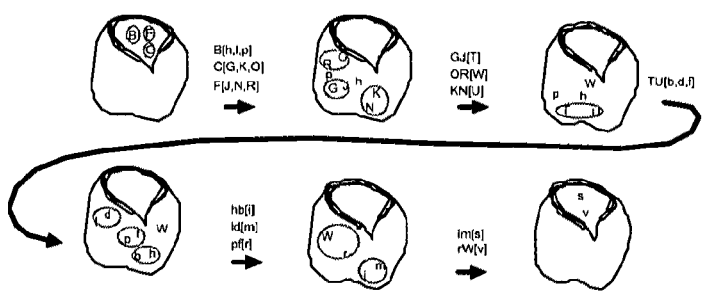

FIGURE 148

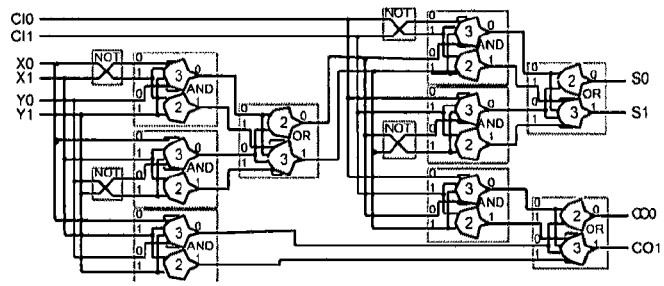

FIGURE 149 a. Minterm form    b. Equivalent 1    c. Equivalent 2

FIGURE 150

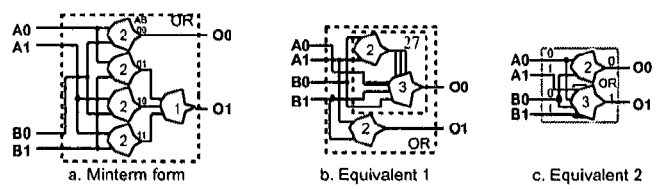

FIGURE 151

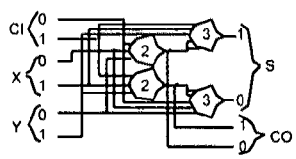

four bit adder invocation
full adder invocation
primitive invocation

```
4BITADD($X0 $Y0 $X1 $Y1 $X2 $Y2 $X3 $Y3 $CARRYIN)
   (S0< > S1< > S2< > S3< > CARRYOUT< >)
```

4BITADD[(A0< > B0< > A1< > B1< > A2< > B2< > A3< > B3< >C0< >)
   ($SUM0 $SUM1 $SUM2 $SUM3 $CARRYOUT3)

```
FULLADD($A0 $B0 $C0)(SUM0< > CARRYOUT0< >)
FULLADD($A1 $B1 $CARRYOUT0)(SUM1< > CARRYOUT1< >)
FULLADD($A2 $B2 $CARRYOUT1)(SUM2< > CARRYOUT2< >)
FULLADD($A3 $B3 $CARRYOUT2)(SUM3< > CARRYOUT3< >)
```
]
FULLADD[(X< >Y< >C< >)( $SUM $CARRY)

```
NOT($X)(OP1< >)     AND($OP1 $Y)(OP4< >)
NOT($Y)(OP2< >)     AND($X $OP2)(OP3< >)
OR($OP4 $OP3)(FIRSTSUM< >)
NOT($FIRSTSUM)(OP5< >)   AND($C $OP5)(OP8< >)
NOT($C)(OP6< >)          AND($OP6 $FIRSTSUM)(OP7< >)
OR($OP7 $OP8)(SUM< >)
AND($X $Y)(OP10< >)      AND($C $FIRSTSUM)(OP9< >)
OR($OP10 $OP9)(CARRY< >)
```
      OR[(A< > B< >)($res) res<$A$B()> :00[0] 01[1] 10[1] 11[1] ]
      AND[(A< > B< >)($res) res<$A$B()> :00[0] 01[0] 10[0] 11[1] ]
      NOT[(A< >)($res) res<$A()> :1[0] 0[1] ]
]

```
FULLADD[(({A0< > A1< >})({B0< > B1< >})({C0< > C1< >}))
    ( ({$SUM0 $SUM1}) ({$CARRY0 $CARRY1}))
                000($A0 $B0 $C0)
                001($A0 $B0 $C1)
                010($A0 $B1 $C0)
                011($A0 $B1 $C1)
                100($A1 $B0 $C0)
                101($A1 $B0 $C1)
                010($A1 $B1 $C0)
                111($A1 $B1 $C1)  :

000[SUM0< D > CARRY0< D >]
                001[SUM1< D > CARRY0< D >]
                010[SUM1< D > CARRY0< D >]
                011[SUM0< D > CARRY1< D >]
                100[SUM1< D > CARRY0< D >]
                101[SUM0< D > CARRY1< D >]
                110[SUM0< D > CARRY1< D >]
                111[SUM1< D > CARRY1< D >] ]
```

FIGURE 160

BIGDIF[({A0< > A1< > ...Am-1< > Am< >}
      {B0< > B1< > ... Bn-1< > Bn< >})
   ( {$O00 $O01 $O02 ... $Omn-1 $Omn} )

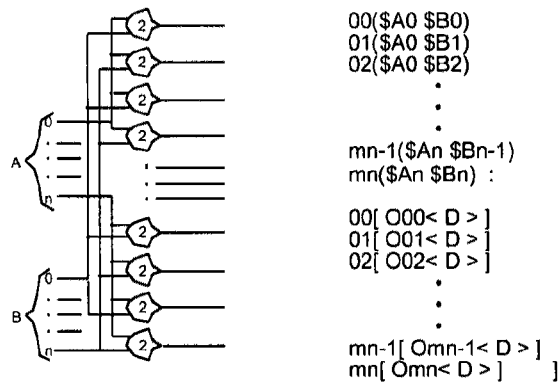

```
00($A0 $B0)
01($A0 $B1)
02($A0 $B2)
      .
      .
      .
mn-1($An $Bn-1)
mn($An $Bn) :

00[ O00< D > ]
01[ O01< D > ]
02[ O02< D > ]
      .
      .
      .
mn-1[ Omn-1< D > ]
mn[ Omn< D > ]       ]
```

FIGURE 161

EXPMEM[(CB< > {A0< > A1< > ...Am-1< > Am< >}
      {B0< > B1< > ... Bn-1< > Bn< >})
   ( {$O00 $O01 $O02 ... $Omn-1 $Omn} )

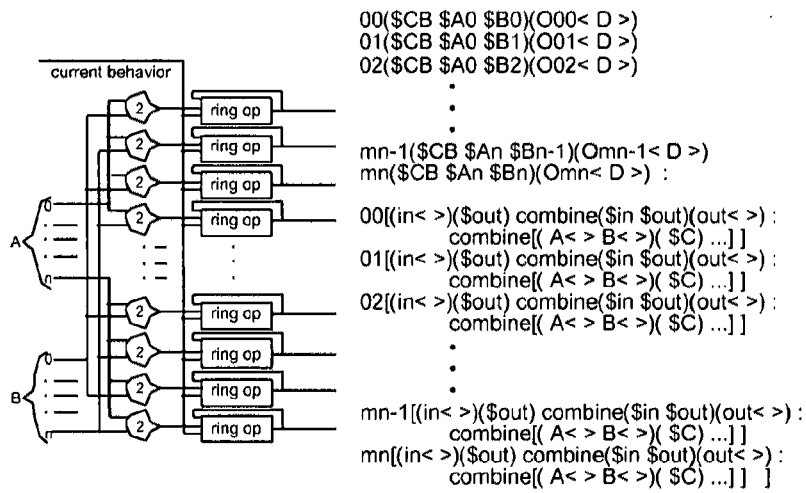

```
00($CB $A0 $B0)(O00< D >)
01($CB $A0 $B1)(O01< D >)
02($CB $A0 $B2)(O02< D >)
      .
      .
      .
mn-1($CB $An $Bn-1)(Omn-1< D >)
mn($CB $An $Bn)(Omn< D >) :

00[(in< >)($out) combine($in $out)(out< >) :
       combine[( A< > B< >)( $C) ...] ]
01[(in< >)($out) combine($in $out)(out< >) :
       combine[( A< > B< >)( $C) ...] ]
02[(in< >)($out) combine($in $out)(out< >) :
       combine[( A< > B< >)( $C) ...] ]
      .
      .
      .
mn-1[(in< >)($out) combine($in $out)(out< >) :
       combine[( A< > B< >)( $C) ...] ]
mn[(in< >)($out) combine($in $out)(out< >) :
       combine[( A< > B< >)( $C) ...] ]   ]
```

FIGURE 162

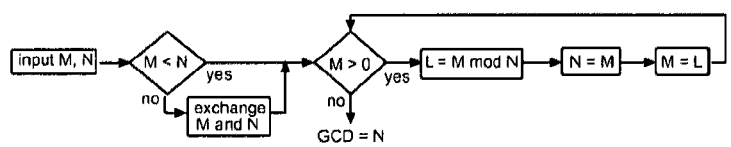

FIGURE 163
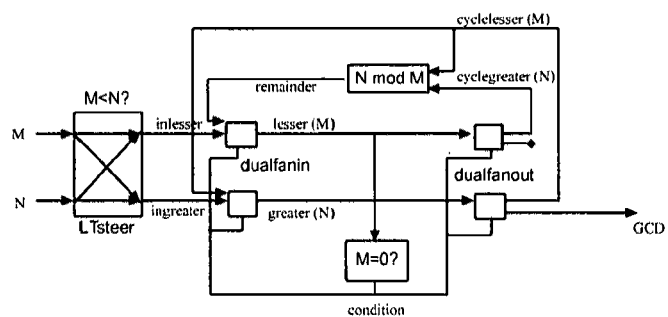
FIGURE 164
| | state 0 | state 1 | state 2 | state 3 | state 4 | state 5 | state 6 |
|---|---|---|---|---|---|---|---|
| 0 | to state 1 | to state 2 | to state 2 | to state 4 | to state 2 | to state 1 | to state 1 |
| 1 | to state 0 | to state 0 | to state 3 | to state 0 | to state 5 | to state 6 | to state 0 Detect |
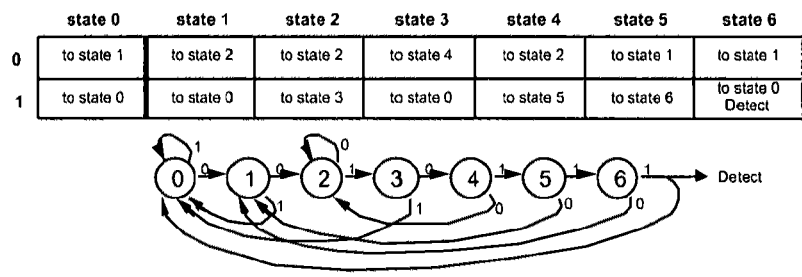
FIGURE 165
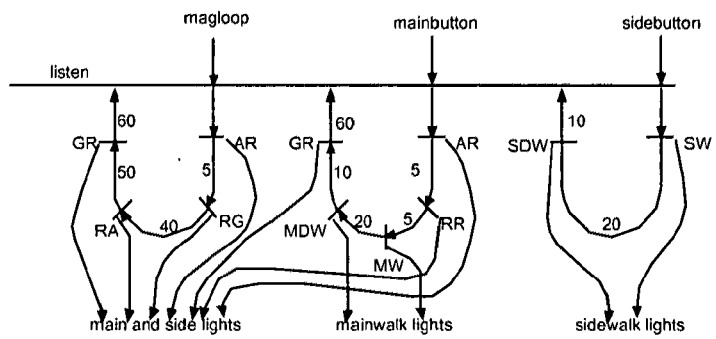
FIGURE 166
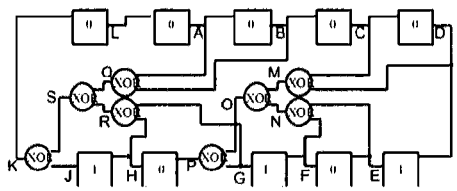
FIGURE 167
a. 2NCL single rail pipeline of coupled cycles.
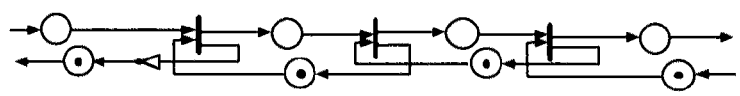
b. Petri net model of cycle behavior.

SYSTEMS AND METHODS USING AN INVOCATION MODEL OF PROCESS EXPRESSION

CROSS REFERENCE TO RELATED APPLICATIONS

The present application claims priority to U.S. application 60/840,725, filed on Aug. 29, 2006, the disclosure of which is expressly incorporated by reference herein in its entirety.

BACKGROUND OF THE INVENTION

1. Field of the Invention

The invention relates to systems and methods for performing concurrent processes, especially methods and machines for carrying out computing, control, communications, and other processes.

2. Discussion of Background Information

Computer science inherited its present conceptual foundations from a branch of mathematics that had been exploring the fundamental nature of mathematical computation. That foundation resulted in conceptual approaches to process expression that are ill suited to many concurrent processes of the real world.

SUMMARY

Improved systems and methods of process expression are disclosed, including an improved language for expressing and implementing concurrent processes.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 24 illustrates association loci;

FIG. 25 illustrates directionalizing the behavior of associations of thengs;

FIG. 26 illustrates the directionalized unit of association;

FIG. 27 illustrates stylized presentations of structures of units of association or operators;

FIG. 28 illustrates association directionalizing switches;

FIG. 29 illustrates successive wavefronts monotonically transitioning between symbolically disjoint expressions;

FIG. 30 illustrates set of completeness appreciating Boolean operators;

FIG. 31 illustrates the completeness criterion for a network of operators as a whole;

FIG. 32 illustrates mapping to the NULL convention;

FIG. 33 illustrates 2 value variable formed from two places;

FIG. 34 illustrates multi path NCL variables;

FIG. 35 illustrates threshold operator;

FIG. 36 illustrates value transform rules for 2 of 2 operator;

FIG. 37 illustrates a two variable pure association expression;

FIG. 38 illustrates the M of N threshold operators;

FIG. 56 illustrates the complete four value expression;

FIG. 57 illustrates the four value operators and the Boolean operators;

FIG. 58 illustrates a universal four value operator;

FIG. 59 illustrates universal four value rotate transform;

FIG. 65 illustrates mapping of fifteen values onto the baseline process;

FIG. 66 illustrates mapping of three values onto the baseline process;

FIG. 67 illustrates mapping of two values onto baseline process;

FIG. 68 illustrates two value expression;

FIG. 80 illustrates set of value transform rules for full-adder with completeness boundaries;

FIG. 81 illustrates progression of resolution for pure value expression with completeness boundaries;

FIG. 82 illustrates four bit adder with boundaries;

FIG. 118 illustrates mapping each recognition to individual behaviors;

FIG. 119 illustrates a pure association expression behavior memory;

FIG. 120 illustrates association expression can search by altering association relationships;

FIG. 121 illustrates association expression of binary full-adder;

FIG. 122 illustrates association expression extended to strict sequence through time;

FIG. 123 illustrates binary full-adder extended in time with pipeline feedback paths;

FIG. 124 illustrates fan-in fan-out command sequences for feedback full-adder;

FIG. 125 illustrates command rings attached to fan-in and fan-out structures of the OR gate;

FIG. 126 illustrates redrawn full-adder showing bounded feedback paths;

FIG. 127 illustrates feedback network with merged steering structures;

FIG. 128 illustrates merged feedback network steering commands;

FIG. 129 illustrates full-adder with operator steering structures;

Figure 135:
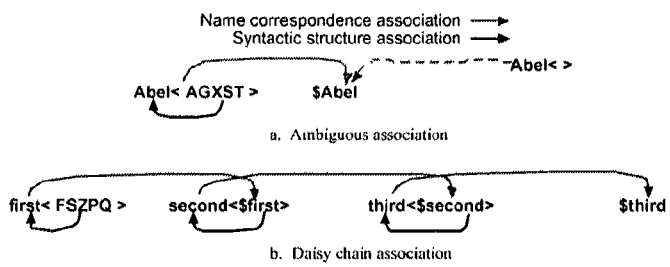
Figure 136:
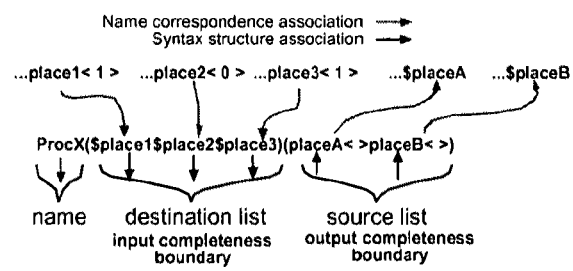
Figure 137:
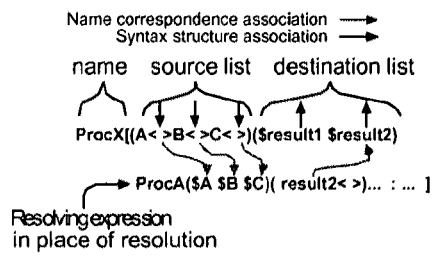
Figure 138:
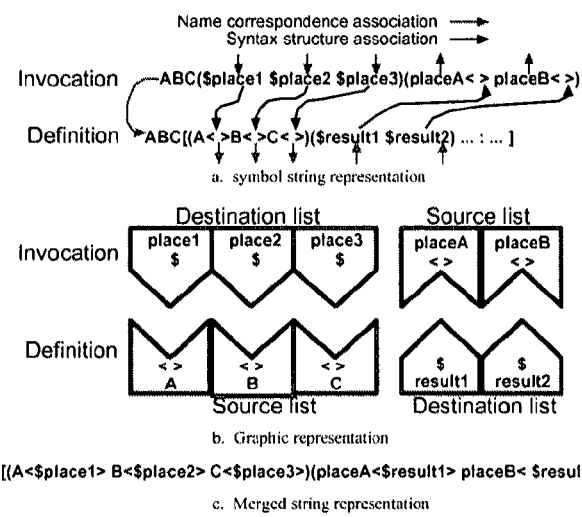
Figure 152:
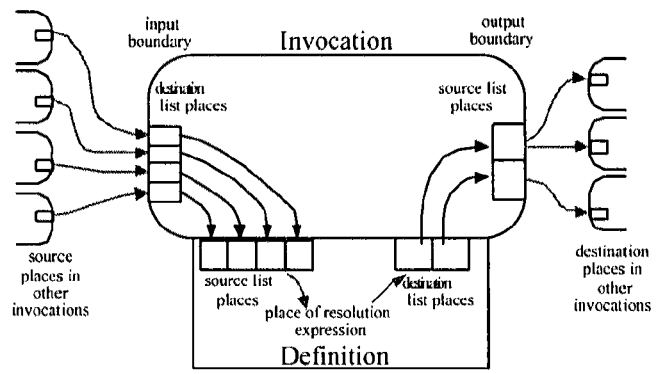
Figure 153:
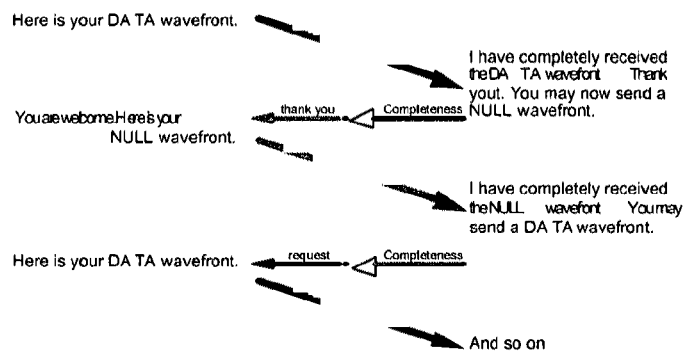
Figure 154:
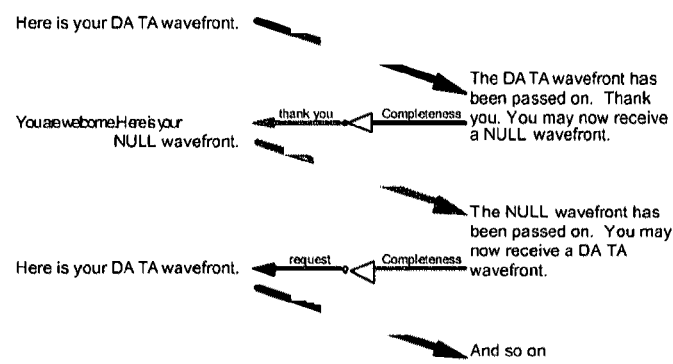
Figure 155:
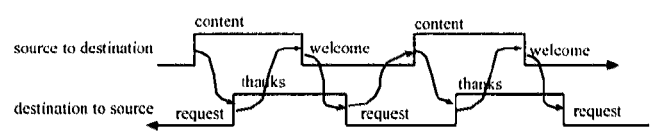
Figure 156:
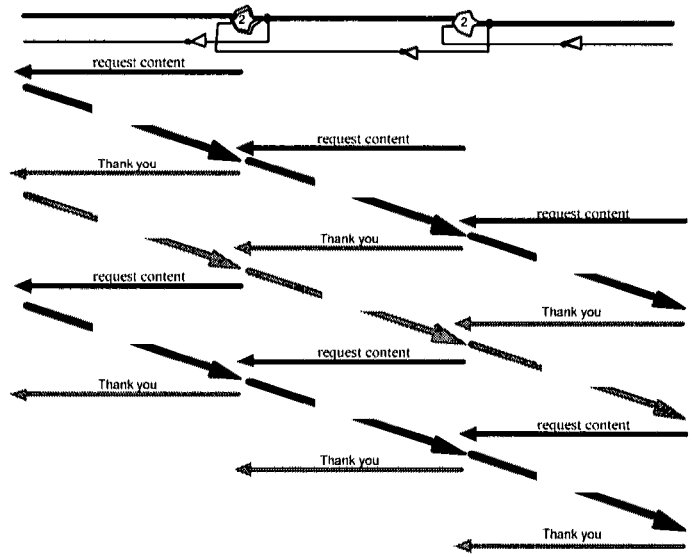
Figure 157:
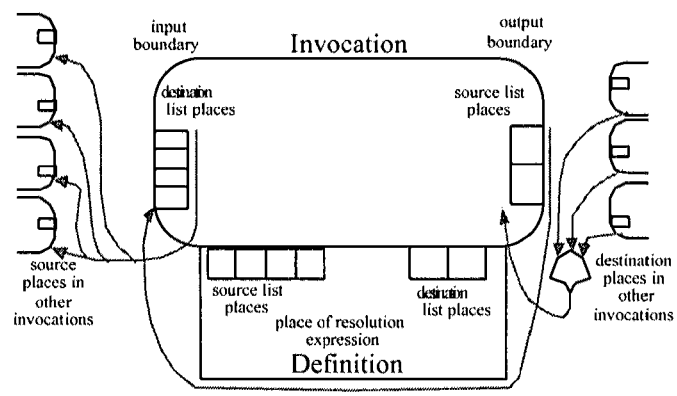
Figure 158:
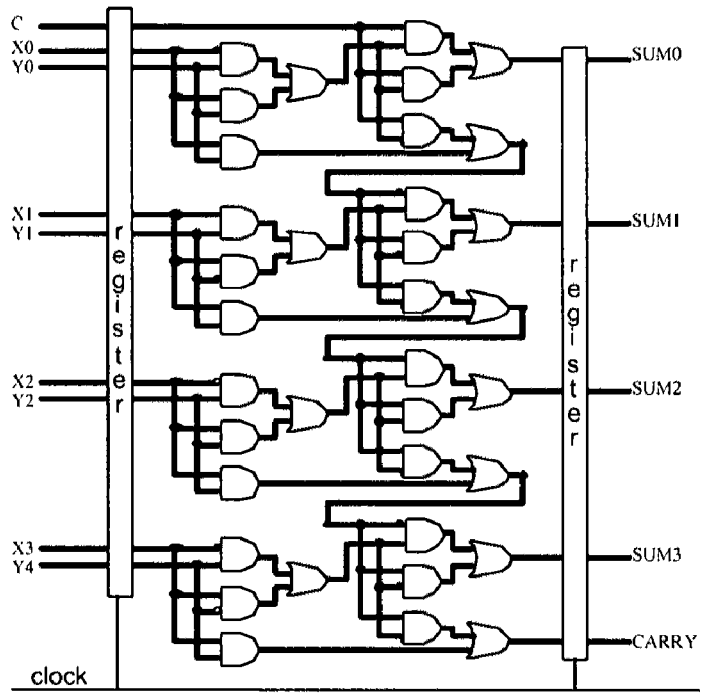
Figure 159:
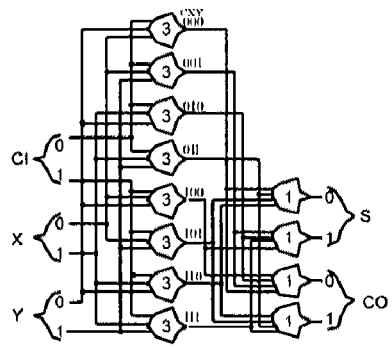

FIG. 130 illustrates merged command sequences with operator steering commands;

FIG. 131 illustrates full-adder redrawn with straight through pipelines and merged command ring;

FIG. 132 illustrates commands combined into a single sequence and mapped to preassigned place names;

FIG. 133 illustrates coupled rings of the eagle expression;

FIG. 134 illustrates source to destination association expressions;

FIG. 135 illustrates daisy chaining associations;

FIG. 136 illustrates the invocation syntax and external associations;

FIG. 137 illustrates the definition syntax and internal associations;

FIG. 138 illustrates the syntactic association of invocation to the definition;

FIG. 139 illustrates structure of language example;

FIG. 140 illustrates Boolean binary full-adder in terms of two half-adders;

FIG. 141 illustrates input associations of the definition;

FIG. 142 illustrates associations within the resolution expression;

FIG. 143 illustrates full-adder with more expressive functions;

FIG. 144 illustrates full-adder with binary correspondence names;

FIG. 145 illustrates mapping association;

FIG. 146 illustrates mapping an interaction expression;

FIG. 147 illustrates resolution progression of pure value expression;

FIG. 148 illustrates pure association expression of full-adder;

FIG. 149 illustrates NCL mappings of Boolean OR function;

FIG. 150 illustrates an optimal version of pure association full-adder;

FIG. 151 illustrates four-bit adder with hierarchical boundaries;

FIG. 152 illustrates completeness boundaries of the invocation with content flow;

FIG. 153 illustrates completeness coordination protocol between expressions;

FIG. 154 illustrates completeness coordination protocol within an expression;

FIG. 155 illustrates four-phase handshake protocol;

FIG. 156 illustrates protocol behavior of interlinked cycles;

FIG. 157 illustrates completeness boundaries of invocation with acknowledge flow;

FIG. 158 illustrates four-bit adder mapped to a clocked autonomous expression;

FIG. 159 illustrates pure association minterm expressions;

FIG. 160 illustrates the expression of very large differentness domains;

FIG. 161 illustrates experience memory;

FIG. 162 illustrates Euclid's greatest common divisor algorithm;

FIG. 163 illustrates Greatest Common Divisor association structure;

FIG. 164 illustrates bit sequence detector state machine;

FIG. 165 illustrates structure of stoplight control expression;

FIG. 166 illustrates Linear Feedback Shift Register;

FIG. 167 illustrates 2NCLcycles and Petri net cycles.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

1 A Critical Review of the Notion of the Algorithm in Computer Science

Computer science inherited its present conceptual foundations from a branch of pure mathematics that, historically, had been exploring the fundamental nature of mathematical computation since before the turn of the century. It is argued that the conceptual concerns of computer science are quite different from the conceptual concerns of mathematics, and that this mathematical legacy, in particular the notion of the algorithm, has been largely ineffective as a paradigm for computer science. It is first necessary to understand the role of the algorithm in mathematics.

1.1 The Notion of the Algorithm in Mathematics

The notion of the algorithm is fundamental to mathematics. To understand the significance of the algorithm to mathematics it is necessary to understand the history of its development. The term itself derives from the name of an important ninth century Persian mathematician, Mohammed ibn Musa al-Khowarizmi, who in about AD 825 A.D., wrote a small book describing how to calculate with a new ten symbol, positional value number system developed in India. It described simple procedures for carrying out addition, subtraction, multiplication and division in the new system. Around 1120 this small book was translated into Latin under the title Liber Algorismi de numero Indorum (The Book of al-Khowarizmi on the Hindu number system). This translation was widely distributed and introduced the Hindu-Arabic number system to Europe. By the mid thirteenth century al-Khowarizmi had been largely forgotten and the term algorism (Latin for al-Kowarizmi's book) came generally to refer to computation in the new number system. At this time an algorism was any book related to the subject. The algorisms were the four arithmetic operations. An algorist was one who calculated in the new number system as opposed to an abacist who used an abacus. By 1500 the algorists had prevailed and the abacists had largely disappeared from Europe.

These algorisms were strictly mechanical procedures to manipulate symbols. They could be carried out by an ignorant person mechanically following simple rules, with no understanding of the theory of operation, requiring no cleverness and resulting in a correct answer. The same procedures are taught to grade school children today. Computing with Roman numerals, on the other, hand required considerable skill and ingenuity. There also existed at this time other examples of mechanical formulation such as Euclid's method to find the greatest common denominator of two numbers. The fact that dumb mechanical manipulations could produce significant and subtle computational results fascinated the medieval mathematicians. They wondered if it was possible that the whole of mathematics or even all of human knowledge could be mechanically formulated and calculated with simple rules of symbol manipulation.

Gotftried Leibniz attempted just such a formulation in the 1660s with his calculus ratiocinator or characteristica universalis. The object was to "enable the truths of any science, when formulated in the universal language, to be computed by arithmetical operations" [1]. Arithmetical here refers to the algorisms. Insight, ingenuity and imagination would no longer be required in mathematics or science. Leibniz did not succeed and the idea lay fallow for two hundred years.

During this period Euclidian geometry, with its axioms and rules of reasoning from the simple to the complex continued to reign as the fundamental paradigm of mathematics. In the 1680s, after the invention of analytical geometry and after he had made new discoveries with his own invention of his fluxional calculus, Sir Issac Newton was careful to cast all the mathematical demonstrations in his presentation of these new discoveries in Philosophiae naturalis principia mathematica in classical Euclidian geometry. A symbolic analytical presentation would neither have been understood nor accepted by his contemporaries. Geometry, which dealt with relationships among points, lines and surfaces, was intuitive, obvious and real. Algebra, which deals with arbitrary symbols related by arbitrary rules did not relate to any specific reality. While algebra was practical and useful, it was not considered fit territory for fundamental theoretical consideration. Late into the nineteenth century symbolic computation was distrusted and discounted. This attitude is exemplified by a nineteenth century astronomer who remarked that he had not the "smallest confidence in any result which is essentially obtained by the use of imaginary symbols" [2].

The dream of formalizing thought in terms of mechanical manipulation of symbols reemerged with the symbolic logic of George Boole presented in his book Laws of Thought in 1854. Boole argued persuasively that logic should be a part of mathematics as opposed to its traditional role as a part of philosophy. Gottlob Frege went several steps further and suggested that not only should logic be a part of mathematics but that mathematics should be founded on logic and he began a program to derive all of mathematics in terms of logic.

Meanwhile the paradigmatic edifice of Euclidian geometry was beginning to show cracks with the discovery of non Euclidian geometries that were internally consistent and therefore were just as valid mathematical systems as Euclidian geometry. Symbolic computation achieved paradigmatic preeminence with the publication in 1899 of David Hilbert's characterization of Euclidian geometry in terms of algebra, Grundlagen der Geometrie (Foundations of Geometry), which emphasized the undefined nature of the axioms. "One must be able to say at all times—instead of points, straight lines and planes—tables, chairs and beer mugs" [3]. Euclidian geometry was after all just one of many possible axiomatic symbolic computation systems.

As the twentieth century dawned, symbolic computation had been established as the arena of mathematical theorizing and logical axiomatic systems provided the rules of the game. The mathematicians were hot on the trail of settling the game once and for all. They seemed to be on the verge of fulfilling Leibniz's dream of the universal symbolic language that would proffer absolute certainty and truth. The quest was led by Hilbert who outlined a program to settle once and for all the foundational issues of mathematics. The program focused on the resolution of three questions:

1. Was mathematics complete in the sense that every statement could be proved or disproved?
2. Was mathematics consistent in the sense that no statement could be proved both true and false?
3. Was mathematics decidable in the sense that there existed a definite method to determine the truth or falsity of any mathematical statement? [4]

The definite method of decidability in question 3 was the modern incarnation of Leibniz's arithmetical operations on his universal symbolic language. Mechanical symbol manipulation reemerges at the very foundations of theoretical mathematics.

Hilbert firmly believed that the answer to all three questions was yes, and the program was simply one of tidying up loose ends. Hilbert was convinced that an unsolvable mathematical problem did not exist, "every mathematical problem must necessarily be susceptible to an exact statement, either in the form of an actual answer to the question asked, or by the proof of the impossibility of its solution"[5].

In 1931 Kurt Godel demonstrated that any axiom system expressive enough to contain arithmetic could not be both complete and consistent in the terms of the axiom system. This result was the death knell for Hilbert's program. The answers to the first two questions were no. There remained the question of decidability, the Entscheidungsproblem, as Hilbert named it: the definite method of solving a mathematical problem. After Godel proved that unsolvable problems (unprovable theorems) could exist in an axiom system, the decidability problem became a search for a definite method to determine if a given problem was solvable or unsolvable in a given axiom system.

The decidability problem appealed directly to the notion of a definite method, which was also referred to as an effective procedure or a mechanical procedure. This notion had always been fundamental to mathematics but had been intuitively accepted and had not been a subject of investigation itself. One knows an effective procedure when one sees one. But to demonstrate something about the nature of effective procedures there must be a precise characterization of what constitutes an effective procedure.

Hilbert made it clear what constituted an acceptable mathematical solution in his 1900 paper posing 23 problems that he considered important to the future of mathematics:

"that it shall be possible to establish the correctness of a solution by means of a finite number of steps based upon a finite number of hypotheses which are implied in the statement of the problem and which must always be exactly formulated." [5]

Satisfactorily characterizing this notion of effective or mechanical procedure became an important foundational issue in mathematics and several mathematicians applied themselves to the problem. Among them were Jacques Herbrand and Godel, Emil Post, Alan Turing, Alonzo Church and A. A. Markov. Each had a different characterization of effective computability, but all were shown later to be logically equivalent. In 1936 both Church with his lambda calculus and Turing with his machine proved that no effective procedure existed to determine the provability or unprovability of a given mathematical problem. The answer to Hilberts third question was also no. Leibniz's calculus ratiocinator with its arithmetical resolution of all questions proved to be not possible. Ingenuity, insight and imagination could not be done away with in mathematics after all.

Despite the failure of Hilbert's program, questions of effective computability have continued to be a fundamental concern of mathematicians. Through the 1940s and 1950s Markov tried to consolidate all the work of the others on effective computability and introduced the term algorithm with its modern meaning as a name for his own theory of effectively computable functions. In the translated first sentence of his 1954 book Teoriya Algorifmov (Theory of Algorithms) he states:

"In mathematics, "algorithm" is commonly understood to be an exact prescription, defining a computational process, leading from various initial data to the desired result." [6]

The term algorithm was not, apparently, a commonly used mathematical term in America or Europe before Markov, a Russian, introduced it. None of the other investigators, Herbrand and Godel, Post, Turing or Church used the term. The term, however, caught on very quickly in the computing community. In 1958 a new programming language was named ALGOL (ALGOrithmic Language). In 1960 a new department of the Communications of the ACM was introduced called "Algorithms" [7].

Historically the algorithm was developed to investigate the foundations of mathematics and it has evolved in relation to the needs of mathematicians. The notion of the algorithm in mathematics is a limiting definition of what constitutes an acceptable solution to a mathematical problem. It establishes the ground rules of mathematics.

1.2 The Advent of Computers

The electronic digital computer emerged in 1945. It computed one step at a time, was by practical necessity limited to a finite number of steps and was limited to a finite number of exactly formulated hypotheses (instructions). The electronic digital computer was an incarnation of the mathematician's effective solution procedure. The mathematicians, being intimately involved with the creation of the computer, having studied mechanical computation for half a century, and having in hand an explicitly mechanical model of computation in the Turing machine, quite reasonably became the de facto theorists for this new phenomenon. One of these mathematicians, John Von Neumann, was a student of Hilbert's and a significant contributor to his program to resolve the foundations of mathematics. Another was of course Turing himself. The related mathematical concepts along with the notion of the algorithm were transplanted into the fledgling science of computers.

The notion of the algorithm has become accepted as a fundamental paradigm of computer science.

"The notion of the algorithm is basic to all computer programming . . . " [8]

"One of the concepts most central to computer science is that of an algorithm." [9]

To appreciate the role of the notion of the algorithm in computer science it is necessary first to characterize computer science.

1.3 Computer Science

Many attempts have been made to define computer science [10][11][12][13][14]. All of these definitions view computer science as a heterogeneous group of disciplines related to the creation, use and study of computers. A typical definition simply offers a list of included topics: computability, complexity, algorithm theory, automata theory, programming, high level languages, machine languages, architecture, circuit design, switching theory, system organization, numerical mathematics, artificial intelligence, other applications, and so forth. The most recent and comprehensive survey of the attempts to define computer science is an article in the Annals of the History of Computing [15].

Computer science appears to consist of a quite disparate collection of disciplines, but there is a common thread of conceptual focus running through the various disciplines of computer science. All of the disciplines that are included under the heading of computer science in any list are concerned in one way or another with the creation of or actualization of process expressions. A logic circuit is an expression of a logical process. An architecture is an expression of a continuously acting process to interpret symbolically expressed processes. A program is a symbolic expression of a process. A programming language is an environment within which to create symbolic process expressions. A compiler is an expression of a process that translates between symbolic process expressions in different languages. An operating system is an expression of a process that manages the interpretation of other process expressions. Any application is an expression of the application process.

Computer science can be viewed as primarily concerned with questions about the expression of processes and the actualization of those expressions. What are all the possible ways a process can be expressed? Are some expressions superior in any sense to other expressions? What are all the possible ways of actualizing an expression. Are there common conceptual elements underlying all expressions? What is the best programming language? How can the best program be formulated? How can the best architecture be built? What is the best implementation environment? These are the questions that occupy computer scientists and they all revolve around the nature of process expression.

Mathematicians, on the other hand, are primarily interested in exploring the behavior of specific processes or classes of process. They bypass general problems of expression by appealing to a very formal and minimalized model of expression, the algorithm as characterized by the Turing machine. They are only interested in whether an expression is possible and whether it conforms to certain specific properties. The mathematicians consider the process as independent of its expression. A process may be expressed in any convenient language and executed on any convenient machine including a human with a pencil.

Mathematics is primarily concerned with the nature of the behavior of process independent of how that process is expressed:

the nature of a process is considered independent of its expression.

Computer science is primarily concerned with the nature of the expression of processes regardless of what particular process might be expressed:

the nature of expression is considered independent of its process.

There is much overlap between the interests of computer science and mathematics, but this core concern with the nature of process expression itself is the unique conceptual focus that distinguishes computer science from the other sciences and from mathematics. Computer science is the science of process expression.

1.4 The Algorithm in Computer Science

Introductory texts on computer science often begin with a chapter on the notion of the algorithm declaring it the fundamental paradigm of computer science. Conspicuously absent from these introductory chapters is discussion of how the notion contributes to the resolution of significant problems of computer science. In the remaining chapters of these texts there is typically no further appeal to the notion of the algorithm and rarely even a usage of the word itself. The notion is never or very rarely appealed to in texts on logic design, computer architecture, operating systems, programming, software engineering, programming languages, compilers, data structures and data base systems.

The notion of the algorithm is typically defined by simply presenting a list of properties that an expression must posses to qualify as an algorithm. The following definition of an algorithm is typical:

1. An algorithm must be a step-by-step sequence of operations.
2. Each operation must be precisely defined.
3. An algorithm must terminate in a finite number of steps,
4. An algorithm must effectively yield a correct solution,
5. An algorithm must be deterministic in that given the same input it will always yield the same solution.

This is pretty much what Hilbert proposed in 1900 and it is easy to see how this list of restrictive characteristics serves to define what is acceptable as a mathematical solution. But what conceptual service does the notion of the algorithm perform for computer science?

The notion of the algorithm demarcates all expressions into algorithm and non-algorithm but what purpose does it serve to know that one program is an acceptable mathematical solution and another is not? Is the expression of one fundamentally different from the expression of the other? Is one interpreted differently from the other? Are algorithms first class citizens in some sense and nonalgorithms second class citizens? Does determining whether or not a given expression is an acceptable mathematical solution aid in building better computer systems or in writing better programs?

Important process expressions do not qualify as algorithms. A logic circuit is not a sequence of operations. An operating system is not supposed to terminate, nor does it yield a singular solution. An operating system cannot be deterministic because it must relate to uncoordinated inputs from the outside world. Any program utilizing random input to carry out its process, such as a Monte Carlo simulation or fuzzy logic simulation is not an algorithm. No program with a bug can be an algorithm and it is generally accepted that no significant program can be demonstrated to be bug free. Programs and computers that utilize concurrency where many operations are carried out simultaneously cannot be considered algorithms. What does it mean when a sequential program qualifying as an algorithm is parallelized by a vectorizing compiler, and no longer qualifies as an algorithm.

While a digital computer appears to be an algorithmic machine, It is constructed of nonalgorithmic parts (logic circuits) and a great deal of what it actually does is nonalgorithmic. These difficulties with the notion of the algorithm have not gone unnoticed and a variety of piecemeal amendments, revisions and redefinitions have been proposed:

"... there is an extension of the notion of algorithm (called nondeterministic algorithm)." [11] p. 16

"Any computer program is at least a semi-algorithm and any program that always halts is an algorithm." [16]

"There is another word for algorithm which obeys all of the above properties except termination and that is computational procedure."[17]

"An algorithm A is a probabilistically good algorithm if the algorithm "almost always" generates either an exact solution or a solution with a value that is "exceedingly close" to the value of the optimal solution." [18]

"The procedure becomes an algorithm if the Turing machine always halts". [19]

"By admitting probabilistic procedures in algorithms ..." [20]

"... if, after executing some step, the control logic shifts to another step of the algorithm as dictated by a random device (for example, coin tossing), we call the algorithm random algorithm." [21]

"An algorithm which is based on such convergence tests is called an infinite algorithm." [21]

"Algorithms that are not direct are called indirect." [22] p. 47

"We drop the requirement that the algorithm stop and consider infinite algorithms". [22] p. 49]

These authors have sensed an inappropriate conceptual discrimination or simply an incompleteness and proposed a remedy. Programs that do not terminate, are not deterministic and do not give specific solutions can now be "included." They are no longer simply nonalgorithmic, they now have positive labels, but simply assigning labels to nonalgorithms misses the point. The point is that algorithm-nonalgorithm is not a conceptual distinction that contributes to an understanding of process expression.

As a paradigm of process expression, the notion of the algorithm is decidedly deficient. It offers no suggestion as to how an operation might be precisely defined. Nor does it suggest how a sequence should be determined. Data is not even mentioned. The definition simply states that an algorithm must consist of a sequence of precisely defined operations. This unsupported imperative is at once an admission of expressional incompleteness and a refusal to be complete. The other algorithmic properties of termination, correctness and determination, while important to issues of computation, are quite irrelevant to issues of process expression.

The notion of the algorithm simply does not provide conceptual enlightenment for the questions that most computer scientists are concerned with.

1.5 Conclusion

What is essentially a discipline of pure mathematics has come to be called "the theory of computer science," and the notion of the algorithm has been decreed to be a fundamental paradigm of computer science. The mathematical perspective, however, is the wrong point of view. It is asking the wrong questions. Mathematicians and computer scientists are pursuing fundamentally different aims and the mathematicians tools are not as appropriate as was once supposed to the questions of the computer scientist. The primary questions of computer science are not of computational possibilities but of expressional possibilities. Computer science does not need a theory of computation, it needs a comprehensive theory of process expression.

2 The Simplicity of Concurrency he expression of sequentiality is generally considered to be simple and reliable whereas the expression of concurrency is perceived to be complex and nondeterministic. Sequentiality is accepted as a primitive form of expression and concurrency is characterized in terms of sequentiality. It is argued here that the perception of the simplicity of sequentiality and the complexity of concurrency is an artifact of a particular conceptual view; it is not unlike the perceived impossibility of traveling to the moon while thinking in terms of cycles and epicycles in crystalline spheres.

The difficulty lies in the notion of the mathematical function, which is a simple mapping relation with no expression of coordination behavior with other functions. The expressivity of coordination traditionally resides in a mathematician with a pencil. In the absence of a mathematician, the uncoordinated behavior of a system of functions, is nondeterministic.

The coordination expression of the missing mathematician can be restored in two different ways that lead to radically different views of process expression. In one view, which sequentiality is simple and primitive and concurrency is a complex and risky derivative of sequentiality and in the other view concurrency is simple and primitive and sequentiality is a complex and risky special case of concurrency.

2.1 The Primacy of Sequentiality

For a number of seemingly good conceptual and practical reasons sequentiality is considered to be a fundamental primitive form of process expression. A strong conceptual motivation for sequentiality comes from the theory of computer science adopted from the theory of mathematics. The notion of the algorithm characterizes a computational process as a strict sequence of precisely defined operations. From the mathematicians point of view, any concurrent expression (a partial ordering) can be reduced to a sequential expression (a total ordering). Sequential expression is a sufficient theoretical primitive so there is no theoretical necessity to consider concurrency on its own terms. Sequentiality appears to reside at a reductive conceptual bottom.

There are practical motivations. A transistor can only do one thing at a time in sequence. There is the convenience of generally configuring a system by using a single element over and over in sequence. There is the sense that humans seem to think, intellectually at least, in a step-by-step manner. There is the unprecedented success at building and using sequential computing machines.

But most influential is that concurrency appears to be complex, even nondeterministic and chaotic, like a hydra-headed beast that must be wrestled into submission. Sequential expression, by contrast, seems simple, straightforward and tractable. It only makes good sense to appeal to the simplicity of sequentiality to tame the complexity of concurrency.

Accordingly, sequentiality is regarded as a primitive form of process expression and concurrency is characterized in terms of sequentiality as cooperating sequential processes[5], communicating sequential processes[3], interleaved sequential processes[2] and so on.

2.2 The Complexity of Concurrency

The complexity of concurrency manifests itself in a number of forms that all relate to unruly behavior. It just seems obvious that controlling a gaggle of multiple events all at once should be more difficult than controlling one thing at a time in sequence.

2.2.1 The Demon of Indeterminacy

"The introduction of concurrency into computation opens Pandora's box to release the possibility of non determinacy and a host of other complications, including deadlock and livelock.... Events within concurrent systems do not necessarily occur at predetermined times, but may occur in different orders depending upon the relative speeds of different system parts. The usual assumption, which is also physically realistic, is that relative speeds cannot be controlled so precisely that the designer or programmer can depend upon them to enforce sequencing requirements.[8]

Events can occur in different orders depending on the relative speeds of different system parts. The speeds of the parts cannot be controlled to avoid the different orderings and most of the possible different orderings do not result in a correct answer.

"Unfortunately, asynchronous circuits are difficult to design because they are concurrent systems. When trying to understand a synchronous circuit, it is possible to pretend that events occur in lock-step. Variations in the speeds of functional elements can be ignored, since the clock is timed to allow for the worst-case delays. the lock-step model does not work for speed-independent designs—a correct design must exhibit proper behavior no matter what the speeds of its components. When several components are operating concurrently, there may be a very large number of possible execution paths, each corresponding to a different set of delays in the components. Non determinism resulting from unknown or varying delays is the essential problem in all concurrent systems. For a property to hold for a concurrent system it must hold for every possible execution."[1]

By "must hold for every possible execution" it is meant that if all the possible execution paths (orderings of components/events) give the same correct result, the problem of many different orderings can be overcome. The first step in resolving this expressional difficulty is to determine all the possible execution paths. This is called the state space explosion problem.

2.2.2 The State Space Explosion

"Although the architectural freedom of asynchronous systems is a great benefit, it also poses a difficult challenge. Because each part sets its own pace, that pace may vary from time to time in any one system and may vary from system to system. If several actions are concurrent, they may finish in a large number of possible sequences, Enumerating all the possible sequences of actions in a complex asynchronous chip is as difficult as predicting the sequences of actions in a schoolyard full of children. This dilemma is called the state explosion problem. Can chip designers create order out of the potential chaos of concurrent actions?"[9]

The state space of the process must include all the possible states of all the possible correct and incorrect orderings, including incorrect states due to critical timing relationships (glitches). For a concurrent expression of any practical size the state space that must be considered can become enormous.

Only after enumerating all the possible sequences (orderings of components-events-actions, execution paths) through the expanded state space can one begin to attempt to reduce the possible sequences and to make each execution sequence unambiguously result in a transition to the correct final state.

2.2.3 Elusive Confidence

Faced with such complexity of behavior it is difficult to attain confidence in the behavior of a concurrent system "concurrent programming is much more difficult than sequential programming because of the difficulty of ensuring that a concurrent program is correct." [2]

Reliably reproducible behavior is the critical ingredient of confidence. The many possible orderings of concurrency does not contribute to confidence.

"Our ability to test a large sequential program in small steps depends fundamentally on the reproducible behavior of the program." [4]

"The important thing about a sequential program is that it always gives the same results when it operates on the same data independently of how fast it is executed. All that matters is the sequence in which the operations are carried out." [4]

Convenient state visibility is lost with concurrent behavior. The first difficulty is the state space explosion. The state space to consider is just much larger than a sequential state space. The second difficulty is that with concurrent events there is no reliable way to determine when an extended state is stable and can be sampled. Even if one is able to sample the extended state, one must also be able to discern which order of events (execution path) is in play to analyze the sampled state.

With sequentiality it is assumed that each event completes before the next event begins. In the interval between events a stable state of the system can be sampled to verify the correct behavior of each event in turn. In the context of state behavior it is clearly easier to observe and trust the behavior of sequentiality than it is to observe and trust the behavior of concurrency.

2.2.4 Confusions

If concurrent behavior is so impossibly complex, how is it possible that anything at all is designed to reliably operate with concurrent behavior? The natural world operates with massively concurrent behaviors and almost every human artifact including computers operate reliably with concurrent behaviors. The situation can't possibly be as bad as it appears.

"Having adopted this assumption of arbitrary speed, the designer or programmer proceeds to construct systems that enforce the sequencing that is logically necessary to the computation. Sequencing can, for example, be enforced by such causal mechanisms as signals, shared variables, or messages between concurrent processes." [8]

Since one cannot rely on timing relationships to control concurrent events one must rely on "causal mechanisms" or, in other words, logical relationships to manage concurrent events. But, if concurrency can in fact be managed with logical relationships, why all the agonizing about timing relationships? Why are time relationships considered at all? Why is concurrency not considered purely in terms of logical relationships to begin with? The answers lie with the mathematical notion of the function.

2.3 The Roots of Apparent Complexity

A mathematical function is a mapping from an input data state to an output data state. Neither the expression of the mathematical function nor the expression of the data state includes the expression of how the function might interact with other functions. how an instance of input data presented to the function might be bounded (when it begins and when it ends) or how the result of the function might be presented and bounded (when it is valid and when it is not valid). These aspects of a function's behavior were, historically, expressed by a mathematician with a pencil. The mathematician understands the proper flow of data among the functions and can correctly manage the behavior of each function and the flow of data among functions. But when functions are obliged to behave on their own, in the absence of the mathematician, the expression of this coordinating behavior embodied in the mathematician is lost.

How the lost expressivity of the missing mathematician is re-established is the root of the confusion and the crux of the matter.

2.3.1 The Behavior of Mathematical Functions

Figure 1:
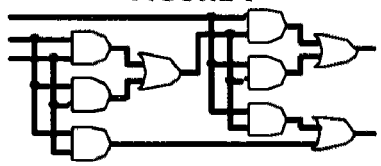
FIG. 1 illustrates a Network of Boolean functions.

The Boolean combinational logic expression of FIG. 1, which is a network of concurrent or partially ordered Boolean functions, is taken as an exemplar of a concurrent system of mathematical functions. There is the expression of each function and the expression of the partial ordering (data paths, association relationships) among the functions. There is no expression of coordination of behavior among the functions. There is no expression of when a function should behave and when a function should not behave so the data paths and the functions must be presumed to behave continuously.

When the inputs of a Boolean combinational expression are presented with a new instance of input data, a wavefront of stable correct result values flow from the input through the network of logic functions to the output, but in the absence of the coordinating mathematician, data transitions flow indiscriminately over the freely flowing paths and through the continuously responsive functions. As some functions and paths are faster than others, the inputs of each function will arrive at different times and cause some functions to temporarily assert an erroneous result, which will be presented to the next functions in the path. As these temporary errors propagate and compound, a chaos of indeterminate result values speeds ahead of the wavefront of stable correct results, causing the output of the Boolean expression to transition through a large number of incorrect states before the wavefront of correct result values reaches the output and the expression stabilizes to the correct resolution of the presented input. This indeterminate behavior is a vivid manifestation of the chaos of concurrency.

One might try to avoid the indeterminate transitions by specifically expressing a precise propagation delay for each component, but propagation delays, which can vary with a number of factors such as data dependencies, temperature, age and manufacturing variability, cannot be reliably expressed. The indeterminate behavior of concurrent functions cannot be avoided by managing the propagation delays of components.

Even if the indeterminate transitioning could be avoided. there would still be no means to determine from the behavior of the expression itself when the output of the expression is asserting the correct result. If the current input happens to be identical to the previous input, the expression exhibits no transition behavior at all, correct or incorrect.

The boundaries of data presentation and resolution, traditionally expressed by the mathematician, are missing in a concurrent composition of mathematical functions. The expression of these boundaries must be re-established.

2.3.2 Re-Establishing the Expression of Boundaries

A concurrent composition of mathematical functions with a stably presented input can be relied on to eventually settle to a stable correct result of the presented input. This eventual stability can be characterized with a time interval beginning from the presentation of input with a duration of the propagation time of the slowest path in the expression plus a margin to accommodate the propagation variabilities of the path. This time interval can be associated with memory elements at the input and the output of the function. The memory element at the input presents and stably maintains the input to the expression at the beginning of the time interval. The memory element at the output of the expression ignores the indeterminate transitions during the time interval and samples the correct result after the expression has stabilized at the end of the time interval. The chaotic behavior of the concurrent expression is isolated by the time interval and the bounding memories.

The expressivity of the mathematician, who can easily manage the correct resolution of a partial ordering of functions, has not been fully recovered. Instead, the behavior of the concurrent functions is blurred into a single timed event characterized by the time interval itself. But enough expressivity of boundary behavior has been recaptured to be of practical use.

2.3.3 Composing Time Intervals

A concurrent/combinational expression, its time interval and its input and output memory elements can now be composed with other similar units of expression in terms of their time intervals and by sharing their memory elements. If this composition contains concurrency, the same problem of differing and varying delays among components (in this case the time intervals) leads to indeterminate behavior.

This second order indeterminacy can be avoided, however, if all time intervals are identical and are in phase. The result is a strict sequencing of events in terms of a succession of identical time intervals most conveniently expressed by a globally available interval signal or clock. When the clock tics, each memory element simultaneously receives output from a predecessor expression and presents input to a successor expression establishing the boundaries of data flow through the expression. Between clock tics the memory elements contain the sampled state of the system.

2.3.4 The Simplicity of Sequentiality

By associating with the concurrent expression a time interval and memory elements that mask its indeterminate behavior and that determinantly bound its data flow behavior, the uncoordinated behavior of concurrent functions has been rendered sufficiently coordinated. Synchronous sequentiality tames the complexities of concurrency and provides a key to practical process expression. But, there is another way to re-establish the lost expressivity of the missing mathematician.

2.4 Symbolic Coordination

The expression of the boundaries of data presentation and the appreciation of those boundaries in the behavior of the functions can be re-established purely in terms of symbolic behaviors by enhancing the symbolic expression of the data to express its own flow boundaries and by enhancing the symbolic expression of the function to appreciate those flow boundaries.

2.4.1 Symbolically Expressing Data Flow Boundaries

Figure 2:
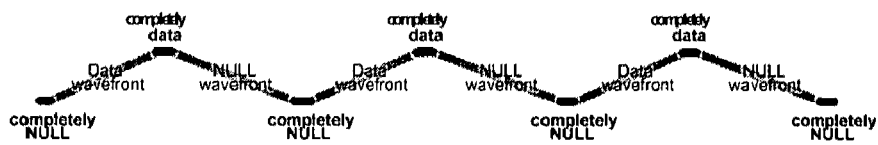
FIG. 2 illustrates Monotonically alternating wavefronts of completely data and completely not-data.

To the symbols representing data is added a symbol, NULL, that explicitly represents "not-data". This allows two disjoint state domains in the representation of data: "completely data" (all data symbols) and "completely not-data" (all NULL symbols). The data can now transition monotonically between "completely not-data" and "completely data" as illustrated in FIG. 2. The transition of the input from "completely not-data" to "completely data" is called a data wavefront and expresses the presentation of a new instance of input data. The transition of the input from "completely data" to "completely not-data" is called a NULL wavefront and expresses the boundary between successive presentations of input data.

2.4.2 Logically Recognizing Data Flow Boundaries

A logical function can be enhanced to respond only to completeness relationships at its inputs:

If input is "completely data," then transition output to the "data" resolution of input.

If input is "completely NULL," then transition output to "NULL".

If input is neither "completely data" nor "completely NULL," do not transition output.

The transition of the output implies the completeness of presentation of the input, the completeness of its resolution and that the asserted output is the correct resolution of the presented input. This is called the completeness criterion.

Figure 3:
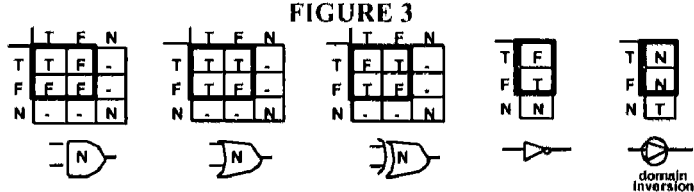
FIG. 3 illustrates Boolean operators enhanced with NULL value and state holding behavior.

Enhanced Boolean logic operators, shown in FIG. 3, are no longer mathematical functions. They now include a state-holding or hysteresis behavior. A dash means that there is no transition. The domain inversion will be explained later. A logic using the NULL value and state-holding behavior will be called a NULL Convention Logic. The logic described here is a 3 value NULL Convention Logic (3NCL). While this discussion will continue in terms of 3NCL, there is also a practical 2 value NULL Convention Logic (2NCL) suitable for electronic implementation [7].

2.4.3 The Completeness Behavior of a Network of Enhanced Functions

Figure 4:
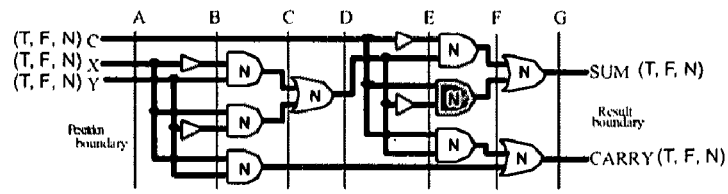
FIG. 4 illustrates the completeness criterion for a combinational expression as a whole.

The monotonic behavior of the data and the completeness behavior of each enhanced function fully coordinates the order of events in a concurrent expression. The individual completeness behaviors accumulate so that the network as a whole expresses the completeness criterion. Consider the combinational network of enhanced Boolean operators shown in FIG. 4. Divide the network arbitrarily into N ranks of operators ordered progressively from input to output, with all inputs before the first rank and all outputs after the last rank. The rank boundaries are shown in FIG. 4 with vertical lines labeled alphabetically in rank order from input to output.

For the values crossing G to be all data, all of the values crossing F must be data.

For the values crossing F to be all data, all of the values crossing E must be data.

For the values crossing E to be all data, all of the values crossing D must be data.

For the values crossing D to be all data, all of the values crossing C must be data.

For the values crossing C to be all data, all of the values crossing B must be data.

For the values crossing B to be all data, all of the values crossing A must be data.

Therefore, for all the values after G to be data, all the values before A must be data. If any value before A is NULL at least one value after G will be NULL.

These considerations are also true for the NULL wavefront presented when the expression is in an "completely data" state. Simply interchange NULL and data in the text above.

When the output of the expression monotonically transitions to "completely data", it means that the input is "completely data," the data wavefront has completely propagated through the expression and the data output is the correct result of the presented input. When the output of a concurrent expression monotonically transitions to "completely NULL," it means that the input is "completely NULL," the NULL wavefront has completely propagated through the expression and the NULL output is the correct result of the presented input. The output of the expression as a whole expresses the completeness criterion and maintains the monotonic behavior of the input.

It does not matter when or in what order the values transition at the input of the expression. Nor does it matter what the delays might be internal to the expression. Consider the shaded function in FIG. 4. It does not matter how long the data values (NULL values) take to propagate through other operators and over signal paths to the input of the shaded function, its output will not transition until all values are data (NULL) at the input of the function. For each wavefront each function synchronizes its input and switches its output exactly once to a correct value coordinating the orderly propagation of a wavefront of monotonic transitions of correct result values through the concurrent expression until the output of the expression as a whole is complete. The orderly symbolic behavior of each individual function accumulates to orderly symbolic behavior of the whole expressing the completeness criterion for the expression as a whole.

The behavior of the expression is fully determined in terms of symbolic behavior. There is no explicit expression of control. There is no consideration of timing relationships anywhere in the expression. There are no races, no hazards and no spurious result values. There is no nondeterministic behavior. For a given input there is only one possible ordering of operators, one possible path through the state space. There is no state space explosion. The behavior of the expression is deterministic, is repeatable, is testable and is trustable.

The complexities of concurrency have vanished.

The expression is complete in itself and behaves deterministically on its own terms. No supplementary expression such as a time interval, a memory, a sequence controller or a mathematician is required.

2.4.4 A New Symbolic Primitivity

The representation of data is no longer just data symbols. It includes what is essentially a syntax symbol, NULL, that separates successive presentations of input data. The operators are no longer mathematical functions. They maintain state. But they maintain state in a very specific way that relates to and propagates the monotonic completeness behavior of the data.

With these new primitivities the expressivity of the mathematician has been effectively integrated into the symbolic expression of the data and the functions. There is no compromise. The expression behaves exactly as if a mathematician had managed its behavior.

2.4.5 Ignoring NULL

Enhanced functions vary in their behavior only for a data wavefront. The NULL wavefront behavior is identical and universal for all enhanced functions. Presented with a NULL wavefront, the enhanced functions of any network will all transition to NULL. So, when expressing a concurrent expression, the NULL wavefront behavior can be ignored and only the behavior of the data wavefront has to be explicitly expressed. The coordinating completeness behavior of the enhanced functions is also identical and universal and need not be explicitly expressed.

Figure 5:
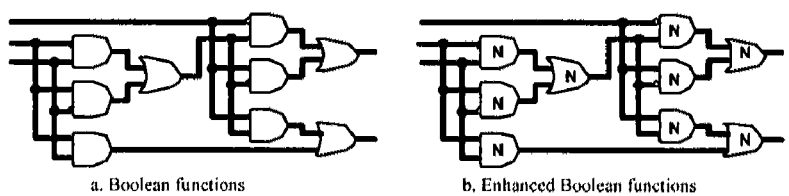
FIG. 5 illustrates identical concurrent networks mapping to different primitives.

Given an expression in terms of mathematical functions as in FIG. 5, the mathematical functions can be directly substituted with enhanced functions as in FIG. 5 creating a deterministically behaving symbolic expression. One can continue composing solely in terms of mathematical functions just as has always. An expression with enhanced functions can be automatically generated from an expression of mathematical functions.

One can compose concurrent networks of functions with confidence that the concurrent behaviors will properly coordinate without explicitly expressing any of the details of the coordination, just like expressing a sequence of operations with the confidence that the sequence will be properly coordinated without explicitly expressing any of the details of coordinating the sequence.

2.5 Coordinating Concurrent Networks

The enhanced functions of a network will coordinate their behavior among themselves, endowing the network with completeness criterion behavior. Networks can coordinate among themselves in terms of this completeness behavior.

2.5.1 The Self Coordinating Network

The completeness of the output of a network can be collected and expressed by asserting a single NULL value for complete NULL and a single data value for complete data. This completeness value can be domain inverted and become an acknowledge value fed back to the input of the network. The domain inversion function, inverts a data value to a NULL value and inverts a NULL value to a chosen data value, in this case T.

Figure 6:
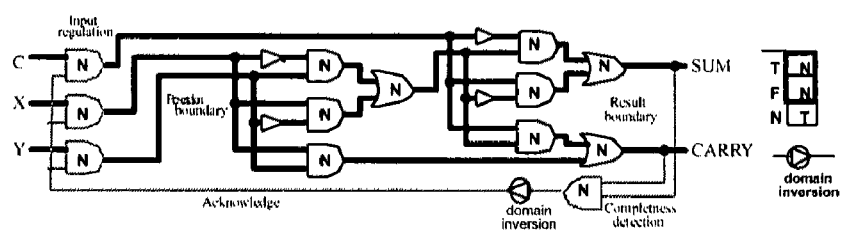
FIG. 6 illustrates a concurrent network coordinating its own input forming a cycle.

The acknowledge signal can then regulate the presentation of input to the network, as shown in FIG. 6 with the input regulator logic, which is a rank of enhanced AND functions. When the acknowledge value is data, it will allow a data wavefront to pass the input regulator. As long as the acknowledge value remains data the data wavefront will be stably maintained by the input regulator even if the data inputs to the AND functions transition to NULL. When the acknowledge value becomes NULL, a NULL wavefront will be allowed to pass. As long as the acknowledge value remains NULL, the NULL wavefront will be stably maintained by the rank of enhanced AND functions even if the data inputs to the AND functions transition to data. The acknowledge value and the input regulator regulates the orderly presentation of alternating data and NULL wavefronts to the concurrent expression.

The closed expression formed by the acknowledge path is called a cycle. By virtue of the domain inversion a cycle is an oscillator which spontaneously transitions (oscillates) between completely data and completely NULL.

2.5.2 Composing Cycles

Figure 7:
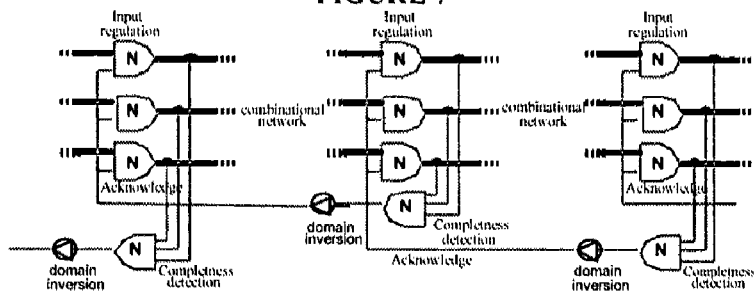
FIG. 7 illustrates coupled cycles forming a pipeline.

Cycles can be coupled by interlinking the cycles as in FIG. 7. The completion detection of a presenting cycle is placed after the input regulation of a receiving cycle.

While an acknowledge value is data the input regulator will allow a data wavefront from the presenting network to pass and will stably present it to its own receiving network. The presenting network will not receive its own acknowledge until the acknowledge value of the receiving network transitions to data allowing the data wavefront to pass the input regulator and be presented to the output completeness logic for the presenting network. An acknowledge signal says:

The data wavefront has been received. I can accept a NULL wavefront now.

The NULL wavefront has been received. I can accept a data wavefront now.

Each network maintains its output wavefront until the wavefront is accepted and maintained by its receiving networks. Alternating data and NULL wavefronts spontaneously propagate from cycle to cycle. Complex spontaneously flowing pipeline structures can be composed of coupled cycles. A fuller discussion of composing cycles into complex autonomously behaving pipeline systems can be found in [7].

2.6 Partitioning a Concurrent Network

Figure 8:
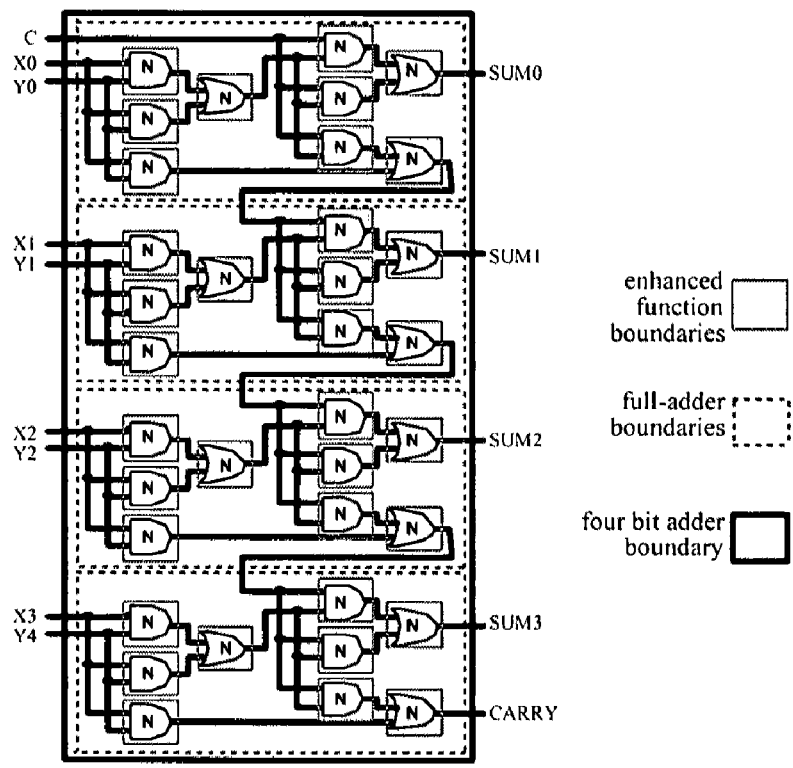
FIG. 8 illustrates four bit adder and composition boundaries.

Indefinitely large networks of enhanced functions can be composed that express the completeness criterion. Since any network of enhanced functions expresses the completeness criterion, any subnetwork expresses the completeness criterion. The result is a nested hierarchy of boundaries. The expression within each boundary expresses the completeness criterion and can support cycle coordination. FIG. 8 shows a network of four full-adders, composed to express a four-bit adder and its nested hierarchy of boundaries.

Figure 9:
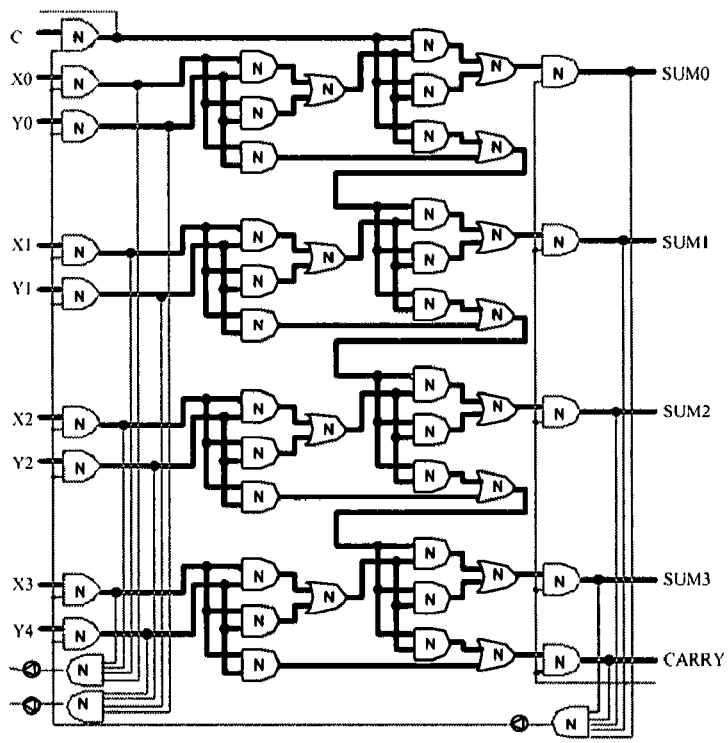
FIG. 9 illustrates four bit adder cycle.

FIG. 9 shows cycle coordination applied at the boundary of the four-bit adder with the coupled portions of presenting and receiving cycles.

2.6.1 Hierarchical Partitioning

Figure 10:
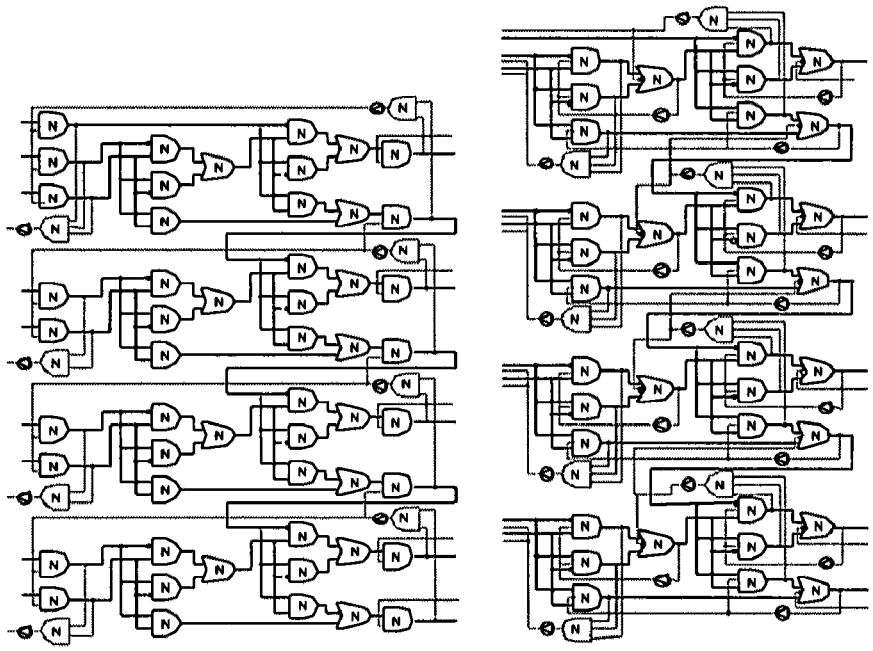
FIG. 10 illustrates four-bit-adder coordinated at full-adder boundaries.

FIG. 10 shows the four-bit adder partitioned with cycle coordination at the boundaries of the full-adders. The four-bit adder is now a pipeline of four full-adders. FIG. 10 shows the four-bit adder partitioned with cycle coordination at the boundaries of the enhanced functions. The four-bit adder is now a fairly complex structure of pipelined functions. In each case the expression of the four bit adder network remains constant. The cycle coordination can be automatically added at any specified hierarchical boundary level.

The method extends to all levels of expression. A large complex network of functions can be hierarchically partitioned and mapped into differing implementation environments such as hardware, instruction set, firmware, software and scriptware. These partitions can be coordinated with whatever protocol is conveniently available at each hierarchical level. The lowest levels might be coordinated with time intervals and a clock or with the NULL convention and cycles. Higher levels might use sequence control, semaphores message passing or communication channels.

The most abstract level is no different from the most primitive function level. Each level is represented as a network of expressions that know when they are done and when they are ready and that are coordinated with interlinked completeness protocols.

2.6.2 Lateral Partitioning

The network can also be laterally partitioned within a particular hierarchical level. A network below a low-level hierarchical boundary might be laterally partitioned into a set of common subnetworks which become an instruction set for that level of the expression. A higher level partitioning into common subnetworks might result in a subroutine library. A network as whole might be partitioned into subnetworks of minimal dependency relationships which become threads of the process.

Figure 11:
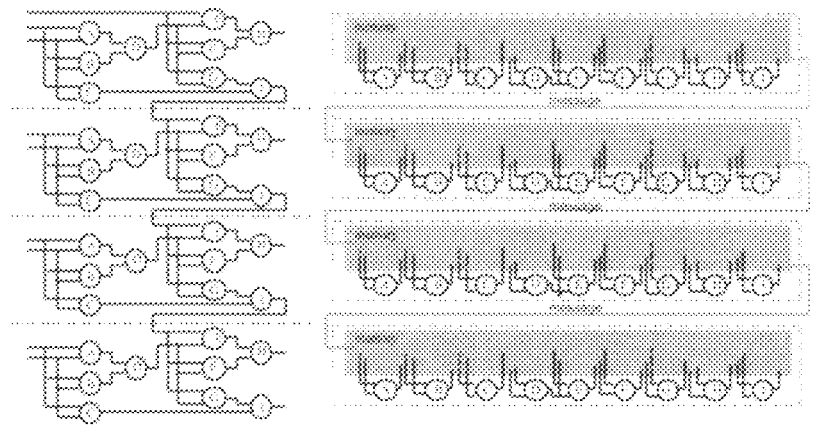
FIG. 11 illustrates four bit adder partitioned an mapped to sequential threads.

FIG. 11 shows the four-bit adder laterally partitioned at the boundaries of the full-adders, which are mapped to separate sequential threads residing in different cores which are coordinated with a message passing protocol.

The multi-thread sequential expression can be "compiled" directly from the network of functions. An expression of a concurrent network of functions can be easily mapped into any available concurrent or sequential implementation. Express once, partition and map forever.

2.6.3 The Simplicity of Concurrency

Now that it is understood that any concurrent network of functions can behave deterministically and reliably, the complexities of concurrency, the non-deterministic behavior, the races and hazards, the state space explosion, the elusive confidence and the subtleties of coordinating multiple sequential programs, have all vanished.

Given the network of functions and specified completeness boundaries, the network can be partitioned hierarchically into different implementation regimes and coordination protocols such as hardware, firmware and software. It can also be partitioned laterally into coupled cycles forming spontaneously behaving pipeline structures or into multi-threaded sequences of operations.

With the NULL convention and the enhanced functions the expression of concurrent behavior appears to be as simple as the expression of strictly sequential behavior. But is sequential expression actually that simple?

2.7 The Complexity of Sequentiality

Glimpsing the simplicity of concurrency reveals the inherent complexity of sequentiality.

2.7.1 The Unavoidable Partial Ordering

A sequence is a mapping from a concuren partially ordered expression. It cannot be any other way. The partially ordering of the flow of data among the functions is simple and direct and expresses the necessary and inherent structure of a process. Understanding and expressing the partial ordering cannot be avoided.

A programmer typically starts a programming task by scribbling flow graphs in a notebook. The programmer then translates these partially ordered graphs into a sequence of operations. Getting the sequence right is not the important thing. The important thing is getting the partial ordering relationships right within the sequence. The partial ordering of the dependency relationships is the referent for the correctness of a sequence. There are many possible correct sequences that express a given process and every one of them must conform to the same partial ordering: the same expression of concurrency.

2.7.2 The Variety of Sequence

Figure 12:
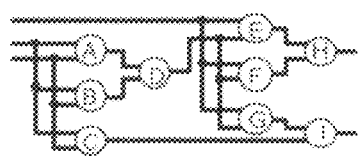
FIG. 12 illustrates labeled partial ordered expression.

FIG. 12 shows a labeled partial ordered expression. In mapping the partial order to a sequence A and B can occur in any order before D. E and F can occur in any order before H and after D. G must occur after D and before I. I can occur anyplace after G and C. C can occur anyplace before I. There are an enormous number of possible correct sequences. With such variety of correctness it can be difficult to be confident of the correctness of a specific sequence and even more difficult to reliably perceive incorrectness.

2.7.3 The Irreversibility of Sequence

Once an expression is sequentialized, it can be difficult to recover the partial ordering. While any expression of partially ordered concurrenc, can be easily translated to a totally ordered sequence, the reverse is not the case. The variety of sequence and ambiguities of memory mapping can obscure the partial ordering relationships. A compiler employs sophisticated algorithms to recover the partial ordering relationships from a sequential expression with only limited success. But, why, one might well ask, is a compiler trying to recover the partial order relationships?

The programmer roughs out the partial order dependency relationships of the process, and then translates these relationships into a sequence of operations. The programmer next presents the sequence to a compiler that attempts to generate the partial order dependency graph from the presented sequence so that it can attempt to reorder the sequence that the programmer gave it into a sequence that is more efficient for the target machine. The machine then puts a great effort into figuring out how to execute the instructions out of order so that multiple instructions can be executed concurrently. Why doesn't the programmer just give the compiler the partial order dependency graph?

While there are many compelling practical reasons to build sequential machines, there is no reason whatever to write sequential programs for these machines. A program should be a specification of the dependency relationships and the coordination boundaries. More than that is not necessary. Such an expression can be automatically partitioned and mapped into a sequence of instructions and memory references for any sequential machine. Since the invention of the compiler it has not been necessary for humans to write sequential programs.

2.7.4 The Necessary Expression of Memory

When a partial ordering is mapped into a sequence, an explicit expression of memory must be included. With concurrency expressed in terms of a network of direct association relationships among continually instantiated functions, data is maintained on the association paths of the network. There is no need to express explicit memory. A sequential operator is instantiated only during its turn in the sequence and cannot itself maintain its output data beyond its own instantiation. Each result must be shelved somewhere until its receiving operator gets its turn in the sequence.

Figure 13:
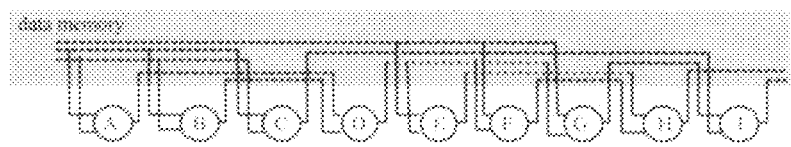
FIG. 13 illustrates the full-adder mapped to fully ordered operations with memory.

The flow relationships of the data and the maintenance of the data during its flow must be expressed indirectly in terms of locations in a separately expressed common memory. FIG. 13 illustrates the mapping of the full-adder network of FIG. 12 to a sequence of operations with memory. Operator A will store its output data in a memory location which will stably maintain the data until operator D gets its turn in sequence and reads that location to get its input. Since there are many possible orders for the sequence, there is no natural relationship between operator order and order of memory reference. So the memory references must be explicitly associated with each operator. Each operator in sequence reads its input from memory and writes its output to memory.

Asking a human to coordinate an arbitrary mapping of addresses to an arbitrarily chosen sequence of operators invites error. Assessing the correctness or incorrectness of a human's arbitrary mapping and sequencing can be elusive. On the other hand, a valid mapping between memory and sequence can be automatically and reliably generated from a concurrent expression.

2.7.5 The Necessary Expression of Control

Figure 14:
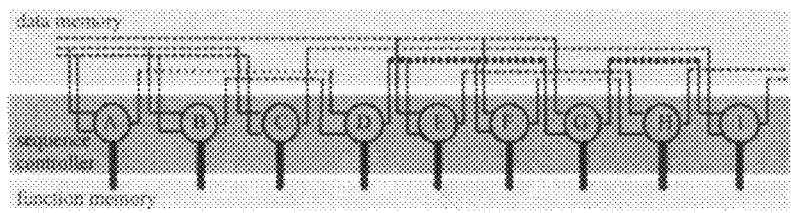
FIG. 14 illustrates sequential expression with sequence controller.

A sequence controller, shown in FIG. 14 encompassing the sequence, is not a part of a sequential expression itself but is an extra expression that must be assumed by the sequential expression. A sequential expression cannot spontaneously flow. It has no expressional basis for the operators to spontaneously sequence themselves by their own behavior. The operators must be sequenced by the behavior of a separate expression, a controller, to instantiate and uninstantiate each operator in turn. This explicitly controlled instantiation and uninstantiation is inherent to the notion of sequentiality. If each operation is not uninstantiated before the next operation is instantiated, there is a condition of uncoordinated concurrent behavior and possible ambiguity.

2.7.6 Sequentiality Cannot be Expressionaly Primitive

Because sequential behavior must be managed by a controller, it cannot be expressionally primitive. The most primitive expression (the most primitive controller) cannot itself be a sequential expression with a controller. It must be a form of expression more primitive than sequentiality that behaves entirely in terms of its own expressivity without any assistance.

2.8 Conclusion

With the traditional mathematical notion of expressing a process in terms of composing functions, the behavior of the mathematician with a pencil embodies a critical expressivity of the behavior of the process. The mathematician knows when data is ready to be presented to the next function and when to write down each function and substitute its data. If the mathematician is not available, this expressivity of behavior is lost, and on their own, the behavior of composed functions becomes indeterminate. The lost expression of behavior embodied in the missing mathematician must be restored to the behaving functions.

The expression of the mathematician's behavior can be restored in two ways. One way is to retain the notion of a mathematical function as a primitive form and add other forms of expression such as time intervals and explicit control properly integrated with the expression of the functions. The other way is to enhance the symbolic expression of the functions and the data to include the necessary expression of coordination behavior.

2.8.1 A Question of Primitivity

If one retains the notion of the mathematical function then one is confronted with the fact that a composition of functions do not work properly and will assert a rash of incorrect results before settling to an assertion of a correct result. If one adopts the notion of the enhanced functions, a composition of enhanced functions work properly and transition to a correct result without any assertion of incorrect results.

The incorrect behavior of a composition of mathematical functions can be isolated by associating a time interval with the expression. By analyzing the delay behavior of the components and their composite delay behavior for a specific implementation, a time interval can be defined for that specific implementation that extends from presentation of input to beyond the incorrect behavior into the period of stable correct behavior. The interval can control a memory associated with the expression output of the expression to sample the correct result. The indeterminate logical behavior is thus isolated by the time interval and the memory. The expression is now in terms of logic, memory and time. The time behavior and the logical behavior have to be properly coordinated for the expression to work correctly.

A composition of enhanced functions does not assert incorrect behavior and there is no need to isolate its logical behavior. It remains purely in terms of logical behavior.

The logic expression of the mathematical functions, the memory and the time interval form a unit of expression that can be further composed in terms of shared memories and shared time intervals. The shared time intervals must be all be identical and in phase. This greater composition is a structure of expressions behaving synchronously in relation to a common time interval: a clock.

An expression of enhanced functions can logically regulate its input with its own completeness behavior and a feedback path from its output to its input forming a cycle. Further composition occurs in terms of interlinked cycles. The greater composition is a structure of cycles each behaving purely in terms of logical relationships and the composition as a whole behaving purely in terms of logical relationships. It is a fully deterministic expression of distributed concurrent behavior.

The clock coordinating the behavior of the mathematical functions isolates all logical relationships. The logical relationships of the expression are not available and have to be reconstituted in terms of a new logical expression of explicit control. The clocked greater composition performs one set of behaviors every interval tick. The new level of explicit control can only compose in terms of a sequence of interval tick behaviors. The incompetence of the mathematical functions has led to explicitly controlled, strictly sequential behavior.

At some point the greater expression of enhanced functions will be reused iteratively. Continued composition might occur sequentially but it need not. The logical behaviors of the expression were never isolated so its complete logical structure is intact and available. This logical structure can be partitioned in various ways to allow parallel and pipeline iterative behaviors.

Mathematical functions do not behave properly to begin with. In correcting the behavior of the functions, one is led through a progression of supporting concepts to sequentiality. The coordinating behavior of the mathematician is only partially restored with a complex scaffolding of concepts. Enhanced functions work properly to begin, require no additional supporting concepts, and leads to distributed concurrency. The coordination behavior of the mathematician is fully restored with a single simple conceptual reorientation.

2.8.2 A Labyrinth of Concepts

Mathematical functions do not work. The concepts necessary to make them work leads to an ad hoc scaffolding of mutually supporting concepts that is difficult to escape:
  stateless mathematical function,
  time Interval,
  synchronicity,
  sequentiality,
  explicit control,
  common memory, and
  extended state space.

It is not possible to change one concept without conflicting with another concept. Attempting concurrency leads to complex control and the explosion of the state space. Attempting to avoid the time interval leads back to the races and hazards of the functions. Abandoning synchronicity leads to indeterminate behavior. Attempting to distribute memory bumps into the arbitrary sequencing and arbitrary memory mapping of sequentiality. Attempting to avoid control leaves the sequence to fend for itself which it cannot do.

One cannot find ones way out of the labyrinth incrementally or gradually. The only way to escape the labyrinth and glimpse the simplicity of concurrency is to change the beginning primitive concept. With enhanced functions that cooperate a set of complimentary concepts emerge that are not necessary supporting concepts but are natural consequence of the fact that enhanced functions work to begin with:
  state holding cooperating functions,
  logical completeness,
  distributed local behavior,
  concurrency,
  cooperation,
  distributed content flow, and
  logical determinism.

2.8.3 A Discord of Conceptual Views

The two primitive beginnings lead to two very different views of process expression. There is the sequential world view and there is the concurrent world view.

In the sequential world view concurrency is fraught with races, hazards and indeterminate behavior. Sequentiality tames the unruly concurrent behavior providing a well behaved, stable foundation for process expression. It is foolish to consider reversion to primitive concurrent behavior. The only reliable path to concurrency is through cooperating sequential processes.

From the concurrent world view, concurrency, beginning with cooperating primitive functions, provides a completely logically determined, well behaved, stable foundation for process expression. Sequentiality is an unreliable form of expression founded on a time interval that is implementation specific and is not precisely manageable. The many possible correct sequences and the arbitrary memory assignments make sequentiality complex, confusing and prone to error.

2.8.4 Illusions of Difficulty

It seems obvious that controlling one event at a time in sequence must be simpler than controlling many events simultaneously. But that is only if one thinks in terms of control instead of in terms of orderly collective behavior by virtue of orderly individual behavior.

The timing races among concurrent functions can be an intractable coordination problem, but it seems so only if one is thinking in terms of functions incapable of coordinating their symbolic behavior with other functions. If one thinks instead in terms of functions that are capable of coordinating among themselves, the timing issues disappear.

State space explosion is a problem only if one thinks in terms of globally sampled instants of an extended state space. If one can trust the symbolic behavior, considering the behavior of a "state space" is unnecessary. The notion of an extended state space is an artifact of sequentiality. Sequential behavior is not fully determined by its symbolic behavior, but is determined by its symbolic behavior, its sequence control and its memory mapping. The only coherent characterization of sequential behavior is in terms of transitions of its state space. Sequentiality can be defined as one atomic transition at a time of a state space and sequential behavior can be characterized in terms of enumerating these state space transitions.

Concurrent behavior is a composition of local state spaces behaving locally. Attempting to combine the local spaces into a collective extended state space is meaningless. It is not possible to predict an instant of samplable stability when there are no transitions occurring in the extended state space and it can be reliably sampled. Even if an extended state space is successfully sampled, it is not possible to predict what the state of the space should be at any instant. So as a referent for behavior in the context of concurrency the notion of an extended state space is useless and meaningless. Concurrent behavior with enhanced functions is fully determined by symbolic behavior. One can and must trust the symbolic behavior.

2.8.5 A Question of Philosophy

The deeper question is what is adopted as primitive and why? Any network of concurrent behaviors can be mapped to a sequence of behaviors. This would seem to imply that sequentiality is a reductive conceptual bottom and is consequently more fundamental and primitive than concurrency. But a sequence of behaviors is not conceptually coherent. It is not sufficient in itself. It requires the assistance of a memory and of a sequence controller. How can a concept be primitive that requires assistance to fulfill its mission of primitivity?

A network of enhanced functions, on the other hand, is coherent and sufficient in itself. The spontaneous behavior of the enhanced functions realizes the behavior of the process. No supplemental assistance is needed.

Computer science is at cross purposes with itself. It has adopted conceptual foundations tailored for the aims of mathematicians but that are not appropriate for the aims of computer science. While mathematics is concerned with the nature of a process independent of how the process might be expressed, computer science is concerned with the variety of ways process can be expressed independent of what process might be expressed. However, computer science has adopted a conceptual foundation from mathematics designed to filter out variety of expressivity [6]. What is usefully primitive for one endeavor is not necessarily what is usefully primitive for another endeavor. While mathematics purposely avoids concurrency, computer science must embrace concurrency in its foundations.

3 Dehumanizing Computer Science

Humans have always been integral to the works of mathematics. Mathematicians devise symbol systems including algorithms to manipulate the symbols. They then enliven the symbol system by manipulating its symbols on paper according to the rules of an algorithm. While the manipulating human has been eliminated and replaced with a machine, the humans that conceive symbol systems and the humans that engineer the manipulating machines remain in the works. However, it is possible to eliminate these humans as well.

3.1 The Humans in Computer Science

Computer science with its mathematical heritage retains humans in the works. These humans constitute an element of arbitrarily sufficient expressivity. If one is only interested in the nature of a symbol system independent of how it might be expressed then any workable expression of a symbol system will suffice. Although appeal to arbitrarily sufficient expressivity can be conveniently effective, if one is seeking insight into the nature of expression itself, the presence of arbitrarily sufficient expressivity fundamentally undermines the effort.

If there is an arbitrarily sufficient interstitial mortar, then the conceptual bricks do not have to fit well. Any concepts can be cobbled together into an apparently universal whole that is adequately functional and that can even appear to be simple in some compelling sense. But the element of arbitrary sufficiency eliminates the necessity of the concepts fitting together and precludes the possibility of discovering appropriate concepts and how they might fit. A fudged model cannot provide insightful understanding or unifying connections. Appeal to arbitrary sufficiency can reveal nothing about essential necessity.

Saying a human does it in computer science is like saying a god does it in physics. The humans in the works both enable the computer and deny it theoretical closure. This difficulty of humans in the works is explicitly recognized in the view of the computer as an artifact and the acceptance that computers cannot be theorized about in the same sense that natural phenomena can be theorized about [2].

"If what the computer scientist says about computers in theory does not agree with behavior, he or she can always change the computer" to match the theory [1].

The essential problem is that there is no way to compare conceptual models. The humans in the works ensure that all models, even those with partially characterizing or misleading concepts, will appear equally successful. There is no criterion of failure, no hint of inadequacy. With the inability to theorize the only approach to understanding the subject appears to be experience and experiment and the only approach to managing it appears to be imposed rationale and convention. Imposing mathematical rationale and convention seems reasonable and convenient.

But are computers and symbol systems as artifactual as supposed? Are humans necessary to symbol systems. Symbolic computing mechanisms exist in nature, particularly in biology. Computer science aspires to encompass these symbol systems. A conceptual model of nature's symbol systems cannot have humans in the works. Can a conceptual model of symbolic expression be conceived that does not require humans?

3.2 Eliminating the Humans

It has long been recognized that the symbol-manipulating human might be replaced by a machine. The development of computer science to date is all about replacing the manipulating human in the works with a spontaneously behaving machine: the computer. But there are still humans involved in the conception of the symbol system and in the design of the mechanism. These humans are somewhat more difficult to remove.

3.2.1 The Engineering Human

Figure 15:
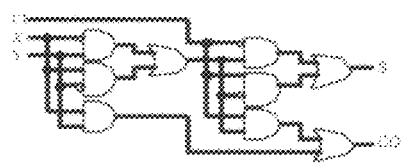
FIG. 15 illustrates Boolean full-adder.

The difficulty with removing the engineering human is that the manipulating human was not completely eliminated to begin with. The manipulating human provided something more than just the enlivenment of the symbolic expressions. The human also provided coordination behavior. Symbolic expressions do not include the expression of coordinating behavior. So simply enlivening a symbolic expression with spontaneously behaving symbols and their interactions is not sufficient. Coordination behavior must also be added to the enlivened expression and this is added by a human engineer. The difficulty is illustrated with a Boolean expression of a full adder expressed in terms of two half adders shown in FIG. 15.

The Boolean logic expression can be enlivened by mapping the symbolic expression to spontaneously behaving symbols and spontaneously behaving symbol interactions (functions). When a new input state is presented to the inputs of the Boolean combinational expression, a stable wavefront of correct result values flows from the input through the network of functions to the output. But since Boolean functions are continuously responsive and since some functions and signal paths can be faster than others, invalid and indeterminate result values may speed ahead of the stable wavefront of valid results. This rushing wavefront of indeterminacy may cause the output of the Boolean expression to transition through a large number of incorrect values before the stable wavefront of correct result values reaches the output and the expression as a whole stabilizes to the correct resolution of the presented input. The behavior of the enlivened symbolic expression is not determinate.

This indeterminate behavior does not occur when the manipulating human with a pencil enlivens the expression. The human can determine when all the input symbols are available for each function and resolve each function in its proper turn. The resolution of the expression flows to completion with no ambiguity of behavior.

There is no way to determine, solely in terms of the behavior of the enlivened expression itself, when the stable wavefront of correct results reaches the output. However, an enlivened expression can be relied on to eventually stabilize to a correct result state. After presentation of an input, it is sufficient to wait an appropriate time interval, characterized by the slowest propagation path through the expression, to ensure that the wavefront of stable result values has propagated through the expression and that the output of the expression has stabilized to the correct resolution of the presented input. This time interval, however, is not symbolic, is implementation specific and cannot be derived from the symbolic expression. It requires the participation of an engineering human.

The arbitrarily expressive engineering human in the works contrives to make the insufficiently expressive enlivened Boolean expressions work. If a Boolean logic expression cannot behave correctly on its own without the assistance of a human it must be considered a conceptual failure. This circumstance can be viewed in two ways. One can assign theoretical primacy to Boolean logic anyway and regard this circumstance as showing that humans are necessary and cannot be eliminated from the works of symbolic expression. Or one can search for a model that works on its own symbolic terms without human assistance.

3.2.2 Eliminating the Human Engineer

The Boolean logic expression of the full-adder can be symbolically expressed in a different way. The Boolean logic expression uses two unique symbols, 0 and 1, and unique places within the expression to represent different meanings within the expression. Each unique meaning is expressed as a combination of symbol and place (wire). The 0 or 1 on one wire is different from the 0 or 1 on a different wire. These unique place-value meanings of the Boolean logic expression can be mapped into an expression purely in terms of unique symbols.

Figure 16:
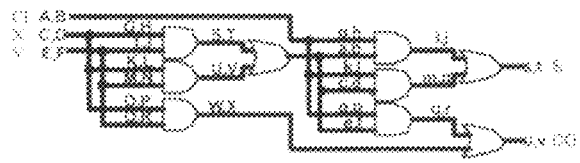
FIG. 16 illustrates Boolean full-adder mapped to a rich symbol expression.

Imagine that there are a multitude of unique symbols available such that each unique meaning can be represented by a unique symbol. Such a mapping of unique symbols to meanings is shown in relation to the Boolean circuit in FIG. 16. Two unique symbols for each wire in the circuit represent the 0 value and the 1 value for that wire.

C means X=0

D means X=1

E means Y=0

F means Y=1 and so on for each wire in the circuit.

Figure 17:
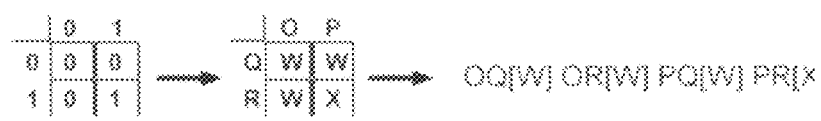
FIG. 17 illustrates mapping of value transform rules.

Next, imagine a set of rules that express how the symbols interact and transform into other symbols such as the set of rules below. GI[S] means the combination of symbols G and I transform into the symbol S. The interaction rules for the behavior of each logic operator are derived from the symbols associated with each operator and its particular logical operation. The derivation of the interaction rules for the AND logical operator surrounded by O, P, Q, R, W and X is shown in FIG. 17.

The resulting expression of the full-adder, which is just a collection of interaction rules is shown below.

"fan-out input symbols"

A[g,k,o] B[h,l,p] C[G,K,O] D[H,L,P] E[I,M,Q] F[J,N,R]

"define combinational resolution stages"

GI[S] GJ[T] HI[S] HJ[S]

KM[U] KN[U] LM[V] LN[U]

OQ[W] OR[W] PQ[W] PR[X]

"fan out input to second half-adder"

SU[a,c,e] SV[b,d,f] TU[b,d,f] TV[b,d,f]

ga[i] gb[j] ha[i] hb[i]

kc[m] kd[m] lc[n] ld[m]

oe[q] of[q] pe[q] pf[r]

im[s] in[t] jm[t] jn[t] "sum"

qW[u] qX[v] rW[v] rX[v] "carry out"

Figure 18:
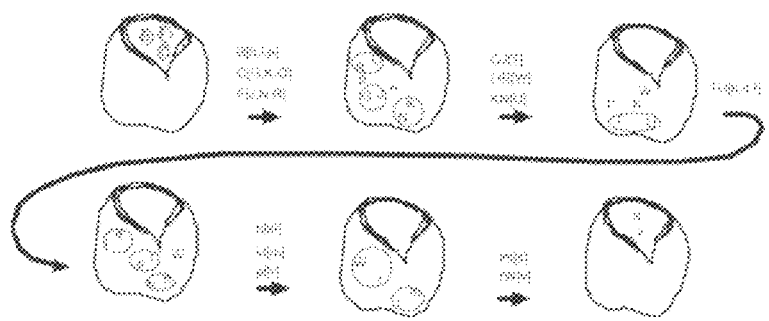
FIG. 18 illustrates resolution progression for pure symbol expression of full-adder.

Imagine that the expression above is directly enlivened with spontaneously behaving and interacting symbols. Symbol G knows it can interact with symbols I and J and with no other symbols. Symbol I knows it can interact with symbols G and H and no other symbols. G and I know when they encounter each other to spontaneously transform into S effecting the rule GI[S]. If the symbols are in a shaking bag, all possible associations of symbols will occur and all possible interactions will happen. The expression resolves progressively and unambiguously through the spontaneous behavior of the individual symbols. Input symbols thrown into the shaking bag will associate, transform and resolve the expression. FIG. 18 shows the progression of resolution for input symbols B, C and F. The combinations of symbols involved at each stage of interaction are circled and the rules involved are shown between the bags.

Every symbol is unique and every combination of interacting symbols is unique. The coordination of the symbol resolution flow is embodied in the symbolic expressions. When the expression is directly enlivened, the behavior of the enlivened expression is completely and unambiguously determined by the symbols and their interaction rules. There are no races, no hazards and no ambiguous behavior. There is only the orderly propagation of correct result symbols. When an s or t and a u or v appear, they express the correct completion of a resolution.

The new expression is a symbolic expression in the same sense that the Boolean logic expression is a symbolic expression. There is a population of symbols with a set of symbol interaction rules. There is a direct mapping between the Boolean symbolic expression and the new symbolic expression. However, the new symbolic expression behaves correctly on its own symbolic merits. No extra expression such as a time interval is required. There is no need to "engineer" the enlivened expression to make it work correctly. An engineering human is not required.

3.2.3 Eliminating the Conceiving Human

There is still the human in the works that conceived the Boolean expression. We are used to thinking of the conception of a symbolic expression as a carefully coordinated interplay between specifying a set of symbols, specifying the symbol interaction rules and specifying the patterns of interaction, but if the resources of expression are profligate, they are spontaneously active and they are contained in a common place of interaction, then a large variety of symbolic expressions must spontaneously arise and resolve. The entire realm of the laws of physics and chemistry provide an enormous domain of interaction rules for particle, atomic and molecular symbols. There are, for instance, 10130 possible protein symbols. Spontaneous symbol interactions in the thermally agitated soup contained by the gravity well of a young earth stumbled upon and ignited the expression of a sustainable chain reaction that drifting through an immense possibility space for billions of years continues to smolder and begins to contemplate itself. No human expressivity was required. The conceiving human finally becomes unnecessary to the existence of a spontaneously behaving symbol system and the last human is removed from the works.

3.3 Humanless Symbol Systems

While humans can still muck around in the works as they please, they are no longer conceptually integral to the works. Transcending its mathematical heritage without abandoning it, dehumanized computer science is essential to understanding the nature of symbolic expression. It can encompass expressions of natural symbolic computation as well as expressions of human symbolic computation in the same way that the science of aeronautics encompasses the airplane's wing and the bird's wing.

4 Transcending the Variable

The notion of the variable is deeply embedded in computer science and programming. Yet it is also viewed as a troublesome concept. There have been efforts to eliminate the variable, to tame the variable and to compensate for the variable. However, there have been no efforts to question the notion of variable itself. Perhaps the troublesome aspects can be dealt with by slightly altering the notion of what a variable name means.

4.1 The Variable in Mathematics

The notion of the variable is one of the more profound ideas of mathematics. Variables allow the relations of an algebraic function to be expressed in completely general terms with arbitrary symbols (variables) as placeholders for numeric values.

Consider the algebraic equation F=A+B. A and B are the domain variables. They can be replaced with any numeric value in the domain of the function. F is the range variable. It is replaced with the result of the function on whatever values replaced A and B. Once replaced, an algebraic variable no longer exists. Nor does the equation and its variables renew after a resolution. Each instance of the equation is a new instance of substitution on a new equation.

The notion of a mathematical variable is clearly defined:
"In general, variables, which are usually represented by letters, represent empty space into which an arbitrary element from a fixed set can be substituted." [2]
"A variable is a symbol or a place-holder that can be replaced by any member of a given set. The given set is called the universal set or the universe of the variable. Each member of the set is called a value of the variable." [4]

4.2 The Variable in Computer Science

While there is no confusion about what a variable is in computer science, it is difficult to find an explicit definition. The word and the concept just are. Very early in one text discussing basic principles of programming the following passage occurs with no prior definition, discussion or even mention of the concept of variable: "means the value of the variable m is to be replaced by the current value of the variable n"[3].

The passage alone is nevertheless sufficiently defining. A computer science variable is a symbolic name of a persistently existing storage bin that can contain over time a sequence of values from the universe of the variable in contrast to an element of a symbolic equation that can be replaced. The variable is not replaced by a value, but the symbolic variable coexists with a value contained in its storage bin. This contained value can be accessed or replaced by referencing the storage bin with the symbolic variable.

4.2.1 The Confusion

While there are differences between the notion of the mathematical variable and the notion of the computer science variable, their usage appears identical. F=A+B is a valid programming statement as well as a valid mathematical equation. The mathematical equation, however, expresses nothing about where the values might come from. Anyone anywhere in the universe can substitute the variables with values and resolve the resulting equation. One general equation serves all mathematical purposes.

On the other hand, each variable of a programming statement explicitly expresses where its value comes from by uniquely binding to a specific storage bin. The symbolic name of the variable is associated with the storage bin rather than with a specific equation. There may be many identical equations in a program referencing different variables. And there may be many different equations referencing the same variable.

The mathematical variable is bound to its equation. The computer science variable is bound to a memory storage bin. The two notions of variable are quite different.

4.2.2 The Discontents

What appears on the surface to be a happy correspondence of a convenient abstraction becomes, in the details of binding, a troublesome concept for computer programming.

4.2.2.1 Scope of Reference

A variable, not being bound to a specific equation, can be referenced from anywhere in a program. Any equation in the program can reference an incorrect variable. There is no inherent limitation to a variable's scope of reference. There have been conventions imposed to limit the scope of reference, such as information hiding, block structuring, strong typing and object orienting. These help some but there is still significant reference freedom within the limited scopes. It is up to the programmer to get every variable reference right.

4.2.2.2 Order of Reference

Some variables depend on the values of other variables and variable references must occur in a specific partial order to properly implement the dependency relationships of the process. There may be many sequences that express the specific partial order. There is nothing inherent in the variables to suggest a proper sequence. A number of imposed conventions have addressed this issue, including eliminating the GOTO statement, structured programming and limiting expression modules to an easily graspable size. In the end, expressing a sequence that properly implements the specific partial ordering is entirely up to the programmer.

4.2.2.3 Side Effects

A program can mimic a mathematical equation as a sub-program with domain and range variables to which actual values are passed. This is very like the mathematical view of substituting variables with actual values in a unique instantiation of an equation. But a sub-program can do something that a mathematical equation cannot do. It can alter the values of domain variables, even though they are strictly input variables that are not intended to be altered. This is called a side effect. Side effects can be particularly sinister because a poorly written library routine that a programmer has no control over can undermine her most exemplary effort to write a correct program.

4.3 A Competition of Mathematical Formalisms

The notion of the variable is at the center of a competition among mathematical formalisms applied to programming. Imperative programming derives from the notion of the algorithm as a step by step transformation of an explicitly referenced state [3]. In a sequence of transformations one transformation writes a storage bin to be read by a later transformation. The write and the read are expressed by an identical variable name associated with each operation that binds to a storage bin.

Functional programming, on the other hand, views the variable name reference as a major source of programming ills and strives to eliminate the use of variable names entirely by expressing processes in terms of function application and by expressing function composition by syntactic nesting [1]. Values flow directly from function application to function application through nesting relationships, eliminating the need to make explicit references to storage bins, and hence eliminating the need for variable names. All the expressional difficulties with variables including side effects are eliminated. However, syntactic nesting is a limited form of expressing association.

Figure 19:
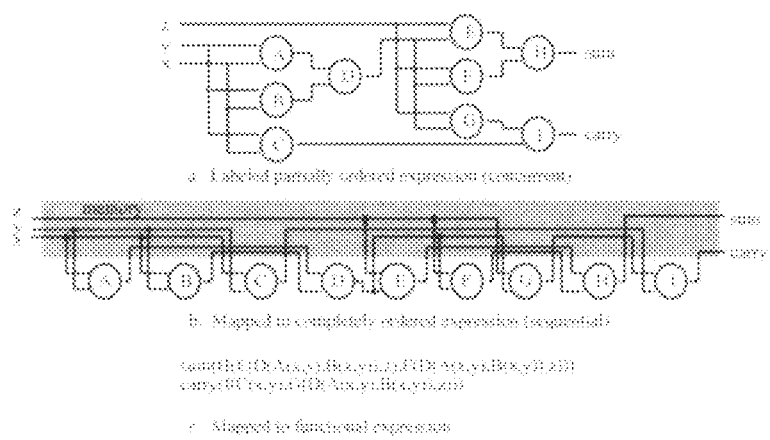
FIG. 19 illustrates three forms of a single expression.

FIG. 19 illustrates the situation. FIG. 19a is a graphic representation of a combinational expression. It is expressed in terms of direct association relationships among operators. There is no explicit expression of addressable storage. FIG. 19b show, a sequential version of the combinational expression. The explicit expression of storage is necessary in addition to the expression of the sequence to express the process. FIG. 19c is a functional expression of the process. The operations are directly associated by nested parenthesis. Again, there is no explicit expression of or reference to storage of state.

To variable or not to variable, that is the question. Or is it?

4.4 Process Expression as Association Relationships

Neither the imperative nor the functional methods fully satisfy? While the imperative method of sequencing operations and referencing variables seems plodding, inelegant and too free form, functional programming seems a pretension that does not quite deliver and is too limiting. Can there be an underlying conceptual commonality that unifies and illuminates?

If there is a underlying commonality of process expression it should be discernible in any serviceable expression of a process. Consider the integer matrix addition routine of Example 4.1 in a typical imperative form. MATRIX1 is added to MATRIX2 to produce MATRIX3 all of which are N by M.

```
PROCEDURE MATRIXADD (MATRIX1, MATRIX2, MATRIX3,
N, M)
BEGIN
    FOR I = 1 TO N
        FOR J = 1 TO M
            MATRIX3(I, J) = MATRIX1(I, J) +
            MATRIX2(I, J)
        ENDFOR
    ENDFOR
END
```

Example 4.1

Example Expression

The outer loop associates the corresponding vectors of each matrix and presents them to the inner loop. The inner loop associates the corresponding integers of each vector and presents them to the integer add expression.

The integer add software expression is a sequence of instructions that moves the corresponding integers from memory to associate them directly to the hardware add expression. The hardware add expression associates the corresponding digits of each integer by wire connection and presents them to the expression for digit addition.

Assuming a binary representation of the integers, the associated digits are presented to a binary full-adder circuit. The full-adder circuit is a combinational circuit expressed in terms of logic functions directly associated by wire connection. Each logic function directly associates each possible input with its appropriate output transforming its input data directly to result data. Each full-adder combinational circuit produces a result digit.

The integer add hardware expression then associates each result digit by wire connection to compose the result integer. The further instructions of the integer add software function associates the results from the hardware add expression to form the result vector and then associates the result vectors to form the result matrix.

The characterization of the process expression and resolution is uniform and consistent even though three totally different expression environments are involved: the high level programming language procedure, the machine instructions and the logic circuits of the hardware adder. Each very different expression is doing exactly the same thing. It is decomposing the input data structure, associating the decomposed data elements and presenting them to the next lower level of process expression which further decomposes and associates until the decomposed elements are primitive values that are associated with primitive functions in the correct progression producing primitive result values. It is all just bookkeeping of association relationships to get the correct progression of primitive functions that realize the process.

What must be effectively expressed no matter what form of expression is being employed is the proper patterns of association relationships. Consider the mathematical function of Example 4.2 for the distance between two Cartesian points.

d=need to past in math function

Example 4.2

Mathematical Function

This mathematical notation very elegantly expresses the association relationships among the parts of the expression.

Figure 20A:
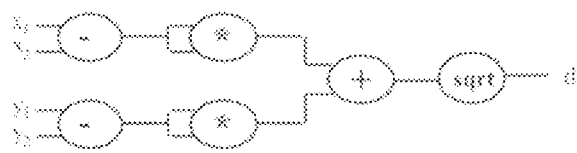
FIG. 20A illustrates graphical expression of the association relationships of the distance equation.

There is no expression of sequence and no reference to any variables other than the input and output variables. FIG. 20A shows the graphical representation of the association relationships of the distance equation.

The process is expressed imperatively in Example 4.3 in terms of a strict sequence of operations writing and reading intermediate variables. Each source operation must explicitly store its result value in a storage bin and each destination operation must explicitly refer to the storage bin of the value when its turn in the sequence occurs.

Operation 1: temp1=x2−x1;
Operation 2: temp2=y2−y1;
Operation 3: temp3=temp1*temp1;
Operation 4: temp4=temp2*temp2;
Operation 5: temp5=temp3+temp4;
Operation 6: distance=sqrt(temp5);

Example 4.3

Imperative Expression

The variables, explicitly referencing temporary storage bins, are implicitly expressing an association relationship from the place in the expression where the variable is written to the place in the expression where the variable is read.

The association relationships can also be expressed by explicitly attaching names to places and associating the names directly by name correspondence shown in Example 4.4. name< > will represent a source place and $name will represent a destination place. If a source place name and a destination place name correspond, then the two places are associated. Values flow directly from source places to destination places.

place1<x2−x1>
place2<y2−y1>
place3<$place1*$place1>
place4<$place2*$place2>
place5<$place3+$place4>
distance<sqrt($place5)>

Example 4.4

Name Association Expression

Since the association relationships among the place names determine the structure of the expression there is no inherent ordering of the statements. Example 4.5 is identical to Example 4.4.

place4<$place2*$place2>place3<$place1*$place1>place2<y2−y1>
distance<sqrt($place5)>place5<$place3+$place4>place1<x2−x1>

Example 4.5

Alternative Name Association Expression

Another possibility is expressing the association relationships with syntactic nesting rather than name correspondence as in Example 4.6. This is the choice of functional programming.

distance(sqrt(add((mult(sub(x2,x1),sub(x2,x1)),mult(sub(y2,y1),sub(y2,y1))))

Example 4.6

Syntactic Nesting Expression

Figure 20B:
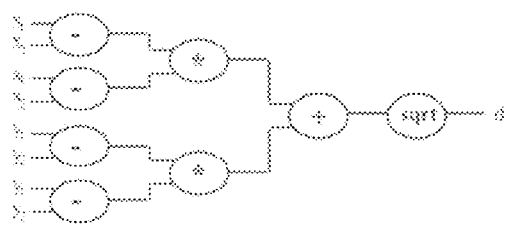
FIG. 20B illustrates association structure of the functional expression of the distance equation.

It will be noticed that there are two references to sub(x2,x1) and to sub(y2,y1) because fan-out cannot be expressed with syntactic nesting association. FIG. 20B graphically illustrates the association structure for the functional expression. Referencing identical function calls multiple times because of the inability to express fan-out leads to awkward expressions and belaborments of the obvious such as the notion of referential transparency, which states that a function called with the same input values must always deliver the same result values. Why would a function not always deliver the same results for the same inputs? Because functional programming does not characterize the internal expression of the function and it does not eliminate all side effects. Referential transparency states as a rule that there can be no side effects.

Fan-out relationships can be directly expressed with name correspondence relationships as shown in Example 4.7, which is entirely in terms of name correspondence association relationships with no syntactic nesting.

place1<sub(x2,x1)>
place2<sub(y2,y1)>
place3<mult($place1,$place1)>
place4<mult($place2,$place2)>
place5<add($place3,$place4)>
distance<sqrt($place5)>

Example 4.7

Completely in Terms of Name Correspondence Association

The reader should notice that the only example that employed the notion of a variable as an explicit reference to storage bins was Example 4.3 which expressed the process as a sequence of operations. Example 4.4 expressed the association relationships in terms of name correspondence. The other examples expressed the process in terms of direct association relationships. All the examples effectively express the process. The underlying commonality is that they are all, one way or another, expressing association relationships among places in the expression. There is nothing expressionally fundamental or necessary about expressing strict sequentiality or about explicitly referencing storage bins. If one forgets that the names temp1, temp2 and so on, refer to storage bins and view them as direct association relationships, then the expression of Example 4.3 is structurally identical to Example 4.4. It is just a slight change in point of view.

4.5 Transcending the Variable

The variable name as a reference to a storage bin is clearly problematic. But the solution is not to avoid the use of reference names entirely but to reconsider what these names might refer to. The notion of a name referring to direct association relationships between places within an expression accomplished the same end as the variable name, while avoiding the problems of the variable name as a reference to a storage bin. The reference scope of a name expressing a direct association relationship is locally limited by the nature of the direct association relationship. There can only be one source place associated with a name which is equivalent to imposing the property of single assignment on a storage bin variable. Side effects and the ambiguities of sequence associated with variable names simply do not occur with names expressing direct association relationships. Direct association relationships can be automatically mapped to storage bin references. There is no need for the notion of the variable name as an explicit reference to a storage bin.

5 The Invocation Model

Process is the appreciation of differentness. Differentness is appreciated with change: an after that is different from a before. Change must include an encompassing persistence that relates a particular after to a particular before. XZ changes to XY and YA changes to YC. Z appreciates X by changing to Y, A appreciates Y by changing to C. Z and Y are related by a persistence. A and C are related by a second persistence. The two persistences are themselves different and are related by the interaction of YA. This counterpoint of persistence relating differentness of change relating differentness of persistence relating differentness of change is the essence of process and its expression.

5.1 Thengs and Values

A primitive expression of differentness is introduced: a theng (sounds like thing), which asserts one at a time of two or more possible values. A theng is a persistence relating its changing values. Different thengs can associate and their values can interact and change. Two thengs are associated when they are sufficiently proximate for their values to interact. Thengness expressing persistence is substantial and spatial. Valueness expressing change is symbolic and temporal. The asserted values of associated thengs form a name. Values forming a name can transform in accordance with a correspondingly named value transform rule. Thengs, values, association relationships among thengs and value transform rules are the only primitive concepts that will be introduced. Everything that follows is in terms of these primitive concepts.

Thengs can form association structures. Each theng in an association structure is different from all other thengs in the structure by virtue of its unique place in the structure. This will be called association differentiation.

Values can interact specifically with other values according to a set of value transform rules. A value is different from all other values by virtue of its unique interaction behavior with all the other values. This will be called value differentiation.

Association differentiation and value differentiation are two complementary domains of differentiation interlinked by thengs asserting values. They form a primitive warp and woof of persistence and change from which is woven the tapestry of process expression.

A theng asserting a value can take many different forms. It might be a wire asserting a voltage, a protein asserting a shape value, a molecule asserting a chemical identity, a digit asserting a value, a human asserting speech, a field asserting a force and so on. It is called theng because no common word quite covers the scope of the notion.

Each domain of differentiation can be considered individually by minimizing the differentiation of the other domain. Value differentiation can be considered on its own terms in an expression where all differentiation is in terms of value and there is no differentiation in terms of association. This will be called a pure value expression.

5.2 Pure Value Expression

In a pure value expression the thengs asserting values are all mutually associated at a single place of association. There is no structure of association relationships and no way to tell one theng from another by its unique place in a structure of association relationships; there is no differentiation in terms of association. The only differentness at the single place of association is differentness of value.

5.2.1 The Mutual Association of Thengs

Figure 21:
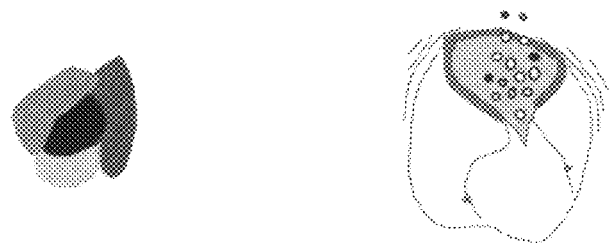
FIG. 21 illustrates the static and dynamic forms of mutual association.
Figure 22:
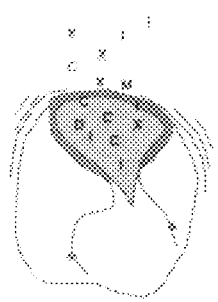
FIG. 22 illustrates Roman numeral addition in shaking bag.

There are two ways to view the mutual association of thengs at a single place. The first view is to consider that thengs are all statically mutually associated. This is illustrated on the left of FIG. 21 with four thengs, each directly associating with the other three. One might imagine a group of neurons each having a synapse with all the others. All possible names are simultaneously formed by the asserted values of the associated thengs.

The second view is to consider that thengs are dynamically mutually associated by being locally constrained and agitated such that all thengs will eventually associate and all possible names will eventually be formed. This is illustrated on the right of FIG. 21 as a shaking bag. The bag is the expression of the association relationship. It ensures that thengs will not wander off and fail to associate. One might envision this in terms of warm matter in a gravity well or the cytoplasm within a cell membrane.

The condition of being statically associated is expressionaly identical to the condition of being dynamically associated. Simultaneous static association corresponds to the case of all eventual dynamic associations fortuitously occurring simultaneously.

5.2.2 The Value Transform Rule

The change behavior of formed names is expressed by a set of value transform rules. These rules express all the values that can populate a pure value expression, all the resolvable names that can be formed by the values and the resolution of each name.

A value transform rule is expressed as a name formed by an association of values and the result values to which the name resolves. The association of values itself is the name of the rule. The symbol string representation of a value transform rule is:

name[result]

For example, the rule AB[F] states that if the values A and B associate, the rule named AB will be invoked resolving the name with the values A and B transforming into the value F. The values A and B cease and the value F becomes. While the values of a symbol string are inherently ordered, the values associating to form a name in a pure value expression are not ordered. BA is the same name as AB. If associated values do not form the name of a value transform rule, there is no resolution and no value transformation.

A pure value expression is an association of the thengs asserting their values and a set of value transform rules. The set of value transform rules expresses all resolvable names and how they are to be resolved. Which names will actually form depends on the values asserted by the thengs. When a resolvable name is formed, the appropriate rule is invoked and the value transformation occurs.

A set of value transform rules might be the functions of a logic, the operations of an arithmetic, the laws of chemistry, protein interaction rules and so on.

5.2.3 Value Differentiation

One value is different from all other values because it interacts with the other values differently from all the other values;

AX[B] means that if A associates with X, the result is B.

AZ[C] means that if A associates with Z, the result is C.

X and Z are different because they behave differently with A.

Consider the following set of value transform rules.

AX[B]
AZ[C]
NB[J]
CN[G]
GM[K]
GD[L]

Assume that a place initially contains A, M and N. If an X arrives, the result will be a J;

AX->B
BN->J.

If a Z appears, because M is present, the result will be a K;

AZ->C
CN->G
GM->K.

If D was present instead of M the result would be L;
AZ->C
CN->G
GD->L.

Each value is different from each other value because its name forming and resolution behavior, as expressed by the value transform rules, is different from all the other values.

Notice that the resolution of each expression is fully coordinated. BN cannot form until AX has formed and transformed into B. GM cannot form until CN is formed and transformed into G and CN cannot form until AZ is formed and transformed into C and so on. There is no ambiguity in the behavior of the expression. In particular, there are no races or hazards. The behavior is directed, discrete and fully deterministic.

While value transform rules can directly express fully determined behavior they can also express ambiguous behavior. If, for instance D, M and G are present in the expression above the names GM and GD can equally form and K or L are equally possible results. In the shaking bag one name may form and transform before the other. In the static association expression both names will form simultaneously, but there is only one G; only one behavior can occur and it is not possible to predetermine which behavior will occur. There is no referent or metric in either case to determine one behavior over the other. The behaviors are equally uncertain in both forms of expression.

5.2.4 Differentness as Limitation of Behavior

Differentness is an expression of limited possibilities. A theng can interact only with neighbor thengs with which it is directly associated. A value can transform only with other values that form the name of a value transform rule. Behavior in time is limited by the mutually exclusive behavior of the theng, which asserts only one at a time of two or more possible values.

If all possibilities occur—all thengs associate and all values interact equally all the time—then there is no differentness. If no possibilities occur, thengs never associate and values never transform then, there is also no differentness.

5.2.5 Differentness as Ongoing Behavior

Imagine that the thengs, the values, the shaking bag and a set of value transform rules is all there is. There is no meta observer, no meta context, no meta metric of space or time, no meta reference frame. There are only the values forming names and resolving according to value transform rules. The expressed differentnesses can only be appreciated by the expression itself.

A name forms from an initial set of values that transforms to one or more values different from the initial set of values. Then a new name and transforms into new different values that form new unique names and so on. Differentness is appreciated by transforming into new differentnesses, which are appreciated by transforming into new differentnesses and so on. The expressed process can continue as long as there are different values and value transform rules to support it.

At some point values might reappear in the expression, forming names previously formed and the expression can become cyclic. Consider the following cyclic expression;
AB[CD], ST[XY], CY[AT], XD[SB].

Beginning with the values A, B, S and T the names AB and ST will form resolving to C, D, X and Y. The names CY and XD will form resolving to A, B, S and T. This cycle will continue indefinitely. From the point of view of the expression there is differentness and the differentness is being appreciated. But the differentness does not extend beyond itself and cannot be appreciated beyond itself.

An extreme case of isolation is the value transform rule AB[AB]. The result values are identical to the name-forming values and immediately reform the name. Whether this formed name is constantly resolving, not resolving at all, or whether it even exists cannot be appreciated, even by itself.

Static values that do not participate in the formation of any name and never transform, or values that spontaneously cease and become with no encompassing relationship, do not extend beyond themselves and cannot be appreciated in a greater context. There is no such thing as a static differentness or an isolated differentness. Differentness cannot stand on its own; it must be appreciated.

The whole point of differentness is that its appreciation abets ongoing behavior. Process is the continual extended appreciation of differentness. Differentness continually appreciating itself. The only important thing is to not become isolated (an isolated cycle) and to not become extinct (cease being appreciated). Each differentness must extend beyond itself to appreciate and to be appreciated. A value transform rule, as the most primitive expression of process, extends beyond itself by asserting at least one result value that is not in its name.

One might suggest that if a value or a behavior exists, it exists whether it participates or not, so one should pursue the truth and consider it. From a meta view one might observe the differences among static values or the behavior of spontaneously becoming and ceasing values or the behavior of self-sustaining cycles, but there is no meta view and there is no meta observer. There are only the thengs, the values and the value transform rules. There is no question of truth: of what really is or what really happens. There is only the question of what can be appreciated with the resources at hand. What cannot be appreciated cannot be considered.

5.2.6 Roman Numerals

The introduction to pure value expression begins with the system of roman numerals without the subtractive principle (9 is VIIII instead of IX). In a place-value number system, values are reused at each place of association (digit place) in a number. The magnitude of a value is expressed by the value and by its place of association in relation to other values of the number. In the roman number system the magnitude of a value is unique. While the values of roman numbers are generally presented in a certain order of association for convenient reading, without the subtractive principle, the order is not significant to their meaning. All differentiation is expressed by unique values. The magnitude of the number is determined solely by the values present. There is no differentiation in terms of association relationship. MMV is equal to MVM and VMM.

The expression of Roman numeral addition is a set of value transform rules.
IIIII[V]
XXXXX[L]
LL[C]
CCCCC[D]
DD[M]

Given two roman numbers these rules will reduce them to a minimal single number representation. The numbers 1978 and 22 are used as examples;
MDCCCCLXXVIII+XXII=MM.

Assume thengs that can assert the roman numerals and that the value transform rules are embodied in the thengs. The thengs recognize a formed name and spontaneously transform their values in response. One can just throw the two numbers into a shaking bag. The five Is will form the name IIIII, invoke the rule IIIII[V] and transform into a V. There are then two Vs that will transform to an X. The five Xs will transform to an L, the two Ls to a C, the five Cs to a D and finally the two Ds to an M. What remain are two Ms. There is no transform rule with the name MM, so no more names can be formed and the addition is completed. Names form, values transform and eventually the sum appears.

5.2.7 Expressional Completeness

The expression itself cannot determine when its resolution is completed. The only way to determine the progress of the resolution is to open the bag and count the values. Roman numeral arithmetic was never intended to behave autonomously in a shaking bag. Integral to the system was the assumption of a trained human able to discern value states, to manipulate the values with well defined procedures, to resolve all the ambiguities and to determine when the resolution was done. None of this human expressivity is embodied in the pure value expression above.

If a coordinating human is not available, the expression itself must be enhanced to express the appropriate coordination behavior. There must be a completeness of expression that eliminates the ambiguities of behavior. This can be expressed with more values and more value transform rules.

To determine completeness of resolution there must be a progression of name formation and resolution such that there is a necessarily last name formed and appreciated. With the present form of the expression there might not even be a first name formed. VI+XII=XVIII with no names formed and resolved at all. There must be a completeness of behavior at each stage of name formation and resolution to ensure that every name in the progression is formed and appreciated in an orderly progression with a guaranteed last appreciation. Completeness of behavior first requires a completeness of representation at each stage of resolution.

The first question of an addition is, How many Is are present in the bag? The process must count the Is and somehow determine that it has considered all the Is and has not missed any Is in the bag. This is quite impossible with just thengs, values and value transform rules unless the number of Is to be counted can be pre-expressed.

The number of Is to be counted cannot be pre-expressed unless the number of Is is constant. This can be arranged with zero place-holder symbols so that there can be a constant number of each value in each number. Since each numeral value expresses a different magnitude there must be a unique zero or place holder value associated with each numeral value. The corresponding lower case letter will be used as the zero value for each numeral value as shown in Table 5.1.

TABLE 5.1

Roman numeral values with their associated zero values.

| Numeral value | Zero value |
|---|---|
| I | i |
| V | v |
| X | x |
| L | l |
| C | c |
| D | d |
| M | m |

In a minimal Roman number it is possible to have zero to four Is. The zero value I is used such that there is always exactly four of I and/or I in a number: iiii, Iiii, IIii, IIIi, IIII. When two numbers are added, there will always be exactly eight of I and/or i. The criterion for completeness can be pre expressed in the value transform rule names. The name of each rule, shown in Table 5.2, is exactly eight values. Each name is a symbol string but this does not imply any position dependency of the symbol values. The name IIIiiiii means that there is three of I and five of I in no particular order.

TABLE 5.2

Transform rules for the addition of Is with the zero place-holders.

Iiiiiiii[iiiiv]
Iiiiiiii[Iiiiv]
Iiiiiiii[Iiiiv]
IIIiiiii[IIIiv]
IIIIiiii[IIIIv]
IIIIIiii[iiiiV]
IIIIIIii[IiiiV]
IIIIIIIi[IiiiV]
IIIIIIII[IIIiV]

A rule will be invoked only when its name is completely formed by all eight values. This requirement of completeness of name formation is the mechanism of behavior coordination.

The V or v is the carry to the V,v addition. There are one each of V and/or v in the two numbers and there will always be a carry value of V or v. So there will always be exactly three of V and/or v present. The names of the value transform rules, shown in, requires 3 of V and/or v. The carry value from the I resolution must be present before the V,v name can form and resolve. Because of the completeness requirement the V,v addition occurs strictly after the I,I addition is completed. The carry values express the necessary progression of name formations and resolutions.

TABLE 5.3

Transform rules for addition of Vs.

vvv[vx]
Vvv[Vx]
VVv[vX]
VVV[VX]

There will be four X,xs in each Roman number so adding two numbers will involve 8 values and the carry value will make exactly nine values to form the X,x addition names as shown in Table 5.4. Again, the X,x addition will occur strictly after the V,v addition.

TABLE 5.4

Addition rules for Xs xxxxxxxxx[xxxxl]
Xxxxxxxxx[Xxxxl]
XXxxxxxxx[XXxxl]
XXXxxxxxx[XXXxl]
XXXXxxxxx[XXXXl]
XXXXXxxxx[xxxxL]
XXXXXXxxx[XxxxL]
XXXXXXXxx[XXxxL]
XXXXXXXXx[XXXxL]
XXXXXXXXX[XXXXL]

The remaining rule sets, shown in Table 5.5 can be similarly derived except for M,m which poses a difficulty because it does not have an inherent maximal form. One can put as many Ms as one likes in a number and there is no way to predetermine how many Ms there are. The only way to deal with this is to limit the number of M,ms allowed in a number. In this discussion the number of M,ms will be limited to five so that, with the carry, there are always exactly eleven of M and/or m. The addition rules for M clip any result greater than five Ms to five Ms without considering the lesser numerals.

TABLE 5.5

Addition rules for L, C, D and M

| Rules for L | Rules for C | Rules for D | Rules for M |
|---|---|---|---|
| lll[lc] | cccccccc[ccccd] | ddd[dm] | mmmmmmmmmmm[mmmmmZ] |
| Lll[Lc] | Cccccccc[Ccccd] | Ddd[Dm] | Mmmmmmmmmmmm[MmmmmZ] |
| LLl[lC] | CCcccccc[CCccd] | DDd[dM] | MMmmmmmmmmmm[MMmmmZ] |
| LLL[LC] | CCCccccc[CCCcd] | DDD[DM] | MMMmmmmmmmmm[MMMmmZ] |
| | CCCCcccc{CCCCd] | | MMMMmmmmmmmm[MMMMmZ] |
| | CCCCCccc[ccccD] | | MMMMMmmmmmmm[MMMMMZ] |
| | CCCCCCcc[CcccD] | | MMMMMMmmmmm[MMMMMZ] |
| | CCCCCCCc[CCccD] | | MMMMMMMmmmm[MMMMMZ] |
| | CCCCCCCCc[CCCcD] | | MMMMMMMMmmm[MMMMMZ] |
| | CCCCCCCCC[CCCCD] | | MMMMMMMMMmm[MMMMMZ] |
| | | | MMMMMMMMMMm[MMMMMZ] |
| | | | MMMMMMMMMMMM[MMMMMZ] |

A modified Roman numeral is always exactly 20 values; four of I or i, one of V or v, four of X or x, one of L or 1, four of C or c, one of D or d, and five of M or m. The number one is mmmmmdccclxxxxviiiI. The number zero is mmmmmd-cccclxxxxviiii. This representation is analogous to a two's complement binary number represented in a 32 bit computer that is always 32 bits regardless of its magnitude.

The Roman numbers

MDCCCCLXXVIII and XXII now become mmmmMDCCCCLxxXXViIII and mmmmmdc-ccclxxXXviiiI and the addition operation becomes:

mmmmMDCCCCLxxXXViIII+
mmmmmdccclxxXXviiiI=mmmMMdccclxxxxviiii.

Figure 23:
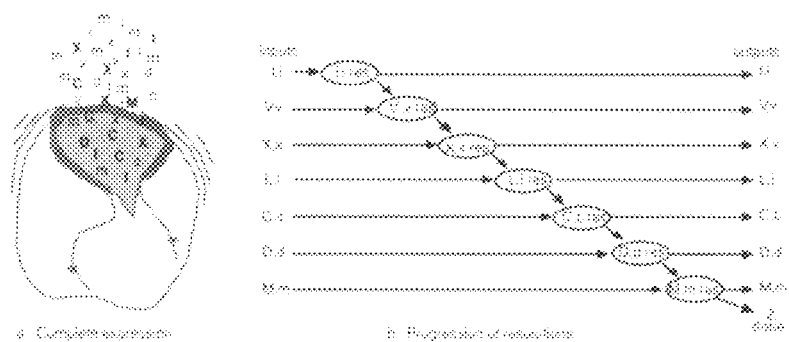
FIG. 23 illustrates modified Roman numeral addition in shaking bag.

The addition process accepts two completely represented numbers and produces one completely represented number. The number representation conventions presented to the expression are preserved in the final result of the expression. The completeness of the representation of the input numbers and transform rules expresses an unambiguous progression of name formations and resolutions. The requirement of completely forming a name to invoke a transform rule fully coordinates the progression of resolutions. The I,i addition is the necessarily first resolution. As shown in FIG. 23b the successive carry values shepherd a coordinated progression of resolutions that lead to the addition of the M,ms as the necessarily last resolution.

No matter how long it takes for the names to form and resolve the expression autonomously resolves in an orderly progression of name formations and resolutions to a necessarily last name formation and resolution which generates the coordination value Z to indicate that the addition is completed. Z might open the bag and spill the results.

5.2.8 Pure Value Summary

A pure value expression consists of thengs mutually associated at a single place asserting values that form names and transform in accordance with a set of value transform rules. Pure value expression and the notion of completeness of expression was illustrated with roman numeral addition. The classic roman numeral expression requires a human to complete the expression and coordinate its behavior. As was shown earlier, more values, value transform rules and conventions of expression can be used to express the coordination behavior previously expressed by a human, that the Roman Numeral expression, or any other pure value expression, can be complete in itself, expressing a fully determined progression of spontaneous behavior that unambiguously produces a correct result.

The behavior of the process is completely expressed solely in terms of associated thengs asserting values behaving in accordance with value transform rules. No other concepts or expressional elements such as an explicit control mechanism or timing relationships need to be introduced. In particular, no humans are needed.

The Thengs of a Pure Value Expression

The thengs of a pure value expression serve as a medium of value assertion and do not contribute to differentiation. When thengs do not contribute to differentiation, their specific behavior is expressionaly irrelevant. They may behave as is convenient to express the values. From some mythical meta view they may disappear, appear, merge or split, but there is no meta view. Values are asserted by thengs that are all mutually associated and that is all that can be said.

Concurrent Behavior

At a single place of association there can be a multitude of pure value expressions with mutually disjoint value sets and value transform rule sets simultaneously and independently behaving in a single frothing sea of values. This is the expressional form of the cytoplasm of a living cell which is a single place of association filled with specifically interacting proteins supporting the intermingled expression of hundreds of independent processes proceeding simultaneously and without ambiguity.

The Temporal Nature of Pure Value Expression

A pure value expression resolves in a progression of name formations and resolutions. Clearly, there is a temporal aspect of befores and afters to a pure value expression. What is the nature of this temporal aspect and what are its limits?

Might it not be the case that sometimes the name-forming values cease some time interval before the result values become or that the name forming values linger after the result values become and co-exist for a time with the result values.

A formed name can be appreciated only by the result values becoming. As long as the name-forming values cease without further behavior, whether they ceased before the result values became or whether they lingered to co-exist with the result values cannot be appreciated. Consequently the question of temporal intervals between the formation of a name, its resolution and the assertion of the result values is meaningless.

By the same token there is no transition interval of appreciation, no duration of name-forming values ceasing and result values becoming. A name cannot be formed with half a value or almost a value. Stages of becoming of a value cannot be appreciated and cannot be considered. Similarly there is no way to appreciate stages of ceasing of a value.

A partially formed name cannot be appreciated. Only completely formed names can be appreciated. There is no means of appreciating how long a value lingers before forming a name or how long a name takes to form. There is no means of appreciating that any particular value has not yet formed a name or that any particular name has not yet fully formed. There is no interval of name formation:

At this most primitive level there is only a progression of discrete befores and afters. Remember that there is no meta view or meta referent or metric of time. There is only the thengs, the values and the value transform rules.

The Spatial Nature of Pure Value Expression

The thengs of a pure value expression are all at a single place of association. There is no here or there within the place. All values and their asserting thengs are equally here. In a shaking bag thengs clearly occupy space relative to each other within the expression and one might be tempted to consider their relative locations and movements within the expression. This temptation, however, requires a meta view, a meta reference frame and a meta metric, none of which are available. The only appreciation that can occur within the place of association is the formation and resolution of a name. Relative spatial position within the place is not appreciable.

If one must talk of spatial place inside a pure value expression, one might say that each theng is simultaneously everywhere inside the expression or that each theng is nowhere in particular inside the expression. One might even say that a theng inside the expression does not even exist until its value interacts and is appreciated. Such comments have no expressional relevance and are all equally meaningless.

5.3 Association Expression

Association expression is the association of thengs in specific structures of association relationships. This is in contrast to the mutual association of thengs in a pure value expression, which has no structure. Differentness is expressed by unique place in the structure. Each theng and its asserted value is different from every other theng and its asserted value by virtue of its place in the structure of association relationships. Identical values asserted at different places are different by virtue of the differentness of their asserting thengs. A pure association expression occurs when a process is expressed purely in terms of association differentiation with no value differentiation.

But before pure association expression can be presented, there are a few preliminaries of association expression that must be addressed. The difficulty is that while a pure value expression can express discrete and directed behavior solely in terms of values and value transform rules with no association differentiation, an association expression cannot express discrete and directed behavior solely in terms of association relationships with no value differentiation. An infrastructure of value differentiation must be established before the pure association expression can be presented 5.3.1 The Behavior of Statically Associated Thengs A theng has no structure and cannot appreciate any orientation of association with other thengs. It has no input or output, no top or bottom, no right or left. There is no way for a theng to differentiate the other thengs with which it is associated. Each theng sees a name formed of its own value and the unordered values of the thengs directly associated with it and changes its own value in response to the formed name. Each theng in a structure of association is a locus of a pure value expression. Each association between two thengs links two pure value expression loci. A structure of associated thengs forms a structure of interlinking pure value expressions.

Theng D in FIG. 24a sees a four value name formed by its own value and the values of thengs B, C and E and partially resolves the formed name by changing its own value. The locus of theng D is indicated by a shaded ring. There is no way for theng D to determine which value is from which theng. Theng E in FIG. 24b sees a four value name formed by its own value and the values of thengs D, G and F and partially resolves the formed name by changing its own value. When theng D in FIG. 24c changes its value it changes the name presented to theng E, which will change its value changing the name presented to theng D and so on. FIG. 24d shows the structure of overlapping and interlinking pure value expressions.

If all thengs assert the same values and resolve the same names, name formation and resolution will flow continually in all directions through an association structure. Its behavior will be neither discrete nor directed.

5.3.2 Directionalizing the Resolution Behavior of Association Expressions

To directionalize the flow of resolution, it must be ensured that result values do not influence the formation of the names that generated the result value. This directional behavior is expressed with value differentiation.

The case of all associated thengs asserting the same value and resolving the same names is illustrated in FIG. 25a. All three A thengs assert the same values (0,1) continually forming and resolving the same names with each other. Value change flows in all directions continually or result values cease changing (all three thengs asserting 1). For directionalized behavior each theng must assert values that do not influence the formation of the name that it recognizes and resolves.

Directional resolution behavior that does not feedback on itself can be expressed with three thengs in linear association asserting disjoint result values as shown in FIG. 25b. Theng A sees names formed of 0, 1, X, Y, S and T. It asserts the result values X and Y. The set of value transform rules for theng A assert a result value based on the values 0 and 1. The values X, Y, S and T are effectively ignored by the value transform rules. Theng B asserts values (S,T) for names including X and Y and effectively ignores the values 0, 1, S and T in the formed name. Theng C then resolves names formed with the values (S,T) asserted by theng B into the values (0,1) effectively ignoring the values X, Y, 0 and 1. Theng C is not associated with theng A, so the values (0,1) asserted by theng C cannot participate in forming the name presented to theng A; the progression of value change does not feedback on itself. By not showing the name forming values effectively ignored by the set of value transform rules associated with each theng, the value transform rules of the three thengs can be re-expressed as shown in FIG. 25c.

To express directional behavior, two thengs that assert identical values must be separated by at least two linear associations with thengs that assert values that are different from the identical values and different from each others values. The (X, Y) and (S, T) value sets buffer the (0,1) values asserted by rightmost theng C from participating in the formation of the name presented to theng A, thereby creating a directional flow of appreciation behavior through the structure of associations.

The general problem of assigning three sets of values and value transform rules to ensure that all identical value sets are appropriately isolated is similar to coloring a map with four colors which can be extremely complex. No map maker, however, has ever made a map with four colors because with five or six colors the problem of isolating and differentiating each use of a color is much easier. Similarly, if many sets of different values and value transform rules are available, the general problem of isolating value usage in an association structure is much easier.

Nature likely solves this problem in the general sense with lots of value sets. For the human, however, there is a straightforward convention using only three value sets that dramatically simplifies the problem.

The Unit of Association

A linear three-theng structure can be defined that has an input association place and an output association place; that always isolates the output from the input. This structure can then be employed as a conventional directionalized unit of association. The unit can then be defined in terms of its input and output values ignoring the internal buffering values as shown in FIG. 26a. It can be assumed that the functional value transform rules are associated with theng A and that thengs B and C are just buffering thengs. Units of association can then be associated output to input, to express large directionalized structures of association relationships as shown in FIG. 26b. FIG. 26c shows theng C extended to facilitate association with theng As of other units.

FIG. 27a shows the units graphically stylized to indicate their functionality and directionality. FIG. 27b shows a further stylization that ignores the internal structure of the unit. Once the unit of association convention is established, the internal buffering associations need not be explicitly expressed and need not even be the same across different units of association that use the same input and output values. One can now ignore the internal buffering structure of the unit of association and consider it as an operator with directed input and output and a set of externally visible values and value transform rules that define its functionality. One can now speak in terms of a single set of values, of operations on combinations of those values and of combining these operations in structures of association relationships. A unit of association will also be called an operator.

The Switch

The simplest directionalized expression is a switch. A switch is a single input functionless association structure whose output is isolated from its input by value differentiation. Consider the electromagnetic switch of FIG. 28a. It receives an input current value, that influences a magnetic field value, that influences a physical position value, that influences a result current value. The output current is isolated from the input current by two different value domains of interaction. Theng A is the coil and core of the electromagnet, theng B is the spring of the switch lever and theng C is the lever and output wire of the switch. The value transform rules for the thengs of an electromagnetic switch might look like the following;

| Theng A | Theng B | Theng C |
| --- | --- | --- |
| incurrent[magnetic field] | magnetic field[lever down] | lever down[outcurrent] |
| no incurrent[no magnetic field] | no magnetic field[lever up] | lever up[no outcurrent] |

The electronic tube of FIG. 28b receives a voltage value, that influences a charge value in a vacuum, that influences current flow value through the vacuum, that influences the output voltage value, that does not feed back and influence the input voltage value.

The voltage on the transistor gate of FIG. 28c influences the charge value in the channel, that influences the electron flow value through the channel, that influences the voltage value at the output, that does not feed back and influence the input voltage value.

The switch has been considered to be a fundamental element for building computer, because Boolean logic functions can be expressed in terms of networks of switches, because a switch is directional, because it asserts a fresh (amplified) signal and because it is easy to understand and build. But any means of discrete interactive behavior will suffice as a primitive element of autonomous computation.

5.3.3 Discretizing the Resolution Behavior of Association Relationships

The directionalized behavior, however, is not discrete. Consider that the name presented to an operator is 01, which is appreciated by the operator asserting 1. Assume that the next name to be resolved is 10, which is expressionaly identical to 01 but both inputs will transition their values. If the 1 value transitions to 0 before the 0 value transitions to 1, then the name 00 is temporarily formed and appreciated by the operator output transitioning to 0. When the 0 transitions to 1, the name 10 is formed and the operator output transitions to 1. The transition of the operator to 0 was an erroneous resolution that depended on the sequence of transitions of the inputs. If the 0 had transitioned to 1 first forming the name 11, then the operator would have continued asserting 1 and the spurious transition to 0 would not have occurred. Further, when the original 1 value transitions to 0, there is still no transition of the operator output value. There has been no spurious transition, but there has been no appreciating change either. There is no way to appreciate that 10 is the next fully formed name and is correctly resolved by the operator.

In the pure value expressions above the complete formation of a name is an appreciable event that occurs in relation to the absence of a formed name. There is no formed name. Suddenly there is a formed name. A value transform rule is invoked. The formed name disappears and the result value appears. Each name formation and its resolution is a discrete event. In a static structure of associated thengs, a completely formed resolvable name is continually presented to a unit of association, which continually resolves the presented name. There is never an absence of a formed name, so there can be no discrete occurrence of a formed named name to mark the beginning of a resolution. There is never an absence of an asserted result, so there can be no discrete occurrence of an asserted result to mark the completion of a resolution.

To appreciate discrete name formation and resolution in a context of continually presented values, consecutively presented names must be formed from disjoint value sets. A name is completely formed when values transition from values of one set to a completely formed name of values of another set. Alternately transitioning formed names between at least two disjoint sets of values allows the completeness of name formation and the resolution of the name to be appreciated as a discrete event. Distributing disjoint value sets over a large expression could be very complicated but, again, there is a convenient convention that greatly simplifies the task for humans.

The NULL Convention

A single new value is assigned that is disjoint from the name forming values. If the name forming values are called 'data' values the newly assigned value will be a 'not data' value called NULL. A name formed of 'data' values will express "a data name". A name formed of all NULL values will express "not a data name." A data name and all NULL can form alternately in relation to each other as shown in FIG. 29. The formation of each name is a discrete appearance event in its value domain. A data name can form in relation to all NULL. And all NULL can form in relation to a data name. In both cases the discrete completeness of name formation (all NULL or complete data) can be directly appreciated by the value transform rules These monotonic transitionings will be called wavefronts. The monotonic transition from 'completely NULL' to 'completely data' is a data wavefront and the transition from 'completely data' to 'completely NULL' is a NULL wavefront. Successive 'data' names are separated by an all NULL 'not data' name. This will be referred to as the NULL convention.

The Completeness Criterion.

Each operator must now appreciate these completeness relations in terms of its value transform rules. Each operator must transition its asserted value only when its input values are a completely formed data name or are all NULL. The following three rules condition the behavior of an operator;

If input is "completely data," then transition output to the "data" resolution of input.

If input is "completely NULL," then transition output to "NULL".

If input is neither "completely data" nor "completely NULL," do not transition output.

The transition of the output to a data value implies the completeness of data presentation at the input, the completeness of its resolution and that the asserted output is the correct resolution of the presented input. The transition of the output to NULL implies the completeness of NULL presentation at the input. This is called the completeness criterion.

Boolean functions enhanced with completeness behavior, shown in FIG. 30, are no longer mathematical functions but now include a state holding or hysteresis behavior. A dash means that there is no value transform rule for that name and hence no transition. The domain inversion will be explained later. A logic using the NULL value and state-holding behavior will be called a NULL Convention Logic.

The Completeness Behavior of a Network of Enhanced Functions

The monotonic behavior of the data and the completeness behavior of each operator fully coordinates the order of events in a network of associated operators. The individual completeness behaviors accumulate so that the network as a whole expresses the completeness criterion. Consider the network of enhanced Boolean operators shown in FIG. 31. Divide the network arbitrarily into N ranks of operators ordered progressively from input to output, with all inputs before the first rank and all outputs after the last rank. The rank boundaries are shown in FIG. 31 with vertical lines labeled alphabetically in rank order from input to output;

For the values crossing G to be all data, all of the values crossing F must be data.

For the values crossing F to be all data, all of the values crossing E must be data.

For the values crossing E to be all data, all of the values crossing D must be data.

For the values crossing D to be all data, all of the values crossing C must be data.

For the values crossing C to be all data, all of the values crossing B must be data.

For the values crossing B to be all data, all of the values crossing A must be data.

Therefore, for all the values after G to be data, all the values before A must be data. If any value before A is NULL, at least one value after G will be NULL.

These considerations are also true for the NULL wavefront presented when the expression is in a "completely data" state. Simply interchange NULL and data in the text above.

During a data wavefront values transition monotonically from NULL to data as resolution progresses through the expression from input to output. If any value crossing a boundary is NULL, then there will be at least one NULL value crossing all boundaries to the right of that boundary. There can only be a complete set of output data values when there is a complete set of input data values and the data values have propagated through the expression. There can only be a complete set of output NULL values when there is a complete set of input NULL values and the NULL values have propagated through the expression. The expression as a whole expresses the completeness criterion. Completeness of the output implies completeness of the input. The output also maintains the monotonic transition behavior of the input.

The behavior of a wavefront propagating through the expression is completely determined. It does not matter when or in what order the values transition at the input of the expression. Nor does it matter what the delays might be internal to the expression. Consider the shaded function in FIG. 31. It does not matter how long the data values (NULL values) take to propagate through other operators and over signal paths to the input of the shaded function, its output will not transition until all values are data (NULL) at the input of the function. For each wavefront, each function synchronizes its input and switches its output exactly once to a correct value coordinating the orderly propagation of a wavefront of monotonic transitions of correct result values through the expression until the output of the expression as a whole is complete. The orderly symbolic behavior of each individual function accumulates to orderly symbolic behavior of the whole, expressing the completeness criterion for the expression as a whole.

The behavior of the expression is fully determined in terms of symbolic behavior. There is no explicit expression of control. There is no consideration of timing relationships anywhere in the expression. There are no races, no hazards and no spurious result values. There is no nondeterministic behavior. There is no state space explosion. For a given input there is only one possible partial ordering of operators. The behavior of the expression is deterministic, is repeatable, is testable and is trustable.

Ignoring the NULL Convention

Just as the directionalization convention could be ignored once the buffering thengs and their behavior had been universally established, so can the NULL value and its behavior be ignored once the NULL convention is universally established. The NULL function is identical and universal for all operators and for all combinations of operators; when the input is all NULL, the output becomes all NULL. Because of this universality the NULL behavior need not always be explicitly expressed. One can express primitive operators solely in terms of data value behaviors as in FIG. 32a. The primitive operators can be directly substituted with NULL convention operators as in FIG. 32b.

5.3.4 Summary of Discretization and Directionalization

With a simple conventions of value differentiation, the behavior of associated thengs can be directionalized and discretized. No new expressional primitives have been postulated. A process expression is still just associated thengs asserting values transforming according to value transform rules.

5.3.5 The Pure Association Expression

With directional and discrete behavior established according to the conventions of value differentiation, the pure association expression can now be presented. Pure association expression occurs when there is only one data value, which will be called DATA, to express the meanings of the process. With one data value, there can be no differentiation of process meaning in terms of value. All differentiation of process meaning is in terms of place in a structure of association relationships.

The Multi-Place Data Differentiation Convention

Differentnesses that were expressed by two or more data values must now be expressed by different places in a structure of association relationships. A variable that is commonly understood as a single unique place that expresses multiple mutually exclusive meanings with multiple unique values must now be represented as multiple unique places in a structure of association relationships that mutually exclusively assert a single DATA value. A place either asserts its meaning by asserting the DATA value, or does not assert its meaning by asserting the NULL value. A binary variable is expressed as two places, place 1 and place 2, that mutually exclusively express TRUE and FALSE. If place 1 asserts a DATA value, the meaning of the variable is TRUE. If place 2 asserts its DATA value the meaning of the variable is FALSE. It is illegal for both places to assert a DATA value at the same time. If both places assert NULL then the variable is in its "not data" state. The binary variable is shown in FIG. 33.

A variable in its most general sense is a locus of mutually exclusive assertion. In general, an M value variable can be represented with M places only one of which will assert a DATA value in a given data wavefront. FIG. 34 shows several examples of multi-value variables; the illegal states are not shown.

For a data wavefront, each variable asserts exactly one DATA value. Completeness of the data wavefront is exactly one DATA value per variable. For a NULL wavefront all asserted DATA values return to NULL and completeness for a NULL wavefront is all NULL values across all variables.

Pure Association Operators are Threshold Operators

The NULL value, meaning 'not data', cannot enter into the formation and resolution of a data name. There is only one data value called DATA, so there can be no combination of different data values. At the most primitive level of name formation, at a single place of association, the only possible names that can form are combinations of DATA values. The only discriminable property available when combining DATA values is how many DATA values are present. Therefore pure association primitive operations can be naturally viewed as threshold operations. The fundamental question of each operator is whether sufficient DATA values are present to completely form its name. If sufficient DATA values are present, then the operator asserts its DATA value. If sufficient DATA values are not present, then the operator does not assert its DATA value.

A threshold operator will be represented with the graphic symbol shown in FIG. 35. The symbol expresses the directionality of the operator and the number in the operator indicates the threshold of the operator. The lines entering the rounded part of the operator indicates the number of input values. The operator shown is a 2 of 2 operator. The value transform rules for the operator are shown in FIG. 36.

Forming Names and Asserting Results

An example of a pure association expression is shown in FIG. 37*a*. Its input is a three-value variable X and a two-value variable Y. Its output is a four value variable Z. It adds a binary digit to a trinary digit and outputs a quaternary digit. For a data wavefront presented to the input, there will be exactly one place of the X variable asserting DATA and one place of the Y variable asserting DATA. A name formed by the two variables comprises exactly two DATA values. There are six formable names and the inputs are associated with the 2 of 2 operators such that each possible name is formed as the input of an operator. This rank of operators is the expression's internal representation of the formable names and the expression of its search to recognize a presented name. A presented name is recognized by one of the operators asserting a DATA value. For input names that assert an identical output behavior, the name recognitions are collected to a single place in the structure with a threshold 1 operator. For instance, the input names 02 and 11 assert the same output behavior and are collected into the single behavior of quaternary value 2.

It will be noticed that the names 01 and 10 are explicitly recognized. In the corresponding pure value expression shown in FIG. 37*b* there is no way to tell 01 from 10. They are a single name. But in the pure association expression the 0s and 1s for each variable come from different places in the structure. 01 and 10 can be differentiated so the formed names must be individually recognized.

The output expresses the completeness criterion and maintains the monotonic completeness behavior of the input. When one output value becomes DATA, the input is completely DATA and the output is the correct resolution of the presented input. When the output becomes all NULL the input is all NULL.

General Threshold Operators

N of N operators and 1 of N operators can be merged to form more general M of N operators. FIG. 38 shows a 1 of 2 operator merged into a 2 of 2 operator to form a 2 of 4 operator with a weight of 2 for a. This leads to a threshold logic of M of N operators with state holding behavior which forms a general logic of pure association expression called two value NULL Convention Logic or 2NCL.

A Pure Association MUTEX

Figure 39:
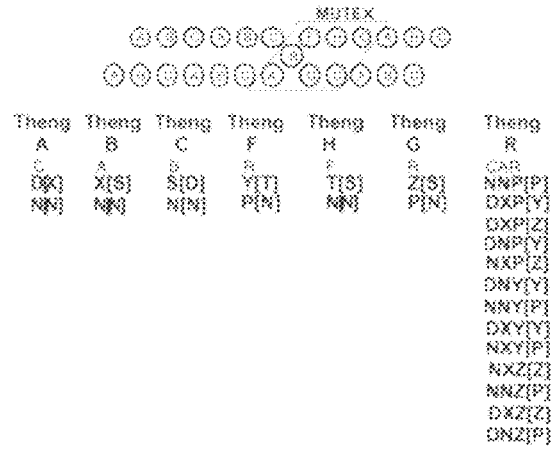
FIG. 39 illustrates spectrum of differentiation expression.

A pure association MUTEX will receive uncoordinated wavefronts on two pipelines, each propagating a single data value wavefront and allow them to pass one at a time mutually exclusively ushering them into the domain of coordinated wavefront behavior. The MUTEX shown in FIG. 39 is modeled as two paths composed of units of association with each pipeline broken and a single theng reconnecting the two pipelines. The pipeline thengs each assert NULL and one non-NULL value. The connecting R theng asserts three values: P means ready, Y means pass upper wavefront and Z means pass lower wavefront. Theng F is a substituted A theng in the upper pipeline that appreciates the Y value asserted by theng R. To avoid ambiguity theng F asserts T instead of X and theng H is a substitute B theng that appreciates T and asserts S. Theng G substitutes for a B theng in the lower pipeline and appreciates the Z value asserted by theng R. The transform rules associated with theng R defines the behavior for the MUTEX.

Figure 40:
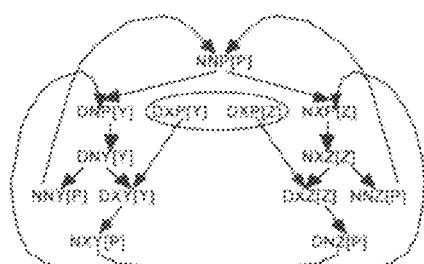
FIG. 40 illustrates association search.

The flow of name formations and resolutions for theng R is shown in FIG. 40. NNP[P] is the waiting state. If a D from the upper pipeline arrives, DNP[Y], it follows the progression on the left. If an X from the lower pipeline arrives, NXP[Z], it follows the progression on the right. For the case where both arrive simultaneously there are two rules, DXP[Y] and DXP[Z]. Both are equally likely to occur. Theng R can only assert one value and one rule will prevail enabling the upper or lower pipeline.

The chosen wavefront will be passed on by theng R asserting the enabling value for the pipeline. Theng R will continue to assert the enabling value until a NULL wavefront arrives on the chosen pipeline. Theng R asserts P resetting for the next enabling. A wavefront that arrives during an enabling or the wavefront that lost the simultaneity contest will wait until the chosen wavefront is completed with the arrival of its NULL wavefront.

5.3.6 Association Expression Summary

In an association expression differentness is expressed by unique place in a structure of association relationships among operators. But if all associated thengs behave identically in all directions, then there is no particular uniqueness of place in the association structure. Uniqueness of place also depends on discrete and directed behavior among associated thengs. Association relationships among thengs do not inherently express discrete and directed behavior. Value differentiation conventions in the form of the unit of association and the NULL convention are required to directionalize and discretize resolution behavior among the thengs.

Once the directionalizing and discretizing conventions are established, the pure association expression can be presented which uses a single DATA value and hence no value differentiation. It was shown that there exists an inherent logic of pure association expression: a threshold logic with state-holding behavior called two value NULL Convention Logic (2NCL).

No new concepts or expressional elements such as an explicit control mechanism or timing relationships have been introduced. It is still just associated thengs asserting values transforming according to value transform rules.

The Values of Pure Association Expression

The values of pure association expression, DATA and NULL, serve as a medium of place assertion and do not contribute to differentiation. Since they do not contribute to differentiation, it is not important that they all be the same two values as long as the values of each operator effectively perform the duty of asserting and not asserting its place in the association structure.

Concurrent Behavior

A discretized and directionalized association expression inherently expresses fully coordinated distributed concurrent behaviors within the association structure.

The Temporal Nature of Pure Association Expression

There are still no inherent durations of behavior. But the succession of wavefronts flowing through an association structure begin to provide a rudimentary rhythm of time passing and of place in time. Each wavefront is a present to itself. Wavefronts preceding it through the structure are in its past and wavefronts following it through the structure are in its future.

The Spatial Nature of Pure Association Expression

The association structure itself, extending in space, begins providing a rudimentary referent of place in space.

5.4 The Spectrum of Expression

Figure 41:
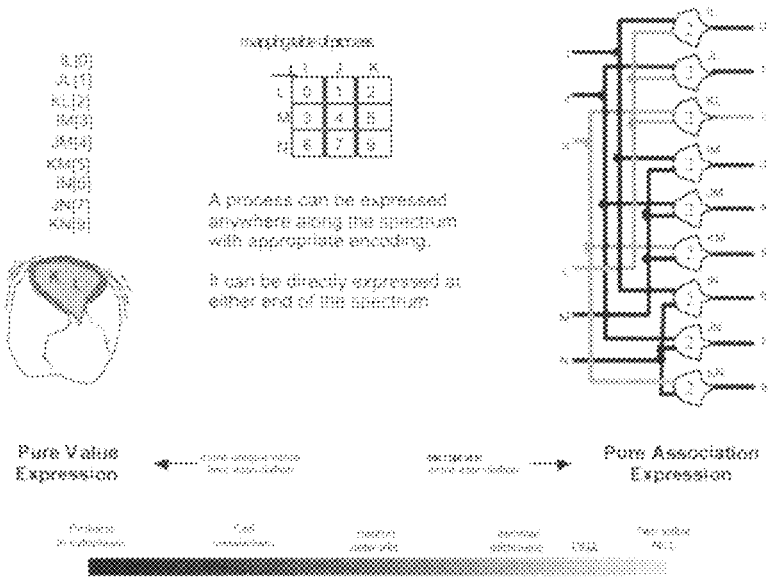
FIG. 41 illustrates alternating value and association differentiation.

The two interpenetrating domains of differentiation form a spectrum of expression shown in FIG. 41 with pure value expression at one end and pure association expression at the other end. There must always be a little bit of each domain in the expression of any process. There must be at least one place of association and there must be at least two values, one data value and one "not data" value.

In the center of FIG. 41a process is defined as a symbolic function table. The input is two three-value variables that can form nine names that map to nine unique appreciation values. There are 15 differentnesses and 9 possible names.

To the right is shown the pure association expression of the process. There are 15 unique places of association bounding the expression: 6 input associations and 9 result associations. The rank of 9 operators recognizes the 9 possible formed names. The values K and L are shown as the presented input to be resolved.

To the left is shown the pure value expression of the process. There are 15 unique values in the expression: 6 input values and 9 result values. The 9 value transform rules recognize the 9 possible formed names. The values K and L are shown entering the bag to be resolved.

The two expressions are exact duals and each is mapped directly from the function table. In the pure value expression, differentiation is expressed entirely in terms of values and value transform rules and in the pure association expression, differentiation is expressed entirely in terms of place in a structure of association relationships.

Association differentiation, on the right end of the spectrum, is the realm of human expression. There are few unique symbols, few interaction rules and large association structures. Humans are fond of simple value domains and complex association structures.

Value differentiation, on the left end of the spectrum, is the expression realm of nature. There are lots of unique values, lots of interaction rules and very little association structure. There are 10130 possible protein symbols and uncountable possible protein interaction rules. Nature is fond of simple association structures and complex value domains.

Along the spectrum lies varying proportions of value differentiation and of association differentiation. The cytoplasm is a pure value expression, but cell metabolism also involves a lot of associated structures within the cell. Neuron networks are largely structures of association relationships but also involve hormone values and lots of different neurotransmitter values. Decimal arithmetic uses ten data values, DNA uses four data values and 2NCL expressions are pure association expressions using a single data value.

One domain of the spectrum can be held constant while the other domain is allowed free rein. A mathematical logic such as Boolean logic holds the values and value transform rules constant and allows arbitrarily complex association structures. All mammals have essentially a constant association structure with the same body design, organ structures and cell structures. The variability among mammals is a matter of protein values expressed by DNA.

The spectrum of differentiation encompasses and conceptually unites many forms of expression that previously appeared to be quite distinct or to be only superficially related.

5.5 The Search

Process is a search to recognize patterns of differentness and assert behavior appreciating the patterns of differentness.

5.5.1 Association Search

Figure 42:
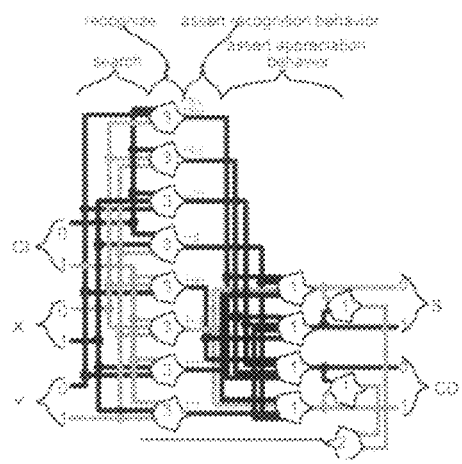
FIG. 42 illustrates an association search.

The pure association form of the full-adder expression shown in FIG. 42 illustrates the search in terms of association differentiation. Input data values, C1=1, X=0 and Y=1 are presented as gray and NULL is black.

Each possible input name is explicitly recognized by a unique operator and for each input presentation exactly one operator will be presented with complete input and will assert a data value recognizing the presented input. Each presented data value is fanned out to each operator that recognizes a name to which it contributes. This fan-out is the probe part of the search. There is only one operator to which all three fan-outs associate. This is the success part of the search.

The recognizing operator asserts a data value, which then produces the output behavior appreciating the presented input. The association configuration of the recognition operators is the internal expression of the possible names. The association of the operator assertion to the output behavior is the expression of the mapping of recognized name to its appreciation behavior.

5.5.2 Association Search Failures

The fan-out paths to the operators that do not achieve completeness are the failed search probes, called orphans. These failed search paths loose their logical relationships and a timing issue arises. An orphan path must propagate strictly faster than the arrival of the next wavefront. A discussion of orphans and how to isolate them can be found in.

5.5.3 Value Search

In a pure value expression there are two forms of search. In one, all thengs are mutually associated and immediately form all possible names. The exhaustive association is the search and a formed name that invokes a value transform rule is the success of the search. In the other, all thengs are jumbling around in the shaking bag and eventually form all possible names. The shaking is the search. The search is a success when values form the name of and invoke a value transform rule.

In the shaking bag, if associated values do not form the name of a value transform rule, they just part company and continue their search. A search failure does not leave any dangling state such as an orphan that needs to be cleaned up. A pure value expression can be expressed without any consideration of time. In this sense the pure value expression can be purely logically determined or delay insensitive, whereas a pure association expression has its orphans to consider.

5.5.4 The Value Transform Search

Nothing can be said of how a primitive theng performs its search, recognizes a presented name and invokes the appropriate value transform rule. It just happens.

5.6 Warp and Woof

Value differentiation and association differentiation are two interpenetrating forms of differentiation, each requiring the context of the other to express differentness. Associated thengs cannot express differentness without their values changing. Values cannot express differentness by interacting and changing without being associated.

In the context of an association expression, an operator can be considered a value expression. Values transform in passing through the operator. Theng A of the operator unit of association is a locus of pure value expression and is the pure value expression responsible for the transformation of the values.

Figure 43:
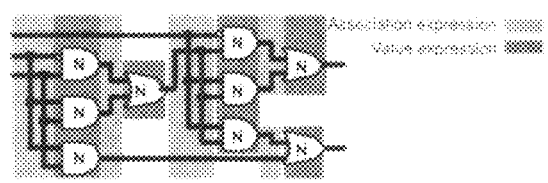
FIG. 43 illustrates alternating value and association differentiation.

The two domains of expression alternately serve as medium and differentness, mutually isolating and renewing each other, each transcending itself through the other. Each stage of association reuses value expression. Each stage of value expression creates new places that can be associated. FIG. 43 illustrates the alternation of expression between value expression and association expression. Each alternation extends the expression of differentness, by small steps, to arbitrary complexity. The two domains of differentiation are the warp and woof weaving an arbitrarily complex tapestry of differentness and its appreciation.

5.7 Summary

Process is differentness at play, endlessly appreciating itself. Unique values transforming at a single place of association or the transformation of common values flowing through places of association. Primitive concepts of expressing differentness were introduced: thengs that can associate and assert one at a time of two or more values that can change according to value transform rules. No other concepts were introduced, no timing relationships, no explicit control, no explicit sequencing, no extended state space, no humans with pencils. No further concepts will be introduced. These are sufficient.

Thengs associating and values interacting form two interpenetrating domains of differentiation. Thengs can be different by virtue of a unique place in a structure of association relationships. Values can be different by virtue of unique interaction relationships, with other values as expressed by the value transform rules. Differentness can be expressed with different values at a single place or with a identical values at different places.

The two interpenetrating domains of differentiation form a spectrum of expression from pure value at one end to pure association at the other end. Along the spectrum the two domains of differentiation interweave in various proportions. The spectrum unites forms of expression previously considered quite disparate, such as symbolic computation and biological processes. Within the invocation model, the expression of the behavior of a living cell is not fundamentally different from the expression of the behavior of an artificial computer. They each express and appreciate differentness at different ends of the spectrum. Humans and nature are doing fundamentally the same thing. They just go about it a little differently.

6 Along the Spectrum

A the two ends of the spectrum are pure value expression and pure association expression. In the interior of the spectrum are expressions with various proportions of value differentiation and association differentiation. This chapter discusses expression along the spectrum.

6.1 The Example Process

Figure 44:
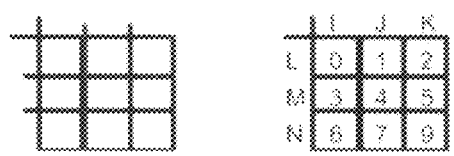
FIG. 44 illustrates baseline example process.

The baseline process is an arbitrary mapping of two inputs, each with three differentnesses combining to form nine possible input names mapping to nine unique appreciation behaviors. The empty table on the left of FIG. 44 shows the structure of the process. The table will be filled in with expressions of differentness, as in the table on the right, at various places along the spectrum with discussions of the corresponding expressions.

6.1.1 Place on the Spectrum

The place of an expression on the spectrum is determined by its proportion of value differentiation and proportion of association differentiation. The first example will jump into the middle of the spectrum with an extended discussion of expressing the baseline process with four data values. Then expression with more available data values and expressions with fewer available data values will be considered.

6.1.2 Ignoring NULL

The NULL convention is a universal behavior and need not be explicitly expressed when symbolically expressing a process. The null convention can be formulaically added to the symbolic expression of the data behavior. The examples will assume the completeness criterion and will be presented without reference to the NULL convention.

6.2 Four Available Data Values

Figure 45:
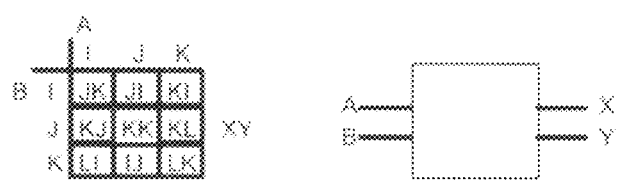
FIG. 45 illustrates mapping of four values onto the baseline process.

Only four values (I, J, K, and L) are available to express the 15 differentnesses of the process. It is assumed that the two inputs are isolated from each other by association and that the input is isolated from the output by association. The differentnesses of the inputs can be expressed with identical values and the output can be expressed with the same values used for the input. The three differentnesses of each input can be expressed with three values, but the nine result differentnesses will have to be expressed as a two value encoding. A mapping of four values to express the differentnesses of the baseline process is shown in FIG. 45. The process receives two input values A and B and generates two output values X and Y.

6.2.1 Name Recognition

The first task of any expression is to recognize a presented name. There must be a means of matching a presented name to an internal representation of the recognizable names and a means of that internal representation generating the appropriate appreciation behavior for the recognized name.

One way to recognize the nine possible names is with a unique operator that recognizes each name. However, name recognition can be expressed more generally for any number of values and any set of names with just two generic operators: an operator that recognizes one standard name and an operator that can transform any name into the standard name by rotating values.

The Equality Operator

Figure 46:
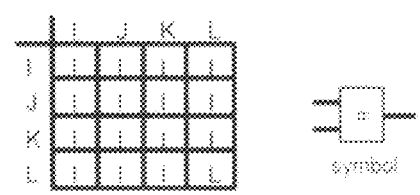
FIG. 46 illustrates a four value equality transform.

The equality operator recognizes a single name. If it is presented with its recognition name, it will output a value that can be understood to mean True, or I have recognized my name. If it is presented with any other name it will output a value that can be understood to mean False, or I have not recognized my name. The recognition name and the True and False values can be arbitrarily assigned. FIG. 46 shows a four-value equality operator with the recognition name of LL, a True value of L and a False value of I.

If the presented name is LL, the operator outputs L. If the presented name is anything else, the operator outputs 1.

The Rotation Operator

Figure 47:
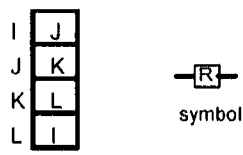
FIG. 47 illustrates a four value rotate transform.

With the rotation operator any presented name can be transformed into the standard recognition name, in this case LL. Each application of the rotation operator transforms the input value to a rotational neighbor value. Any value can be transformed into any other value with one or more applications of the rotate operator. The four-value rotation operator is shown in FIG. 47.

Figure 48:
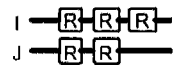
FIG. 48 illustrates transform IJ to LL.

The value I can be transformed to the value L with three rotations. The example of FIG. 48 transforms the name IJ into the name LL. Only the name IJ will rotate to LL. If the result is not LL, then the presented name was not IJ.

The Name Recognition Expression

Figure 49:
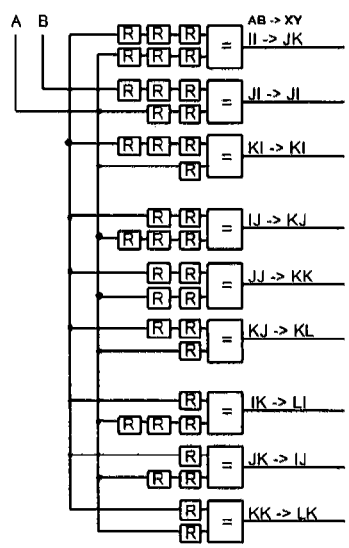
FIG. 49 illustrates four value name recognition expression.

The nine possible input names can each now be recognized with nine equality transforms. The input OF the expression is rotated differently for presentation to each equality operator. Each equality operator with its rotated inputs recognizes a unique input name. The expression, shown in FIG. 49, will recognize which of the nine possible input names is presented.

Only one equality operator will be presented with LL and will output L, recognizing the presented input name. The other eight equality operators will not be presented with LL, will not recognize their names and will output I. This expression of rotate and equality operators expresses the search to determine which name is presented to the expression. The structure of rotate operators associated to the nine equality operators is the internal representation of the nine possible names. The single assertion of L is the internal recognition of a presented name and generates the appreciation behavior of the expression.

Figure 50:
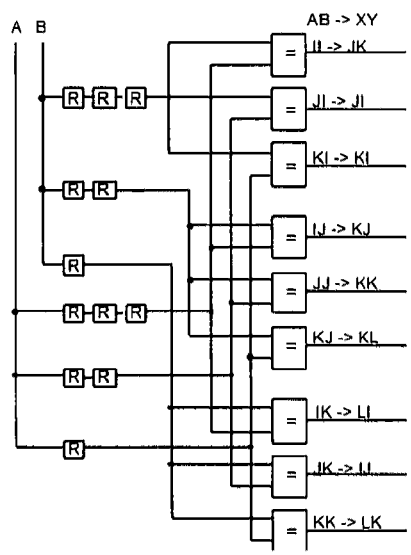
FIG. 50 illustrates optimized four value name recognition.

Name recognition can be more efficiently expressed if, instead of rotating at the input of each equality operator, each rotate sequence is performed once for each input and the rotated values fanned out to the appropriate equality operators, as shown in FIG. 50. The equality name is arbitrary and can be chosen for expressional efficiency. In this case, if the equality name were KK then six rotates could be eliminated.

6.2.2 Appreciation Behavior

The recognition of the presented name generates the appreciation behavior associated with the recognized name. In this case the appropriate behavior is the assertion of two output values. The one L value from the equality operators must cause the assertion of the correct output values and then deliver the asserted value to the appropriate output.

The Assertion Operator

Figure 51:
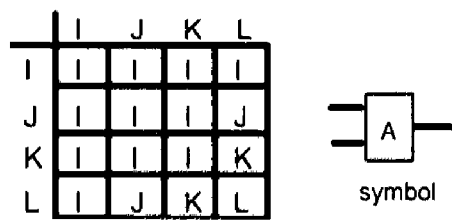
FIG. 51 illustrates four value assertion operator.
Figure 52:
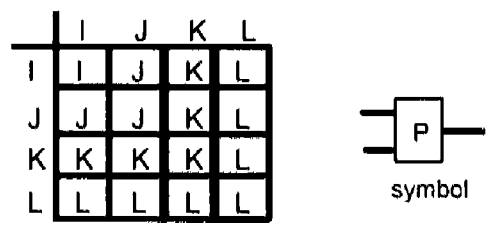
FIG. 52 illustrates four value priority transform.

The assertion operator, shown in FIG. 51, asserts a specified value or asserts a default value. Setting one input to a constant value specifies the assertion value. The other input is the output of an equality operator. If the other input is the TRUTH value, in this case L, then the specified value is output, iF the other input is a FALSE value, in this case I, then a default value is output. In the latter case, I is assigned as the default value. It is convenient for the FALSE value and the default value to be identical.

The Priority Operator

Once the appropriate recognition value is asserted it must be delivered to the appropriate output. The priority operator, shown in, passes the default value, in this case I, unless one input is a higher priority nondefault value in which case the operator passes the higher priority nondefault value. A tree of priority operators with all inputs default values except one, which may be a nondefault value, will propagate the nondefault value to the root of the tree. If there is no nondefault value the default value, will propagate to the root.

The input of the tree of priority operators is the nine assertion operators. These operators will all generate I except for one, which may assert a higher priority value or may assert I.

Asserting the Output

Figure 53:
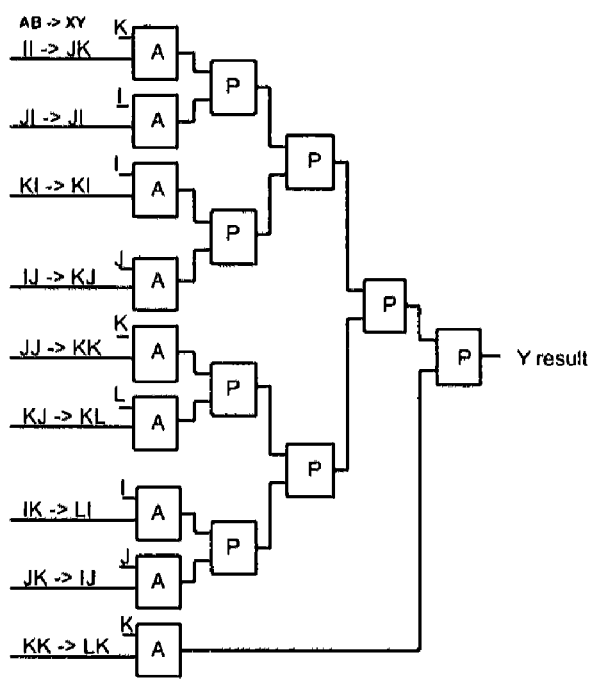
FIG. 53 illustrates generation of Y output value.

The generation of the Y output value is shown in FIG. 53. A single L value will cause an assertion operator to assert the appropriate output value that is collected through the tree of priority operators to assert the final Y output.

Figure 54:
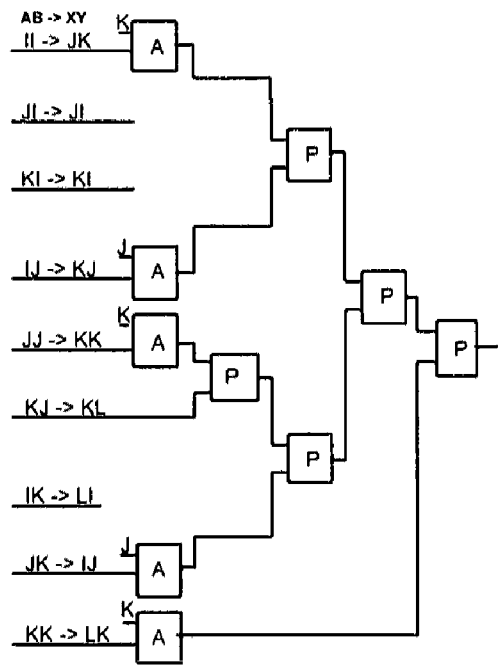
FIG. 54 illustrates modified Y output assertion.

All of the result values do not need to be explicitly generated. The truth value is already an L value, so it can be used directly without passing through an assertion operator. For the case where the output value is I, it need not be explicitly asserted at all. All the other recognition values will be asserting I into the priority tree. I is the default value and the collected output will be I without it being explicitly presented to the tree. FIG. 54 shows the generation of the Y output explicitly asserting only J and K.

Figure 55:
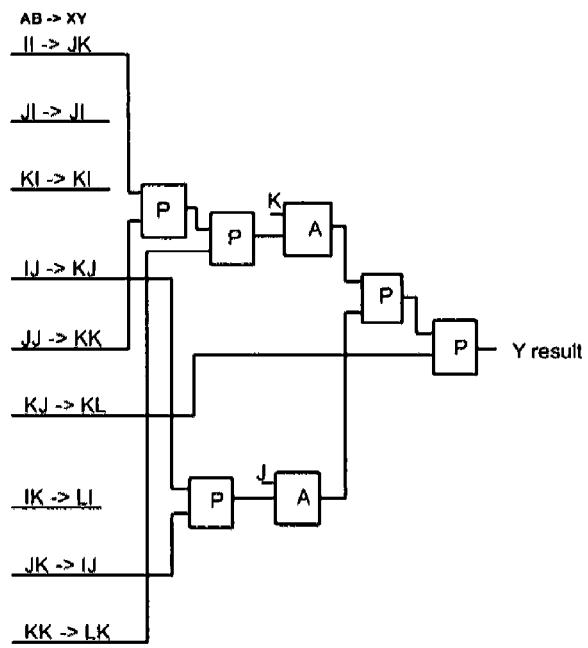
FIG. 55 illustrates optimized generation of Y output.

Since L is a higher priority value, all the Ls that will assert a specific value can be priority collected before the assertion of the specific value. There only needs to be one explicit assertion of each value for each output. FIG. 55 shows the collection of all the TRUTH values that will generate K or J before presenting them to assertion operators to actually generate the values K or J.

6.2.3 The Complete Expression

The complete expression that recognizes a presented input name and generates the appropriate output values for X and Y is shown in FIG. 56. With the NULL convention coordination all operators will transition twice per name recognition for 74 transitions. For timed coordination without the NULL convention there will be 17 to 22 transitions per input. All twelve rotates will transition. One recognition will transition. There will be three or four transitions to assert X and one, four or five transitions to assert Y. With four values there is a 25% chance that each operator will be in the appropriate state and not transition, so the transitions for a timed expression will be 75% of 17 to 22 or 12.75 to 16.5 transitions. The transitioning of the clock is not considered.

6.2.4 Correspondence with Boolean Logic

The correspondence of the four-value operators with the familiar Boolean logic operators is shown in FIG. 57

Binary inversion is the Boolean version of the rotate operator. The AND operator is the Boolean version of the equality operator with a standard recognition name of 11. TRUE is 1 and FALSE is 0. The OR operator is the Boolean version of the priority operator that passes the default value, 0, unless overridden by the higher priority nondefault value, 1. Since there is only one nondefault value which is the same as the TRUE value asserted by the AND operator, there is no need for an explicit assert operator to assert multiple nondefault values.

6.3 A Universal Four-Value Operator

In Boolean logic there are two universal operators, NAND and NOR, that can mimic the other functions and that are each sufficient to completely express Boolean processes. Is it possible to express a single four-value operator capable of mimicking the behavior of the four operators: rotate, equality, assert, and priority? And is it sufficient to completely express any four-value process?

Because a large number of convention choices are available, such as what the rotation sequence will be, what the TRUE and FALSE values will be, what the DEFAULT value will be, and what the standard recognition name will be, there can be many different configurations of operators providing a certain amount of flexibility in the configuration of a universal operator. The operator shown in FIG. 58 was arrived at with little effort and will be the focus of the discussion.

The primary difficulty with a universal operator is the need to perform value rotation. This means that the result values of all operators are always rotated and the mapping of values to meanings in the expression are always becoming skewed. In a Boolean logic circuit expressed with NAND gates, for instance, if one logic stage is interpreted in terms of positive logic, the next logic stage will be interpreted in terms negative logic. With multi-value expressions, the mapping of meaning to values, for example, which value represents TRUE, will rotate through as many stages as there are values For the present four-value example, the result values will simply be rotated between operations to maintain a constant mapping of value to meaning and a simple correspondence with the previous examples. The purpose here is simply to show that a universal operator is possible. The first step is to show how it mimics each of the four operators.

6.3.1 The Rotate Operator

Setting one input to a constant I will cause the other input will be rotated. The behavior of the universal operator is limited to one row or one column. The rotate mapping is shown in FIG. 59.

6.3.2 The Equality Operator

Figure 60:
FIG. 60 illustrates universal four value equality operator.

II is chosen as the recognition name, so for all name recognition stages the input values will be rotated to the II name. The name II will result in an L, and all other names will result in a non L. This establishes the logic conventions that L is TRUE and non L is FALSE. The universal equality operator is shown in FIG. 60.

6.3.3 The Assertion Operator

One input of the operator is set to a constant value. The other value from the equality operators will be L or a non-L value. The L value will be rotated so that it becomes an I value. If the rotated value is I, the operator will assert the value specified by the constant value input; otherwise, the operator will assert the default value I.

Figure 61:
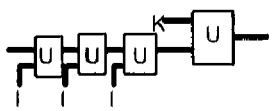
FIG. 61 illustrates universal four value assert operator.

Since the operator is going to assert a rotated result value, the constant input value must be set to the value in the rotation order before the desired result value. For instance, a constant K will result in the operator asserting a J. FIG. 61 shows an assert configuration to assert the result value J.

6.3.4 The Priority Operator

Figure 62:
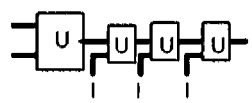
FIG. 62 illustrates universal four value priority operator.

There are only I's and the single asserted result value, which itself might be an I, presented to the result collection priority tree. Each priority collection stage has either II or I and non I presented to it. If II is presented, the asserted result value will be L. If a non I value is presented, the result value will be the rotation neighbor of the non-I value. Rotating the result value three times will convert the L into I or the rotated assertion value back into the actual assertion value. Thus each priority operator has three rotates on its result variable, as shown in FIG. 62.

6.3.5 The Four-Value Expression with the Universal Operator

Figure 63:
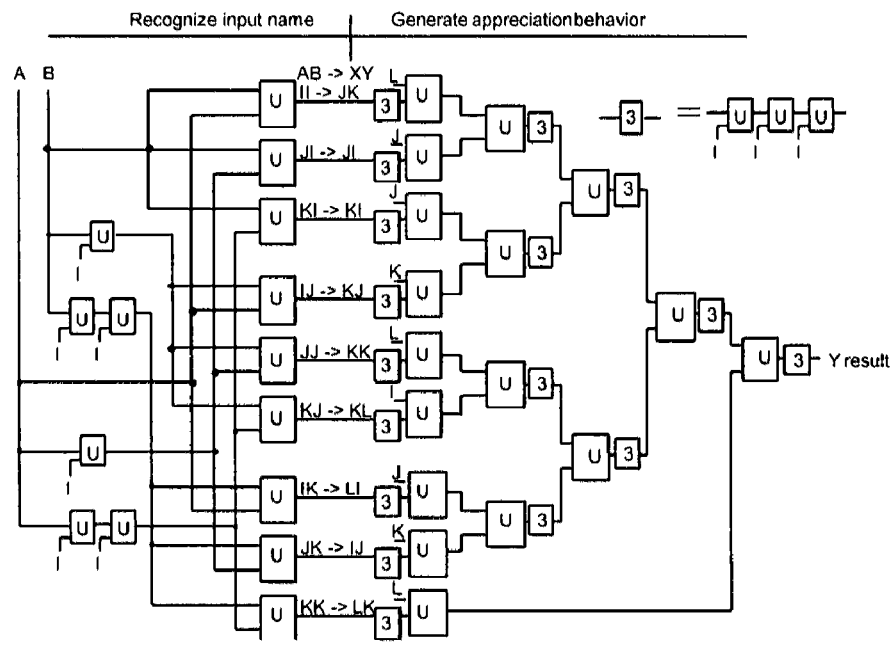
FIG. 63 illustrates example expression in terms of universal four value transforms.

The expression with the universal transform is shown in FIG. 63. Only the Y output is shown. The X output is expressed with a tree of assertion operators and priority operators just like the Y output. Optimization of the output generation is not considered.

6.4 The Expressivity of Operators

If the internal buffering associations are ignored, a primitive operator can be thought of as a pure value expression expressed as a set of value transform rules. More expressive operators means that there is more expression in terms of value differentiation and that less expression will be required in terms of association differentiation. Less expressive operators means that more differentiation in terms of association will be required.

Consider the availability of four equality operators that each asserts a different TRUTH value. Each equality operator could assert its output value directly. The assertion operators would not be needed and could be eliminated from the expression. The value differentiation is slightly increased and the association differentiation is slightly diminished. If a set of equality operators were available that each directly recognized a different input name, then the rotate operators could be eliminated from the expression. Again, the value differentiation is increased and the association differentiation is diminished.

6.5 Six Available Data Values

With six available data values the form of the encoding and the form of the expression remains identical to the form of the four-value expression. Each input can be represented with one value and each output must be represented with two values. With six values, however, there is a great deal more wasted value differentiation than with four values.

6.6 Nine Available Data Values

Figure 64:
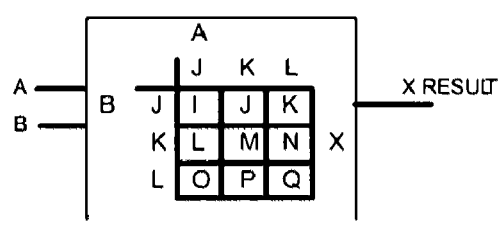
FIG. 64 illustrates mapping of nine values onto baseline process.

With nine values available the result values need no longer be encoded in two variables. The entire process can be expressed as a single operator shown in FIG. 64.

It appears that no association relationships are needed. However, the same values are used for both inputs and the output, so the expression must be an operator that isolates the values of the inputs and the values of the output with internal buffering associations.

6.7 Fifteen Available Data Values: Pure Value Expression

With 15 values the process can be fully differentiated in terms of value. The expression becomes a pure value expression. There is no longer a need to isolate the input from the output so no association operator needs to be involved. Given the mapping of the symbols to the process on the left of FIG. 65, the pure value expression of the process is just the set of value transform rules shown on the right. The value transform rule names are not ordered. IL is also LI.

6.8 Three Available Data Values

With only three values available, shown in FIG. 66, the two input meanings can be differentiated with one variable each, and the result meanings can be expressed with two variables. The three-value expression will have the same form as the four-value expression but the operators will be simpler.

Three values are an optimal number for this process in that no value differentiation is wasted. With four values there were several names that could be formed that were not used. With six values there were even more unused names. With three values all possible value combinations for both the input names and the results are used. This is the only example on the internal spectrum that exhibits fully efficient value differentiation.

6.9 Two Available Data Values

With only two values available, it becomes necessary to encode each input with two values and each result with four values as shown in FIG. 67. The left shows the mapping with the letters of the previous examples and the right table shows the mapping with the more familiar 1 and 0.

FIG. 68 shows the complete two-value expression of the example process with Boolean operators. Since the input name 0000 outputs all default values 0000, it does not need to be explicitly recognized. The default values from all the other recognition operators will output the default values when 0000 is presented. With NULL convention coordination every operator will transition twice for 54 transitions. With timed coordination there will be thirteen transitions per input. All four inverters will transition, two first rank recognitions will transition and one final recognition will transition. There will be two transitions each to assert X, Y and Z. With two values there is a 50% chance that each operator will be in the appropriate state and not transition, so the transitions for a timed expression will 50% of 13 or 6.5 transitions. The transitioning of the clock is not considered.

If the rank of recognition gates had four inputs each, then each name could be recognized directly, and the first rank of gates could be eliminated. Again, with operators with more value differentiation, less association differentiation is needed.

6.10 One Available Data Value

Figure 69:
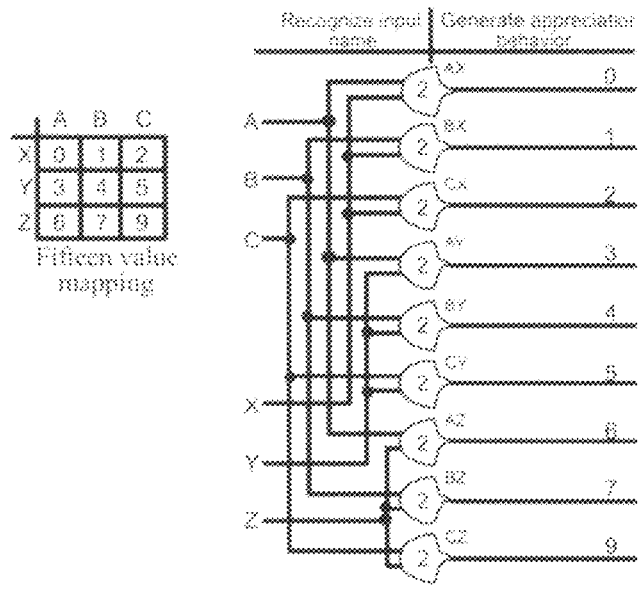
FIG. 69 illustrates mapping of one data value onto baseline process.

With only one data value to express data meanings an expression becomes a pure association expression expressed in NULL Convention Logic. There is no differentiation in terms of value. All differentiation is in terms of association. The pure association expression which directly implements the behavior of the process is shown in FIG. 69. The places in the expression are labeled with the symbols of the fifteen value mapping to show the correspondence of the expressions.

The fifteen-value example is the pure value expression at one end of the spectrum and the one-value example is the pure association expression at the other end of the spectrum. The two expressions are exact duals and both directly express the example process defined by FIG. 44.

6.11 Summary

Several examples of the expression of a baseline process at various points on the spectrum of differentiation have been presented. The first example was limited to four data values and four operators with the bulk of the differentiation in terms of association relationships. The basic methods of name recognition and appreciation assertion were discussed in the context of this expression. It was also shown that there is a universal four-value operator and that there can be a universal operator for any set of values.

Figure 70:
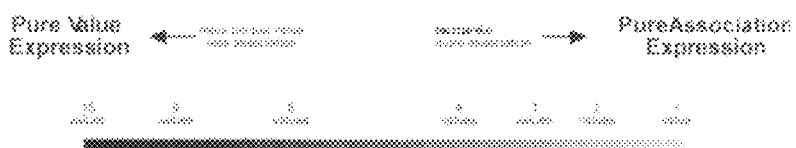
FIG. 70 illustrates example expressions on spectrum.

With nine data values there was sufficient value differentiation that the process could be expressed as a single operator. With fifteen data values the process could be expressed as a pure value expression. Examples were shown with three values, two values and finally one data value that was the pure association expression of the process. The examples are shown in relation to the spectrum in FIG. 70.

The spectrum is not a continuum but is discrete. Values, value transform rules and associations exist in units. There cannot be half a value, half a value transform rule or half an association. Hence the operators, as compositions of value transform rules, exist in units and are associated in units. The spectrum is punctuated with peaks and valleys of various efficiencies and inefficiencies. Considering just the value differentiation, Table 6.1 characterizes the efficiency of expression among the examples. Clock and register transitions are not considered in the table for the transitions associated with timed coordination of transitions.

| Example Data values | Possible Differentnesses in/in/out | Actual Differentnesses in/in/out | Unused Differentiation in/in/out= | Transition Behaviors NULL/timed |
|---|---|---|---|---|
| One | 3/3/9 | 3/3/9 | 0/0/0 = 0 | 2/NA |
| Two | 4/4/16 | 3/3/9 | 1/1/7 = 9 | 54/6.5 |
| Three | 3/3/9 | 3/3/9 | 0/0/0 = 0 | 74/12.75-16.5 |
| Four | 4/4/16 | 3/3/9 | 1/1/7 = 9 | 74/12.75-16.5 |
| Six | 6/6/36 | 3/3/9 | 3/3/27 = 33 | 74/12.75-16.5 |
| Nine | 9/9/9 | 3/3/9 | 6/6/0 = 12 | 2/0.89 |
| Fifteen | 3/3/9 | 3/3/9 | 0/0/0 = 0 | 1/NA |

Value differentiation efficiencies of the example expressions.

At the two ends of the spectrum there is no unused differentiation. The most wasteful example expression is with six values. Next most wasteful is nine values and then two values and four values. Three values is the most efficient representation in the middle of the spectrum.

In the examples it is assumed that the NULL convention will be applied by substituting NULL convention operators for the functional operators. The operators of the expression become more complex and the transition behavior dramatically increases. But consider what happens with the one-value pure association expression that is more efficient in every aspect than all the other association expressions. There are fewer and simpler operators and less transition behavior. The 15-value pure value expression is also more efficient in terms of transitions than all the other expressions.

A particular process embodies a characteristic quantity of differentiation. The expression of the process may be purely in terms of value differentiation, purely in terms of association differentiation or a collaboration of the two. Expressions in the middle territory tend to be more complex than the pure forms of expression, due to encoding differentness with a combination of value differentiation and association differentiation. The result is that the expressions are continually de-encoding to pure association to recognize names and then re-encoding the recognition to assert the results. This can be most dramatically seen with the two-value example expression. The four-bit input name is de-encoded to a pure association representation (9 unique places, in the middle of the expression) and then re-encoded into a four bit representation. Encoding differentness with two values or ten values does not always lead to the most efficient expressions of process. All processes, however, are efficiently expressed at the two ends of the spectrum where an expression can match exactly the differentiation required by any process with minimal transition behavior.

7 Composing Boundaries

The previous two chapters discussed how expressional primitives associate and collaborate to express a greater stride of appreciation that recognizes and appreciates more differentness than any individual primitive could recognize. A pure value expression with a set of value transform rules can recognize and appreciate larger and more numerous formed names than any individual value transform rule. A structure of associated operators can recognize and appreciate larger and more numerous formed names than any individual operator. These greater expressions form behavior boundaries with their appreciation behavior. There is an input boundary that receives a presented name to appreciate and there is an output boundary through which appreciation behavior is asserted. These greater expressions can be further composed into even greater expressions with greater strides of appreciation of differentness by associating output boundaries to input boundaries.

This chapter discusses the composition of behavior boundaries to express a greater stride of appreciation. The discussion will be initially in terms of association expression. There can also be boundary relationships within a pure value expression that will be discussed.

7.1 Boundaries of Completeness Behavior

The completeness criterion is expressed between the input and output boundaries of an expression, promising orderly deterministic behavior from input boundary to output boundary. When two expressions are composed, output boundary to input boundary, an internal mutual completeness boundary is formed between the two expressions. The new greater expression also expresses the completeness criterion from its new input boundary to its new output boundary.

7.2 Association Boundaries

Figure 71:
FIG. 71 illustrates a full-adder expression.

Consider the binary full-adder of FIG. 71 that takes three binary inputs and asserts two binary outputs. The full-adder is bounded by inputs CI, X and Y and outputs S and CO.

Consider that the full-adder is composed of two three input expressions; S and C as in FIG. 71. S outputs the sum and C outputs the carry. Each expression has its own input and output boundary. If S and C express the completeness criterion, then their boundaries compose to express the completeness criterion for the full-adder.

Figure 72:
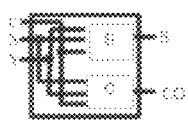
FIG. 72 illustrates composed full-adder expressions.
Figure 73:
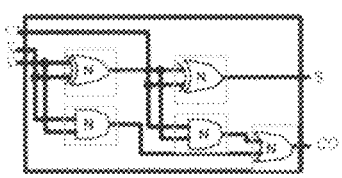
FIG. 73 illustrates full-adder in terms of two input operators.

Consider that three input expressions are not available but only two input expressions are available. FIG. 72 shows the full-adder in terms of two input NULL Convention Boolean functions. Each function is bounded and expresses the completeness criterion. Again, the completeness relations of the boundaries of the functions accumulate so that the full-adder input and output boundaries are completeness boundaries. The boundary of the full-adder encompasses the boundaries of the functions and appreciates a greater range of differentness than any function individually.

Figure 74:
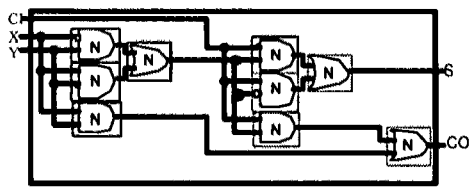
FIG. 74 illustrates full-adder in terms of more limited two input operators.

Consider that the XOR is not available and only AND, OR and NOT are available; the expression might look like FIG. 74. Again, the completeness boundaries of the functions accumulate so that the boundaries of the full-adder are completeness boundaries.

In FIG. 74 the full-adder is expressed in terms of two half-adders. The boundaries of the half-adders shown in FIG. 75 added as internal boundaries are completeness boundaries also. The boundaries of any sub network will be completeness boundaries. While all boundaries defined within the greater network of primitive operators are arbitrary, some might seem less arbitrary than others. Internal boundaries are usually defined for convenience of expression.

Figure 75:
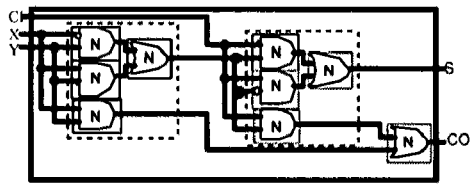
FIG. 75 illustrates half-adder boundaries of the full-adder.
Figure 76:
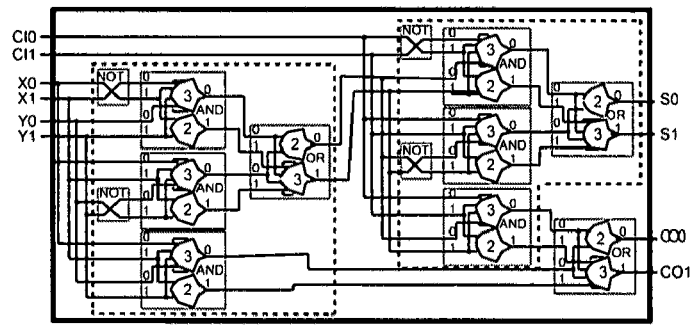
FIG. 76 illustrates NULL Convention Logic pure association expression of full-adder.

Consider that only two-value NULL Convention Logic operators are available. The 2NCL pure association expression corresponding to the full-adder of FIG. 75 is shown in FIG. 76. The two expressions have the same boundary structure.

Figure 77:
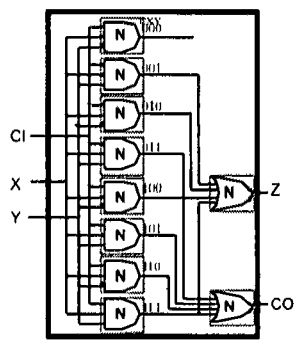
FIG. 77 illustrates minterm expression of full-adder.

All expressions of a process are not identically partitionable. The minterm expression of FIG. 77 expresses the same full-adder process but its boundary structure is quite different.

7.3 Pure Value Boundaries

Figure 78:
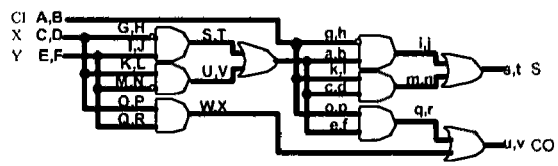
FIG. 78 illustrates full-adder with values assigned to paths.

Consider that there are no operators at all but there are lots of values and value transform rules. The full-adder of FIG. 74 can be mapped directly into a pure value expression. The Boolean logic expression uses unique places within the association expression and two unique symbols, 0 and 1, to represent unique differentnesses within the expression. The 0 or 1 on this association path is different from the 0 or 1 on that association path. In FIG. 78 each association path is mapped into two unique symbols, one representing a 0 symbol on the path and one representing a 1 symbol on the path.

The mapping for symbols C, D, E and F are shown below.

C means X=0
D means X=1
E means Y=0
F means Y=1 and so on for each path in the circuit.

Figure 79:
FIG. 79 illustrates mapping of value transform rules from operators.

The value transform rules for resolving each locus of interaction corresponding to each operator are derived from the symbols associated with each operator. The derivation of the value transform rules for the operator surrounded by O, P, Q, R, W and X is shown in FIG. 79.

The resulting set of derived value transform rules are shown on the left side of FIG. 80. A pure value expression is structured by relationships among the value transform rules and can have the same boundaries as an association expression. In a pure value expression a completeness boundary is a locus of mutually exclusive assertion. At the input, only one of C or D will be asserted. Further in, only one of U or V will be asserted and so on. In the association expression of FIG. 78 mutual exclusivity is expressed with the paths (wires) that can only assert one value at a time of two possible values. In the pure value expression the mutual exclusivity is explicitly expressed in the value transform rules. If mutual exclusivity is expressed in the presentation of the input of the expression, it will be maintained through the resolution and expressed at the output of the expression. The completeness boundaries of the derived pure value expression coincide with the loci of mutual exclusivity. Completeness boundaries identical to the boundaries in FIG. 75 are shown on the right side of FIG. 80.

FIG. 81 shows the progression of resolution for input values B (1), C (0) and F (1) that is equivalent to the binary name 101 resolving to a sum of s (0) and a carry of v (1) as a progression of populations of symbols in a shaking bag. In each population of values only certain associations form a name of a value transform rule which are shown circled. The value transform rules involved in each resolution stage that assert the values of the succeeding population are shown above the arrows. The completeness boundaries of the resolution progression are shown also as encompassing ovals.

The population of values at each stage of resolution is unique. There is no ambiguity of association or interaction at any stage of the resolution. The spontaneous individual behavior of indiscriminately associating values reliably and unambiguously resolves to a correct result. The progression of behavior is identical to the progression of behavior of the association expression of FIG. 75.

While completeness boundaries can exist among the behaviors of a pure value expression, it may not be a sensible form of pure value expression. A pure value expression is capable of exhaustive global association and breaking the association of values into progressive steps defeats this expressivity. The example of FIG. 72 can be expressed as a pure value expression below using the same value assignments for input and output shown in FIG. 78 and using three-value transform rule names. The expression resolves with two concurrent behaviors, and fewer values and value transform rules are required.

ACE[s,u] ACF[t,u] ADE[t,u] ADF[s,v]
BCE[t,u] BCF[s,v] BDE[s,v] BDF[t,v]

7.4 Greater Composition

Full-adders can be composed via their boundaries into a multi-bit ripple-carry adder. A new completeness boundary is formed about the ripple-adder. The previous boundaries about the full-adder and internal to the full-adder remain intact. A four-bit adder and its boundaries are shown in FIG. 82. The ripple-adders can be composed into multipliers, dividers and so forth. Indefinitely complex expressions can be composed with bigger networks of association composition.

An appreciation stride can be attributed to each boundary. Each Boolean function can appreciate two differentnesses among four input names. Each full-adder can appreciate four differentnesses among eight input names. The four-bit adder can appreciate 32 differentnesses among 512 input names.

7.5 Summary

Larger expressions with a greater stride of appreciation can be composed by associating the boundaries of lesser expressions with lesser strides of appreciation. When behavior boundaries are composed their behavior must be coordinated. The primitive form of coordination is the completeness criterion that can be expressed with the NULL convention for association expressions and that can be expressed directly with the value transform rules for pure value expressions. The binary full-adder has sufficed to illustrate the first-order composition of completeness boundaries, the variety of possible boundary structures and the coordinated behavior of the composed boundaries.

7.6 Coordinating Boundaries

While the composition of completeness boundaries is concurrent, the behavior of each boundary is strictly sequential. Only one input presentation at a time can flow through an input boundary and into an expression. There must be a presentation of empty or NULL between each presentation of data content. The monotonic behavior of the content flow must be maintained, the content must be maintained and the liveness of the flow must be maintained. Again, there is a simple convention for humans that accomplishes the purpose.

The completeness criterion states that when there is completeness at the output boundary the resolution of the input is complete. The completeness criterion can be used to coordinate the presentation of input and the flow of resolution through an expression.

7.7 The Cycle

Figure 83:
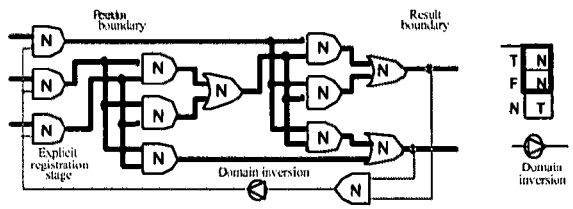
FIG. 83 illustrates feedback self coordination cycle for full adder.

The fact of completeness of the output can be domain inverted and associated back to the input to coordinate the presentation of the input. Domain inversion shown on the right in FIG. 83 is a NULL convention primitive that transitions a data value to NULL and NULL to a selected data value, in this case T. This feedback coordination value, also called acknowledge, is associated from the output to a rank of input primitives called a registration stage as shown in FIG. 83. When the output is completely data, the coordination value transitions to NULL. When the output is completely NULL, the coordination value transitions to data.

Only when the input values presented to the registration stage are data, and the coordination value is data, will the output of the registration stage transition to data and present a data wavefront to the encompassed expression. As long as the coordination value remains data, the registration stage will stably maintain its output data values even if a NULL wavefront is presented to the input of the registration stage.

Only when the input values presented to the registration stage are NULL values and the coordination value is NULL, will the output of the registration stage transition to NULL and present a NULL wavefront to the encompassed expression. As long as the coordination value remains NULL, the registration stage will stably maintain its NULL output values even if a data wavefront is presented to the input of the registration stage.

The feedback association of the inverted coordination value is a simple dependency relationship that forms a closed oscillating expression called a cycle. The expression continually strives to transition between data and NULL. Not only does the cycle provide coordination of input presentation for an expression, it provides an autonomous expression of liveness.

7.8 Flow Coordination

Figure 84:
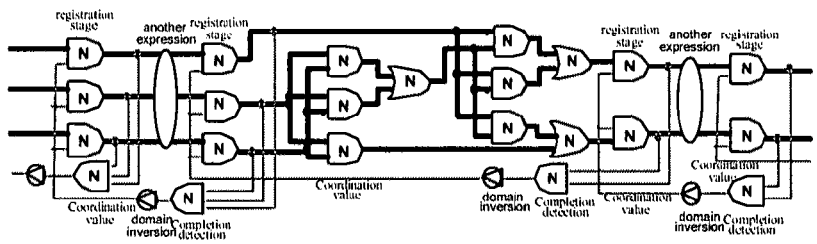
FIG. 84 illustrates cycles with interlinked self coordination.

Flow of presentation of input and assertion of output between expressions can be coordinated through associated completeness boundaries by interlinking the self-coordination cycles of the associated expressions, as shown in FIG. 84. If completeness of a source expression is determined strictly after presentation is allowed by the destination expression, then no expression will allow a next input presentation until its current asserted output is accepted by the destination. Wavefronts flow spontaneously and stably from cycle to cycle.

Interlinked cycles form a structure of coupled oscillators, which expresses a spontaneously behaving pipeline structure. Large complex pipeline structures can be expressed in terms of interlinked cycles.

7.9 Integrated Coordination

Figure 85:
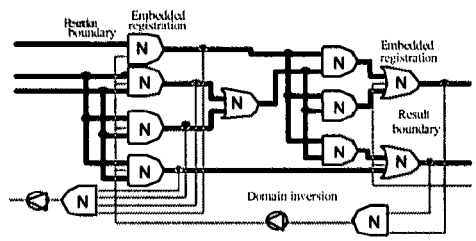
FIG. 85 illustrates full-adder with integrated coordination.

There does not need to be a separate expression of a registration stage. The expression of registration can be integrated into the logic expression itself as shown in FIG. 85. The input and output operators receive one more input which is the coordination signal. A single operator is added to coordinate the topmost input path of the expression.

7.10 Level of Coordination

A composition boundary is also a partitioning boundary, a completeness boundary and a coordination boundary. Hierarchical levels of nested boundaries can be defined within a large expression such as the four-bit adder of FIG. 82. Cycle coordination can be applied to all boundaries of commensurate hierarchical level within an expression. The hierarchical levels of the four-bit adder will be called the data path level for the four-bit data path for the boundaries of the four-bit adder, the intermediate level for the boundaries of the full-adders and the primitive level for the boundaries of the primitive operators.

7.11 Data Path Level Cycle Coordination

Figure 86:
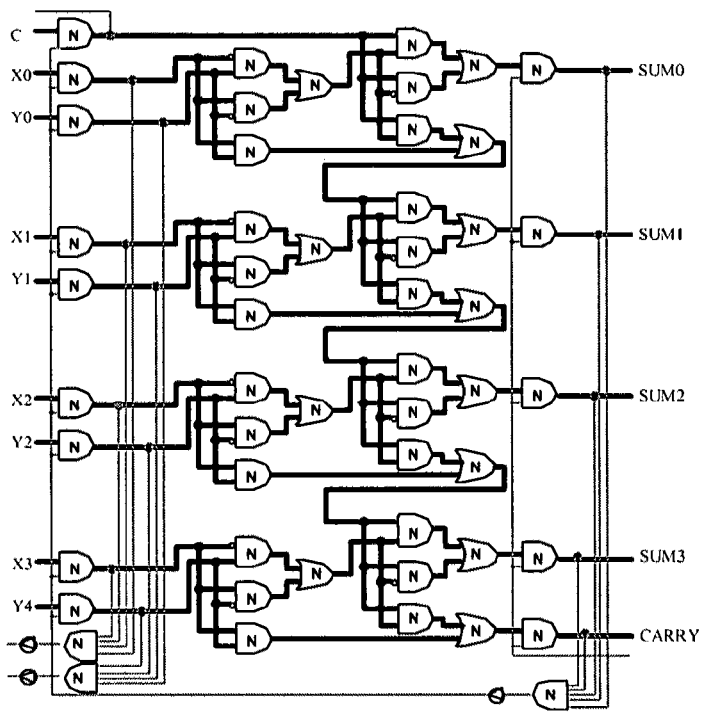
FIG. 86 illustrates cycle coordination at the data path level.

FIG. 86 shows the four-bit adder with cycle coordination about its boundary. Other four-bit adders and other four-bit expressions can be composed as interlinked cycles into a spontaneously behaving pipeline structure, with its flow coordinated at the level of a four-bit data path.

Figure 87:
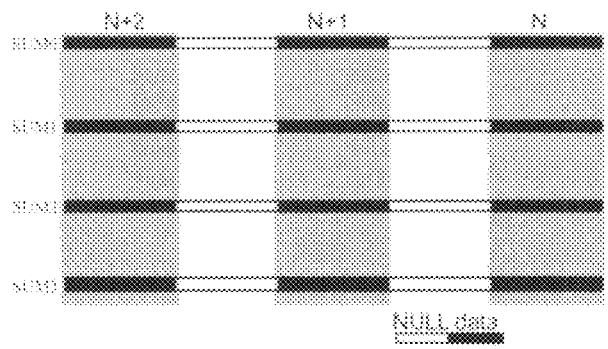
FIG. 87 illustrates successive wavefronts of the coordinated four bit adder.

FIG. 87 shows the flow of successive data and NULL assertions from the output of the coordinated four-bit adder. The shading indicates related bits of each successive presentation.

A data wavefront will propagate all the way through the four-bit adder expression. When the output of the four-bit adder is complete a NULL wavefront will be allowed and will propagate all the way through the four-bit adder until the output is completely NULL, at which point a next data presentation will be allowed to propagate.

7.12 Intermediate Level Cycle Coordination

Figure 88:
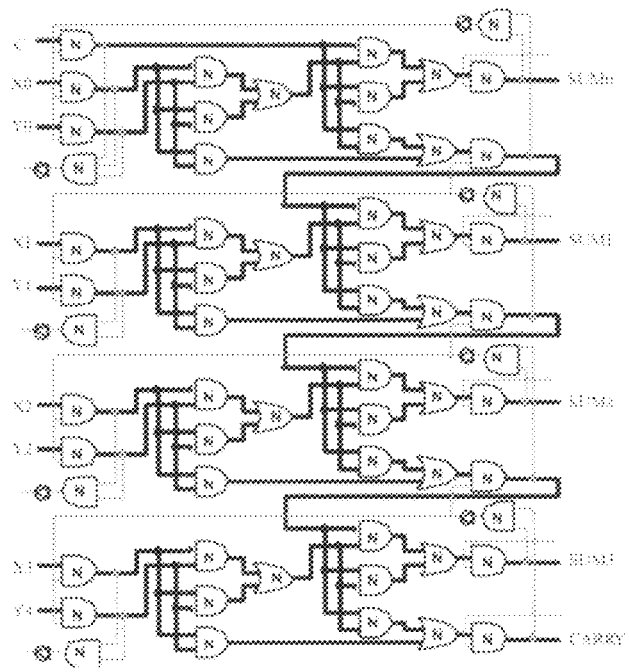
FIG. 88 illustrates four bit adder coordinated at the intermediate level.

The feedback coordination might be applied at the level of the full-adder boundaries, as shown in FIG. 88. The four-bit adder is now a pipeline of four one-bit adders.

Figure 89:
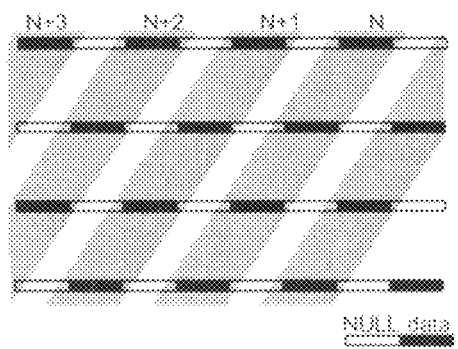
FIG. 89 illustrates successive wavefronts of the intermediate level pipelined four-bit adder.

The expression is no longer explicitly coordinated at the four-bit level but is coordinated at the bit level. The boundary of the four-bit adder is now above the hierarchical level of cycle coordination. How does the boundary of the four-bit adder coordinate? Because of the carry value each successive full-adder has to wait on the carry of the previous full-adder. SUM0 will be completed and propagated first. SUM1 will be completed and propagate slightly later, and so on. The output of the four-bit adder will be skewed across the data path as shown in FIG. 89.

While it is clear how an expression encompassed by a cycle is coordinated in terms of the completeness criterion, it is less clear how the un-encompassed expression boundaries at levels above the hierarchical level of cycle coordination are coordinated. For the Nth presentation to the input of the four-bit adder there will be Nth SUM0 and Nth SUM1 an Nth SUM2, and so on. The Nth SUM0 will be followed by an Nth NULL, which will be followed by the Nth+1 SUM0 for the Nth+1 input presentation. The same occurs with the other outputs. Each data output is aligned in sequence and separated by NULL. The successive data presentation wavefronts are not temporally or spatially aligned, but they are logically aligned with NULL wavefronts. The boundary of the four-bit adder is coordinated in terms of logical succession relationships.

Primitive Level Cycle Coordination

Figure 90:
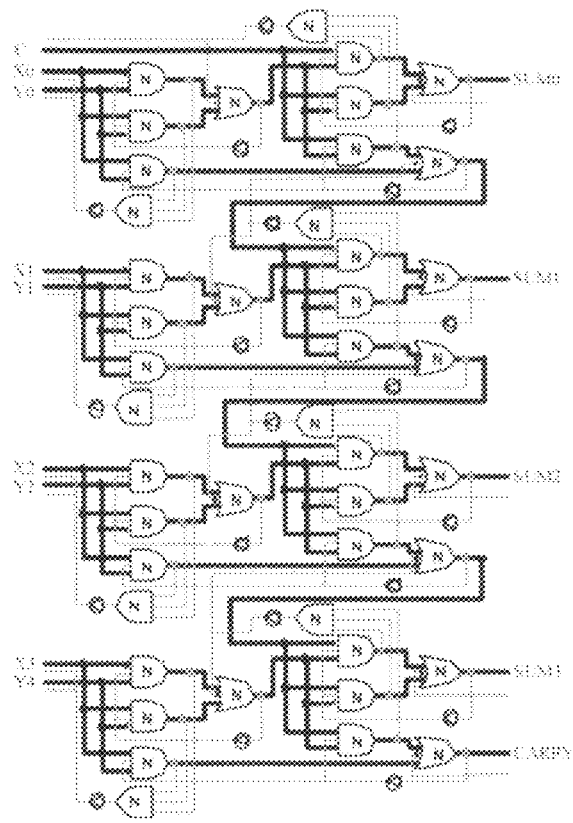
FIG. 90 illustrates four bit adder coordinated at the primitive level.

Each primitive expression is also bounded and can be coordinated with cycle coordination, as shown in FIG. 90. Each full-adder is a pipeline of primitives, and the four-bit adder is now a fairly complex pipeline of primitives.

Figure 91:
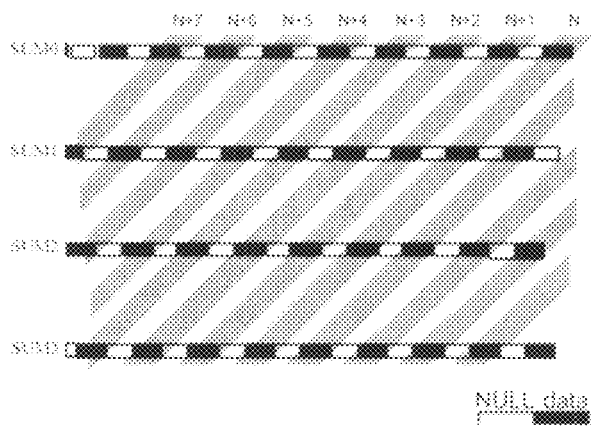
FIG. 91 illustrates successive wavefronts of the primitive level pipelined four bit adder.

Now all the higher level boundaries are above the level of cycle coordination. The flow behavior is shown in FIG. 91. The cycle periods of the primitive cycles is shorter, so the successive presentations are quicker making the throughput higher. The pipelining did not speed up the carry propagation, so the presentations in the data path are skewed at a shallower angle. The logical coordination of NULL, in separating each Nth data wavefront on the data path, still prevails.

If the input to the four-bit adder is skewed such that each input arrives just in time to meet the propagating carry, then the skewed presentations flow right through the four-bit adder with much higher throughput than was the case when cycle coordination was at the four-bit level. A whole system can be constructed with skewed data path presentations flowing through the system with much higher throughput than higher level cycle coordination will allow. These skewed presentation behaviors of the data path can get quite ragged in terms of time and space and still be fully coordinated in terms of logical sequence. What can appear very chaotic from a spatial or temporal view is quite orderly from a logical view.

7.12.1 Recovering Temporal and Spatial Alignment

Figure 92:
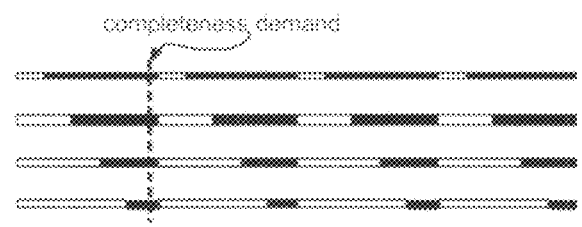
FIG. 92 illustrates naïve realignment completion demand across data path.

The temporal and spatial alignment can be recovered by demanding logical completion across the data path. If completeness is demanded without considering the skew behavior of the data path all the throughput advantage can be lost, as shown in FIG. 92. The leading presentations have to wait on the lagging presentations slowing the entire pipeline.

Figure 93:
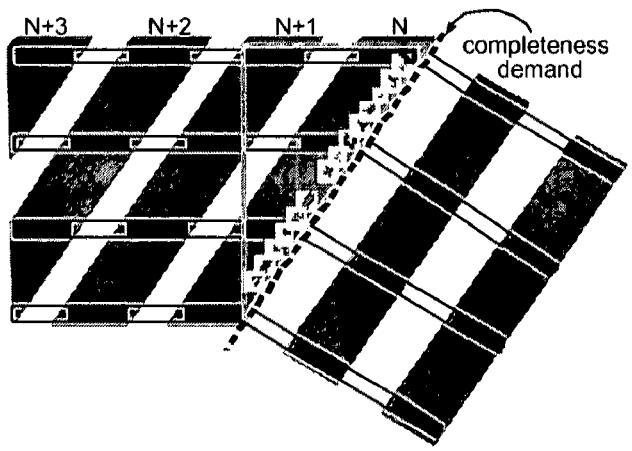
FIG. 93 illustrates triangle buffer recovering temporally aligned wavefront flow.

The full throughput advantage can be maintained if the leading presentations are given room in the data path to wait on the lagging presentation. This can be accomplished with a triangle buffer, which is wider in terms of buffering cycles at one end than at the other to give the leading presentations room to wait. The easiest way to understand the behavior is to consider the completion demand as being spatially skewed in the data path to match the skew of the flow, as shown in FIG. 93. The upper pipelines of the triangle buffer are longer in terms of cycles than the lower pipelines.

The skewed demand for completeness realigns flow temporally and spatially while retaining the throughput of the expression. This realigned flow can then be presented to a clocked interface, written to memory or presented to higher level coordination protocols.

Any expression can be cycle coordinated at the level of primitives, forming a large complex pipeline. Data wavefronts can flow through this pipeline structure at very high throughput, with skewed and ragged temporal and spatial alignment but with completely determined logical coordination. Whenever necessary, spatial and temporal alignment can be reconstituted from the logical coordination of the data path.

7.12.2 Generating Skewed Wavefront Flow

Figure 94:
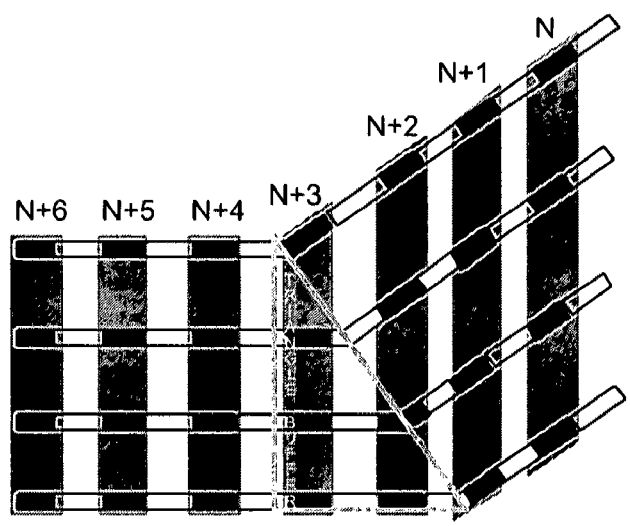
FIG. 94 illustrates inverted triangle buffer generating skewed wavefront flow.

Skewed wavefront flow can also be generated from temporally and spatially aligned wavefront flow with an inverted triangle buffer, as shown in FIG. 94. The inverted triangle buffer can be used to present wavefronts from a synchronous input into a system of skewed wavefront flow.

7.12.3 Composing Coordination

Coordination of flow and its composition is hierarchical also. Once a primitive expression of coordination is established, higher levels of coordination compose in terms of the primitive coordination. In this section the primitive coordination is the NULL convention. The cycle composes from the behavior of the NULL convention. Higher levels of coordination derive from the logical behavior of the cycle. Spatial and temporal alignment can be recovered at the level of the four-bit adder, which can then be composed to coordination protocols through communication channels and memories, and so forth.

7.12.4 Nature's Coordination

The completeness boundaries and the feedback coordination cycle presented here are simple conventions for human consumption. The inverted acknowledge is a simple dependency relationship to keep wavefronts from colliding. The expressivity of nature is more free form and opportunistic than the formal mentality of humans, and there can be more complex dependency relationships that separate wavefronts of behavior and involve more disjoint value sets. There is no reason why there cannot be multiple disjoint value sets, each expressing data meaning as well as coordination meaning with data paths and coordination feedback paths much more complexly intertwined, less distinctly hierarchical and less distinctly cyclical.

7.12.5 Partitioning the Network

Figure 95:
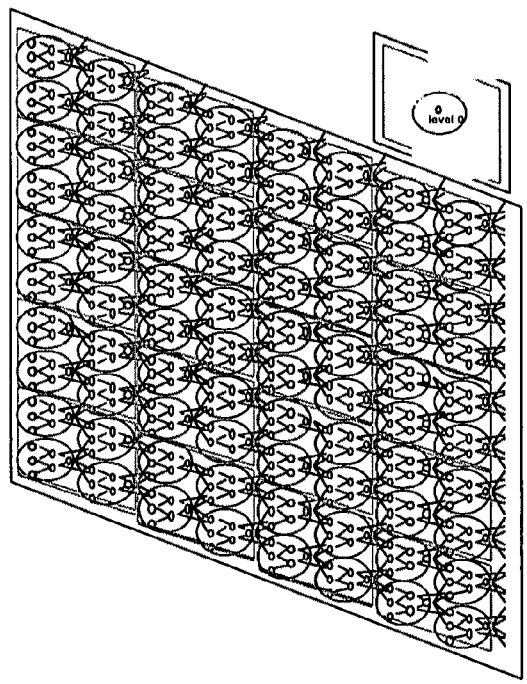
FIG. 95 illustrates association expression with composition boundaries.

Composing greater association expressions by directly associating boundaries of lesser association expressions makes larger and larger networks of association relationships. This network is a structure of composition boundaries that can be viewed in many ways in relation to its boundaries. Each composition boundary is also a partitioning boundary, a completeness boundary and a coordination boundary. The behavior of every boundary has to be coordinated one way or another. FIG. 95 shows a network and its composition boundaries.

7.12.6 Completeness Boundaries and Concurrent Behavior

Each level of composition forms a new boundary that encompasses the boundaries of the component expressions resulting in a hierarchical structure of nested levels of boundaries. Each new boundary is composed of multiple lesser boundaries.

While the behavior of a boundary itself is strictly sequential, the component boundaries can behave concurrently in relation to each other. These boundaries in turn decompose into lesser boundaries that can behave concurrently in relation to each other. As boundaries decompose down the hierarchy, concurrent behavior proliferates.

The four-bit adder receives one pair of four-bit number wavefronts at a time. These wavefronts are decomposed into four pairs of one-bit numbers and presented concurrently to four full-adders. Each full-adder decomposes the pair of one bit numbers and a carry into individual digits and presents them concurrently to its internal logic functions.

7.12.7 Hierarchical Partitioning

Figure 96:
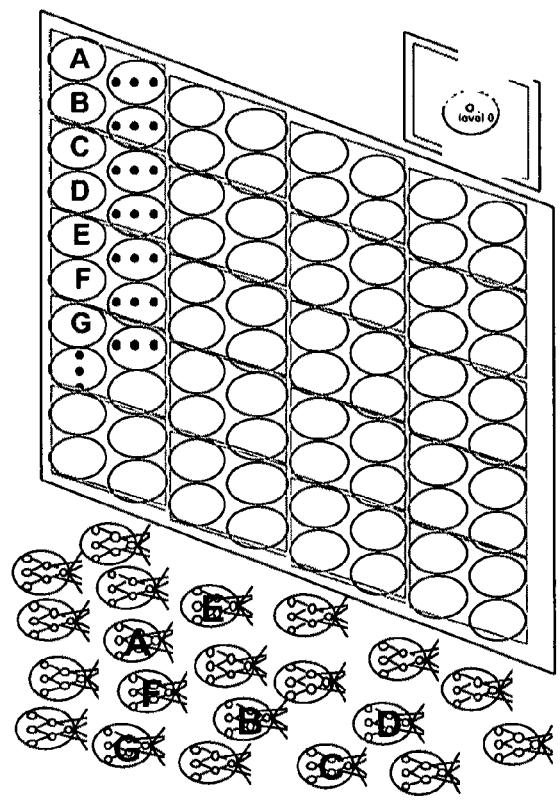
FIG. 96 illustrates network hierarchically partitioned at level 1.

A network can be partitioned along commensurate hierarchical boundaries. The network of FIG. 95 can be partitioned at level 1 boundaries, as shown in FIG. 96. The level 1 boundary is expressed in both partitions. The greater partition, levels 1, 2 and 3 retain the expression of the level 1 association relationships. The lesser partition, levels 0 and 1, lose the level 1 association relationships and the lesser partition becomes an unassociated collection of level 1 expressions. The relationship between the greater partition and the lesser partition might be maintained with a reference mechanism such as the letters in FIG. 96.

Figure 97:
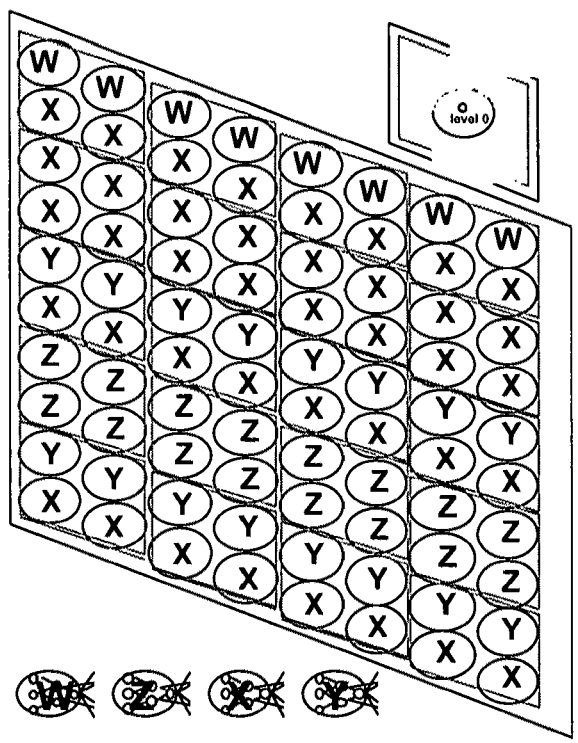
FIG. 97 illustrates lower hierarchical partition as a set of expression types.

One might compare and sort the unassociated level 1 expressions and find that there are only four different types of expression. The greater partition can now be expressed in terms of reference to type of level 1 expression, as shown in FIG. 97 instead of in terms of reference to specific level 1 expressions.

This raises the possibility of there being only one instantiation of each level 1 expression. As the greater partition resolves, it can dynamically compose level 1 expressions by type reference from the sparse set of instantiated level 1 expressions. A conventional computer with its ALU, large memory and sequence controller is a mechanism to realize such dynamic composition. The greater partition is the program and the lesser partition is the ALU.

An expression might be partitioned at multiple hierarchical levels to map into different implementation environments. The lowest level might be partitioned and mapped into hardware. A higher level can be mapped into firmware, a higher level into software and an even higher level into scriptware.

7.12.8 Lateral Partitioning

Figure 98:
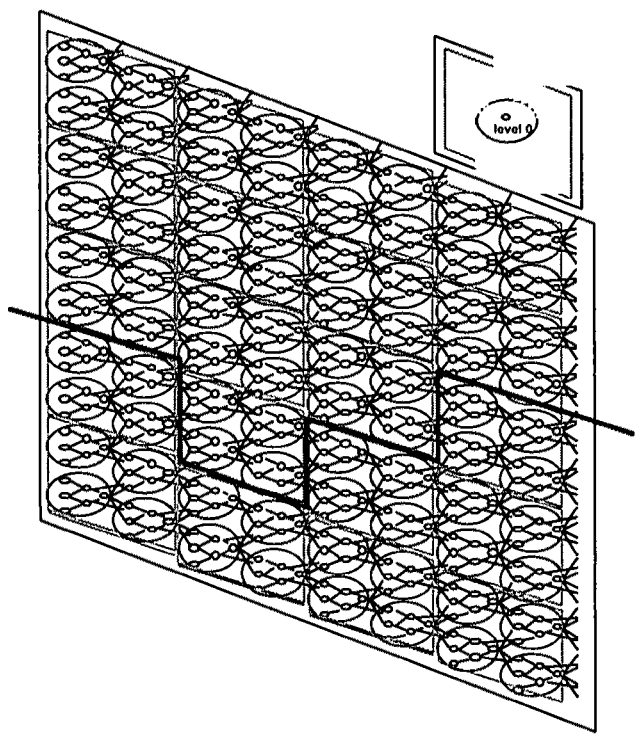
FIG. 98 illustrates network laterally partitioned along level 2 boundaries.

A network can be partitioned laterally along boundaries of a particular hierarchical level. One might search for partitions spanning the network with minimal association and cleave the network into separate networks that relate in some other way than by direct association. In FIG. 98 the zigzag line shows a lateral partition through the network along level 2 boundaries.

Figure 99:
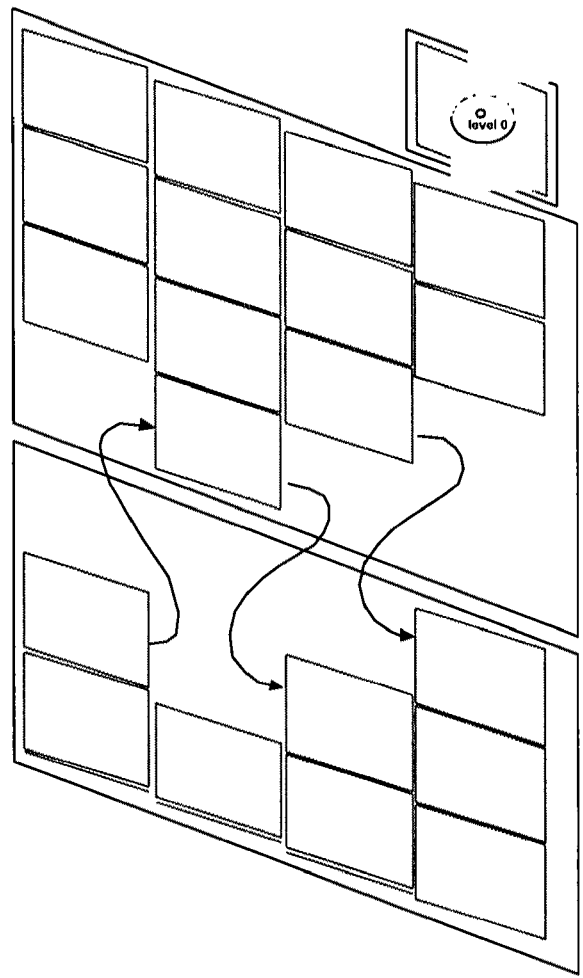
FIG. 99 illustrates two lateral partitions with communication relationships.

FIG. 99 shows the network cleaved into two separate networks with level 3 boundaries. There are now level 2 association relationships that cross level 3 boundaries. These association relationships can no longer be coordinated as directly associated level 2 boundaries. The associations might be viewed as stretched over a higher level boundary. They must now be coordinated in some different way in relation to the level 3 boundaries. How the stretched association relationships are coordinated depends on how far removed the partitions become and on what boundaries the association relationships get stretched across. Lateral partitions might be mapped to multiple processor cores, multiple software threads, distributed computers, and so on.

7.12.9 Mapping the Network

The association network is a fully distributed and fully concurrent expression. The behavior model for an association expression is a directly mapped pipeline structure coordinated with cycle protocol at some level of the hierarchy, as was discussed above. The association paths of the expression that become pipeline paths is the memory of the expression that is distributed co-locally with the behaviors of the expression. This expression of distributed behavior and co-located distributed memory can be partitioned and mapped into any other form of expression with an equal or lesser degree of distribution and concurrency down to centralized sequentiality. It can map to multiple processors, multiple processor cores, multiple threads, multiple tasks, multiple computers, and so on.

7.12.10 Automatic Partitioning and Mapping

The association network with its completeness boundaries is a coherent expression of a process from the most primitive behaviors to its highest level of abstraction. The expression of the network need not explicitly express any details of partitioning, mapping or coordination. The details can be added later. The entire expression of the network can be purely referential facilitating formulaic and parametric partitioning and mapping of the expression to other forms of expression and implementation. A mapping processor can be directed to add cycle coordination to level 2 or to add clock coordination to level 1, to partition hierarchically at level 1 and compare and sort the lesser partition into a minimal set and specify an ALU function set, to map the greater partition of level 1 into a sequence of behaviors and memory locations, to search level 2 boundaries to find all spanning partitions with three or less associations between them, to search hierarchical partitions for the partition boundary with the most commonality in the lesser partition, to search level 2 boundaries to find exactly four spanning partitions with minimal associations between them, and so on.

Express once—partition and map forever.

7.12.11 Coordinating Pure Value Expressions

It might not make sense for the value behavior of a pure value expression to be expressed in terms of a progression of multiple coordinated behaviors. If there are sufficient unique values and value transform rules for a progression of behaviors, there is probably sufficient value differentiation for the same process to resolve in a single behavior. This section discusses the possibility anyway.

Consider a set of four value transform rules:

AC[F]
AD[E]
BC[E]
BD[E]

There is no expression of coordination of the formation and presentation of the names. There may be many As, Bs, Cs and Ds and several names may form and resolve simultaneously. This may not be a problem, but if it is a problem and only one name should be formed at a time, then the values must be explicitly coordinated such that exactly one A or B and one C or D is ever simultaneously present: an explicit boundary of mutually exclusive completeness.

7.12.12 The Pure Value Cycle

This coordination can be expressed with values dedicated solely to the expression of coordination. The dedicated values serve the same role as the dedicated association paths for cycle coordination in an association expression. In these examples uppercase letters will express primary name forming values (data) and lowercase letters will express coordination values.

The first step is to isolate the function by mapping its input and output values to a second set of buffering values and then conditioning the name forming values with a coordination value. The buffering values are as follows:

S->A
T->B
U->C
V->D
G->F
H->E

Figure 100:
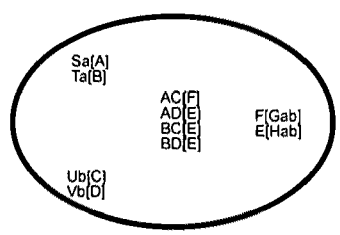
FIG. 100 illustrates coordination of presentation with a value cycle.

The name-forming values A, B, C and D are next conditioned with coordination values a and b. The result values E and F assert the coordination values as well as the final result values of the new function is shown in FIG. 100. The expression is initialized with one a and one b. When an S or T appears, the a will allow it to transform to an A or B. When a U or V appears, the b will allow it to transform to a C or D. A single name is formed and resolved to F or E. An F will transform into G, a and b. An E will transform into an H, a and b. In both cases the a and b are regenerated and can allow another transformation of S or T and U or V into A or B and C or D, allowing another name to form and be resolved to F or E. There is no confusion with the previous F or E because it transformed to G or H when the a and b were asserted.

The oval in FIG. 100 indicates a pure value cycle. The S, T, U, V, F and E rules buffer the internal function from the general pure value expression. The coordination values a and b circulate around the function coordinating the formation of names and assertion of results in strict sequence, creating an isolated and coordinated value domain within the greater pure value expression. There can still be many Ss, Ts, Us and Vs but, there will never be more than one A or B and never more than one C or D.

The expression is an isolated locus of cyclic behavior with coordinated completeness boundaries. The behavior of the value cycle is identical to the behavior of the association cycle of FIG. 83. Like the association cycle, value cycles can be interlinked to coordinate the flow of values among them.

7.12.13 Coordinating Cycles

Value cycles can coordinate their behavior by combining their buffering rules and sharing coordination values. This is identical to interlinking the completeness protocols of association cycles through shared data paths. Consider the intersection of cycle 1 and cycle 2 of FIG. 101. The output rules for cycle 2 are:

S[Ayz]
T[Byz]

The values y and z are the coordination values for cycle 2. The input rules for cycle 1 are:

Sa[A]
Ta[B]

The value a is the coordination value for cycle 1. The two rule sets can be combined to coordinate the behavior of cycle 1 and cycle 2 as follows:

Sa[Ayz]
Ta[Byz]

Assume that cycle 2 has asserted a result value S. The S will not transform into an A until the coordination value of cycle 1 is present. The A becomes an isolated input for cycle 1, and the y and z allow another input to be presented in cycle 2. The S will not transform until the a is present. Cycle 2 cannot receive a new input name until the y and z are asserted. The y and z will not be asserted until an a is present. An a will not be present until cycle 1 is ready to receive a new input name. When the a is present, the name Sa is formed and resolved to Ayz. Cycle 1 receives a new input value, and cycle 2 is enabled to receive a new input value.

Figure 101:
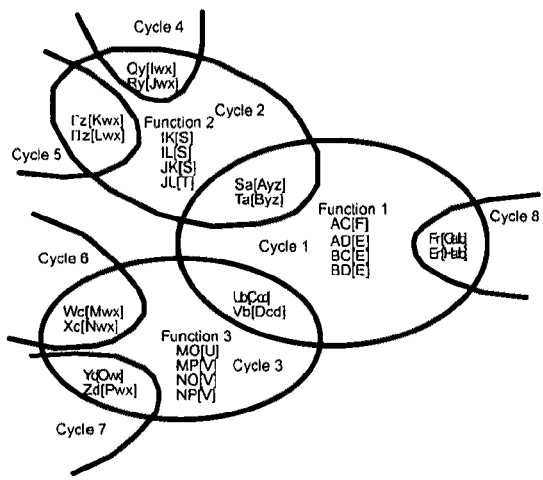
FIG. 101 illustrates coordinated fan-in cycle structure in a pure value expression.

Each cycle is isolated by its circulating coordination values and its value transform rules embodying the coordination protocol. The flow of name formation and resolution from cycle to cycle is fully coordinated and fully determined by the interlinked completeness protocol. There is no ambiguous behavior. Large structures of cycles can be coordinated in a pure value expression via circulating coordination values. FIG. 101 shows an extended fan-in structure of coordinated cycles in a pure value expression. Each oval is an isolated value cycle with interlinked coordination behavior.

Figure 102:
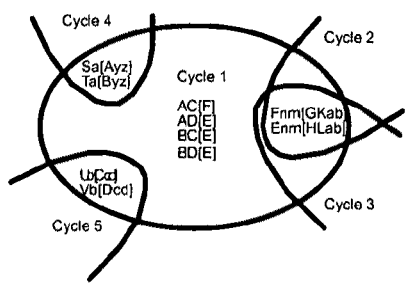
FIG. 102 illustrates coordinated fan-out cycle structure in a pure value expression.

FIG. 102 shows a buffering rule set for a fan-out relationship from cycle 1 to cycle 2 and cycle 3. The value n is a coordination value for cycle 3, and G and H are input values for cycle 3. The value m is a coordination value for cycle 2, and K and L are input values for cycle 2. An asserted F or E will not transform until both cycle 2 and cycle 3 are ready to receive input.

Each oval is a cycle with a progression of three sets of value transform rules. One set coordinates the presentation of name forming values, a second set resolves the formed name and a third set coordinates the assertion of result values. Cycle behavior is coordinated by combining a first rule set of one cycle with a third rule set of another cycle. While the lower case coordination values circulate within each cycle, the upper case data values propagate from cycle to cycle.

The coordination values and the buffering value transform rules interlink the cycles, creating pipeline behavior within the pure value expression. Appreciation of differentness propagates progressively and unambiguously through the pipelined expression in the midst of a teeming sea of values.

It must be emphasized that there is nothing physical or spatial about these cycles. The thengs and their asserted values are rattling around indiscriminately in a shaking bag or a frothing soup. The cycles and their structure are loci of behavior expressed in terms of name formation dependency relationships among value transform rules.

7.12.14 Integrating the Expression of Function and Coordination

Figure 103:
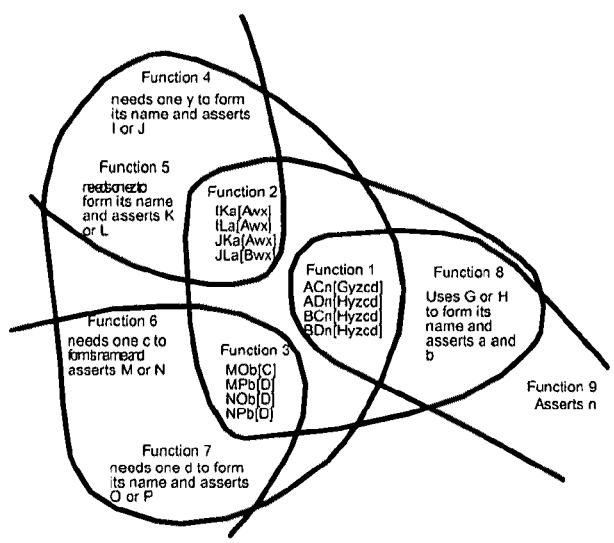
FIG. 103 illustrates pure value cycle coordination integrated with functions.

The expression of coordination can be integrated into each internal expression just like the coordination was integrated in the association expression of FIG. 85. Each cycle is still defined by circulating coordination values and comprises three sets of rules: allow name forming values to present a name, resolve the formed name, project the result values. Each group of rules expresses a name resolution plus coordination for another cycle. FIG. 103 shows the integration of a portion of the expression of FIG. 101. There are fewer rules, but the names and results for each rule are more complex.

Each expression directly incorporates coordination values, coordinating the presentation of its result values to successor functions and coordinating its own name formations from the results of predecessor functions. The functions can resolve more complex names from more different sources. An intertwined complexity of behavior can be expressed that strains human understanding but whose behavior is nevertheless fully coordinated and unambiguous.

7.12.15 Associating Pure Value Expressions

The progression of different result values cannot continue indefinitely in a pure value expression. Infinite differentness of value or even arbitrarily adequate differentness of value is not assumed. Values must eventually be reused to express other differentnesses. A value cannot be reused in a single pure value expression, so there must be other isolated pure value expressions that use the same value to express different meanings.

A pure value expression can extend its stride of appreciation by projecting values beyond itself into another pure value expression. The value transform rules of a pure value expression express an input value by including it as a name-forming value for some value transform rules but not as a result value for any transform rules. The value is not produced by the current expression so it must arrive from beyond the expression. The value transform rules express an output value by including it as a result value for some value transform rules but not as a name forming value for any value transform rules. It cannot form a name in the present expression and must move beyond the expression to form a name elsewhere.

An input presentation to a pure value expression must be expressed either by a theng asserting a value entering the expression or by a theng asserting a value extending into the expression. The projection of result values is expressed either by a theng asserting a value leaving the expression or by a theng asserting a value extending out of the expression.

Recall the interlinking pure value expressions presented in FIG. 54. The interlinking is an example of thengs projecting between pure value expressions. A wire connecting two transistors is a theng extending out of one pure value expression into another pure value expression. The receptor of a biological cell uses both methods of association. Thengs asserting values are projected from a cell by vesicles dumping thengs outside the cell membrane. Values are presented into a cell via a receptor, which is a theng that extends from outside a cell to inside a cell and changes its asserted value inside the cell.

7.12.16 Coordination of Value Flow Among Pure Value Expressions.

Figure 104:
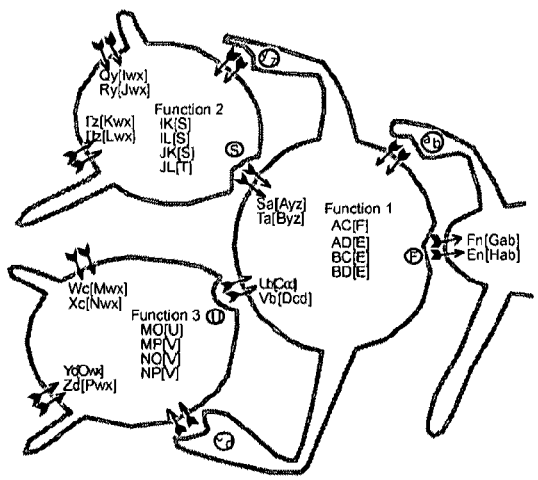
FIG. 104 illustrates partitioned pure value expression.

Value flow among associated pure value expressions can also be coordinated with dedicated coordination values. The gray shapes in FIG. 104 show a partitioning of the value transform rules of the expression of FIG. 101 among different pure value expressions. In this expression, result values, illustrated by S, U, F, and coordination values, illustrated by ab, yz and cd, flow between the pure value expressions. A theng asserting the value flows from one expression to another. The arrows are receptor thengs that transmit a value into its pure value expression. When a result value, such as S, and its theng move to another expression, it transforms and asserts coordination values, such as y and z, that flow back to the sending expression.

Figure 105:
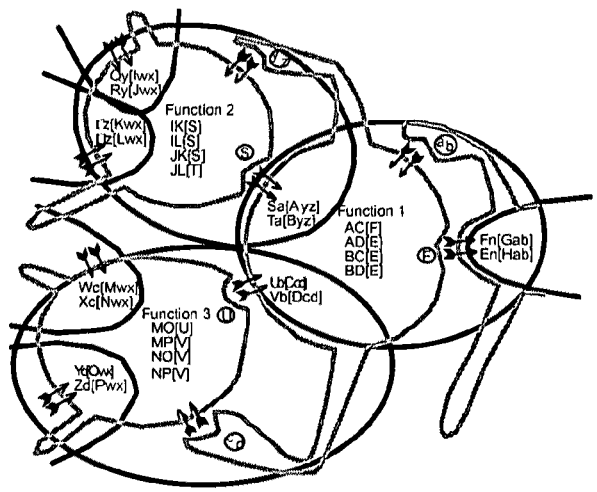
FIG. 105 illustrates cycle structure overlaying pure value partitioning structure.

The cycle structure of the overall expression is still determined by the circulation of coordination values and since these flow between individual expressions a cycle encompasses at least two expressions and links the expressions. The cycle structure in relation to the expression structure of FIG. 104 is shown in FIG. 105. The cycles are represented as intersecting ovals just as in FIG. 101.

Reusing Values

The partitioned expression in FIG. 105 is shown with the full value differentiation of FIG. 101. However, now that the expression is partitioned into separate pure value expressions the values can be reused in each expression.

Figure 106:
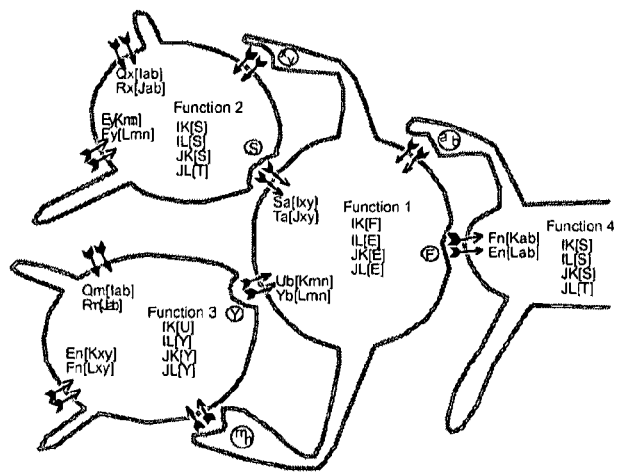
FIG. 106 illustrates reusing value in partitioned pure value expressions.

The expression with the individual pure value expressions reusing values is shown in FIG. 106. The name-forming values I, J, K and L are isolated inside each pure value expression and can be reused by each expression. The result values move between expressions, so a single expression cannot generate result values that are identical to its input values, which are the result values of its predecessor expressions. So the use of result values must be buffered by at least one pure value expression. Function 4 can reuse S and T as result values. There can be other strategies of value isolation. For instance, the receptor theng might not just transmit the external value but might transform the external value to a different internal value acting as an isolation buffer.

A value cycle is similar to the unit of association in that it is a linear progression of three different value transformations that isolate the first values from the last values. Following a specific value progression, the name Sa might form, then the name AC can form, then the name Fn can form, then the name Sa can form again.

7.12.17 The Last Association Boundaries

Boundaries of association expressions are further associated to form greater expressions with greater strides of appreciation. As a greater association expression is composed of lesser association expressions, there will always be input and output boundaries of the greatest association expression that are uncomposed and expressionally dangling. What is beyond these last dangling boundaries? Where does the presented input come from, where does the asserted output go and how are they expressed? The input and output is not integral to the association expression itself, but exists in some unexpressed magically sufficient limbo. There are two possibilities for expression beyond the last boundaries: closing the association expression and pure value composition.

7.12.18 Closing the Expression

All dangling outputs can be associated with all dangling inputs, forming a closed association expression that continually cycles appreciating its own differentnesses. But a closed expression does not extend beyond itself. It is an expressional dead end and is of no further interest here.

7.12.19 Pure Value Composition

Consider that the next level of composition encompassing the dangling input and output boundaries is not more association expression but is a very large pure value expression. The association expression becomes a component adrift in the vast context of the pure value expression, receives its input from the content of the pure value expression, and asserts its output to the content of the pure value expression. From the point of view of the pure value expression, the association expression is just a large complex theng in its content.

The input/output boundary with the pure value expression is different from a boundary with another association expression. There is no mutual coordination. The pure value expression does not explicitly present a sequence of formed names to the input. The association expression itself must grab its input from the content of the pure value expression with its own input coordination protocol. The pure value expression does not explicitly accept output. The association expression simply presents output to the content of pure value expression with its own output coordination protocol.

7.12.20 The Composition Hierarchy

With the introduction of pure value composition, the hierarchy of association composition takes on a new form. Association composition begins at the bottom with the content of pure value expressions (thengs) and bounded pure value expressions directly associating. As the association expression grows, it remains content of the pure value expression. Association composition begins and ends within a single pure value expression. The top of the hierarchy is the encompassing pure value expression. The bottom of the hierarchy is the primitive components of the encompassing pure value expression.

The top and the bottom of the hierarchy are inscrutable. The bottom of the hierarchy is inscrutable because primitives have no explanation. They just are and they just behave with no further accountability. The top of the hierarchy is inscrutable because there is no higher level. While an association expression requires presented input differentnesses to elicit behavior, the greater pure value expression, with its continually interacting content, does not require input or output boundaries to elicit behavior. The greatest pure value expression exists and continually behaves on its own terms with no greater context to impart meaning or significance to its behaviors. With only lateral behavior on its own level, it feeds on its own content drifting—one might say aimlessly—within itself.

In the middle of the hierarchy of association are isolated component association expressions that cannot transcend their own level or their own local context within the greater expression, that cannot extend their stride of appreciation beyond their place in the greater structure. It is not necessary that a component expression transcend its place as it is presented with sequences of limited pre-expressible behaviors via fixed boundary protocols and it only behaves within that limited context.

The input and output boundaries of the greater association expression, however, are exposed to the content of the encompassing pure value expression. Presentation context is not limited and boundary protocol is not fixed. The greater association expression, as a whole, must make its own way through much more dynamic circumstances than its component expressions face.

While the behavior of mid-hierarchy component association expressions might be fully pre-expressible, the behavior of the greater association expression as it makes its way through the pure value content cannot be fully pre-expressed. Appreciating differentness takes on new meaning for the greater association expression. Recognizing the differentness of encountered content and asserting appreciation behavior is more in the nature of a search than of an appreciation of pre-expressed differentness. Appreciating differentness is no longer an end in itself but is a component means of a greater search behavior.

7.12.21 Summary

Lesser expressions are composed into greater expressions by associating behavior boundaries. A greater expression is a network of association relationships with a hierarchy of nested boundaries. The greater expression can be partitioned both hierarchically and laterally along these boundaries in various ways to map to various implementations with various coordination protocols.

The convention of a spontaneously oscillating feedback cycle was introduced as a method of coordinating flow between boundaries, and it was shown that a structure of interlinked cycles implements a pipeline structure that can be a direct mapping of the association expression. It was also shown that there can be cycles in a pure value expression and that they can be interlinked forming a spontaneous pipeline flow through a pure value expression, and more pertinently between pure value expressions.

The last dangling boundaries of association composition were encompassed with the introduction of pure value composition. All issues of boundary composition are finally addressed. There are no loose ends. Association expression arises within the content of a pure value expression and remains a component, just another theng, of the pure value expression. The appreciation of differentness takes on new meaning for the greater association expression with its boundaries exposed to the pure value expression.

No new primitive concepts of expression were introduced. It is still just associated thengs asserting values that interact according to value transform rules.

8 Time and Memory

In its quest through the pure value expression a greater association expression might find it useful to be able to appreciate differentness through time. Expressions considered so far have not extended beyond the appreciation of a single presentation. There might be successive presentations to the input of an expression, but each presentation is a unique differentness to be individually appreciated. There is no appreciation of differentness through time across successive presentations and no expression of change of appreciation through time, both of which require the expression of memory.

It is convenient at this point to consider process expression entirely in terms of memory and of memory as relative persistence of expressivity. An expression itself is a memory, a locus of relationships that persists from presentation to presentation. The paths of resolution behavior through an expression are less persistent short-term transient memories that maintain the differentnesses of resolution as they flow through an expression.

There can be expressions of memory that are less persistent than the expression itself and more persistent than the differentnesses flowing through it. It is this intermediate-term memory that expresses the appreciation of differentness through time within the expression. This chapter discusses the expression of intermediate memories in the context of association expressions.

8.1 Association Through Time

Successive wavefronts flowing through an association expression represent successive instances of appreciation in time. Successive wavefronts through a place in the association expression are related through time by that place. In relation to a given wavefront through a given place, wavefronts that precede it through the place are in its past, and wavefronts that follow it through the place are in its future. Wavefronts can be delayed in relation to primary flow through the structure and can be associated with places in the structure containing future wavefronts.

8.2 Pipeline Memory

In a pipelined expression there are successive wavefronts at various stages of propagation. The delay of a wavefront to associate with a future wavefront can be expressed in the pipeline structure with differential wavefront populations in pipeline segments or by feedback association relationships that associate backward in relation to the primary flow of resolution behavior, forming a pipeline ring to associate with following future instances of wavefronts. A direct spatial association relationship becomes an association through time. A delayed wavefront is effectively a memory that associates a past with a future. The persistence of the memory is the number of wavefronts into the future expressed by the delay. Memories of varying persistence within an expression can be composed to recognize patterns of differentness in time just as logic operators can be composed to recognize patterns of differentness in space.

8.2.1 Graphical Pipeline Representation

Figure 107:
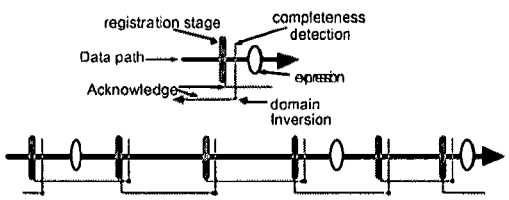
FIG. 107 illustrates graphical representation of pipeline stages.
Figure 108:
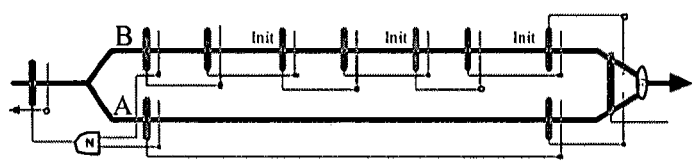
FIG. 108 illustrates wavefront delay with differential pipeline populations.

FIG. 107 shows the graphical representation of pipeline coordination and a represented pipeline of coupled cycles. Some cycles contain an expression. Cycles that do not contain an expression are buffer cycles.

8.2.2 Differential Pipeline Population

Figure 109:
FIG. 109 illustrates a pipeline ring.

In a structure of two parallel pipelines with different populations of wavefronts, the pipeline with the greater wavefront population will delay wavefronts with respect to the pipeline with the smaller wavefront population. FIG. 109 shows a structure of pipelines A and B. There are three wavefronts initialized in pipeline B and no wavefronts initialized in pipeline A. When a wavefront enters the structure on the left, it flows to both pipelines. Through pipeline A it flows to expression F but in pipeline B it gets blocked by the three wavefronts already in the pipeline. At expression F, the wavefront in pipeline A will interact with the rightmost wavefront from pipeline B. For every wavefront passing through pipeline A one wavefront will flow into B and one wavefront will flow out of B. There will always be three more wavefronts in pipeline B than in pipeline A.

After the initialized wavefronts in pipeline B are used, wavefront N from pipeline A will interact at expression F with the past wavefront N-2 from pipeline B. The wavefront presented to expression F from pipeline B will always be delayed by two instances in relation to the wavefront presented by pipeline A. A past differentness is associated with a future differentness.

The asserted behavior of the expression is a continual appreciation of the name formed by two wavefronts associated through time. It is a combination expression in time.

8.2.3 The Feedback Ring

Feedback is an explicit association path from later in a resolution flow of an association structure to earlier in a resolution flow of an association structure forming a ring structure. A ring, shown in, is a pipeline that feeds back on itself.

Figure 110:
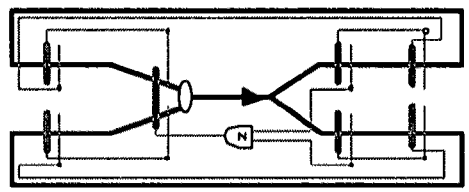
FIG. 110 illustrates two rings coupled through a shared cycle.

Structures of rings can be composed by sharing cycles FIG. 110 shows two rings coupled through a shared cycle.

Figure 111:
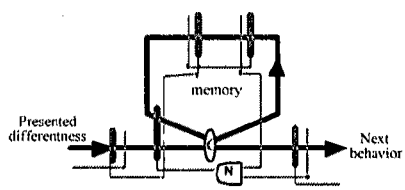
FIG. 111 illustrates a ring coupled with a pipeline through a shared cycle.

A ring can be coupled to a pipeline through a shared cycle, as shown in FIG. 111. A part of each appreciation of expression C is remembered in the ring and will combine with the next presented differentness, influencing its appreciation. The ring might feedback the carry value for a serial adder or the current state of a state machine.

While the input and output content of an expression must be understood by other expressions, how ring content is represented and how it influences the appreciation behavior can be unique and local to an expression. No other expression has to appreciate the content of the ring around expression C.

8.3 Composition of Memories

Figure 112:
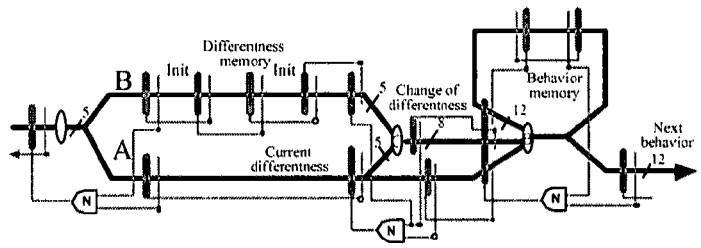
FIG. 112 illustrates a pipeline expression using two forms of pipeline memory.

The pipeline expression of FIG. 112 employs two forms of pipeline memory to express an output behavior that is sensitive to change in its input and to its previous behavior. The change of input differentness is expressed with differential population pipelines and the previous behavior is expressed with a ring.

The parallel pipelines and expression C appreciate the change between the current input and a previous input. The slanted lines through the content paths indicate how many differentnesses are represented by each path. There are five possible differentnesses of presented input, and expression C can appreciate eight differentnesses of its associated wavefronts. The current presented differentness, the result of expression C, and the remembered behavior all combine through expression B to determine one of twelve possible next output behaviors.

Expression C might appreciate that a stare changes to a snarl and then back to a stare or that the snarl changes to bared teeth. Expression B in conjunction with the behavior memory remembering that the last behavior was to offer a biscuit might determine that the next behavior should be to relax or to run.

Figure 113:
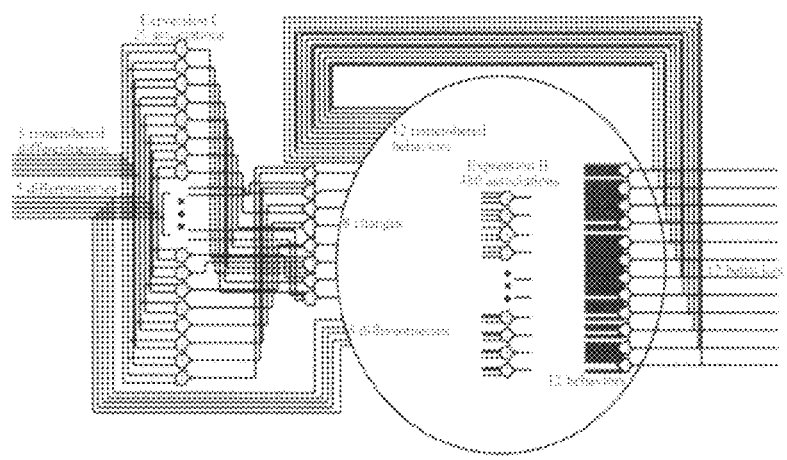
FIG. 113 illustrates pure association version of expression of FIG. 112.

FIG. 113 illustrates the pure association form of the expression. The content paths are shown without coordination expression. Expression C appreciates the change of presented differentness with 25 operators generating one of 8 possible appreciations. Expression B contains 480 operators generating one of 12 final output behaviors.

8.3.1 Patterns of Differentness in Time

Progressive patterns of differentness in time can be appreciated with multiple differential population pipelines. Expression C in FIG. 114 continually appreciates the composition of the current and the three previously presented differentnesses. Expression C might be an explicit recognition of each possible pattern, it might be a filtering process that just recognizes a few of the possible patterns, it might be a smoothing process such as a sliding window average.

8.3.2 Patterns of Behavior in Time

Figure 114:
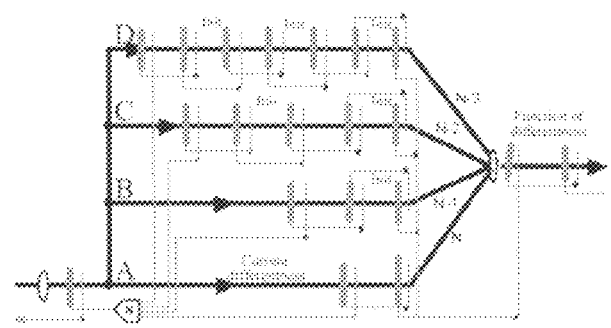
FIG. 114 illustrates appreciating patterns of recognition through time.
Figure 115:
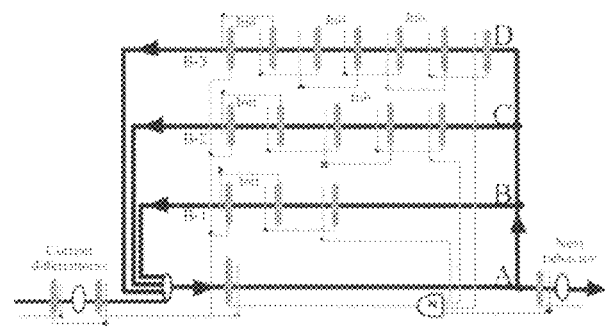
FIG. 115 illustrates appreciating patterns of behavior through time.

If pipelines B, C and D in the expression of FIG. 114 are reversed, the result is a structure of three rings that remembers the three previous behaviors. FIG. 115 shows the three-ring structure. Expression C determines the next appreciation behavior from the current presented differentness and the three previous behaviors.

8.3.3 A Behavior Search

Figure 116:
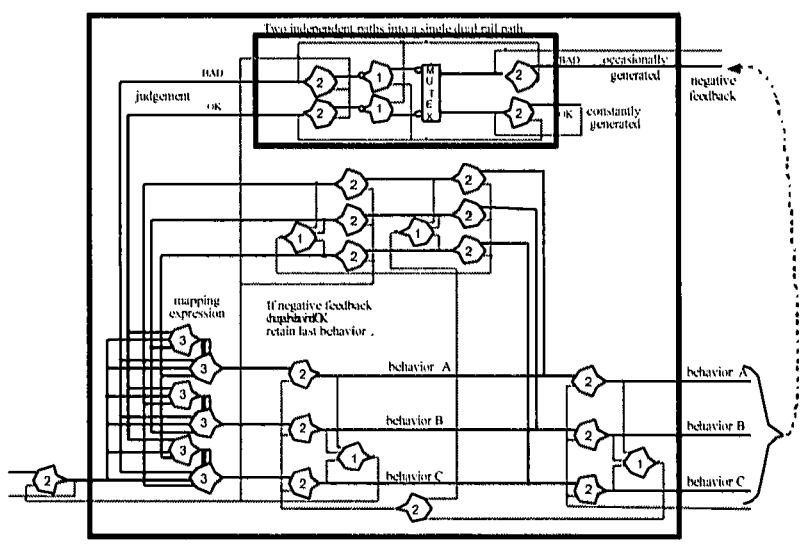
FIG. 116 illustrates pure association expression of dynamic behavior mapping.

FIG. 116 shows a pure association expression of nested rings mapping a single recognition input to an output behavior. An internal ring remembers the last behavior. A negative feedback path forms an expression ring encompassing the internal state ring. The expression maps to the last behavior asserted, maintaining a constant behavior mapping unless something bad happens with the last behavior and it receives negative feedback.

The External Appreciation Input

The external appreciation forms a ring of associated behavior from the output of the expression, through the external appreciator, through the negative feedback input of the expression, through the expression itself and back through the output. Negative feedback occurs only occasionally if at all.

OK is constantly generated by an auto produce expression. The generated OK and negative feedback are independent signals, which are combined by the arbiter into a single dual-rail signal with values OK and BAD. The continual generation of OK ensures that a dual-rail judgment value is always presented to the mapping expression with each recognition input. Whenever negative feedback occurs, it will get its turn through the arbiter and be presented to the mapping expression as BAD.

The Mapping Expression

The input of the mapping expression is the recognition input, the remembered behavior, and the judgment value. The mapping expression is shown in Table 8.1. The recognition input enables the ring. When OK is presented, the mapping expression asserts the remembered previous behavior that is stored in the ring. When BAD is presented, the mapping expression asserts a new behavior by rotating away from the remembered behavior. If the next presentation is OK, then the expression will stabilize with new behavior. A behavior mapping that does not receive any BAD judgments will persist.

TABLE 8.1

Behavior mapping table

|  | beh A | beh B | beh C |
| --- | --- | --- | --- |
| OK | beh A | beh B | beh C |
| BAD | beh B | beh C | beh A |

One could add more content differentnesses to the behavior ring as shown in Table 8.2 to modulate the persistence of OK. There can be a weak behavior A (beh A 1) and a strong behavior A (beh A 2). If a behavior receives an OK, it is raised to a strong behavior, and it takes two consecutive BADs to change it. Ring content differentnesses can be mapped to express many different behaviors or to express gradations of persistence of a few behaviors.

TABLE 8.2

Behavior states with gradations of persistence

|  | beh A 1 | beh A 2 | beh B 1 | beh B 2 | beh C 1 | beh C 2 |
| --- | --- | --- | --- | --- | --- | --- |
| OK | beh A 2 | beh A 2 | beh B 2 | beh B 2 | beh B 2 | beh B 2 |
| BAD | beh B 1 | beh A 1 | beh C 1 | beh B 1 | beh A 1 | beh C 1 |

The expression dynamically changes behavior through time as feedback on behavior occurs. The change of behavior of the expression is a search to cease receiving negative feedback.

8.3.4 Composition of Behavior Mappers

Figure 117:
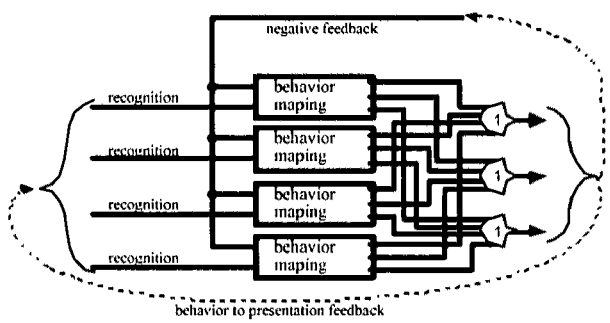
FIG. 117 illustrates mapping each recognition to common behaviors.

Dynamic behavior mappers can be composed into a larger expression as in FIG. 117. Each behavior mapper is enabled by a recognition, and the negative feedback is associated globally to all the behavior mappers. The structure forms a simple experience memory that will settle into behaviors of no negative feedback for each recognition provided that there are such behaviors. If, once settled and negative feedback recurs, the expression will attempt to modify its behavior again.

Figure 118:
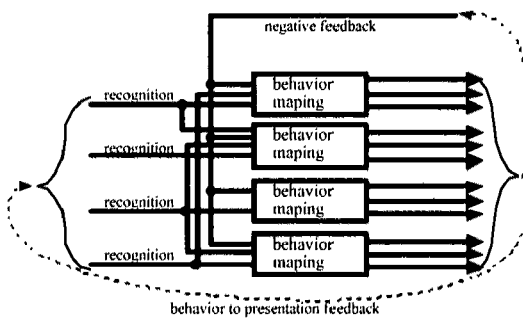

In the expression of FIG. 117 there are only three output behaviors. Each recognition enables one behavior mapping and results in one of the three behaviors. It also might be that each mapping asserts individual behaviors and that a recognition enables more than one behavior mapping, as shown in FIG. 118.

8.4 Experience Memory

A structure of ring memories can remember behaviors.

Behavior Memory

Figure 119:
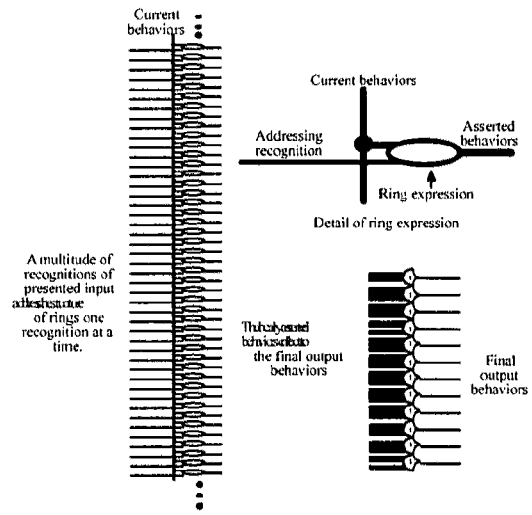

Consider the structure of ring expressions of FIG. 119. Each ring is associated with a recognition of presented input. Only one recognition out of a multitude of possible recognitions will occur at a time. The recognition is both a write enable and a read enable for a ring expression. Current behaviors are globally presented to each ring expression in the structure. A recognition enables the current behaviors to flow into the one addressed ring expression. Some function of the current behaviors and remembered behaviors will flow out of the ring and also back into the ring. The behaviors flowing out of the ring will contribute to final output behaviors for the greater association expression. The ring then sits quiescent remembering the last behaviors until it is enabled again by a recognition.

The ring memories will modify as recognitions occur over time, accumulating a memory of experience that is accessible by recognition of presented input. The content of the rings are memory of the past that are not associated to a specific relative time but to a specific experience. A recognition will be a familiarity and the content of the ring the reminiscence. An appreciation might enable more than one memory ring. A memory content might enable other memories. Networks of memories associated by experience and behavior can appreciate patterns of differentness through time that can influence the ongoing behavior of the greater expression.

8.4.1 Recognition Memory

Behaviors can be associated through time in other relationships as well. Recognition content might be remembered in association with appreciation behaviors. An expression does not have control over its input, but it does have control over its output and there are only so many output behaviors. An expression can generate output on a speculative basis (play) and observe what input occurs. It can enable rings in a structure with the output behavior and store in the rings the ensuing input recognition. The expression can anticipate what input recognition behavior should occur, and this anticipation can become an integral part of the appreciation of the ensuing input. Eventually an expression might gain a modicum of control over its input through its output behavior.

8.5 A New Form of Expression

What is new with this chapter is intermediate persistence memories. Prior to this chapter a process expression was characterized as a permanent expression through which transient differentnesses flowed and were appreciated. There might be a succession of presented differentnesses to appreciate, but each successive presentation was independent with no relationship with other presentations. There were only two extremes of persistence: the permanent expression and the transient differentnesses that flow through it being appreciated. The only relationship among successive presentations was the constancy of appreciation of the expression itself. Identical differentnesses are always identically appreciated.

With the introduction of intermediate persistence memories the nature of expression changes dramatically. There are now direct association relationships among successive presentations. An expression is now an association structure of memories as well as a structure of appreciating operators. The content of the intermediate memories is integral to the appreciation of each successive presentation. The content of the memories is constantly changing. The appreciation behavior of the expression is constantly changing. Identical differentnesses are no longer always identically appreciated. There is no longer a static appreciator of dynamic differentness. The appreciator is itself dynamic.

An association expression encompassed by a pure value expression includes a ring path from the output of the expression through the pure value expression to the input of the expression. With the cyclic behavior of the ring and changing contents of intermediate persistence memories a new form of expression arises, dynamically making its way through the pure value expression.

8.5.1 The Expression of Memory

There is no firm boundary between the expression of memory and the rest of the expression. The differential pipeline memory is a matter of initialized wavefronts. Without the initialized wavefronts the structure does not express a memory. The ring is just another association relationship in the greater structure. There is no standard way of expressing memory. It can be any means of expression that persists in relation to other expressions. It can be anything from a serially addressable monolithic memory to the structure of an association expression itself.

Figure 120:
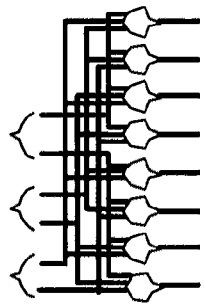

In the behavior search of Section 8.3.3 a ring stored three possible behaviors, and the expression searched through the three behaviors to avoid bad experiences. It could also be expressed as an object with methods of search in the monolithic memory of a conventional computer. It could also be expressed as an association search that reconfigures itself with the negative feedback. FIG. 120 shows a pure association expression of three binary inputs combining association relationships into a rank of threshold operators representing eight possible appreciation behaviors. The pattern of associations maps the formed name to a recognizing behavior.

The expression can search through various mappings of recognition to behavior by changing the association relationships. A negative feedback could cause the expression to make more associations. Negative feedback just mixes things up. In the absence of negative feedback a status quo consolidates itself. The resulting memory of mapping recognition to behavior is an integral part of the association expression.

It was suggested at the beginning of the chapter that it was convenient to consider process expression purely in terms of memory. An expression not only contains intermediate memories but is itself a memory that can change. An expression is a structure of memories of various, persistences with the greater expression itself simply being the most persistent memory. As the content of the memories change, including the structure of expression itself, the appreciation behavior of the expression changes. The ring expressions of FIG. 119 might be dynamically changing association expressions like FIG. 120.

8.5.2 The Expression of Time

Association through time is expressed as association between places in the network. While some associations through time might be constant relative to succession relationships such as with a delay memory, which always associates the memory of the third previous wavefront with the current wavefront, other associations will be in terms of recognition behaviors within the expression.

No Structure of Place in Time

There is no coherent characterization of "place in time." A place in time might be a place in relation to presentation succession. A place in time might be a place of some specific experience or behavior. Different kinds of places in time are not relatable among themselves. They do not compose. A relative experience time cannot be related to a relative succession time. But they can all be associated within the association expression. These association relationships do not themselves form a coherent network of association relationships through time. Each place of association through time is an island of association within the association network. The islands themselves are not necessarily associated in terms of time, but they are all associated within the network.

Prior to the invention of the clock and the calendar there is no particular structure to time within an association expression: no coherent characterization of place in time.

No Boundaries in Time

While the behavior of an association expression is bounded by its input and output boundary and by the extent of its network, there is no inherent bound to its behavior in time and no particular boundaries of association through time. An association expression can receive input, assert output and remember content as long as it persists. There is no particular beginning and no particular ending of time during its persistence.

The closing of the boundaries of the expression through the pure value expression and the expression of memories within the expression transcends the bounds of the association expression itself. It becomes an ongoing process extending through time and into the pure value expression with no firm boundaries of expression.

8.5.3 Whither Referent?

Another aspect of the expression that becomes infirm is the stability of the expression itself and its role as a referent of differentness. Initially expression was characterized as a referent for presented differentnesses. But, if an expression can change its behavior in relation to the differentnesses presented to it, what becomes of the role of referent? The answer lies in the beginning.

Differentness and its appreciation begins in the primitive pure value expression. Each theng carries around its value and some value transform rules. Thengs freely associate and interact. All thengs are on a level playing field, symmetrically appreciating each other. Each theng and its value is equally a referent to appreciate the differentness of all other thengs and equally a differentness for all other thengs to appreciate.

When thengs join in a persistent locus of association, the locus breaks the symmetry of expression. The association expression as a whole has a greater stride of appreciation and becomes a greater referent than any individual theng. If the association expression changes slowly in relation to the differentnesses flowing through it, it does not cease to be a greater referent. It just becomes a slightly different referent.

8.5.4 The Arrogance of Bulk

As the locus persists and grows bulkier its stride of appreciation grows and it becomes a farther reaching referent, not only of differentness, but the association structure and the memories of the expression begin forming referents for space and time. Earlier in Section 5.2.8 it was stated that there is no inherent place or time within the pure value expression and that there is no external meta view to project a referent of place and time. An association expression arising within a pure value expression becomes an internal meta observer projecting its metrics of differentness, space and time onto its neighborhood content, usurping the role of meta referent with the presumptive arrogance of self reference: a persistence with attitude—an arrogant bulk that can impose its appreciations and its referent on lesser expressions with smaller stride of appreciation and less persistence.

There is no meta referent for the behavior of these self proclaimed referents. There is no ultimate "true" referent, no absolute meta referent. An arrogant bulk is a greatest referent and it is entirely on its own.

8.5.5 Whither Stability?

The content of memories can change. The association structure of the expression can change. With so much that can change how can an expression possibly remain stable and persistent?

It was mentioned above that an expression might change slowly. What does it mean for an expression to change slowly? It means that there is a new differentness that is not very different from the previous differentnesses: that there are localities of differentness in the expression, that a change within the locality does not drastically change the expression but slightly evolves the expression. The primitive expression of locality of differentness is mutual exclusivity of assertion. A theng that mutually exclusively asserts one value at a time expresses a primitive locality of differentness.

Consider a pure association variable that represents a1000 differentnesses as 1000 unique places of association only one of which will assert at a time, rather like FIG. 120 with 1000 appreciations instead of 8. The 1000 differentnesses might be 1000 gradations of force for a particular muscle. It is easy to imagine that some associations might wither, that some associations might strengthen, and that new associations might arise speculatively. It is easy to imagine that the appreciation of a particular input might gradually drift along the gradations of force as the association relationships changed. One change of differentness among 1000 differentnesses can be a gradual change.

One can also imagine gradual change in a pure value expression. Consider a protein gradually changing if differentness in relation to all other proteins as DNA mutation gradually alters its amino acid structure one amino acid at a time.

Pure forms of expression can easily express locality of differentness and gradual drift of local differentness. It is this expression of locality of differentness from which stability of persistence arises. Of course, a change may still cause a very non local change of differentness and the expression may or may not persist. Or a local change may cross some boundary of stability to the detriment of the expression. There is no primitive imperative of stability. An arrogant bulk is merely a locus that has managed to persist.

Non local change does not foster stability. Consider an expression whose content is binary encoded. If a bit flips on a 10 bit number changing it from 512 to 520, what does that mean? If the expression of binary ADD changes slightly, what does that mean? An encoded number represents some whole differentness, Nevertheless, the encoding, which might be in any radix, is arbitrary. Since the encoding is arbitrary, it cannot relate directly to the whole differentness being represented, and a change of the code cannot be meaningfully related to the whole differentness. Place-value encoded differentness provides opportunities for meaningless and disruptive non local change.

8.5.6 A Greater Search

An association expression was initially characterized as a passive appreciator of differentness that searched to match a presented input to an internal representation of the possible presentations. Since all possible presentations cannot be internally pre-expressed, this internal search is no longer a sufficient end in itself but becomes a component means of a greater search extending into the pure value expression. If appreciation of differentness cannot be fully pre-expressed within the expression, then the expression must develop its own appreciations through play. The ring of behavior from the output through the pure value expression to the input provides the ability to search and play within the pure value expression.

For an association expression encompassed by a pure value expression, its output behavior is no longer just values asserted at an output boundary. Output behavior can directly interact with the content of the pure value expression. The output behavior might change the orientation of the input boundary in relation to the content of the pure value expression. The output behavior might change the content of the pure value expression in a way that immediately or eventually feeds back to the input boundary affecting the presentation of the input.

The memories in the expression provides the ability to remember the consequences of output behavior in a way that influences future behaviors. The various memories of the expression are an integral part of the search. As well as forming an internal memories of experience, an association expression might form memories in the pure value expression itself by leaving mementos about in the pure value expression to be found later or by modifying the pure value content in some memorable way. It might communicate with other association expressions by placing things in the pure value content and by receiving things from the pure value content. With individual mobility, association expressions might maintain mutual locality and form a persistent locus of loosely coupled association expressions. The expressions might cooperate to accumulate experience memory within themselves collectively and within their immediate vicinity. An association expression is no longer a passive appreciator. It is an active participant.

8.5.7 The Goal

What is the goal of the greater search? There is no particular goal, no end to the search, no ultimate answer. It is just an ongoing behavior that is convenient to speak of as a search. The behavior continues, or it does not. The behavior abets persistence, or it does not. While an arrogant bulk is judging the differentnesses of its surrounding content, the surrounding content of the pure value expression is judging the persistence of the bulk. An arrogant bulk behaves and judges as long as it persists. Persistence begets referent, and persistence itself is the only ultimate referent.

8.6 Time and Memory in Pure Value Expression

While an association expression forms a coherent whole with relationships among all its parts, a pure value expression does not form a coherent whole. The content of a pure value expression can support a multitude of value expressions behaving independently, the only commonality being the common place of association. While a rhythm may be established by one independent value expression, there is no structure of relationships for a rhythm to influence the pure value expression as a whole. In a pure value expression all association is either immediate, as with a fully associated pure value expression, or of indeterminate interval, as with a shaking bag pure value expression. Neither case provides a basis for a referent interval of time.

The memory of a pure value expression is its content. Because the content can contain a multitude of independent processes, there is no particular structure to the content and no particular structure to the memory. A value can be left in the content of the expression to interact at a later time, but when the interaction occurs, it may not be clear that the value is from a past or from how far in the past. Past, present and future are much murkier in a pure value expression than in an association expression.

8.7 Summary

The structure of an association expression can serve as a referent of relative past, present and future for the wavefronts flowing through it. The succession of presented or grabbed input wavefronts can establish a rhythm of successive instances of time. Each successive wavefront has a place in time relative to the other wavefronts in the succession. Intermediate persistence memories within an association expression can store wavefronts and associate them with succeeding or future wavefronts associating differentness through time. Association structures of memories of differing persistence can express the appreciation of patterns of differentness through time.

Appreciation behavior can change in relation to the changing memories that are integral to the expression. An expression becomes a dynamic appreciator of its dynamic pure value surroundings. Expressions with great stride of appreciation become referents for expressions with considerably less stride of appreciation: arrogant bulks: ad hoc self-proclaimed referents for all they encounter, adrift in the pure value expression, making their way as best they can.

No new primitive concepts of expression have been introduced. It is still just associated thengs asserting values that interact according to value transform rules.

9 Incidental Time

With memory expressions can be extended in time, not only for the appreciation of differences in time but simply for some convenient variation of expression. Such extension in time is not an inherent property of the process being expressed but is incidental to a particular expression of a process that might be expressed in other ways without extension in time. One reason for incidental extension in time is to compensate for various limitations of expressivity. Another reason is to provide flexibility of behavior.

9.1 Sequentialization of Associations

Figure 121:
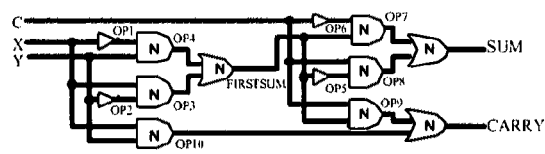

The association expression of the full-adder in FIG. 121 will serve as an example expression. The minimum extension in time for any expression is a single behavior. The full-adder can be expressed as two concurrent single behaviors as seen earlier with the association expression of FIG. 72. The example expression extends with multiple behaviors through both space and time because of the limited value differentiation of the Boolean functions.

Extension in time occurs when there are resources of limited expressivity that have to be reused over and over. In the case of FIG. 121 there are only two values that must be reused multiple times, and there are only simple association operators that must be used multiple times. The association paths are the memories extending the expression in time.

Figure 122:
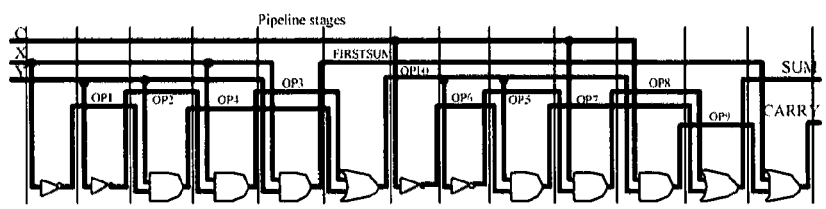

The full-adder expression can be further extended in time by increasing memory capacity. FIG. 122 shows the expression of FIG. 121 redrawn with stateless operators in an ordered sequence with exactly the same association relationships. The expression is partitioned with clocked pipeline stages indicated by the vertical lines. The horizontal part of each association path is one or more pipeline stages long. Each pipeline stage is a separate memory element. The C input path, for example, has ten pipeline stages. Each association path in the expression of FIG. 121 is exactly one memory element. The memory capacity of each association path in FIG. 122 is increased by the pipeline stages allowing the expression to be extended farther in time.

9.2 Time-Space Trade-Off

Consider that there is just one AND operator, one OR operator and one NOT operator. The AND operator has to be used six times, the OR operator three times and the NOT operator four times. The behavior of the expression must be extended in time to allow each resource to be reused multiple times. One instantiation of each operator takes up less space than a fully populated association expressions of FIG. 121 and FIG. 122. This is commonly called a time-space trade-off. Space is being saved in terms of instantiated resources by using rare resources over and over in time.

9.2.1 Reusing operators

With each use of an operator, its asserted result is fed back and presented to the input of the operator to which it associates. FIG. 123 shows the feedback expression for the binary full-adder. There is a new operator called Chain to replicate in time the values that are replicated by fan-out in the association expression.

The feedback paths are pipeline paths forming rings. Each feedback path corresponds to an internal association path in the association expression. Each operator outputs only one result at a time that must be explicitly steered, in sequence, through a fan-out steering structure (O1 through O4) to the proper pipeline that associates through an input steering structure (I1 through I6) to the input of an operator.

A sequence of commands controlling each steering structure is sufficient to realize the full adder expression. Each steering structure is controlled by an individual sequence of steering commands, shown in FIG. 124. Each output goes to a specific path and each input comes from a specific path. The Chain operator output can be steered to an association pipeline as well as the Chain pipeline which replicates wavefronts.

The commands can reside in a ring attached to each steering structure, as shown in FIG. 125. Continually cycling in the ring, they will repeatedly control the steering structures to resolve successively presented inputs. In this case the feedback paths of the rings allow indefinite repetition of each command sequence, and hence the indefinite repetition of the expression as a whole continually resolving successively presented inputs on X, Y and C.

The expression is still a spontaneously flowing pipeline structure coordinated by completeness relations, but it is no longer purely a structure of data flow. It is now a structure of data flow integrated with multiple command flows. With the association expression of FIG. 121, the data wavefronts coordinated their own correctly behaving flow. The expression has been fragmented into separate components of data flow and control flow that must be properly coordinated to correctly express the behavior of the process. The association relationships are now expressed partly in terms of direct association and partly in terms of command sequence. The expression of explicit control has emerged.

9.2.2 Sequencing the Feedback Network

Figure 126:
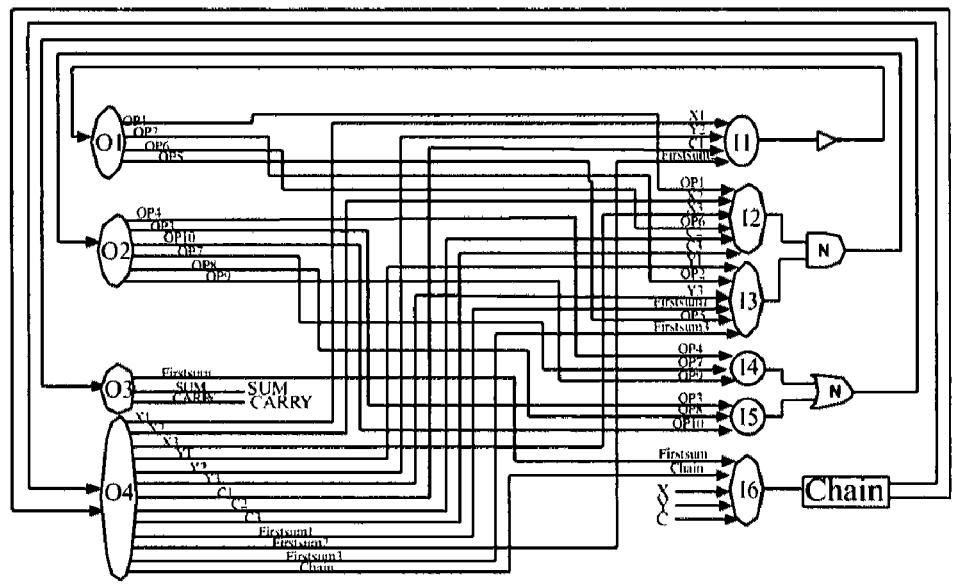

The feedback full-adder is redrawn in FIG. 126 to show the feedback network between the fan-outs and fan-ins. The feedback network can now be seen as an association structure bounded by the steering structures in contrast to the operators bounded by the steering structures.

Figure 127:
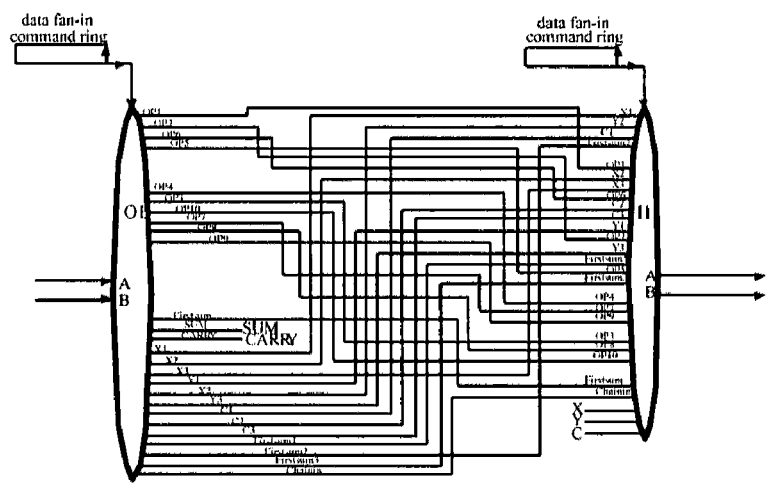

While the expression above might allow for very limited concurrent behavior among the operators, it is simpler and likely more efficient to strictly sequentialize the behavior. The control of the feedback network can be sequentialized by merging the output steering structures and command sequences into a single output steering structure and command sequence and by merging the input steering structures and command sequences into a single input steering structure and command sequence. The merged steering structures are shown in FIG. 127. The new fan-out steering structure requires two inputs to accommodate the two outputs of the chain function and the new fan-in steering structure requires two outputs for the AND and OR inputs.

Figures 128, 129:
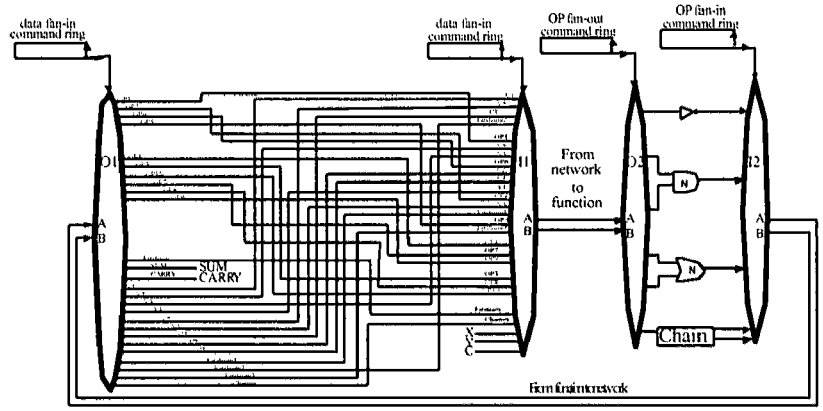

The command sequences of FIG. 124 can be merged into a single fan-out sequence (input) and a single fan-in sequence (output) for the feedback pipelines such that all inputs to the network are earlier in the merged sequence than the outputs of the network to which they associate. X2, for instance, is steered in through the fan-out structure before it is steered out through the fan-in structure. The two sequences must also correspond such that the result of a fan-in to an operator is correctly steered by the corresponding fan-out command. The OP4 fan-out command must be in the same place in sequence as the OP1, Y1 fan-in command. The resulting sequence of commands is shown in FIG. 128.

In the expression above of FIG. 126, the input of an operator is expressed by direct association with a steering structure. With the steering structures merged and the commands merged in a strict sequence, there is no longer any direct association relationship between the steering structure and the operators. The operators must now be bounded by their own steering structures with a sequence of commands that steer input to one operator and then steer the output of the operator. The resulting expression structure is shown in FIG. 129.

The sequence of commands for steering through the operators is derived from the direct association relationships of the steering structures in FIG. 126. The merged fan-in and fan-out commands and the new operator steering commands are shown in FIG. 130. Each step in each command sequence manages a single operator behavior through the expression.

9.2.3 A Final Merge

The four command sequences are all the same length, and their command sequences coincide. The Nth command in each sequence manages the Nth operator resolution flow. The four command sequences can be merged into a single sequence of combined commands, each command configuring a single cycle of the expression. The single sequence of commands can then be expressed in a single ring that fans its output to the four steering structures, as shown in FIG. 131.

9.2.4 Referential Expression

With the steering structures merged, there is no longer any direct association relationships in the expression related to a particular process expression. All association relationships are configured by a sequence of symbolic references or commands. The expression has become purely referential.

Now that the feedback association relationships are expressed referentially by the steering commands, the network of feedback pipelines need no longer express specific association relationships. There is a one-to-one mapping between the steering structures bounding the feedback pipelines so they need only associate directly from the fan-out structure to the fan-in structure. The network can be straightened out in a one-to-one association from the fan-out structure to the fan-in structure, as shown in FIG. 131. Each pipeline can have a preassigned steering name such as 0, 1, 2 and so on and the association names of the expression can be arbitrarily mapped to these preassigned names. The operators can also have preassigned steering names that are convenient to the implementation. The steering structures with the new steering names are shown in FIG. 131. The original association expression place names are shown in the middle of the network as a translation reference The complex association relationships of the ring structures of the previous examples have been subsumed into address mapping of a memory and a sequence of commands. FIG. 132 shows the command sequences of FIG. 130 combined into a single command sequence with the association names of the original expression mapped to the preassigned steering names of the feedback network and the operators. Each row of the table is a single command. The use of preassigned steering names in the commands highlights the purely referential form of the expression.

While the previous versions were fairly complex structures of coupled rings, the current expression can be seen as a structure of two coupled rings: a memory/operator ring with selectable paths and a command ring storing and presenting command wavefronts that select the sequence of paths for the memory/operator ring.

9.2.5 The Transformed Nature of the Expression.

Even though the configurable expression is still a pipeline structure that behaves in terms of spontaneously flowing wavefronts, the expression of a mapped process is no longer in terms of spontaneously behaving wavefronts flowing along direct association paths through spontaneously behaving operators. Data wavefronts and operators passively wait to be controlled by a command wavefront. A single coherent relationship structure has been fragmented into two relationship structures with no inherent connection. Unique place in a structure of association relationships has transformed into a combination of unique place in memory and unique place in an a sequence of commands.

These two expressions must be properly coordinated with each other to correctly express the process. There are many possible correct command sequences, and the memory mapping is completely arbitrary. It is easy to get the coordination wrong. None of this variability of expression is present in the original example association expression of FIG. 121.

9.2.6 Commands in Memory

The command ring is just a memory for the command sequence that presents the commands one at a time in sequence. With a large generally addressable feedback network each command wavefront can just as well be stored in the feedback network and the command ring can contain just a sequence of feedback network addresses. Each command can be fetched and instantiated in sequence and then sent back to its address to be enabled another time.

9.2.7 SubExpressions and Iteration

If the pre-addressing of the feedback network is ordinal, the commands can be placed in consecutively ordered addresses and the address ring can contain, instead of a sequence of addresses, an address generator that generates consecutively ordered addresses. A command can be added that sets the address of the address generator so that it starts generating a sequence from a new pipeline address. This way a greater sequence can be composed from lesser sequences located at different places in the pipeline network. If a command can set the sequencer address dependent on some data state, a command sequence can be composed conditionally in relation to states of data.

9.2.8 Indirect Addressing and Data Structures

The ability to change the sequencing location means that some sequences can be composed multiple times. It makes little sense that the same sequence be applied to the same data multiple times, so each instantiation of the sequence should be presented with a different data set to resolve. If the commands in the sequence refer to specific feedback pipelines, the contents of the pipelines can be changed between instantiations. Another possibility is that with ordinal addresses the pipeline addresses of each command can be relative to a base address that can be changed by a command between each instantiation, allowing a command sequence to be instantiated over and over on different sets of data at different places in the memory enabling iteration behavior.

9.2.9 A Generally Configurable Expression

A sequence of commands composed of short command sequences at different places in memory can operate on patterns of data reference composed of common subpatterns of data reference at different places in memory. Any association expression, including expressions that associate through time, can be mapped into the configurable expression.

9.2.10 The Conventional Synchronous Sequential Architecture

The configurable expression presented so far is still a logically determined pipeline structure of spontaneously flowing wavefronts coordinated with completeness relationships. A command wavefront splits into field wavefronts that flow to the steering structures, enabling wavefronts patiently waiting in the memory pipelines through an operator and back to a memory pipeline. It is a short step from this point to the traditional synchronous architecture with a conventional passive memory, a controller and an ALU—all coordinated with a global clock. With a conventional memory a location can be read multiple times, so the chain operator is no longer needed. The data flow is regimented in terms of clock tics instead of spontaneously flowing in terms of local completeness relations. Each tic of the clock is the expression of completeness. With the conventional memory and the clock the last vestige of logically determined spontaneous behavior disappears.

9.2.11 New Notions of Expressivity

In the process of incidentally extending expression in time, several new notions of expressivity arose: the notion of a single coherent addressable memory, the notion of passive data, the notion of addressable operators (ALU), the notion of strict sequentiality, the notion of explicit sequence control, the notion of the serial bus, the notion of a sequence of symbolic reference and the notion of interpretive resolution of a symbolic referential expression.

9.3 Summary

Extension of an expression in time may simply be an incidental feature of a particular expression in contrast to an additional dimension of differentiation and appreciation. Any expression can be extended in time in many ways, all of which involve memory. Memory may often be much cheaper than other resources of expression, and memory can support flexibility of expression enabling symbolic interpretation.

10 Points of View

The first step of process expression is a point of view. What are the differentnesses of the process? How are they associated? How do they interact and appreciate? The answers to these questions form a point of view. There can be different points of view for any given process, leading to radically different expressions of the process. This chapter explores example processes from differing expressional points of view.

10.1 Number as Differentness

Number is an expression of ordered differentness. The differentnesses can be ordered with uniform intervals of differentness, creating a cardinal metric typically expressed as a uniformly ruled number line. Differentness is characterized as place on the number line in terms of quantity of intervals from an origin. Two different numbers represent two different places on the number line. If two numbers are identical, then they represent the same place on the number line.

In the abstract, each number is a unique differentness. But, in practice, a number is represented symbolically with a limited number of actual differentnesses: a limited set of unique digits. This is accomplished with multiple ordered digit positions, each of which can contain any digit of the set, each position imparting a different meaning to its contained digit. This is called a place-value number, where place refers to the position of a digit and value refers to the actual digit at the position. In a place-value number, each digit position in the number represents a different granularity of differentness of place on the number line, with the rightmost digit representing the finest granularity and the leftmost digit representing the coarsest granularity.

The range of differentness represented by each position of a place-value number is determined by the number of available digits. Two digits is a binary range, eight digits is octal, ten digits is decimal, sixteen digits is hexadecimal, and so on. With eight digits there can be a first representation of eight differentnesses. Using the digits again in a different position, there can be eight differentnesses of eight differentnesses. Using the digits again at another position, there can be another gradation of eight differentnesses of eight differentnesses of eight differentnesses, and so on.

A reference point in the sequence of digits represents a baseline granularity of the number line. A place-value number is indefinitely extendable about this reference point. Digit positions progressing to the right of the reference point increase the fineness of the granularity of differentness of place on the line, extending the precision of a number. Digit positions progressing to the left of the reference point increase the coarseness of differentness of place on the line extending the range of a number. The number of positions in a number bounds the extent of unique places represented on the line. A four-position decimal number represents places 0000 to 9999, ten thousand uniquely different places, on the line.

A place-value number is a successive approximation of the place on the line. The leftmost decimal digit of a four-position number indicates the neighborhood of thousands. The next right digit indicates the neighborhood of hundreds within the thousands neighborhood. The next indicates the neighborhood of tens within the hundreds neighborhood and, the rightmost digit indicates the place itself within the tens neighborhood. It is a hierarchically nested progression of uniform differentness representing finer and finer granularity of place on the number line.

A place-value number can guide a progressive search for a place on the line. One might view a number as similar to a file system path name: /9/5/6/4/3 for the decimal number 95643.

10.1.1 Interaction of Numeric Differentness

Places on the number line can interact to represent new places on the number line. In the abstract, two distances-from-the-origin can be directly catenated in a single behavior to represent a new distance-from-the-origin place on the line that is the addition of the two distances. But, in practice, the interaction of place-value numbers representing the places must be expressed as a method of manipulating the digits of the numbers representing the two distance-from-the-origin places resulting in a new place-value number representing the new distance-from-the-origin place on the line.

The addition of place-value numbers is accomplished by combining the digits of commensurable granularity on the number line to produce a new digit for that granularity. Commensurable granularity is expressed as positions equally relative to the reference point of two numbers with identical baseline granularity. Digit addition is the catenation of the distance represented by each digit within their granularity domain. It might occur that a combination of digits spills out of their granularity domain into a neighboring granularity domain. This eventuality has to be communicated as a carry digit to the combination of the next coarser digits. Because of this propagation of influence each digit combination must wait on the completion of the combination of the next finer granularity digits. Consequently the addition of place-value numbers proceeds sequentially from the finest granularity digit positions to the coarsest granularity digit positions. The combination of two numbers does not represent a new place on the number line until all the digits of both numbers have been combined in sequence to produce a new number representing a complete path to the new place on the number line.

Place-value numbers provide a general method of expressing differentness and its interaction with a common referent (the number line), a common structure (the place value number), a common set of digits (0-9) and a common set of interaction behaviors (arithmetic). This commonality enables a uniform characterization of differentness and the interaction of differentnesses: a general form of expressing process behavior.

10.1.2 Projecting Numeric Differentness

The number line can be projected in many different ways into many different circumstances to provide a referent for and representation of differentnesses of the circumstances. Two number lines intersecting orthogonally can represent a two dimensional reference frame, and two numbers (a number for each line) represent a place on the plane of the reference frame. Three orthogonal number lines can represent a three-dimensional reference frame that can be projected in space, creating a referent of spatial differentness with three numbers representing a place in its space.

The ordinality, cardinality, and indefinite extensibility of place-value numbers can be used anywhere in the context of a projected reference frame to characterize spatial behaviors in terms of numeric differentnesses and interaction relationships among the numbers.

10.2 A Landing Eagle.

Consider an eagle landing on a tree branch.

10.2.1 The Numeric View

To characterize the process of an eagle landing, one might project a 3D reference frame about the tree extending indefinitely in all directions, define a reference frame for the eagle within the reference frame of the tree at some point prior to landing, and specify orientations for the wings, the talons and the head and eyes within the reference frame for the eagle. The landing can then be characterized as a spatial translation of the eagle onto the limb within the common 3D reference frame.

The spatial distance and orientation between the eagle and the tree branch can be determined. Coordinate translations of the head, wings and talons can place the eagle on the branch in a single translation step. This translation can be calculated with the place-value numbers representing the position of the branch, the position of the eagle and all its parts and the equations of coordinate translation. The calculations are complex algebraic equations carried out on vectors and matrices involving an enormous quantity of interacting numbers. Each number interaction resolves sequentially through all its stages of digit position approximation.

If one wishes to simulate the landing in stages, this translation computation can be repeated in small increments of position each closer to the branch until the eagle is perched on the branch. Each step of the sequence must be calculated to the full precision of the reference frame to provide a current orientation for the calculation of the next step until the eagle is perched on the branch. Presumably the finer the increments of position and the finer the granularity of the numbers, the more closely the simulation represents a real eagle landing on a real branch.

Some people marvel that animals can perform the calculations necessary to walk and jump and catch Frisbees. There is an assumption that nature, through evolution, has come up with very clever ways to perform the necessary numeric calculations within the reference frame. Perhaps calculation within the reference frame has nothing to do with it. Perhaps it is just a matter of a different point of view.

10.2.2 The Eagle's View

Consider the problem from the point of view of the eagle. The eagle cannot project a high-precision 3D reference frame onto the world, measure places in the frame with high-precision numbers and interact the numbers with complex equations to land on the branch. The eagle only has the reference frame of its field of vision. Instead of projecting a 3D reference frame onto the world, the world projects onto the eagle's 2D field of vision.

In the vision field there will be a distance and direction delta between the talons and the branch. This delta can resolve to a number of behavior variables that fan out to the wings, the talons, the head and the eyes as a first coarse approximation to the landing problem. The resulting body movements cause a change in the vision field of the eagle, which results in a new delta value that resolves to more values fanned out to the wings, the talons and the head and eyes as a finer approximation to the landing. As the eagle nears the branch, body behaviors continue to reduce the delta between the talons and the branch until the landing is accomplished.

Assume that the delta covers a limited range of one thousand possible deltas within the vision field. The eagle keeps its eye on the branch centered in the field of vision. A thousand neurons distributed over the vision field can represent a thousand different delta (radius vector) values relative to the center of vision, only one of which will fire at a time. Think of the compound eye of the bee. Bees can land on branches too. The neuron that fires can then contribute to generating the body variables that direct the wings, the head and the talons.

Assume that the body parts have small relative behavior ranges and that the generated body variables each have a range of 5 possibilities that can be represented with five neurons. The body parts are directed though a progression of small changes that guide the eagle and its vision field onto the branch.

The eagle's reference frame is its field of vision, which has a direct relationship to its body parts. The expression of the eagle is arranged so that it uses only necessary difference relations in a fairly short progression of direct interactions to effect each iteration or approximation of the landing behavior. Its body movements and its path through space are never characterized in the context of any external reference frame, they are characterized only in terms relative to the vision field and the body of the eagle. The vision reference frame is not a projected reference frame but is integral to the expression of the eagle and its behavior.

The expression of the eagle is a structure of rings with part of one-ring path passing through the branch. There are command paths to the body parts and return paths indicating current position in relation to the body. The ring through the branch is through the whole body of the eagle, through the branch, through the eyes and to the body part command generation as shown in FIG. 133.

The vision field delta is represented as a thousand unique differentnesses by a thousand neurons. Each body variable is represented as five unique differentnesses by five neurons. These are direct representations of local differentness that perform specific local tasks. They are not numbers in the conventional sense.

The eagle knows nothing about the numeric reference frame, about coordinates, about place-value numbers or about how numbers behave in relation to the reference frame. The eagle is not doing anything remotely like numeric calculation as humans understand it.

But why doesn't the eagle use place-value numbers? To contrast the representation of direct differentness with the conventional notion of number, the notion of a single digit number is introduced.

10.3 The Single-Digit Number

A single-digit number represents its entire range of differentness with a single-digit position. One might think of it as adjusting the radix of the number to match its range so that a second-digit position is never needed. If a number represents 50 differentnesses, there are 50 digits. The digits might be 50 unique symbols or 50 unique places in a network of association relationships.

Each single-digit number has a unique set of digits that interact by direct association in a single behavior with digits of other single-digit numbers in terms of a unique set of value transform rules. Each number is unique, and each interaction is unique. There is no necessary commonality of structure, or commonality of digits, or commonality of interaction behavior. There is no number line, no ordinality and no cardinality.

Initially this must seem a major shortcoming of the notion of the single-digit number. There is no foothold of commonality for analysis and comparison of single-digit number expressions. But, while commonality has its use, it also has its cost. Specifics can be obscured by commonality, and many things can be properly understood only in the specific. Commonality can also be very expensive. Combining multitudes of place-value numbers is not cheap. The specificity of single-digit numbers provides a directness of expression and efficiency of behavior that place-value numbers cannot provide.

10.3.1 Single-Digit Number Expressions

Because single-digit numbers interact with a single behavior, a single-digit number expression is a network of directly associated single-digit numbers. This network of association relationships is the counterpart of the algebraic expression for place-value numbers.

Logic, as it is used in designing electronic circuits, is a single-digit number system with a common set of digits and common set of interaction behaviors. Each logical variable (number) has only two digit values, TRUE or FALSE, NULL or DATA, represented as a single digit position. These single-digit numbers are directly combined as a network of directly interacting logical operators.

Single-digit number expressions can be directly mapped to real world behaviors. Real world behaviors can also be mapped directly to single digit number expressions. If real world behaviors are mapped to place-value number expressions, confusions of commonality arise. Implications of ordinality, cardinality, extensibility and spatial placeness of differentness are introduced. None of these qualities have any relevance to the behavior being mapped. These confusions do not arise with single-digit number expressions. There are a multitude of real world behaviors that are single-digit number expressions and very likely not a single one that is a place-value number expression.

Both commonality and specificity have their appropriate places.

10.3.2 Two Methods of Approximation

With place-value numbers and the projected reference frame the eagle can be translated to the branch in a single translation calculation. Even though the calculation is carried out as a single abstract step, it is still calculated as an enormous quantity of numeric interactions, each of which resolves as an iterative progression of successive approximation. If the landing is carried out as a sequence of N translations, the enormous quantity of numeric approximation steps is multiplied by N.

The single-digit number expression of the eagle cannot perform the landing in an abstract single calculation step. It must calculate the landing in an iterative progression of approximations, each approximation being an iteration of the full expression.

The eagle landing can be structurally related to the addition of two place-value numbers as an iterative resolution of successive approximations. The eagle number, structured through time, is composed of the sequence of vision field deltas, with each delta being a finer approximation of place in the vision field. The succession of deltas corresponds to the order of digits of the place-value numbers. Each vision field delta is resolved with a constant expression: the body of the eagle. Each resolution produces a new delta (the carry) to the next iteration. This constant expression resolving each vision field delta corresponds to the constant expression of the digit addition table resolving each digit in turn with a propagating carry value. Both the eagle landing and two place-value numbers being added resolve as an iterative progression of approximations, with each approximation expressed in a common format and resolved with a common behavior.

10.3.3 Two Views of Expression

The projected world frame and the eagle both express the same process of the eagle landing on the branch by way of symbolic calculation. Each is a very different expression of differentness and its interplay, but In both cases the eagle moves identically through space to land on the branch.

The projected world frame provides a generalized accounting that is remote from the reality of the eagle. It can equally characterize a squirrel's landing on the branch or a saw cutting the branch. It embodies an indifferent generality that precludes an intimate specificity. While it may seem that the most encompassing generality will provide the deepest understanding, this is not always the case. Bounds of representation and nuances of meaning are lost in the expressivity of the numbers and the generality of their application.

The eagle expresses the behavior of the eagle and nothing else. There is nothing common or general about the expression. Another bird might proceed similarly but not identically. The landing expression of a squirrel might be quite different.

There is nothing incorrect about a numeric characterization within a projected reference frame, but it contributes no insight whatever into how a real eagle goes about landing on the branch. It cannot be directly instantiated and become an instance of a real eagle landing on a branch. It just saves the appearances of the process. While this is exactly how an imaginary, but very real looking, eagle landing on the branch with feathers fluttering in the wind would be generated by computer for a movie, the real eagle does not care in the least how it appears while landing and least of all how its feathers flutter in the wind.

The projected world frame is an external observer's view of differentness. Its characterizations of process may seem complete and precise but may actually be unnecessarily complex and superficial. A projected reference frame is an arm's-length external view that cannot characterize the differentnesses inherent to the behavior itself. Nature can be observed in terms of projected reference frames and place-value numbers, but nature itself speaks in terms of embedded reference frames and single-digit numbers representing direct interaction among specific differentnesses. The place-value number is an incidental encoding method of humans and while projecting it onto nature can be very useful it does not always unlock her secrets. Table 10.1 compares place-value numbers and single-digit numbers.

TABLE 10.1

Comparison of place-value numbers and single-digit numbers.

| Place-value numbers | Single digit numbers |
|---|---|
| Indefinite range of differentness | Limited range of differentness |
| Multiple digit positions | A single digit position |
| Each number uses the same set of digits | Each number may use a different set of digits |
| They interact with a sequence of digit interactions | They interact with a single behavior |
| Is cardinal and ordinal | Is neither cardinal nor ordinal |
| Common algorithms for interacting numbers | Each interaction is unique, no common algorithms |
| Too general: wasted expressivity and computation | Just right: no wasted expressivity, no wasted computation |
| Common reference frame | No common referent |
| Indirect representation of differentness | Direct representation of differentness |
| Place-value numbers are a general form that relate to the global reference frame | Single digit numbers are a specific form that relate directly to each other locally |
| Profligate with resolution behavior | Parsimonious with resolution behavior |
| Parsimonious with digit value sets and interaction behaviors | Profligate with digit value sets and interaction behaviors |
| Enables extended abstraction | Does not support abstraction in the conventional sense. |

The notion of the single-digit number has allowed a convenient comparison of an unfamiliar form of expression with the familiar place-value numbers, but a single-digit number is not a number in any conventional sense of the term. The single-digit number expression is just another way of talking about pure differentness expression, such as a pure value expression or the pure association expression of the eagle.

10.3.4 The Eagle's Answer

For mathematics and computer science the goal of a computation or a program is an answer. At the end of the process of the eagle landing there is not the appearance of an answer so much as the disappearance of a question. The eagle is on its perch. The question of how to land on the perch is resolved, not by supplying an answer but by progressively eliminating the question. Even if some kind of output that can be characterized as "an answer" is produced it does not remain relevant beyond the actual landing. The next landing problem will be slightly different with a slightly different "answer."

Nature is about the ongoing interplay of patterns of differentness, not about numbers and answers. Number is an incidental encoding technique of humans. The notion of an answer is an artifact of a particular style of human thinking.

10.4 Formalism vs. Form

From the point of view of formalism, differentness is expressed with structures of passive symbols. Association and interaction of the symbols is expressed as a process manipulating the symbols within their structures. Some think that understanding a process as a formal symbolic process is the important thing and that understanding a specific form of expression is unnecessary. The ultimate formalist expression of the eagle would be as a Turing machine program.

To produce a formal expression of the eagle, the expression of the eagle must first be understood on its own terms. But, if one has achieved an understanding of the eagle on its own expressional terms, it is difficult to see how binarizing, algorithmizing, sequentializing and reducing it to a Turing machine program can in any way enhance that understanding.

One aspect of the formal symbolic computation point of view is that it may be possible to elucidate the symbolic computation of a process expression without understanding the form of that expression itself. If the form of an expression is largely inaccessible, such as a brain or life, then focusing on symbolic computations with similar behaviors might offer a path to understanding that is otherwise unavailable. One might, for instance, focus in great precision on the external spatial behavior of the eagle in the projected reference frame and be able to determine the differential equations that the eagle must be solving to perform its landing. But, if one looks inside the eagle, there is nothing like a numeric differential equation solve, and the notion that it is solving differential equations does not help one in the least understand the actual symbolic computations the eagle performs in its landing and how it performs them.

The formal symbolic view, in its extreme—that symbolic computation independent of form of expression is the only valid path to understanding—is not a fruitful point of view. Intrinsic form of expression cannot be ignored.

10.5 This Primitive—that Primitive

A point of view grows from a primitive concept. A theme of this book is the consequences of choosing a primitive concept of expression: the notion of a stateless primitive or the notion of a state holding primitive. Two choices of primitivity leading to profoundly different points of view.

10.5.1 The Stateless Primitive

When stateless mappings are composed races and hazards produce incorrect nondeterministic results before settling to a correct deterministic result. This can be remedied by adding a timing interval to the expression that indicates when the nondeterministic behavior is over and the expression has settled to the correct result. The logical relationships of the functions become isolated by the timing interval, so further composition must be in terms of the time intervals instead of in terms of logical relationships. Time intervals cannot be composed concurrently for the same reasons of races and hazards that the stateless mappings cannot be composed. They must be composed synchronously or sequentially. In the modern computer circuits are composed synchronously, and operations are composed sequentially.

A sequence of operations cannot spontaneously sequence itself, so there must be a notion of explicit sequence control to instantiate and un-instantiate each operation in sequence. Data flowing between operations must be parked someplace while awaiting destination operations to get their turn in sequence, so there must be a notion of an addressable memory.

There can be many valid sequences and many valid memory mappings. The variability of expression does not provide a coherent characterization of process that supports comparison and validation. For a coherent characterization of behavior one must appeal to transitions in a state space. Between the instantiation and un-instantiation of each sequential operation there exists a static state that can be conveniently sampled and examined. The expected behavior of the sequence of operations can be characterized in terms of successive state transitions, and the behavior of any instance of the expression can be validated by comparing the actual behavior of its state space to the expected behavior of the state space.

The time interval, synchronous composition, sequential composition, explicit control, addressable memory and state space are all interlinked, mutually supporting concepts that derive from the primitive notion of stateless mapping. One cannot find one's way to a different view by incremental adjustment of any of the concepts. One gets continually pulled back into the view by the other interlinked concepts. For instance, if one attempts to consider concurrency, then one is faced with the complexity of control and the indeterminacy of the state space. If one attempts to distribute memory, one is confronted with the variability of sequence and the arbitrary mapping of memory. Attempting to avoid the time interval leads back to races and hazards.

A conceptual point of view can appear general, encompassing and ideally suited within its own context. It can also make other conceptual views appear less than ideal. Sequentiality appears straightforward and much simpler than concurrency, but this is only if sequentiality and concurrency are looked at from the point of view of sequentiality.

10.5.2 The State-Holding Primitive

If one starts over with state-holding primitives that understand how to behave among themselves, then a quite different conceptual regime emerges.

A composition of state-holding primitives can cooperate in terms of logical relationships to deterministically coordinate the flow of resolution from primitive to primitive with no races and no hazards. This composition of logically determined behavior is indefinitely extendable. Since there is no nondeterministic behavior, there is no need of the concept of a time interval. Without the time interval there is no need of synchronous sequentiality. Since the state holding primitives interact directly in terms of logical relationships, there is no need of explicit control. The state-holding behavior of the primitives maintains the flow of resolution in the association paths among the primitives. There is no need for a notion of an addressable memory. Finally, since the behavior of a network of primitives is completely determined and fully characterized by logical relationships, there is no need of the notion of a state space. Since the behavior of the individual primitives of a network is not synchronized, there is no instant of reliable sampleability making the notion of a state space meaningless anyway.

10.5.3 The Consequences

Table 10.2 contrasts the consequences of each point of primitive view. While the concepts in the left column lists concepts that must be added to the concept of the stateless primitive to make it work, the right column lists behaviors integral to the composition behavior of state-holding primitives. The state-holding primitive is sufficient in itself. No further supporting concepts need to be added.

TABLE 10.2

Consequences of primitive beginnings

| Concepts Necessary to Support Primitives with Stateless Behavior | Behaviors Inherent to Primitives with State-Holding Behavior |
| --- | --- |
| Time interval | Logical completeness |
| Synchronous composition | Distributed local behavior |
| Sequential composition | Concurrency |
| Explicit control | Cooperation |
| Addressable memory | Distributed content flow |
| Extended state space | Logical determinism |

One view of primitivity leads to a view of process expression that is a contrived scaffolding of interlinked mutually supporting ad hoc concepts that makes process expression difficult, expensive and unreliable. Within this view concurrency is extra conceptual and is even more difficult, expensive and unreliable.

The other view of primitivity leads to a simple conceptual milieu. The single concept of the state-holding primitive suffices. No other supporting concepts are necessary to express arbitrarily complex processes. In this view the expression of concurrency is simple and reliable, while the expression of sequentiality is a complex, expensive and unreliable special case of concurrency. The state-holding primitive leads to the simpler, more encompassing and unifying point of view.

10.6 Big Thengs—Little Thengs

Both nature and humans compose expressions of increasing appreciation stride. Humans begin with small thengs with small appreciation stride: a small set of values and a small set of value transform rules such as binary variables and Boolean logic functions. From such a well defined kernel of behavior, they and compose very large association expressions with complex patterns of behavior that accumulate appreciation stride through time.

Nature also begins with small thengs providing a small set of values and value transform rules, such as elementary particles in the seething disorder of a pure value expression. It composes the small thengs into big thengs with very large sets of values and very large sets of value transform rules. With a little more sense about the importance of time and economy of behavior, nature composes these big thengs into small association expressions with direct and immediate behaviors. Two exceptions are the brain and DNA, which are very large association expressions.

10.6.1 Nature's Big Thengs

Nature's primitive behavior rules are continuous and undirected, but they support the formation of persistent loci of collective behavior. Out of an uncoordinated chaos of particles the proton, the neuron and the electron compose in continuous undirected behaviors to form 92 atoms. These 92 atoms are stable loci (new thengs) asserting 92 new values and a multitude of new interaction rules. These new thengs with 92 values, still in a seething chaos, associate with continuous undirected behavior to form larger stable loci, molecules (new thengs), asserting innumerable newer values and interaction rules.

When atoms interact to form molecules, the interaction behavior of the atoms within the molecule is continuous and undirected, but the value of each atom is preserved. When molecules interact, molecular value is not preserved. When two molecules interact, the interacting molecular values disappear, and new molecular values appear. Because the atoms retain their identity they are a discrete units of molecular change. Molecular interactions are, therefore, discrete and directed. With molecules, pure value expression has emerged from the continuous behavior of particles and atoms.

As these molecules become bigger and more complex, the possibility of directed association emerges. Molecules with two ends that interact differently allow the building of association structures, such as the cell membrane, that can express a bounding association relationship of a pure value expression.

As molecules become even bigger and more complex, proteins emerge that express very specific value behaviors within a very large range of value differentness. Molecules develop an input end and an output end, and a unit of association emerges. Units of association can associate directly to form association expressions, or they can serve as receptor proteins to associate pure value expressions through their bounding membranes.

With each stage of composition the components of expression are subsumed by a wholeness of behavior, which is not a simple sum of the components. Each stage of composition creates a new domain of differentness and appreciation behavior. Atoms are not particles and do not behave like particles. They create a new domain of differentness and appreciation among themselves. Molecules create a new domain of differentness and appreciation. Complex molecules such as proteins create yet another domain of differentness and appreciation.

From the point of view of nature, these persistent structures of association are just bigger thengs with more complex sets of value transform rules drifting in the greater pure value expression. The bigger thengs, however, begin taking themselves somewhat more seriously as an ultimate referent for all they encounter. Eventually very big thengs arise that call themselves human and invent things like numbers and arithmetic, and many other referents to project onto other expressions in their neighborhood.

10.6.2 Composition Strategies

Humans are methodical and orderly. Nature is opportunistic and disorderly. Humans begin with a precisely defined kernel and increase stride of appreciation by composing precisely defined patterns of association through levels of hierarchical composition, accumulating more and more complex association encoding in terms of a few values. Nature begins with an enormous chaos of behavior and increases stride of appreciation by spontaneously composing persistent loci, new thengs, through levels of hierarchical composition that assert a greater and greater range of unique values and unique appreciation behaviors. Humans tend to minimize value differentiation, nature tends to minimize association differentiation.

10.7 Observer—Participant

The points of view of an observer and a participant can be quite different. Consider a population of free but contained particles.

10.7.1 Behaving Particles

There is no observer and no reference frame. The particles are autonomously behaving and are entirely on their own. Each particle can sense proximity of interaction with another particle and knows how to behave in an interaction. Differentness for a particle is proximate or not proximate and kind of particle. If proximate, the proximate particles appreciate their differentness by interacting.

The autonomously behaving particle expression itself is a fully distributed, autonomously behaving pure value expression. The differentness within the system is appreciated by the particles themselves. There is no reference frame nor spatial metric integral to the expression itself. A particle appreciates nothing about relative place in space or path through space relative to the other particles. It can only appreciate proximity to kind of particle. It can appreciate nothing of the extended system of which it is part.

10.7.2 Observed Particles

An observer is a sufficiently complex expression that can project a reference frame of sufficient precision onto another expression being observed and internalize the observation. Differentness for the observer is place in the reference frame and kind of particle. Process for the observer is motion within the reference frame and particle interactions. The observer's internal representation is necessarily referential and symbolic. It cannot be an instance of the observed expression.

In this case, unlike the case of the eagle, there is a very large difference in stride of appreciation between the observer expression capable of projecting a reference frame and internalizing the results and the expression of the particle system. The behavior of the particles can be relatively very simple and the observer expression can be complex enough to embody a useful characterization.

10.7.3 Observer and Participant

A complex observer expression is a meta view in relation to a simple observed expression. It can encompass and appreciate a wholeness of the particle system that the individual particles or even the system of particles itself cannot appreciate. While the observer characterization within the reference frame may seem complete and thorough in itself, the experiences and appreciations of the particles themselves are not captured in this characterization. The observer might consider the projected reference frame as part of the reality of the particle system itself, but it is not. The observed participants manage to behave without the projected reference frame and without any possibility of appreciating anything like an encompassing reference frame, relative place in space or trajectory through space. An individual particle has no stride of appreciation: no reference frame. From the point of view of an individual particle it is absolutely motionless, and nothing ever happens. An electron has enough stride of appreciation to sense proximity and to interact by, for instance, flipping its spin, but it does not have sufficient stride of appreciation to remember the previous spin. It can have no appreciation that anything is different.

While observation through a projected reference frame appears to completely and thoroughly characterize the system of particles, it does not characterize the experience and point of view of the participants. To properly characterize an observed expression, the points of view of the participants within the observed expression must also be considered.

The observation of the eagle through a projected spatial reference frame characterizes the behavior of the eagle in terms very specific to the observer. This provides a partial picture of the expression of the eagle, but to completely understand the eagle, the observing expression must also encompass the eagle's point of view. The notion of single-digit numbers is an attempt to bridge the numeric projection view of an observer and the pure association expression of the eagle.

An observer is just another expression, just another participant with its own inherent limitations of appreciation: an arrogant bulk messing about with other "observed" expressions. While an observer expression may be able to observe and thoroughly characterize within itself an expression that is much simpler than itself, it is not capable of fully appreciating itself or another expression of comparable complexity. An observed expression thoroughly characterized within the context of an observer expression that cannot, itself, be thoroughly characterized is a fundamental quandary, at its most mischievous when observer and observed are commensurable such as humans observing humans or photons observing photons.

Complex expressions can effectively observe simple expressions, commensurable expressions cannot effectively observe each other, and clearly, simple expressions cannot observe complex expressions. A complex expression observing simpler expressions is the realm of science. Commensurate expressions observing each other is the realm of psychology. Simpler expressions observing more complex expressions is the realm of sociology and philosophy.

At some level of complexity an observing expression might strive to transcend its limitations and glimpse itself and its greater encompassing expression. The only path to transcendent appreciation is the accumulation and organization of experience, which might possess a stride of appreciation that the observing expression itself does not posses. But the inherent limitations of the observing expression are still a quandary. The enterprise of science is an attempt to transcend this quandary by accumulating and trying to organize experience with experiment and theory.

10.8 Invisible Behaviors and Illusory Behaviors

An observed autonomously behaving expression behaves with an intrinsic point of view. An observing expression must discover a point of view that most clearly elucidates the observed expression and its point of view. There may be limitations of interaction between observer and observed, and there may be limitations of characterization capacity in the observing expression that precludes many points of view. There may be behaviors that are only observable and expressible from particular viewpoints and that can be neither expressed nor observed from other viewpoints.

It may be that any single point of view has illusory behaviors that obscure and render invisible real behaviors. It may be that any single point of view is never sufficient in itself. Illusory behaviors typically occur at the limiting edges of a point of view. One must avoid the dangerous edges of the flat earth. One cannot, in principle, travel to the heavenly moon in its crystalline sphere. Concurrency is inherently complex and nondeterministic. The illusions of a point of view obscure behaviors that are consequently invisible to the point of view.

From a different point of view the illusions disappear and the invisible becomes visible. One can sail as far as one likes toward the edge of the world without falling off. One can travel to the moon. Concurrency can be simple and deterministic.

The illusions are an inherent part of a point of view. From within a point of view they are just inherent limitations about which nothing can be done. They can only be transcended from a different point of view. One must step outside the point of view for a different perspective. If one cannot discover the other point of view, the illusions can seem very real, inevitable and unavoidable.

10.8.1 Complementary Chaos

The invocation model consists of two complementary points of view. A pure value expression can only be observed from the point of view of the behavior of the values. If one observes it only from the point of view of spatial relationships, it appears to be undifferentiated chaos.

A pure association expression can only be observed in terms of its association relationships. Observing the expression in terms of the behavior of the values without regard to their place in the association structure appears to be an undifferentiated chaos of identical values incoherently transitioning.

What is invisible, obscured by an illusion of chaos, from one point of view becomes visible orderliness from the other point of view.

10.8.2 Complementary Order

Value expression and association expression can be considered two quite different views of process expression with a complementary relationship. Neither is viable in the absence of the other. There must be an expression of association in a pure value expression, and there must be an expression of value transition in a pure association expression. Neither can be observed in terms of the other, but they cooperate with interweaving expressivity to transcend their individual limitations and form expressions of indefinite complexity that must be considered in terms of both points of view.

10.8.3 Chaotic Flow or Orderly Flow

Consider the skewed wavefronts of Section 7.2.5. If they are viewed in terms of time relationships and spatial relationships in the context of a spatial reference frame projected onto the expression, they appear chaotic and uncoordinated. It might be possible to derive some complex formulas of space and time to tease order out of the observed chaos, but the order can be directly appreciated by just changing point of view. The behavior of the wavefronts is quite orderly from their own point of view of logical coordination relationships. If they are externally viewed in terms of the logical relationships that are determining their behavior, the appearance of order emerges. The appearance of disorder, or the invisibility of order, was just an illusion of a particular observational point of view. The projected point of view can see a larger picture than the participants but it cannot see the orderly behavior of the participants in the larger picture that it sees.

10.8.4 Asymmetric Points of View

Sequentiality and concurrency are two asymmetric points of view. The point of view of sequentiality does not encompass concurrency and cannot see the simplicity of concurrent behavior, the point of view of concurrency encompasses sequentiality as a special case of concurrency.

10.8.5 Finding a Point of View

There is no final right answer. There is only the best that an arrogant bulk can accomplish with hints such as inconsistency, incoherence, nonconformance with experience, overly capable concepts, inconvenient or arbitrary limits, and so forth.

10.9 Slippery Words

A way of saying can subtly convey a point of view. It has been reiterated for almost this entire book that an expression recognizes a presented input and asserts an appreciating behavior. One might also say that the behavior of an expression is controlled by its presented input. Or that an expression adapts its behavior to its presented input. Or that an expression manipulates the presented data. Is an expression just a static referent in space through which dynamic change flows? Does an expression grab its input and consume it? These are markedly different views of who is doing what to whom, of what is primary activity, of what is secondary activity, and of where authority resides.

American computers execute instructions, while British computers obey order codes. The American phrasing conjures up a dynamic and authoritative computer taking command of its instructions and shepherding them along. The British phrasing conjures up a completely passive machine being commanded by the order codes. Both are characterizing identical circumstances, but the implicit assignments of activity, passivity and authority—a point of view of the circumstances—are quite different.

The persistent is not appreciable apart from the transient. The transient is not appreciable apart from persistent. Is differentness flowing through a structure of association relationships or is a structure of association relationships flowing through a sea of differentness. Change can only occur in a context of persistence. Persistence can only occur in a context of change. Where is the grounding? It is in a point of view.

10.10 Summary

A point of view cannot be avoided. Every expression behaves with an intrinsic point of view. Expressions observe other expressions at some level of mutual understanding that is sufficient to support interaction behaviors among themselves. Some expressions may become complex enough to go beyond direct interaction and may begin observing or playing with other expressions to build internal models of the other expressions.

To go beyond direct interaction, an observing expression must transcend its intrinsic point of view and adopt an observational point of view and project it onto the observed expression. The task for the observer is to characterize the observed expression as completely as possible within its own expression by interacting with the observed expression within the context of the projected point of view. The problem is that the observer has no ground truth. It cannot determine a priori what the characterization of the observed expression should be or what the appropriate point of view might be.

A chosen point of view determines what can be observed by and characterized within the observing expression. Different observers may have different observational concerns and capabilities. There might be aspects of an observed expression that are invisible to a point of view. A point of view may project properties onto an expression that are not inherent in the expression, such as complexity, chaos, or extensibility. It may actually create behaviors not inherent in the observed expression but that are artifactual illusions of the point of view.

What an observer sees critically depends on how it looks. Finding an appropriate point of view to characterize an observed expression is a fundamental problem. There are no definitive guidelines nor absolutely correct answers. It is easy to construct a point of view built of arbitrarily sufficient mortars that seems to be complete and definitive but really says nothing about the inherent nature of the observed expression. If it is so easy to be misguided, how can one tell when one might be right? There is no final certifiable correct answer. Discovering an appropriate point of view is a search guided by indirect clues. There are only interacting expressions with points of view doing what they can with the resources at hand.

11 Referential and Autonomous Process Expression

An autonomous process expression spontaneously behaves entirely on its own merits. It must be a complete expression in all respects. If any expression is missing, it will fail to behave. A referential process expression does not spontaneously behave on its own merits and so does not have to be a complete expression in all respects.

11.1 Autonomous to Referential

Referential expression emerges from autonomous expression.

11.1.1 Primitive Expressivity

The most primitive expression is a single primitive theng, its values and its value transform rules. A primitive theng does not express a process all by itself. A process is at least two primitive thengs associating, forming a name and spontaneously resolving. At this level, expressivity is symmetric. Each primitive theng is a differentness to be appreciated by the other. Each primitive theng is referent for the differentness of the other. Each changes its value in the resolution behavior.

11.1.2 Loss of Symmetry

When a persistent locus of association occurs, the symmetry disappears. Just as a primitive theng is a persistence relating changing values, a structure of associated thengs is a greater persistence relating a greater range of changing values. It has a larger stride of appreciation.

The association structure encounters individual thengs and their values and responds with a wavefront of value change flowing through the expression to an output boundary that asserts output values that are appreciations of the encountered input values. Note that the association structure appreciates the differentness of values of the encountered thengs. The encountered thengs do not have sufficient stride of appreciation to "appreciate" the association structure in any significant sense.

11.1.3 Meaning

The association structure itself does not change. The association structure, being persistent over many encounters of input values, becomes a de facto referent for the differentness of the encountered values. The expression imparts its own arbitrary meaning to the encountered differentnesses, a meaning that does not necessarily correspond to any meaning imparted to the same differentnesses by another expression.

11.1.4 Process and Data

The asymmetry can be characterized by the notions of process and data. The association structure can be called a process. The encountered values and the value changes flowing through the association structure can be called data. The process expression is an appreciator/referent/observer of the encountered data.

11.1.5 Intermediate Memory

Intermediate persistence memories can occur in the process expression that relate to and record specific encounter experiences. Upon similar encounter experiences the memories can present values to the expression that contribute to its appreciation of each similar encounter. The memories are integral to the process expression and they may be distributed throughout the process expression.

11.1.6 Internal Models of Encountered Expressions

An association expression may experience encounters not just with data but with other expressions also. The intermediate memory accumulates expressions of encounter experiences, and so assists the greater association expression in appreciating its subsequent encounters. The content of this memory is an observer's internal model of external encounters. The content of the intermediate memory is a partial referential expression of an external encounter. The partial referential expression along with the interpreting behavior of the greater association expression is an abstract model of an external expression. It is the best characterization of the external expression that the observing expression can muster.

An intermediate memory and its content are unique to an expression and are integral to the appreciation behavior of the expression. No other expression needs to be able to appreciate the values from the memories. The greater association expression generates the contents of the memories and then uses the contents of the memories. Even if the gross structures of the intermediate memory and greater association expression are similar among different expressions, there is no need for the specific content of intermediate memories or for the fine structure of the greater association expression to be similar among the greater association expressions. Even if external behavior is identical among greater association expressions, it does not imply identical internal expression. Think of all the ways of expressing binary addition with Boolean logic functions.

11.1.7 Common Symbols

Association expressions, however, can agree among themselves on a common form of external expression. They can collaborate through a mutually agreed-on common set of differentnesses (symbols) whose association structures (language) are identically or at least similarly appreciated among individual expressions. A specific structure of associated symbols is a symbolic referential expression.

A symbolic referential expression does not autonomously behave on its own merits but must be appreciated by an association expression. One association expression can leave a symbolic referential expression lying about, and another association expression can encounter it and interpret it in terms of its own appreciation behavior.

11.1.8 Symbolic Processes

Rather than relying on the inherent appreciation behaviors of a receiving association expression, a symbolic referential expression might include its own unique rules of appreciation behavior expressed with the same symbols and expressed simply enough for any association expression to grasp in terms of its own inherent appreciation behaviors. This will be called a symbolic process expression. A symbolic process expression can then be appreciated by a receiving association expression in terms of manipulating the symbolic expression according to the symbolic rules of behavior instead of being appreciated in terms of its own inherent behaviors. A symbolic process becomes not just similarly interpreted but identically interpreted among association expressions. The variations of individual expression and appreciation can be minimized to insignificance with the formalism of symbolic process expression.

Symbolic process expression relies on a very high level of persistence. Symbolic process expression fails if the symbols change or if the behavior rules change. The whole point is that, among themselves and through time, all participating association expressions see the same association structure of symbols and the same rules of behavior.

11.1.9 Transcendent Expression

Symbolic process expression is an external form of expression complete in itself and unambiguous in its own terms: a universal language identically appreciable by all expressions transcending the limitations of the association expressions themselves. Symbolic process expression offers a stable standard of communication among association expressions and a persistence of memory greater than the association expressions themselves.

11.2 Referential to Autonomous

A symbolic process expression is of no significance in itself. It is only significant in that the expressed behavior is realized. There are a number of ways that the behavior of a symbolic process expression can be realized.

11.2.1 By Association Expression

An association expression can interpret the symbolic process expression according to its rules of behavior.

11.2.2 By Artificial Expression

A symbolic process expression and its rules of behavior can be embodied in a specifically constructed artificial association expression.

By Direct Mapping

The symbols and their interaction rules can be mapped to spontaneous behaviors, and the behaviors organized according to the symbolic process expression. The symbolic process expression becomes an autonomously behaving artificial expression that realizes the single symbolic process expression.

By Interpreter

An artificial expression that embodies just the rules of behavior and a large symbol memory can be constructed to interpret symbolic process expressions. Symbol values can be physically represented in a common addressable memory, and an artificial expression can be built that can manipulate the physical representations of the symbols in memory according to the rules of behavior by shuffling symbol values around in memory.

A referential symbolic process expression can be translated into the interpreter's internal referential form of expression and placed in its memory. The behavior of the expression is then realized, as the artificial interpreter expression is directed by the internal expression of the symbolic process and manages the flow of content through memory.

An interpreter can be general in that any symbolic process expression might be mapped into it and have its symbols manipulated.

Mixed Artificial Expression

The direct mapping and the interpreter are two extremes of realizing the behavior of a symbolic process expression with artificial autonomous expression. There can also be a middle ground, which is partly interpretive and partly directly mapped.

The most familiar mixed artificial expression is the conventional computer. Expressions mapped to the computer are partitioned hierarchically at the level of arithmetic/logical operations. The greater partition expression is a network of references to arithmetic/logical operations, and the lesser partition expressions are the arithmetic/logical operations. The lesser expressions are directly mapped to artificial autonomous expressions, and the greater expression is interpreted. A set of directly mapped arithmetic and logical operations are collected in an arithmetic-logic unit (ALU) within which they can be referenced by an interpreter. The greater expression is mapped into a sequence of references to memory and references to the available arithmetic-logic functions and placed into the memory of the interpreter. A sequence controller then scans the internal referential expression, enlivening it in terms of content flow through memory and through the ALU.

Convenient Realization

The mixed artificial expression is a convenient means of realizing a large class of symbolic process expressions. The interpretive aspect makes it a general interpreter. Symbolic process expressions mapped into the mixed artificial expression do not have to refer to any of the ALU operations, in which case it behaves as a pure interpreter. An expression that does use the ALU operations can behave much more efficiently. A wide range of referential expressions can be quickly and simply enlivened by mapping them into a mixed artificial expression.

11.3 Economies of Referential Expression

Because a symbolic process expression does not behave, it can transcend the gritty details of autonomous expression and offer a convenient economy, generality and flexibility of expression, by taking advantage of various forms of shorthand expression. It can assume universal conventions that need not be explicitly expressed. It can assume common subexpressions that need not be explicitly expressed. It can be convenient to an originator of expression such as a human instead of specific to some autonomous behavior environment. It can be general in the sense that a single symbolic referential expression can represent and map to many other forms of referential and autonomous expression.

11.3.1 Hierarchical Parsimony

A common subexpression that occurs many times in an expression can be referred to many times but need be symbolically expressed only once. If a process has 1000 additions, a symbolic process need not explicitly express the adder 1000 times. It can express the adder once and refer to the adder expression 1000 times. When mapping to autonomous behavior, the references can be expanded. The single adder expression might be replicated to 1000 autonomous adder expressions, and one associated with each reference or a single autonomous adder expression might be used over and over in time, with each reference being associated to a single autonomous adder in sequence. A referential symbolic process expression is a template that can be mapped to other forms of referential symbolic process expression and to forms of autonomous expression.

Multiple references to a common expression is a hierarchical partition relationship and can be repeated at each level of hierarchy. No part of a referential symbolic process expression has to be expressed more than once, enabling a convenient economy of expression when commonalities of expression are present.

11.3.2 Partitioning Uniformity

Each reference is both a hierarchical and a lateral boundary and the structure of references directly expresses the hierarchical and lateral structure of behavior boundaries of the process. The hierarchy bottoms out with value transform rules, which have no hierarchical or lateral reference structure. The lateral structure has no inherent limits.

A symbolic process expression can assume that all of its boundaries are identical, providing a uniform template that can be partitioned in many ways and mapped to varied autonomous behavior domains. The identical referential boundaries of the symbolic process expression might be partitioned across multiple transistors, across multiple instructions, across multiple threads, across multiple computers, into different hierarchical regimes, and so on.

11.3.3 Coordination Simplicity

A referential symbolic process expression assumes that its identical boundaries are coordinated identically with a universal coordination protocol in terms of the completeness criterion and need not explicitly express coordination behavior. As a referential symbolic process expression is mapped to autonomous behavior, its boundaries get mapped into and stretched across different regimes of expression, both hierarchical and lateral, each requiring a different coordination protocol. Lower level coordination boundaries might be mapped to the completeness criterion and cycles or to time intervals and a clock. Higher level coordination boundaries might be mapped to sequence control, fork and join, semaphores, messages, and so on. Even higher level boundaries might be mapped to various forms of communication channels. Each autonomous coordination protocol implements in one way or another the behavior of the completeness criterion. A symbolic process expression provides a uniform template ready to be stretched and mapped and filled in with appropriate coordination behaviors.

11.3.4 Resource Indifference

A referential symbolic process expression can be completely referential down to the expression of the values and the value transform rules. It need not consider any particular detail of autonomous behavior or condition of available autonomous resources. There might be 1000 references to add, but the symbolic process expression need not be concerned with whether there might be 1000 adders available or only one adder available or with how an adder might be expressed. The issues related to specific or limited autonomous resources can be ignored by the symbolic process expression and resolved when it is mapped to autonomous expression.

11.4 Archetypal Referential Expression

A symbolic process can ignore many of the messy details of autonomous expression and express just essential relationships. It can use shorthand expression and assume universal conventions. It provides a template of essential relationships that can be mapped to many other forms of referential expression and to a wide range of autonomous expressions. Might it be possible that there is a most general, most convenient, most mappable form of symbolic process expression for a given process: a single archetypal expression of a process that captures the essence of the process and that can map to all possible referential and autonomous expressions of the process?

11.4.1 Elusive Essence

The essence of a process is the interactions of the differentnesses independent of how the differentnesses and their interactions might be expressed. While this essence is embodied in every possible expression of a process, like a platonic form, the essence itself cannot be directly expressed. How does one express something independently of how it might be expressed?

Consider binary digit addition. The essence of binary digit addition that all expressions of binary digit addition must relate to is the mapping of values, which can be expressed with a set of value transform rules as a pure value expression. While the mapping expression might be the essence of binary digit addition, it is not the essence of numeric addition. Binary addition is just one specific form of numeric addition. Numbers can be expressed and added with any radix.

Can the essence of numeric addition be referentially expressed. Since numbers are indefinitely extensible in precision and range their addition cannot be expressed as a symbolic mapping; their addition, however, can be expressed as a symbolic process that iterates over a sequence of digits of whatever radix from the beginning of the number to the end of the number. The strategy of iteration can vary. An iteration might directly map one, two or more digits per iteration. The radix can vary. There is a range of possible referential expressions, all equally expressive and no one expression more essential than any other. Symbolic expression of the essence of numeric addition eludes capture.

11.4.2 A Chosen Standard

The best that can be done is to choose a form of expression that most conveniently embodies some essence and invest in it as a standard. The criterion of convenience might be some familiarity, or minimality, or maximality, and so on.

Originator Familiarity

A standard form might be chosen because it is familiar and convenient to an originator of expressions and is easily mappable to autonomous and other forms of expression. An originator might find it most convenient to express radix 10 numbers. It is easy to translate any radix to another radix that might be required for autonomous expression such as radix 2. There might simply be a mapping between names familiar to an originator and names familiar to an autonomous expression. For example, a cell expression knows nothing of the human names adenosine, cytosine, guanine and thymine but, components of the cell understand perfectly how to recognize and interact with the real values corresponding to the human names. Programming languages are attempts at a standard form of expression based on mathematical language or on human language that is easily mappable to a conventional computer.

Expressional Minimality

A standard form of expression might be based on some criterion of minimality. A Turing machine, for instance, is based on minimal value differentiation. The pure forms of expression at each end of the spectrum are minimal forms of expression. A pure value expression has minimal association differentiation. A pure association expression has minimal value differentiation.

An expression encoded in the middle of the spectrum does not provide the same minimal directness of expression. It can possess arbitrary proportionalities of value differentiation and association differentiation. The continual un-encoding and re-encoding is an added complication that is not present with the pure forms of expression. A pure form of expression can easily be mapped to an encoded expression in the middle of the spectrum, but an encoded expression may not be as easily mappable to a pure form of expression.

Expressional Maximality

The referential expression with the finest granularity of hierarchical and lateral structure of boundaries expressing a maximum of distributed and concurrent behavior offers the most flexibility of partitioning and mapping to the greatest range of other forms of referential and autonomous expression. A pure value expression has maximal value differentiation. A pure association expression has maximal association differentiation.

Sequentiality

Sequentiality is widely considered a standard form of process expression that is universally familiar and optimally convenient. There are many motivations for sequentiality. There is the imperative of the algorithm. There is the supposed unruly behavior of concurrent functions. There is the fact that input and output boundaries are inherently sequential: that every boundary within an expression sequentially iterates over successive presentations of input and assertions of output.

Some consider that conditional sequential iteration that expands through time to accommodate to circumstances is a key factor of sequential expression that makes it superior to other forms of expression and mandates that all expression be strictly sequential. But sequential iteration can occur in the midst of concurrent behavior. Natural expressions that are expressed internally with massive concurrency iterate to accommodate to circumstances. The iteration of individual natural expressions can occur in a concurrently behaving association structure of many natural expressions. Conditional sequential iteration is a fundamental behavior present in all forms of process expression, but this does not imply that all expression must be strictly sequential.

Sequentiality might be considered a standard form of expression because any expression can be mapped to a sequential expression, providing a convenient universal form of expression through which all other forms of expression can be mapped and compared. But the fact that all other forms of expression can be mapped to a sequence does not mean that a sequence can be conveniently mapped to other forms of expression or that sequential expressions can be conveniently compared. The variability of sequence and the arbitrariness of memory mapping make sequential expression far too opaque to be a standard of comparison or to be a standard of expression conveniently mappable to other forms of expression.

While sequentiality is an inherent behavior in all forms of process expression, while strictly sequential expression has been a standard of original process expression for several centuries, strict sequentiality is nevertheless not an optimal standard for original expression.

11.4.3 Point of View

A referential expression like any other expression must assume a point of view. There is no single point of view that encompasses all other points of view, and there is no inherent rationale for choosing one point of view as a standard. In fact, differing points of view pose the greatest barrier to archetypal expression. Points of view are not always mappable among themselves. The reference frame expression of the eagle landing cannot be mapped into an instance of a real eagle landing. The expression of the real eagle landing cannot be mapped into a reference frame expression.

A point of view can focus attention on aspects that are important and ignore aspects that are not important, and what is important from one view may not be what is important from another view. From the point of view of mathematics, the behavior of a particular process is important. Variety of expression is unimportant. From the point of view of computer science, the variety of expression is important.

It may be more important for an archetypal expression to incorporate multiple points of view rather than to adopt a single point of view. The invocation model, for instance, incorporates two views of the expression of differentness: association differentiation and value differentiation.

11.4.4 Summary

A referential expression can be a general form that can be translated to a wide range of other forms of referential expression and to a wide variety of autonomous expressions, however, referential expression falls short of providing a single archetypal expression that captures the fundamental essence of a process that can be mapped to all possible forms of the process. This is because there can be great variety of equally valid referential expressions and because differing points of view do not map among themselves. There can also be a great variety of symbolic expression of differentnesses and behaviors. Symbolic differentness can be expressed with colors, with symbols, with molecules, with sounds, with graphics, and so on.

There is no philosophically essential form or standard form of referential expression. All that can be done is to choose a convenient form of expression and invest in it as a standard form.

11.5 Referential of Natural

Can an association expression create a symbolic process expression of itself or of a another equally complex association expression?

11.5.1 The Internal Expression

The internal structure of an association expression and its value memories are unique to itself. No other expression needs to appreciate the internal expression. Other expressions only need to appreciate external behaviors among themselves. The internal expression of an association expression is typically inaccessible and inscrutable to another expression.

The internal expression of an association expression is the means of its stride of appreciation, which cannot be sufficient to fully appreciate its own internal expression. An association expression is part association expression and part referential expression. The problem is essentially to build an internal referential expression model that encompasses the internal referential expression and the association expression itself. The model referential expression must be much larger than the internal referential capacity of the association expression.

Can the stride of appreciation of an association expression be sufficient to appreciate the internal expression of a much simpler association expression such as an amoeba?

11.5.2 Sampling an Amoeba

A symbolic process expression is static, so it must embody a sampled instant of the expression of the amoeba. When the symbolic expression is realized it will continue the behavior of the amoeba from the instant of the sampling. An amoeba is an expression with ongoing dynamic behavior whose internal intermediate memories are continually changing contents. Being also a generally concurrent expression, there is no predictable instant of reliable sampleability of the complete extended state of the amoeba.

An observing expression has its own limitation. It must take a certain amount of time to sample and appreciate the expression of the amoeba. During this time the amoeba continues to behave and change. So, even if there was a predictable instant of stability, another natural expression cannot instantaneously gather a complete sample of the amoeba. A sample over a time interval of a single amoeba will result in a blurred referential expression of the amoeba. Another approach might be to sample many amoeba over time to build a referential expression of an average instant of a typical amoeba.

Dynamically evolving association expressions are continually changing to accommodate circumstances. Any sample of an amoeba expression will be in midstride. It will be an expression without a clear beginning and without a clear current state. The amoeba itself, being a product of billions of years of continuous behavior, never had an initial state nor an instant of stable state. How can it be expressed with a static expression that begins from a stable initial state? How can a viable initial state be determined for an autonomous expression from a "blurred" or "average instant" referential expression?

The notion of one association expression completely understanding another commensurate association expression has fundamental problems with accessibility and sufficiency of resources. There is a fundamental problem with time between the dynamic nature of an association expression, its limited observation capabilities and the static nature of a symbolic referential expression.

11.6 Referential to Natural

If a faithful symbolic process expression of an existing association expression cannot be obtained by observation can a symbolic process expression be created that maps to an artificial autonomous expression indistinguishable from an existing association expression? This can take two forms.

The first form is a symbolic process expression that captures the form of expression of the amoeba, and when mapped to autonomous behavior, is an instance of an amoeba, not identical to any existing amoeba but a fully viable instance of an amoeba indistinguishable both internally and externally from any other instance of an amoeba.

The second form is a symbolic process expression that when mapped to autonomous behavior produces the same behaviors as an amoeba but with an internal expression that is completely different. It is a robot amoeba. The autonomous expression saves the behavioral appearances of the amoeba but not the internal substance.

Saving the appearances is a uniquely mathematical point of view that derives from the mathematical strategy of abstracting out variety of expression as irrelevant. The Turing test exemplifies this point of view. If the results (the external behaviors) are identical (indistinguishable), then the processes are equivalent and any difference in their specific expression is irrelevant. The symbolic process expression of the robot amoeba is fully representative. This may satisfy a mathematician, but it will not satisfy a biologist and should not satisfy a computer scientist.

The problem with saving the appearances is that it cannot be ensured that all appearances have been saved. There might lurk in the internal expression infrequent, nondeterministic appreciations exhibiting behaviors that have not been observed or compared and whose appearance cannot have been saved. If the goal is to understand the existing expression, simply saving the appearances is not sufficient.

11.7 Pure Value Referential Expression

A pure value referential expression is a collection of value transform rules specifying the patterns of interaction among symbol values. A pure value expression is almost entirely lateral with very little hierarchical structure. All the values in a pure value expression must be unique, so there is no commonality of expression to exploit. The symbol interactions are self-coordinating, so there are no coordination protocols to ignore. The symbolic value transform rules are a one-to-one mapping to the behaviors of an autonomous pure value expression, so there is no opportunity to ignore resource issues. In short, there are no opportunities for convenient economies of expression in a pure value referential expression.

Mapping a pure value referential expression it is a different matter to map an existing referential expression to an autonomous pure value expression is very different from mapping an association expression. One must find just the right spontaneously behaving resources with the appropriate interaction behaviors. For a large expression this could be difficult to impossible. Humans are not facile with creating pure value expressions. Humans minimize value expression and maximize association expression. Logical operators are typically expressed as pure value expressions. The truth table of a logical operator is the set of value transform rules of a pure value expression and are typically implemented as a network of transistor switches. The insides of a transistor, which is a fully associated pure value expression, is the largest autonomous pure value expression that humans typically employee.

Pure value expression is not an economic medium of referential expression nor a convenient medium of artificial autonomous expression. While nature might create a soup bowl processor in the form of the biological cell, humans are more facile with association expression.

11.8 Continual Mapping of Referential to Autonomous

Association expression has been discussed in terms of a persistent greater expression with less persistent memories that contain referential expressions that change and which are appreciated by the greater association expression. There is another relationship of referential expression to association expression to consider and that is when a referential expression is more persistent than the greater association expression and the greater association expression derives its persistence by being continually mapped from a more persistent referential expression.

The biological cell is such an expression where the DNA referential expression is continually mapped into the autonomous expression of the cell. The components of the cell expression are as transient as the differentnesses flowing through the expression. The form and structure of the greater association expression persists by virtue of a continuous stream of new components mapped from DNA that spontaneously organize into the greater association expression of the cell. This is how the pure value expressions of the cell, which consume themselves in resolving, continually renew and persist Another form of most persistent referential expression is a constitution and canon of laws and traditions of a society continually mapping onto and structuring successive generations of constituent association expressions.

11.9 Summary

An autonomous expression is complete and behaves on its own expressional merits. A referential expression is an incomplete symbolic expression that does not behave on its own merits. Because it is incomplete and does not behave it can appeal to conventions and commonalities in a shorthand of process expression. One might consider referential symbolic expression to be an abstract invention of humans but it is, in fact, integral to all process expression.

Referential expression occurs within autonomous expressions as the content of the intermediate persistence memories forming internal models of experience. It occurs as a means of communication among autonomous expressions and as a persistent means of externally storing representations of experience. It occurs as a template to be mapped to autonomous behavior by filling in the incomplete parts and enlivening the expression. The completed expression might be mapped directly to autonomously behaving components or it might be interpreted by an existing autonomous expression or by an artificial autonomous expression created specifically to enliven referential expressions.

There is no archetypal or universal form of referential expression encompassing all forms of expression. Each expression must adopt a point of view of what the differentnesses and their interactions are and how they will be represented and not all points of view can be encompassed by a single point of view.

12 The Invocation Language

This chapter presents a symbol string language of direct association relationships that embodies the invocation model.

12.1 The Nature of Symbol String Expression

The essential property of a symbol string is that it exists in an inherently limiting one-dimensional expression space. A symbol in the string can associate with its direct neighbors but cannot directly associate with more remote places in the string. Contrast this to the expression of an electronic circuit in three-dimensional space in which any place in the circuit can directly associate with any other place in the circuit via a wire connecting the two places.

A symbol string expression must be mappable to higher dimensional forms of expression. So there must be a means of expressing higher dimensional relationships in the one dimensional string, a means of delimiting places within the string and a means of associating these places from anywhere in the string to anywhere else in the string. This is accomplished with syntax structure and with name correspondence.

Of the available symbols a small set is reserved for expressing syntax structures, and the rest can be used for expressing correspondence names and the content that flows through the expression. Syntax structure can express delimitation of places and their local association in terms of nesting and contiguity, but it cannot associate one place in the expression with any other arbitrary place in the expression. This is accomplished with name correspondence association. Each syntax structure has a unique name. Remote syntax structures with identical names are associated by the correspondence of their names.

Another consequence of the one-dimensionality of the symbol string is that there is not enough dimensionality for a symbol string expression to autonomously resolve in the context of the string. A symbol string expression can be mapped into an expression with sufficient dimensionality or it can be interpreted within an expression of sufficient dimensionality. However, a symbol string cannot spontaneously behave on its own merits. A symbol string expression is a purely referential, form of expression.

Since a symbol string is purely referential it can indulge in expressional efficiencies that are not available to expressions that autonomously resolve. It can express just the necessary relationships of a process and defer as universal conventions many of the details of process behavior. The deferred expressivity can be added back in during mapping to autonomy or during interpretation.

12.2 A Language of Association Relationships.

The invocation language embodies the invocation model. It expresses association relationships among places in an expression in contrast to a sequence of operations on a state space. It expresses distributed concurrency in contrast to centralized sequentiality. It expresses locally autonomous behavior in contrast to centrally controlled behavior. It expresses distributed data maintenance in contrast to centralized data maintenance. Expression in the language is uniform and consistent from primitive expressions such as logic functions or protein interactions through all levels of hierarchical composition.

There are several familiar notions of expressivity that the language does not include. There is no predefined set of symbols, no predefined set of primitive operators, no predefined data types or structures and no predefined control operators. There is no concept of sequence or of any time referent, no concept of explicit control, no concept of explicitly addressable memory and no concept of state space.

Expressions in the invocation language can be mapped into any form of implementation from a fully distributed and concurrent pipeline structure to a contemporary sequential processor and onto any intermediate flavor of distributed processing such as multiple core sequential processors, DSPs and programmable gate arrays. Uncluttered with conventions and confusions the invocation language captures the elegant simplicity of expressing concurrent and distributed behavior encompassing all forms of process expression from mathematical computation to biological metabolism.

12.3 The Syntax Structures

There are four syntax structures: the source place, the destination place, the invocation and the definition. A source place anywhere in the string is laterally associated by name correspondence to one or more destination places. Boundaries within the network are expressed with an invocation. One or more destination places are associated as an input boundary, and one or more source places are associated as an output boundary. The invocation boundaries laterally associate with other invocations and hierarchically associate by name correspondence to a definition that contains the expression between the input and output boundaries of the invocation.

12.3.1 Lateral Composition: Place to Place Association

Non-neighbor places in the string are associated by name correspondence between a source place and one or more destination places. Sourcename is the correspondence name of the source place and destinationname is the correspondence name of the destination place.

Source place: sourcename<content>
Destination place: $destinationname

A source place will associate with all destination places with an identical correspondence name. The behavior model is that the content of a source place flows to each destination place of the same name. In FIG. 134a AGXST is the content of a source place named Abel. Source place Abel< > is associated with one destination place $Abel by name correspondence. The AGXST will flow from source Abel< > to destination place $Abel. FIG. 134b shows a source place named Baker with a content NGRYU with a fan-out association by name correspondence to three destination places named Baker. The content, NGRYU, will flow to all three destination places.

A single correspondence name can span only one association. There cannot be two source places of the same name. In FIG. 135 a illustrates the ambiguity of identically named source places.

To extend a path of association, a destination place associates with a differently named source place by syntax association. FIG. 135 b shows a source place first< > with a content FSZPQ that is associated with destination $first by name correspondence association. Destination place $first is associated with source place second< > by syntax structure association. Source place second< > is associated with destination place $second by name correspondence association. Destination place $second is associated with source place third< > by syntax structure association. Source place third< > is associated with destination place $third by name correspondence association. The FSZPQ in source place first< > ultimately flows through the associations to destination place $third.

Different syntax structures are associated by name correspondence, and different correspondence names are associated by syntax structure. Extended paths of association are expressed by alternating name correspondence association and syntax structure association, weaving a tapestry of arbitrarily complex association relationships in a one-dimensional string of symbols.

12.3.2 Hierarchical Composition: The Invocation and Definition

The invocation and definition express the boundaries of both lateral and hierarchical composition.

The Invocation

The invocation associates destination places to form an input boundary and associates source places to form an output boundary. The behavior model is that the boundaries are completeness boundaries and that the invocation expresses completeness criterion behavior between its input and output boundaries. When the content at the output boundary is complete, the content presented to the input is complete, and the output is the correct resolution of the content presented to the input boundary. Invocation boundaries are the boundaries of the expression. They are composition boundaries, coordination boundaries and partition boundaries.

An invocation is a named syntax structure of two parenthesized lists. Invocationname is the correspondence name of the invocation. The destination list is the input boundary for the invocation, in which the content to be resolved is received, and the source list is the output boundary for the invocation, through which the result content is distributed.

Invocation invocationname(destination list)(source list)

FIG. 136 shows the syntax structure of the invocation and its external association relationships. ProcX is the correspondence name of the invocation that associates with a definition of the same name.

The Definition

The definition expresses the network of associations between the boundaries of the associated invocation. A definition is a named syntax structure delimited by brackets containing a source list delimited by parenthesis, a destination list delimited by parenthesis, a place of resolution terminated by a colon followed by a place of contained definitions. Definitionname is the correspondence name of the definition. The source list is the input for the definition through which a formed name is received, and the destination list is the output for the definition through which the results are delivered. The place of resolution is best understood as a bounded pure value expression that can contain association expressions.

definition definitionname[(source list)(destination list)
place of resolution: contained definitions]

A definition associates to an invocation by name correspondence. The place of resolution contains the expression between the boundaries that resolves the presented input to an asserted output. The source list receives the input contents by correspondence of syntax structure from an invocation destination list and associates them to destination places in the resolving expression in the place of resolution. The resolving expression contains source places that associate to the output destination places. The destination list receives the results from the source places of the resolving expression and returns them by correspondence of syntax structure to the invocation source list.

FIG. 137 shows the syntax structure of the definition and its internal association relationships. ProcX is the correspondence name of the definition and associates with a invocation of the same name.

12.3.3 The Association of Invocation and Definition

An invocation associates by name correspondence to an identically named definition. The lists of the invocation associate with the lists of the definition by syntactic structure. The source list of the definition associates to the destination list of the invocation by order correspondence. The destination list of the definition associates to the source list of the invocation by order correspondence. This might seem somewhat confusing at first, but the rationale is straightforward.

In FIG. 138.a the invocation ABC associates by name correspondence to definition ABC. Destination places of the invocation destination list associate by order with the source places of the definition source list. Source places of the invocation source list associate by order with the destination places of the definition destination list. The destination list of the invocation is places to where contents flow to form the content to be resolved. The source list of the definition is the places from which the content flows to the resolving expression. The destination list of the definition is the places to where the results of the resolving expression will flow, and the source list of the invocation is the places from which results will flow to their destinations. FIG. 138b gives a graphic representation of the invocation-definition syntactic interface.

The interface relationships can also be understood in terms of daisy chaining. FIG. 138c shows the invocation and definition lists with destination places merged into their associated source places showing the relationship of the invocation and definition boundaries in terms of syntactic daisy chaining.

Because its interface of association places with the external expression is purely syntactic, a definition forms an isolated correspondence name domain for source places and destination places. Internal names can be chosen without concern that there will be ambiguity with the external expression.

12.3.4 Abbreviated Forms of the Invocation and Definition

The invocation and definition syntax structures can be abbreviated to express simpler association relationships and also to accommodate familiar forms of symbol string expression.

Return a Content to Place of Invocation

An un-named source place in the source place list of an invocation associates by implicit name correspondence to the place of the invocation and no other place. The invocation itself becomes the single destination place for the returned result. In Example 12.1 the first source place in the source list of the invocation is unnamed. The destination place $SUM in the destination list of the definition associates to the unnamed source place. The content flowing through $SUM will associate to the unnamed source place and flow to the place of the invocation.

invocation FULLADD(0, 1, 0)(< >CARRYOUT< >) . . . $CARRYOUT definition FULLADD[(X<>Y<>C<>)($SUM $CARRY)

Example 12.1

Un-Named Source Place in an Invocation

Single Return to Place of Invocation

If an invocation receives a single result in its own place, there is no need of a source list. The corresponding definition can express the single return with the absence of a destination list and with the presence of a single unnamed source place in the place of resolution. An expression like Example 12.2 can be further abbreviated to the form of Example 12.3.

invocation AND($A $B)(< >)
definition AND[(X<>Y<>C<>)($R) R< . . . >: . . . ]

Example 12.2

Expressing a Single Return to Place of Invocation invocation AND($A $B)
definition AND[(X<>Y<>)< . . . >: . . . ]

Example 12.3

Further Abbreviated Expression of a Single Return to Place of Invocation

This abbreviation supports the familiar expressional form of functional nesting. In Example 12.4 each invocation has only a destination list and is part of the destination list of another invocation or is within a source place.

<OR(AND(NOT($X),$Y),AND($X,NOT($Y)))>

Example 12.4

Nested Invocations

The Conditional Invocation Name

If an invocation has an empty destination, i.e., no input, list then the invocationname itself must express the variable part of the invocation. The conditional invocationname is the mechanism of content transformation in the language. The invocation correspondence name is formed from the content of one or more contiguous destination places. Content emerges from flow paths to interact by forming the correspondence name of an invocation. All content flowing through the association paths eventually emerges to form an invocation correspondence name. This is how value transform rules are invoked to transform the flowing content of the expression.

$place1$place2$place3( )

The Constant Definition

If a definition does not contain a source list and does not contain a definition list it is a constant definition. With no input associations there is no content flow into the definition to resolve, no need for internal definitions, and no need for the colon. A constant definition contains only a place of resolution between the brackets, which contains a constant content and can be abbreviated as shown below:

definitionname[constant]

Since there is no destination list, the constant content is returned to the place of invocation.

A constant definition expresses a value transform rule. Example 12.5 shows the value transform rule definitions for the AND function. The content values 1 or 0 will propagate through A< > and B< > and a two-value name will be formed by $A$B( ) that will invoke one of the contained definitions. The constant of the invoked definition will return to the place of the invocation, entering a flow path in the unnamed source place, and will flow through the unnamed source place back to the invocation of AND. The set of constant definitions—value transform rule definitions—expresses the truth table of the AND function. One can think of the content forming the invocationname that transforms into the content of the definition.

AND[(A< >B< >)<$A$B( )>: 00[0] 01[0] 10[0] 11[1]]

Example 12.5

AND Function with Value Transform Rule Definitions

A constant definition can also contain a fragment of expression including an invocation that will be returned to the place of invocation. The formation of an invocationname in a place of resolution results in the fragment of expression in the corresponding constant definition being returned to the place of invocation in the place of resolution and consequently being resolved. In Example 12.6 the content of select< > will be A or B. This content flows to $select and forms the invocation A( ) or B( ), invoking one of the two contained definitions. The content of the named definition is returned to the place of invocation in the place of resolution and resolved directing the input to one of two possible output association paths.

```
def  fanout[(select< > in< >)({$out1 $out2})
       $select( ):  A[out1< $in >]
                    B[out2< $in >]   ]
```

Example 12.6

Fan-Out Steering

The Pure Value Expression

If there are no list parenthesis in a place of resolution, then there are no explicit invocations. The contents flowing into a place of resolution are assumed to be freely associating values of a pure value expression that will form names of contained definitions. The contained definitions are value transform rules, or they contain association expression fragments to be inserted into the place of resolution.

definitionname[(A< >B< >C< >)( . . . )$A$B$C: . . . ]

The place of resolution of Example 12.26, as seen later in this chapter, contains a pure value expression.

12.4 The Comma

The comma is a general separator. There can be cases of separate places that must be syntactically separated but that are not separated by the syntax defined so far such as two constants in the destination list of an invocation. Example 12.7 illustrates two constants, NT and EW, in the destination of an invocation delimited by a comma. Without the first comma, NT would get confused with the B of $B. Without the second comma, NT and EW would appear as a single constant.

ProcX($A $B, NT, EW)( )

Example 12.7

Comma-Delimited Constants

Because the destination places are not syntactically isolated, in an invocation destination list the meaning can become ambiguous if a destination place is followed by a conditional invocation. In Example 12.8 the destination places $C$D form an invocationname. If the comma did not separate $B and $C all four destination places would be considered to form the invocationname.

ProcX($A $B, $C$D( ))( )

Example 12.8

Comma-Delimited Destination Places

Commas can be used freely as a redundant separator for convenient readability. In Example 12.8 the string "$A, $B" is identical to the string "$A $B".

12.5 Completeness Relations

The language does not express the details of coordination. It assumes completeness criterion behavior between the boundaries of each invocation and between source and destination places. The language must, however, indicate what constitutes completeness for each invocation boundary.

12.5.1 Full Completeness

The simplest completeness relation is that content be present at all places in each list. An invocation begins when there is content in all of its destination places. An invocation is completed when there is content in all of its source places. A list with no additional syntax implies full completeness.

12.5.2 Mutually Exclusive Completeness Relations

There are many circumstances where, for each instantiation, exactly one of a group of places will have content. This mutually exclusive behavior can occur in pure association expression with multi-path representation where a group of places mutually exclusively assert a value. This is expressed by enclosing the mutually exclusive group of places in braces. In the definition given in Example 12.9 content in exactly one of A0< > or A1< > and one of B0< > or B1< > is completeness for the source list and content in one of $0 or $1 is completeness for the destination list.

OR[({A0< >A1< >} {B0< >B1< >})({$0$1}) . . . :]

Example 12.9

Mutually Exclusive Completeness

12.5.3 Conditional Completeness

Conditional completeness is expressed when the content of one place in a list, which must always be complete, determines the completeness relations of other places in the list delimited by braces.

Conditional Input

Conditional input is shown in Example 12.10. The invocation of fan-in will pass $in1, $in2, $in3 or $in4 depending on the content of $select, which can be A, B, C or D. The content of select< > will form an invocation name in the place of resolution. The invoked definition will return an expression fragment that directs the content of one of the input places to the output destination place. Only one of $in1, $in2, $in3 or $in4 needs content for completeness. The braces explicitly express this completeness relation. Input completeness is a $select content and content of the selected source place. The mutually exclusive completeness relationships are also reflected in the definition lists.

```
inv   fanin($select {$input1 $input2 $input3 $input4})(output< >)
def   fanin[(select< > {in1< > in2< > in3< >in4< >})($out)
         $select( ) :    A[out< $in1 >]
                         B[out< $in2 >]
                         C[out< $in3 >]
                         D[out< $in4 >]   ]
```

Example 12.10

Conditional Input Expression

The unselected places may or may not have content. If a place has content and is not selected, its content will be retained until a presentation occurs that does select it.

Conditional Output

Conditional output can also be expressed as shown in Example 12.11. The invocation of fan-out will pass $input to output1< >, output2< >, output3< > or output4< > depending on the content of select< >. Output completeness is exactly one of output1< >, output2< >, output3< > or output4< >. The braces explicitly express this completeness criterion. The mutually exclusive completeness relationships are also reflected in the definition lists.

```
inv   fanout($select $input)({output1< > output2< > output3< >
         output4< >})
def   fanout[(select< > in< >)({$out1 $out2 $out3 $out4})
         $select( ) :    A[out1< $in >]
                         B[out2< $in >]
                         C[out3< $in >]
                         D[out4< $in >]   ]
```

Example 12.11

Controlled Fan-Out Expression

Serial Bus: Fan-In/Fan-Out Expression
Example 12.12 is a serial bus expressed by the invocations associating the output of a fan-in with the input of a fan-out.
    inv fanin($selin {$in1 $in2})(serialmid< >)
    inv fanout($selout $serialmid)({out1< >out2< >out3< > out4< >})

Example 12.12

Serial Bus

Parallel Bus: Fan-Out/Fan-In Expression
Example 12.13 is a parallel bus expressed by associating the output of multiple fan-outs with the input of multiple fan-ins. The outAs and outBs of the fan-out invocations associate to the inputs of the fan-in invocations.

```
inv  fanout($seloutA $srcA)({outA1< > outA2< > outA3< >
     outA4< > outA5< >})
inv  fanout($seloutB $srcB)({outB1< > outB2< > outB3< >
     outB4< > outB5< >})
inv  fanin($selin1 {$outA1 $outB1})(dest1< >)
inv  fanin($selin2 {$outA2 $outB2})(dest2< >)
inv  fanin($selin3 {$outA3 $outB3})(dest3< >)
inv  fanin($selin4 {$outA4 $outB4})(dest4< >)
inv  fanin($selin5 {$outA5 $outB5})(dest5< >)
```

Example 12.13

Parallel Bus

12.5.4 Arbitration Completeness

Arbitration manages the content flow of two or more places of uncoordinated flow into a single coordinated flow. If all the arbitrated places have content simultaneously, the places will compete for the privilege of flowing through the arbiter. It cannot be predetermined which content will flow. Contents that lose the competition will remain and wait their turn or participate in the next competition. If only one place has content, the content will flow through the arbiter without competition.

The arbitrated places are encompassed with double braces in the invocation destination list. The double-braced list of destination places associates to a single source place in the definition source list.
    inv Arbiter({{$place1 $place2}})(next< >) . . . $next
    def Arbiter[(placeB< >)($pass) pass<$placeB>:]

Example 12.14

Arbitrated Places

Example 12.14 is an expression that arbitrates the content flow of $place1 and $place2. The arbitrated content flows into placeB< >, through the expression in the place of resolution and out through $pass back to next< >. The uncoordinated flow into Place1 and place2 becomes a coordinated flow out of next< >.

12.5.5 Complex Completeness Relationships

There can arise circumstances of more complex completeness relationships. An ALU is one of these. The ALU is a locality of multiple possibilities associated by a single command content. While this is an artifact of sequentiality, the language should encompass it. Each function in the ALU can take different configurations of input and assert different configurations of output. Not all inputs of the ALU are always used, and not all outputs are always asserted. What needs to be expressed in the context of the definition is the completeness relationships for each possible configuration of the ALU. The question, to be answered are, What are the completeness relations for each list and how does the completeness relations of the destination list relate to the completeness relations of the source list? This is the critical information to configure a coordination protocol between the source list (the output of the invocation) and the destination list (the input of the invocation). With these relationships expressed, any form of coordination from cycles to clocks can be automatically added to the expression.

Example 12.15 shows the definition for an ALU that receives a command whose content is always complete and one to three other inputs. There are seven commands: shift left(SL), shift right(SR), NOT, AND, OR, XOR and ADD. Each command can involve a different input and output completeness relation. The shifts and NOT take one input and assert one output, the logic functions take in two inputs and assert one output, and the ADD takes in three inputs and asserts two outputs.

```
ALU(ADD, $A $B $carryin)(output< >carryout< >)
ALU[(command< > {SL(A< >) SR(A< >) NOT(A< >) AND(A< > B< >)
     OR(A< > B< >) XOR(A< > B< >) ADD(A< > B< >
     carryin< >})
     ({SL($result) SR($result) NOT($result) OR($result)
     AND($result) XOR($result) ADD($result $carryout)})
...... : ... ]  ]
```

Example 12.15

Definition of ALU with Complex Completeness Relations

Each completeness relation is expressed as a sublist of places enclosed in parenthesis. All of the places of a sublist must have content for completeness. The seven sublists are enclosed in braces indicating the only one of the sublists will have content. Each sublist is then labeled with the enabling command content.

Completeness for the source list is content in the command place and complete content in one of the sublists. Completeness for the destination list is complete content in one of the sublists. The destination list is structured identically to the source list with a corresponding order of sublists.

12.5.6 The Occasional Output

An expression might resolve a multitude of presentations before asserting an output. A code detector, for instance, might only occasionally assert "detect." Consider that an expression always asserts a "yes" or a "no" and that only the "yes" is to be passed on. A response filter expression, shown in Example 12.16, can receive an answer containing "yes" or "no" and only pass on the "yes" content. When the content is "no," an empty content is returned to the place of resolution, to $NO and to NO< >, which expresses completeness for the invocation but does not associate with any destination place in the expression. NO< > is a dead-end association. When a "yes" is received, a "yes" content is returned, passed on through $YES to OK<> in the invocation and continues on to $OK.

```
inv   report($answer)(OK<> NO<>) .... $OK
def   report[(answer<>)({$YES $NO})
          $answer( ) :
              yes[YES<yes>]
              no[NO<>]  ]
```

Example 12.16

Example with Occasional Source Place 12.6 Bundled Content

Bracket pairs nested within a source list of a definition indicate unbundling of content from a single destination place in the invocation destination list. Each bracket pair associates with a single destination place of an invocation. Bracket pairs nested within a destination list of a definition indicate bundling of content into a single source place in the invocation source list. Each bracket pair associates with a single source place in the invocation source list. Bundling is a convenient convention when many association relationships follow an identical flow path as with a multi-value paths of a pure association expression or digits of place-value numbers.

```
OR($A $B)(Y<>)
:   OR[( [{A0<>A1<>}] [{B0<>B1<>}] )( [{$0 $1}] )
    1< 3of6($A1 $A1 $A0 $B0 $B1 $B1) >
    0< 2of2($A0 $B0) > : ]
```

Example 12.17

Bundling Mutually Exclusive Path into a Single Path

Example 12.17 shows an example of bundling and mutual exclusion. The definition of the OR is in terms of dual-rail coding. The two rails are bundled in places A and B of the invocation. The two bracket pairs in the source list of the definition associate with the $A and $B of the invocation. A0< >A1< > are unbundled from $A. B0< >B1< > are unbundled from $B. A0<> and A1<> enclosed in braces are mutually exclusive as are B0<> and B1<>. $0 and $1 in the destination list of the definition are bundled and associate with Y<> in the source list of the invocation.

The multi-rail representations are bundled and conveniently expressed as a single place at the next higher composition level. Later in this chapter, Example 12.27, a pure association expression of a full-adder, shows this usage. At the Boolean function level the expression is in terms of paths with bundled content. In the definition of each Boolean function the paths are unbundled and expressed as explicitly dual-rail paths.

Bundling can be used for any common association path. Example 12.18 shows the bundling and unbundling of a four-digit number. The places in the invocation are bundled, and the places in the definition are unbundled. The source places A0 through A3 are unbundled from $A. The sum destination places SUM0 through SUM3 are bundled into SUM<>. The Axs and Bxs might be dual-rail representation and might be further unbundled into their dual-rail components as in Example 12.17.

```
4BITADD($A $B $CARRYIN)(SUM<> CARRYOUT<>)
4BITADD[([A0<>A1<>A2<>A3<>] [B0<>B1<>
    B2<>B3<>] CI<>)
    ([$SUM0 $SUM1 $SUM2 $SUM3] $CO)... : ...]
```

Example 12.18

Bundling Digits into Numbers

The bundling brackets follow the bundled content delimiting the content into nested levels of bundling. Each level of bundling adds outermost brackets. Each level of unbundling strips the outermost brackets from the bundled content.

12.7 Expression Structure

FIG. 139 shows the component structures of an example expression. There are some outlying source places and destination places. They associate with an invocation of ProcX. There is a definition of ProcX with a source list and a destination list. The resolution place of the definition contains an invocation of ProcA within a source place named result2. The place of contained definitions contains the definition of ProcA that itself contains a set of value transform rule definitions.

The arrows show the association relationships and the flow of content. The content 101 is formed in the destination list of the invocation of ProcX flowing from source places place1< >, place2< > and place3< > to destination places $place1, $place2, and $place3. The content flows into the definition of ProcX through source places A< >, B< > and C< > and into the destination places $A, $B and $C in the invocation of ProcA in the place of resolution. The contents then flow into the source places X< >, Y< >, and Z< > of the ProcX definition, and then into the destination places $X, $Y and $Z in the place of resolution of ProcA forming the invocation 101( ), which invokes the definition 101 [1], which returns the value 1, which then flows out of the definition of ProcA to the place of the ProcA invocation becoming the content of the source place result2< >, then to the destination place $result2, to the source place placeB<> in the invocation of ProcX, and on to the destination place $placeB.

The gray arrows indicate name correspondence associations, and the black arrows indicate syntax structure associations. The black ring is neighbor association. The alternating shade along association paths show the alternation between name correspondence association and syntax structure association, each extending the reach of the other, weaving a network of association pathways through the invocations and definitions.

12.7.1 Name Correspondence Search

The language assumes a search behavior to match correspondence names. Some name correspondence association relationships are static, and the search for corresponding names in the string can be carried out by a language processor and mapped to a direct association relationship such as a wire in the autonomous expression. For some association relationships the correspondence name is not expressed until the time of resolution when a name emerges from a content path. So the search must be integral to the resolution behavior. These searches can be mapped to efficient search expressions in the autonomous expression such as a combinational logic expression, a MUX, the addressing behavior of a conventional memory or a shaking bag.

12.7.2 Scope of Correspondence Name Reference

A definition forms a syntactically isolated correspondence name domain for source places and destination places. To maintain the integrity of association relationships and content flow all content flow, into and out of a definition must flow through the syntactic interface with an invocation. Place correspondence names do not cross definition boundaries.

However, the correspondence of invocationnames to definition names can have a larger scope of reference. It is convenient to assume hierarchical scope of reference rules for invocationnames. The search for the corresponding definitionname can progress up the hierarchy of nested definitions until a match is found. No matter where in the hierarchy a definition is found, it can be considered to be instantiated at the place of the invocation. This allows the expression and invocation of common definitions in the language.

12.8 A Progression of Examples

A progression of example expressions of a single process is presented to illustrate the range of expressivity of the invocation language. Binary digit addition will serve as the example process with the first example being a binary full adder composed of two half-adders shown as a graphical expression in FIG. 140. The expression is a structure of association relationships among Boolean functions. The input and output of the full-adder is a completeness boundary, and the input and output of each function is a completeness boundary.

12.8.1 Imperative Form

The graphic expression of FIG. 140 is labeled with correspondence names for the inputs of the expression, which are destination places of the invocation, and the output of each function which are the source places in the expression. Example 12.19 expresses the full-adder as an imperative expression. It is a collection of statements each an invocation of a function with its input and output. The associations are completely in terms of name correspondence relationships. There is a one-to-one correspondence between the graphic expression and the string expression.

---

```
inv  FULLADD(0, 1, 0)(< > CARRYOUT< >) ... $CARRYOUT
def  FULLADD[(X< >Y< >C< >)( $SUM $CARRY)
     NOT($X)(OP1< >)
     AND($OP1 $Y)(OP4 < >)
     NOT($Y)(OP2< >)
     AND($X $OP2)(OP3< >)
     OR($OP4 $OP3)(FIRSTSUM< >)
     NOT($FIRSTSUM)(OP6< >)
     AND($C $OP6)(OP7< >)
     NOT($C)(OP5< >)
     AND($OP5 $FIRSTSUM)(OP8< >)
     OR($OP7 $OP8)(SUM< >)
     AND($X $Y)(OP10< >)
     AND($C $FIRSTSUM)(OP9< >)
     OR($OP10 $OP9)(CARRY< >)
     :    OR[(A< > B< >)($res) res<$A$B( )> :00[0] 01[1] 10[1]
     11[1] ] AND[(A< > B< >)($res) res<$A$B( )> :00[0] 01[0] 10[0]
     11[1] ] NOT[(A< >)($res) res<$A( )> :1[0] 0[1] ]   ]
```

---

Example 12.19

Imperative Form of Expression

Note that the first source place of the source list of the invocation of FULLADD is unnamed and the $SUM result of the definition is associated to the place of the invocation. The CARRY result associates by name correspondence to $CARRY in the definition destination list, by syntax correspondence to CARRYOUT< > in the invocation source list and then by name correspondence to $CARRYOUT.

There are three contained definitions. The AND and OR definitions use a different set of value transform rule definitions with the same set of names. Each set of value transform rules is isolated within a definition, so there is no ambiguity of name correspondence.

FIG. 141 shows the associations from the source list of the definition to destination places within the expression at the place of resolution. The expression is identical to Example 12.19 except that some invocations have been doubled up on a single line.

FIG. 142 shows the associations of resolution flow within the resolution expression and the flow of the results to $SUM and $CARRY.

12.8.2 Functional Form

Example 12.20 is the full-adder expression in terms of a nesting structure of abbreviated invocations that each receive a single return in place. The FIRSTSUM< > source place represents the output of the first half-adder and is fanned out to three destination places. SUM< > and CARRY< > source places are the results of the expression and associate with the destination places in the destination list of the definition.

---

```
inv  FULLADD(0, 1, 0)(< > CARRYOUT< >) ... $CARRYOUT
def  FULLADD[(X< >Y< >C< >)( $SUM $CARRY)
FIRSTSUM<OR(AND(NOT($X),$Y),AND($X,NOT($Y)))>
CARRY<OR(AND($X,$Y),AND($C,$FIRSTSUM)>
SUM<OR(AND(NOT($C),$FIRSTSUM),AND($C,NOT($FIRSTSUM)))>
     :
     OR[(A< >B< >)<$A$B( )> : 0[0] 1[1] 00[0] 01[1] 10[1]
     11[1] ] AND[(A< >B< >)<$A$B( )> : 0[0] 1[0] 00[0] 01[0]
     10[0] 11[1] ] NOT[(A< >)<$A( )> :1[0] 0[1]   ]
```

---

Example 12.20

Functional Form

Expressing association relationships with syntactic nesting may be useful as a human convenience, but it is neither a necessary nor a sufficient form of expression in a symbol string. It is not sufficient in that it cannot directly express circular or feedback relationships and it cannot directly express fan-out relationships. The fan-out relationship in Example 12.20 is expressed with a source place FIRSTSUM< >. It is not necessary in that all relationships that can be expressed in terms of nesting can be expressed in terms of name correspondence.

12.8.3 Net List Form

Example 12.21 shows a netlist form of expression. Each invocation is abbreviated as a single return invocation and is nested in a source place. Each source place is associated with a destination in the destination list of an invocation. The expression is a collection of named statements and direct connections among them.

---

```
invocation  FULLADD(0, 1, 0)(< > CARRYOUT< >) ... $CARRYOUT
definition  FULLADD[(X< >Y< >C< >)( $SUM $CARRY)
     OP1< NOT($X) >
     OP4 < AND($OP1 $Y) >
     OP2< NOT($Y) >
     OP3< AND($X $OP2) >
     FIRSTSUM< OR($OP4 $OP3) >
     OP6< NOT($FIRSTSUM) >
```

-continued

```
OP7< AND($C $OP6) >
OP5< NOT($C) >
OP8< AND($OP5 $FIRSTSUM) >
SUM< OR($OP7 $OP8) >
OP10< AND($X $Y) >
OP9< AND($C $FIRSTSUM) >
OR($OP10 $OP9)(CARRY< >)
:
    OR[(A< > B< >) <$A$B( )> :00[0] 01[1] 10[1] 11[1] ]
    AND[(A< > B< >) <$A$B( )> :00[0] 01[0] 10[0] 11[1] ]
    NOT[(A< >) <$A( )> :1[0] 0[1] ]  ]
```

Example 12.21

Net List Form

12.8.4 Longer Value Transform Rule Names

Example 12.22 shows a FULLADD expression that directly resolves the three value name in terms of value transform rule definitions with three value names. Now there are only two invocations in the place of resolution invoking the definitions COUT and ADD as shown in FIG. 143. With longer value transform rule names there is more expression in terms of value differentiation and less in terms of association differentiation.

```
inv  FULLADD(0, 1, 0)(< > CARRYOUT< >) ... $CARRYOUT
def  FULLADD[(A< >B< >C< >)( $SUM $CARRY)
     CARRY<COUT($A $B $C)>
     SUM<ADD($A $B $C)>
     COUT[(X< > Y< > Z< >)<$X$Y$Z( ) > :  000[0] 001[0] 010[0]
          011[1] 100[0] 101[1] 110[1] 111[1]]
     ADD[(X< > Y< > Z< >)<$X$Y$Z( )> :   000[0] 001[1] 010[1]
          011[0] 100[1] 101[0] 110[0] 111[1]] ]
```

Example 12.22

Longer Value Transform Rule Names

12.8.5 Limited Set of Name Forming Symbols

Name forming symbols disjoint from the syntax symbols are used to form correspondence names as well as to express content. Name correspondence relies only on name equality; it is insensitive to the symbol set used. Unique and equal names can be expressed using any set of conveniently available symbols. Even a single symbol can be used, in which case names will correspond solely by their length. The only requirement of correspondence names is that they correspond.

Correspondence names and content are syntactically isolated as content flows through the association paths until the content symbols emerge and briefly form correspondence names. All content symbols ultimately participate in forming correspondence names, so the set of content symbols must be included in the set of correspondence name symbols. The constant definitions, the value transform rules, determine the set of content symbols. Every content eventually contributes to the formation of the name of a constant definition.

In the examples above the correspondence names were formed with a full alphabet and the content names were formed with the symbols 0 and 1. Example 12.23 and FIG. 144 show the full adder expressed using just two name-forming symbols: 0 and 1. The structure of the expression is identical to Example 12.22. Only the correspondence names have been changed.

```
inv  1011001101(0,1, 0)(< > 101010101< >)    $101010101
def  1011001101[(1100< >1101< >1110< >)($11010 $111111111)
     111111111< 11110000($1100 $1101 $1110)(< >)>
     11010<11001100($1100 $1101 $1110)(< >)>
     11110000[(11100< >11101< > 11110< >)<$11100 $11101
          $11110( )>: 000[0] 001[0] 010[0] 011[1] 100[0] 101[1]
          110[1] 111[1]]
     11001100[(11100< >11101< > 11110< >)<$11100 $11101
          $11110( )>: 000[0] 001[1] 010[1] 011[0] 100[1] 101[0]
          110[0] 111[1]]]   ]
```

Example 12.23

Full-Adder with Binary Correspondence Names

12.8.6 More Available Content Values

With more content values available there can be less association structure of the expression. The values S, T, U, V, W and X map to the following meanings:
S means A=0
T means A=1
U means B=0
V means B=1
W means CI=0
X means CI=1
S means SUM=0
T means SUM=1
W means CO=0
X means CO=1

In the expression of Example 12.24 the place of resolution contains no parentheses, so it is a pure value expression in which the values spontaneously associate to form names of value transform rules. The expression is entirely in terms of definitions. There is no association structure in the place of resolution. However, the values S, T, W and X are used for both the input and for the output. To avoid reforming input names in the place of resolution, the result values must be isolated within a source place when they are delivered to the place of resolution. While the place of resolution of Example 12.24 is a pure value expression the expression, as a whole is not quite a pure value expression.

```
inv  FULLADD($A,$B,$C)(< > CARRYOUT< >)
def  FULLADD[(A< > B< > CI< >)($SUM $CO)
     $A$B$CI   :
     SUW[SUM<S> CO<W>] SUX[SUM<T> CO<W>]
     SVW[SUM<T> CO<W>] SVX[SUM<S> CO<X>]
     TUW[SUM<T> CO<W>] TUX[SUM<S> CO<X>]
     TVW[SUM<S> CO<X>]   TVX[SUM<T> CO<X>] ]
```

Example 12.24

Pure Value Place of Resolution

12.8.7 Pure Value Expression

The values K, L, M and N are added as output values that are unique from the input values.
S means A=0
T means A=1
U means B=0
V means B=1
W means CI=0
X means CI=1
K means SUM=0

L means SUM=1
M means CO=0
N means CO=1

The output values can now be delivered to the place of resolution as free values and can effect their own output, in this case by invoking a definition that contains a source place with themselves as content that associates to $SUM and $CARRY. The expression of Example 12.25, as a whole, is a pure value expression.

```
inv  FULLADD($A,$B,$C)(< > CARRYOUT< >)
def  FULLADD[(A< > B< > CI< >)($SUM $CO)
     $A$B$CI   :
     K[SUM< K >] L[SUM< L >] M[CO< M >] N[CO< N >]
     SUW[K,M] SUX[L,M] SVW[L,M] SVX[K,N]
     TUW[L,M]   TUX[K,N] TVW[K,N] TVX[L,N]   ]
```

Example 12.25

Pure Value Expression 12.8.8 Another Pure Value Expression

The binary full-adder of FIG. 140 can be mapped directly into a pure value expression that is expressed solely in terms of unique symbols and value transform rules. The Boolean logic expression uses two unique symbols, 0 and 1, and unique places within the expression to represent unique differentnesses within the expression. The 0 or 1 on this path is different from the 0 or 1 on that path. The graphical circuit in FIG. 145. shows the mapping of each wire (association path) to two unique symbols. One representing a 0 symbol on the wire and one representing a 1 symbol on the wire.

C means X=0
D means X=1
E means Y=0
F means Y=1, and so on, for each wire in the circuit.

The value transform rules for resolving each formed name are derived from the symbols associated with each function. The derivation of the value transform rules for the function surrounded by O, P, Q, R, W and X is shown in FIG. 146. The set of derived value transform rules then becomes the set of contained definitions. Example 12.26 is the pure value expression. The input content is dumped into the place of resolution with no invocation syntax and begins forming names.

```
inv  FULLADD($A,$B,$C)(< > CARRYOUT< >)
def  FULLADD[(X< >Y< >CI< >)( $SUM $CARRY)
     $X $Y $CI:
     "fan-out input symbols"
     A[g,k,o] B[h,l,p] C[G,K,O] D[H,L,P] E[I,M,Q] F[J,N,R]
     "define combinational resolution stages"
     GI[S] GJ[T] HI[S] HJ[S]
     KM[U] KN[U] LM[V] LN[U]
     OQ[W] OR[W] PQ[W] PR[X]
     SU[a,c,e] SV[b,d,f] TU[b,d,f] TV[b,d,f] "fan out input to second half-adder"
     ga[i] gb[j] ha[i] hb[i]
     kc[m] kd[m] lc[n] ld[m]
     oe[q] of[q] pe[q] pf[r]
     im[s ] in[ t ] jm[ t ] jn[ t ] "sum"
     qW[u ] qX[ v ] rW[v ] rX[ v ] "carry"
     s[SUM< s >] t[SUM< t >] u[CARRY< u >] v[CARRY< v >]
     "output"
     ]
```

Example 12.26

Pure Value Expression of Boolean Full-Adder

FIG. 147 shows the resolution for input values B, C and F as a progression of populations of symbols in a shaking bag, which represents the place of resolution. In each population of values only certain associations form a name of a value transform rule. In each population the values that form the name of a value transform rule are shown circled. The value transform rules involved in each population are shown above the arrows and assert the values that will be in the succeeding population. The final values s and v invoke definitions with source places that associate to places in the destination list of the definition. In a shaking bag s and v might cause the bag to open.

12.8.9 Pure Association Expression

To maintain consistency with the other examples, a NULL Convention Logic pure association expression, shown in FIG. 148, is mapped directly from the full-adder of FIG. 140 by substituting the Boolean functions with 2NCL expressions.

Example 12.27 is a pure association expression. The expression is identical to Example 12.19 except for the definitions of OR, AND and NOT, which are expressed in terms of a set of invocations only one of which will achieve completeness of its destination list.

```
invocation  FULLADD($A $B $C)(< > CARRYOUT< >)
            ... $CARRYOUT
definition  FULLADD[(X< >Y< >C< >)( $SUM $CARRY)
            NOT($X)(OP1< >)   AND($OP1 $Y)(OP4 < >)
            NOT($Y)(OP2< >)   AND($X $OP2)(OP3< >)
            OR($OP4 $OP3)(FIRSTSUM< >)
            NOT($FIRSTSUM)(OP6< >) AND($C $OP6)(OP7< >)
            NOT($C)(OP5< >)   AND($OP5 $FIRSTSUM)(OP8< >)
            OR($OP7 $OP8)(SUM< >)
            AND($X $Y)(OP10< >)    AND($C $FIRSTSUM)(OP9< >)
            OR($OP10 $OP9)(CARRY< >)
            :    OR[([{A0< > A1< >}][{B0< > B1< >}])([{$O0 $O1}])
                    out1($A1 $B1)
                    out1($A1 $B0)
                    out1($A0 $B1)
                    out0 $A0 $B0) : out1[O1<D>] out0[O0<D>]]
            AND[([{A0< > A1< >}][{B0< > B1< >}])([{$O0 $O1}])
                    out1($A1 $B1)
                    out0($A1 $B0)
                    out0($A0 $B1)
                    out0 $A0 $B0) : out1[O1<D>] out0[O0<D>]]
            NOT[([{A0< >A1< >}])([{$O0 $O1}])
                    O0<$A1>
                    O1<$A0>      :]  ]
```

Example 12.27

Pure Association String Expression of Full-Adder

A language expression properly ends with either primitive value transform rules or primitive association relationships. Example 12.27 is a pure association expression that ends with primitive association relationships.

The individual paths of the dual-path inputs associate in the destination list of each invocation. For each presentation the destination list of only one of the invocations will have complete content enabling the invocation. The enabled invocation will invoke a definition that associates a data value with one of the mutually exclusive output places. The set of invocations expresses the truth table for the OR operator in terms of association differentiation. The value differentiation version of OR is expressed in Example 12.19, Example 12.20 and Example 12.21.

How primitive relationships may be mapped to autonomy is not necessarily a concern of the language, but the mapping should, nevertheless, be expressible in the language. This example illustrates disjointed mapping. The language expression takes the expression to a certain level, and then a mapping occurs between the language primitive relationships and a different form of expression that is equivalent.

In this case the language expresses the primitive association relationships as a set of invocations for each Boolean function. The set of invocations in the OR definition map directly to the pure association expression of FIG. 149a which is a minterm form NULL Convention Logic (NCL) expression that can be transformed into the equivalent expressions in FIG. 149b or into the expression in FIG. 149c. The NCL expression form of FIG. 149c was directly substituted for the Boolean functions of the full-adder of FIG. 140 to arrive at the expression of FIG. 148.

The NCL operators can also be expressed in the language as pure value expressions. Example 12.28 shows the 2 of 2 operator and the 3 of 6 operator expressed as pure value expressions within the language.

```
2of2[(A< > B< >) $A$B : DD[D]]
3of6[(A< > B< > C< > D< > E< > F< >)
     $A$B$C$D$E$F :
     DDD[D]]
```

Example 12.28

NCL Expressions as Pure Value Language Expressions 12.8.10 Another Pure Association Full-Adder The full-adder of FIG. 150 is a pure association NCL expression derived directly from the mapping of differentnesses for the binary full-adder, rather than being mapped from some other form of expression.

Example 12.29 is the language expression in terms of NCL operators corresponding to FIG. 150. The dual-rail paths are unbundled and bundled in the definition of FULLADD and associated to the NCL operators. The NCL operators are expressed as pure value expressions.

```
invocation  FULLADD($A $B $C)(< > CARRYOUT< >...
            $CARRYOUT
definition  FULLADD[(({A0< > A1< >})({B0< > B1< >})({C0< >
            C1< >}))
    (({$SUM0 $SUM1}) ({$CARRY0 $CARRY1}))
            CARRY0< 2of3($A0 $B0 $C0) >
            CARRY1< 2of3($A1 $B1 $C1) >
            SUM0< 3of5($CARRY1 $CARRY1 $A0 $B0 $C0) >
            SUM1< 3of5($CARRY0 $CARRY0 $A1 $B1 $C1) > :
            2of3[(A< > B< > C< >) $A$B$C : DD[D]]
            3of5[(A< > B< > C< > D< > E< >)
                $A$B$C$D$E : DDD[D]] ]
```

Example 12.29

Language Expression of NCL Full-Adder 12.8.11 Greater Composition: Four-Bit Adder Greater expressions are composed by associating places of destination lists and source lists among invocations. A network of invocations can be encapsulated in a definition resulting in hierarchical levels of definitions of networks of invocations.

12.8.12 Associated Invocations

Invocations of FULLADD can be associated to form the expression of a four-bit adder. The four-bit parallel adder expression of FIG. 151 is the language expression for the graphic expression of FIG. 82. Boundaries expressed by the invocations that correspond to the boundaries of the graphic expression are highlighted. The invocation of 4BITADD receives two four-bit numbers and a carry-in value and returns a four-bit sum and a carryout value. In the definition of 4BITADD the digits of each number are fanned out to four invocations of FULLADD. The invocations are linked by CARRYOUTx associations.

12.8.13 Nested Invocations

Since there is only one association relationship (CARRYOUTx) between the invocations, the four-bit adder can also be composed as nested invocations as in Example 12.30.

```
4BITADD[(A0< > B0< > A1< > B1< > A2< > B2< > A3< >
B3< >C0< >)
    ($S0 $S1 $S2 $S3 $CARRYOUT3)
    CARRYOUT3< FULLADD($A3 $B3, FULLADD($A2 $B2,
    FULLADD($A1 $B1,
FULLADD($A0 $B0 $C0)(S0< > < >))(S1< > < >))(S2< >
< >))(S3< > < >) >]
```

Example 12.30

Four-Bit Adder as Nested Invocations 12.8.14 Nested Definitions

The four-bit adder can also be composed in terms of nested definitions forming a recursive structure, as shown in Example 12.31. 4BITADD adds the fourth bits and passes the remaining bits to 3BITADD. 3BITADD adds the third bits and passes the rest off to 2BITADD. Finally, 1BITADD returns a carry, the carries propagate back up the hierarchy, and the full sum is returned by 4BITADD. 1BITADD is a contained definition of 2BITADD which is a contained definition of 3BITADD, which is a contained definition of 4BITADD.

```
4BITADD[(A0< > B0< > A1< > B1< > A2< > B2< > A3< >
B3< >CIN< >)
    ($S0 $S1 $S2 $S3 $COUT)
    FULLADD($A3 $B3 $C2)(S3< > COUT< >)
    3BITADD($A2 $B2 $A1 $B1 $A0 $B0 $CIN)(S0< >
    S1< >S2< > C2< >) :
3BITADD[(A0< > B0< > A1< > B1< > A2< > B2< > CIN< >)($S0
$S1 $S2 $COUT)
    FULLADD($A2 $B2 $C1)(S2< > COUT< >)
    2BITADD($A1 $B1 $A0 $B0 $CIN)(S0< > S1< > C1< >) :
2BITADD[(A0< > B0< > A1< > B1< > CIN< >)($S0 $S1 $COUT)
    FULLADD($A1 $B1 $C0)(S1< > COUT< >)
    1BITADD($A0 $B0 $CIN)(S0< > C0< >) :
1BITADD[(A0< > B0< > CIN< >)($S0 $COUT)
    FULLADD($A0 $B0 $CIN)(S0< > COUT< >)
]]]]
```

Example 12.31

Four-Bit Adder in Terms of Nested Definitions 12.8.15 Structureless Expression

The four-bit add can also be composed without any hierarchical syntactic structure. In Example 12.32 the four-bit adder is expressed entirely in terms of association relationships among primitive operators. The structure of the expression is expressed entirely in terms of unique correspondence names.

```
def  4BITADD[(X0< >Y0< > X1< >Y1< > X2< > Y2< > X3< >Y3< >CIN< >)
     ($SUM0 $SUM1 $SUM2 $SUM3 $CARRY3)
     NOT($X0)(OP01< >) AND($OP01 $Y0)(OP04 < >) NOT($Y0)(OP02< >)
     AND($X0 $OP02)(OP03< >) OR($OP04 $OP03)(FIRSTSUM0< >)
     NOT($FIRSTSUM0)(OP06< >) AND($CIN $OP06)(OP07< >)
     NOT($CIN)(OP05< >)
     AND($OP05 $FIRSTSUM0)(OP08< >) OR($OP07 $OP08)(SUM0< >)
     AND($X0 $Y0)(OP010< >) AND($CIN $FIRSTSUM0)(OP09< >)
     OR($OP010 $OP09)(CARRY0< >)
     NOT($X1)(OP11< >) AND($OP11 $Y1)(OP14 < >) NOT($Y1)(OP12< >)
     AND($X1 $OP12)(OP13< >) OR($OP14 $OP13)(FIRSTSUM1< >)
     NOT($FIRSTSUM1)(OP16< >) AND($CARRY0 $OP16)(OP17< >)
     NOT($CARRY0)(OP15< >)
     AND($OP15 $FIRSTSUM1)(OP18< >) OR($OP17 $OP18)(SUM1< >)
     AND($X1 $Y1)(OP110< >) AND($CARRY0 $FIRSTSUM1)(OP19< >)
     OR($OP110 $OP19)(CARRY1< >)
     NOT($X2)(OP21< >) AND($OP21 $Y2)(OP24 < >) NOT($Y2)(OP22< >)
     AND($X2 $OP22)(OP23< >) OR($OP24 $OP23)(FIRSTSUM2< >)
     NOT($FIRSTSUM2)(OP26< >) AND($CARRY1 $OP26)(OP27< >)
     NOT($CARRY1)(OP25< >)
     AND($OP25 $FIRSTSUM2)(OP28< >) OR($OP27 $OP28)(SUM2< >)
     AND($X2 $Y2)(OP210< >) AND($CARRY1 $FIRSTSUM2)(OP29< >)
     OR($OP210 $OP29)(CARRY2< >)
     NOT($X3)(OP31< >) AND($OP31 $Y3)(OP34 < >) NOT($Y3)(OP32< >)
     AND($X3 $OP32)(OP33< >) OR($OP34 $OP33)(FIRSTSUM3< >)
     NOT($FIRSTSUM3)(OP36< >) AND($CARRY2 $OP36)(OP37< >)
     NOT($CARRY2)(OP35< >)
     AND($OP35 $FIRSTSUM3)(OP38< >) OR($OP37 $OP38)(SUM3< >)
     AND($X3 $Y3)(OP310< >) AND($CARRY2 $FIRSTSUM3)(OP39< >)
     OR($OP310 $OP39)(CARRY3< >)
  :     OR[(A< > B< >)($res) res<$A$B()> :00[0] 01[1] 10[1] 11[1] ]
     AND[(A< > B< >)($res) res<$A$B()> :00[0] 01[0] 10[0] 11[1] ]
     NOT[(A< >)($res) res<$A()> :1[0] 0[1] ] ]
```

Example 12.32

Syntactically Flat Expression of Four-Bit Adder 12.8.16 Conditionality

The basis of conditionality in the language is content emerging from association flow paths at a destination place to form correspondence names dynamically forming association relationships. The formed name must match the name of an expressed definition.

In Example 12.33 the invocationname is expressed as two destination places. When content flows to both destination places, an invocationname is formed and the named definition is invoked. The most primitive conditionality is the invocation of a value transform rule. The definition of the Boolean OR operator in Example 12.34 illustrates conditional invocation of value transform rules. The contents of association paths A< > and B< > emerge at the destination places $A and $B to form an invocationname. The invoked definition returns a constant, which becomes the content of the single source place, which is returned to the place of invocation as content of the un-named source place and begins flowing through association paths.

$A$B( . . . )

Example 12.33

Conditional Invocationname

OR[(A< >B< >)<$A$B( )>:0[0] 1[1] 00[0] 01[1] 10[1] 11[1]]

Example 12.34

Conditional Invocation of Value Transform Rules 12.8.17 IF-THEN-ELSE

The IF-THEN-ELSE construct can be expressed with simple name conventions. In Example 12.35 The association path $logic to logical< > to $logical is assumed by convention to contain either TRUE or FALSE. The contents of the second and third places of the destination list are constants that are the names of the conditional definitions. $logical becomes either TRUE or FALSE, invoking the named definitions contained within the definition of IF. The definition for TRUE returns the content of thenname< >. The definition for FALSE returns the content of elsename< >. The returned content flows through $name to result< > to $result to form an invocation of either THIS or THAT, which are definitions contained in the definition containing the invocation of IF. The thenname and the elsename can be any arbitrary local names. The names just have to have corresponding definitions.

```
IF($logic, THIS, THAT)(result< >)    ...... $result( ) .... : THIS[........]
THAT[....] ]
IF[(logical< > thenname< > elsename< >)($name)
    $logical() :
        TRUE[ name<$thenname>]
        FALSE[ name<$elsename>] ]
```

Example 12.35

IF-THEN-ELSE Expression Conventions

A convention of naming is established with a set of definitions that return a set of common names. Example 12.36 is a set of conditionals that all return TRUE or FALSE.

```
binaryequal[(a< > b< >) $a$b( ) :
   00[TRUE] 01[FALSE] 10[FALSE] 11[TRUE]   ]
binarygreater[(a< > b< >) $a$b( ) :
   00[FALSE] 01[FALSE] 10[TRUE] 11[FALSE]   ]
logicaland[(a< > b< >) $a$b( ) :          FALSEFALSE[FALSE]
FALSETRUE [FALSE]
      TRUEFALSE[FALSE] TRUETRUE[TRUE]   ]
logicalnot[(a< >) $a( ) TRUE[FALSE] FALSE[TRUE]   ]
```

Example 12.36

Set of Definitions Establishing Correspondence Name Convention

An invocation of a conditional can be nested in a destination list of the Invocation of IF as in Example 12.37.

IF(equal($X $Y), THIS, THAT)(result< >) . . . $result( ) . . . THIS[ . . . ] THAT[ . . . ]]

Example 12.37

Nested Conditional that Returns TRUE or FALSE 12.8.18 IF-THEN

In the IF-THEN construct the ELSE is left to a default behavior. In a sequential expression, this means continuing the sequence. However, in the invocation language, there are no default behaviors, so this construct is not viable in the invocation language.

12.8.19 Multi-Way Conditionality

Multi-way conditionality is directly expressed in the invocation language with multiple name to multiple place correspondence as shown in Example 12.38. The invocation passes the name of the definition to be invoked. The set of names must be a pre-expressed convention between the invocation and the definition. While nested IFs can be expressed in the language, there is no inherent need to binary encode conditions and decode them with nested IFs.

```
dox($choice)
dox[(todo< >)
    <$todo()>:
        doA[  ... ]
        doB[  ... ]
        doC[  ... ]
        ........
        doZ[  ... ]   ]
```

Example 12.38

Expression of Multi-Way Conditionality 12.8.20 Coordination Boundaries

The invocation language is a language of association relationships among composition boundaries. The behavior of an expression unfolds with content flowing along association paths through composition boundaries. Each invocation expresses a composition boundary that is also a coordination boundary, every one of which must be coordinated. The language assumes that all boundaries are coordinated with the completeness criterion behavior.

12.8.21 Invocation Boundaries

An invocation associates destination places in a destination list and source places in a source list. Each place and each list represents a boundary of completeness behavior. Content flow from boundary to boundary must be coordinated both within an invocation and between invocations. The completeness boundaries of the invocation are reflected to a definition, as shown in FIG. 152, that contains the expression between these two boundaries in its place of resolution. The expression inside the definition will also contain invocations with boundaries forming a hierarchical structure of composition boundaries, which expresses rich possibilities of partitioning and coordinating.

12.8.22 Coordination Behavior

The essence of coordination is completeness behavior. In a sequence of operations, each operation must be completed before the next operation in the sequence can commence. In an invocation language expression, the resolution of each invocation must be completed before its correct result flows to further associations and it accepts a new presentation to resolve. Just as a sequential language assumes that any implementation will properly coordinate the completeness behavior of a sequence, the invocation language assumes a universal convention of completeness behavior and assumes that when an invocation expression is mapped to autonomous behavior and partitioned in various ways along boundaries according to the available resources, that the partitioned boundaries will be coordinated in ways which realize the completeness behavior in one way or another. It is sufficient for the language to express coordination boundaries with their completeness criteria without expressing the details of coordination.

The universal convention assumed by the language is the completeness criterion: The completeness of content at one boundary implies completeness at boundaries from which content flows to that boundary. The completeness criterion forms a basis of coordination supporting protocols from the NULL convention to the cycle to high-level communication protocols. The completeness criterion also encompasses the interval and the clock protocol. The task of the interval is to express when a resolution is complete and correct. The task of the clock is to synchronize the completeness of concurrent intervals and of successive intervals.

The Completeness Dialog

The completeness criterion enables the simple dialogue of FIG. 153. This dialogue assumes the NULL convention as an integral part of the dialogue. The dialogue occurs between the output boundary of an invocation and all the destination places to which its source places associate. And the dialogue occurs between the input boundary of an invocation and all the source places to which its destination places associate. A dialogue also occurs between the input boundary as a whole and the output boundary as a whole of an invocation, shown in FIG. 154. The thank you and the request are also called an acknowledge.

The two dialogues are structurally identical. It is such a dialogue, based on completeness relationships, that is assumed by the language to coordinate the flow of content between all boundaries.

Four-Phase Handshake Protocol

The dialogue is identical to the classic four-phase handshake protocol, which is typically presented, as shown in FIG. 155, as two signals with interlocking behavior coordinating the transfer of content between two places. Only the send behaviors are explicitly represented by the signals, which are labeled with the behavior names. The receive behaviors are implied by the send behaviors and are usually illustrated with arrows. "Content" implies that the request was received. "Thanks" implies that the content was received. "Welcome"

implies that the "thanks" was received. "Request" implies that the welcome was received.

The Cycle Protocol

Cycle behavior introduced in Section 7.2.1 is a direct expression of the completeness dialogue. The dialogue can be interlinked just like cycles are interlinked to manage flow of content. Interlinked cycles express a progression of coordination dialogues. FIG. 156 illustrates the dialogue behavior of interlinked cycles forming an autonomously behaving pipeline.

12.8.23 Coordinating Boundaries

Within an invocation the content of the destination list ultimately flows to the content of the source list, and the completeness of the source list is coordinated with the completeness of the destination list. Each destination place in the destination list will associate with and coordinate with a source place in the greater expression. Each source place in the source list will associate with and coordinate with one or more destination places in the greater expression. Within the invocation the source list as a whole must coordinate with the destination list as a whole.

Each boundary must acknowledge all the places that contribute to its content and must be acknowledged by all the places to which it contributes. Acknowledge relationships for the example of FIG. 152 are shown in FIG. 157. When the four destination places of the destination list are complete, the destination list acknowledges the four source places. When the two source places of the source list are complete, the source list acknowledges the destination list. When the three destination places associated with the two source places of the source list are complete, each acknowledges the source list. When acknowledges from all destination places are received, the source list of the invocation is acknowledged.

All boundaries between explicitly coordinated boundaries are coordinated with the completeness criterion. All boundaries above explicitly coordinated boundaries are coordinated in terms of the explicitly coordinated boundaries. These coordination relationships are discussed in Section 7.2.

Clocked Coordination

Coordination can also be added at a chosen hierarchical level with a time interval, a clock and clocked registers. However, the timing behavior of the encompassed expression must then be guaranteed to be within the timing constraints of the clock and the behavior of the registers. FIG. 158 shows the four-bit adder coordinated with clocked registers.

Mapping to Sequential Coordination

An invocation expression can be easily mapped to an explicit expression of sequential coordination. The semicolon is introduced as a new syntax symbol to express statement sequence. Each invocation is a bounded statement. The invocations are sorted such that all source places precede their associated destination places in the sequence. The place correspondence names become variable names referencing memory locations. Each source place represents a memory write operation, and each destination place represents a memory read operation. The sequentialized expression is shown in Example 12.39.

```
4BITADD   ($A0 $B0 $A1 $B1 $A2 $B2 $A3 $B3 $C0)
     (SUM0< > SUM1< > SUM2< > SUM3< > CARRYOUT3< >);
4BITADD[(A0< > B0< > A1< > B1< > A2< > B2< > A3< >
B3< >C0< >)
     ($SUM0 $SUM1 $SUM2 $SUM3 $CARRYOUT3)
     FULLADD($A0 $B0 $C0)(SUM0< > CARRYOUT0< >);
     FULLADD($A1 $B1 $CARRYOUT0)(SUM1< >
     CARRYOUT1< >);
     FULLADD($A2 $B2 $CARRYOUT1)(SUM2< >
     CARRYOUT2< >);
     FULLADD($A3 $B3 $CARRYOUT2)(SUM3< >
     CARRYOUT3< >); ]
FULLADD[(X< >Y< >C< >)( $SUM $CARRY)
     NOT($X)(OP1< >);
     NOT($Y)(OP2< >);
     AND($OP1 $Y)(OP4 < >);
     AND($X $OP2)(OP3< >);
     AND($X $Y)(OP10< >);
     OR($OP4 $OP3)(FIRSTSUM< >);
     NOT($C)(OP6< >);
     NOT($FIRSTSUM)(OP5< >);
     AND($C $OP5)(OP8< >);
     AND($OP6 $FIRSTSUM)(OP7< >);
     AND($C $FIRSTSUM)(OP9< >);
     OR($OP7 $OP8)(SUM< >);
     OR($OP10 $OP9)(CARRY< >); ]
```

Example 12.39

Sequentialized Four-Bit Adder 12.9 Large Domains of Differentness

Large domains of mutually exclusive differentness are expressed with large sets of unique names. For a pure association expression, each unique place must have a correspondence name. For a pure value expression, the character set of the language will rapidly run out of unique characters and the values will need to be represented as unique names. Proteins, for instance, might be represented with their fully spelled out protein names.

The discussion will focus on association expression. The simplest expression of a large domain of differentness is a large collection of places with unique association relationships. Each place is an appreciation of an interaction of differentnesses.

FIG. 12.26 illustrates expression of unique places as appreciation of interactions of differentnesses. It shows both the graphical expression and the language expression of the minterm form of a pure association expression for a binary full-adder. In the language expression there are eight invocations with just a destination list. Each destination list is a unique combination of associations to places in the source list. Given the mutual exclusivity relationships of the places in the source list, only one invocation destination list will become complete, thus enabling its invocation. The enabled invocation will invoke its named definition and generate the indicated output behavior.

There can be large mutually exclusive input domains of differentness whose interaction produces a very large mutually exclusive domain of appreciation differentnesses. A large domain of differentness can be expressed by expanding the mutually exclusive input domains. FIG. 160 shows an expression with two large input domains and a very large minterm. There might be K mutually exclusive input domains each with L possibilities resulting in LK possible appreciation minterm places. Each appreciation can enable a behavior appropriate to the appreciated name. The names are shown in the example as a progression of place-value names, and while there may be convenient aspects to expressing the names as place-value numbers, there is no need that the names be ordinal or cardinal or be otherwise related beyond each being unique.

12.10 Experience Memory

An enabled place can be a ring that remembers the behaviors coincident with an appreciation. There might be several input domains of differentness such as visual recognition input, tactile input, smell input, or hearing input. These differentnesses can combine resolving to a very large domain of unique places appreciating an experience. The current behavior is presented to all the rings, and each experience appreciation enables one ring that remembers the behaviors coincident with the experience. One can start with a very large expression, and as experience accrues, the rings become populated with content. Each access of a ring is both a read and a write. The remembered content spills out, combines with the current content of the experience, flows back into the ring, and continues on to influence the next behavior of the expression.

FIG. 161 shows the structure of an experience memory and its language expression. The inputs are the current behavior and the multiple differentness domains. The appreciation is the familiarity and the content of the memory is the reminiscence. The memory associates experience through time.

12.11 Conditional Iteration

The greatest common divisor algorithm of Euclid (GCD), shown in the flowchart of FIG. 162, illustrates conditional iteration in the language. The algorithm generates intermediate values until M is equal to 0, at which point N is equal to the greatest common divisor of the input M and N. Example 12.40 is the invocation expression of the greatest common divisor algorithm. The association relationships form a ring that the content flows around until the termination state is reached. N is passed on as the GCD, and a new pair of numbers is allowed.

```
inv  GCD($M $N)( GCD< >)
def  GCD[(M< >N< >)( $GCD)
         init< 0 >
         LTsteer($M,$N)(inlesser< > ingreater< >)
         dualfanin($incondition {$inlesser $remainder}{$ingreater
         $cyclelesser})
               (lesser< > greater< >)
         Mod($cyclelesser $cyclegreater)(remainder< >)
         EQ0({$lesser $init})(incondition< > outcondition< > )
         dualfanout($outcondition $lesser $greater)
               ({(cyclelesser< > cyclegreater< >) ( SINK< >
               GCD< >)})
         dualfanin[(steer< >{A< > B< >}{C< > D< >})($out1 $out2)
               $steer( ):        True[out1< $A > out2< $B >]
                                 False[out1< $C > out2 < $D >]]
         dualfanout[(steer< > A< > B< >)({($out1 $out2)
         ($out3 $out4)})
               $steer( ):        True[out1< $A > out2< $B >]
                                 False[ out3< $B > out4< $A >]]
         EQ0[(A< >)($condition $condition)
               condition<Equal($A,0 )>:]
         LTsteer[(A< >B< >)($out1 $out2)
               LT($A $B):        True[out1< $A > out2< $B >
                                 False[out1< $B > out2< $A >]] ]
```

Example 12.40

The Invocation Expression of the Greatest Common Divisor

FIG. 163 shows the association structure of the invocation expression. LTsteer makes sure that the inputs are correctly oriented in terms of magnitude. The invocation of dualfanin accepts input from either the input or the feedback ring depending on the content of $lesser (M). If lesser is equal to zero, then a new input can be accepted. If it is greater than zero, then a resolution is in progress. The content of source place init< > provides an input of 0 to the invocation of EQ0 to configure the expression to accept its first input.

The invocation of dualfanout delivers the content of the pipeline into the ring or to the output depending on the value of $lesser. The function N mod M is performed in the feedback ring, and passed through dualfanin; then the content of $lesser is tested. If $lesser is zero, then the resolution is completed and dualfanout delivers the content of $greater to the output as the greatest common divisor and discards the content of lesser.

12.12 Value Sequencer

Example 12.41 is a simple expression that continually rotates through four values. Each time it is invoked, it returns the next value. The value is maintained in the invocation itself in the feedback association from the source list to the destination list. The value is initialized by setting the content of value< > to 0.

```
inv  fourstate($value)(value< 0 >) ... $value
def  fourstate[(curvalue < >)($nextvalue)
         nextvalue <$curvalue( )> :
              0[1] 1[2] 2[3] 3[0] ] ]
```

Example 12.41

Four-Value Sequencer

Example 12.42 is a pure association version of a value sequencer.

```
inv  fourvalue($value)(value< 0 >) ...    $value
def  fourvalue[({{S1 < > S2 < > S3 < > S4 < > }})([{$SA $SB $SC
     $SD}])
         A( $S4 )
         B( $S1 )
         C( $S2 )
         D( $S3 ) :
         A[SA<D>] B[SB<D>] C[SC<D>] D[SD<D>] ] ]
```

Example 12.42

Pure Association Sequencer

Example 12.43 is a pure value version of a value sequencer.

```
inv  fourstate($value)(value< 0 >) ...    $value
def  fourstate[(curvalue < >)($nextvalue)
         $curvalue :
              0[nextvalue <1>] 1[nextvalue <2>]
              2[nextvalue <3>] 3[nextvalue <0>] ] ]
```

Example 12.43

Pure Value Sequencer

The invocation maintaining the value can be inside the definition, as in Example 12.44. In this case the invocation does not send the current value but just requests the next value. The internal memory value sequencer is a wavefront source continually presenting successive wavefronts to the place of the invocation.

```
inv    fourvalue( )
def    fourvalue[( )($value)
            nextvalue($value)(value< 0 >) :
            nextvalue[(curvalue< >)($newvalue)
            newvalue<$curvalue( )>
                0[1] 1[2] 2[3] 3[0] ] ]
```

Sequencer with internal state maintaining invocation.

12.13 Code Detector

The code detector of Example 12.45 detects the occurrence of code sequence 0010111 in a continuous stream of bits. It is a state machine that enters a particular state when the sequence is detected. The invocation of code receives the current state and the next bit in the stream, invokes the definition of code, and receives in return the next state and the detect condition. The next state in the source list associates with current state in the destination list. When the next bit arrives, the definition is invoked with the current state and the next bit. The expression is initialized by setting the content of state< > to S0. The behavior of the state machine is presented in FIG. 164 as a function table and as a state transition graph.

```
inv    code($state $nextbit)(state< S0 > detect< >)
def    code[(currentstate< > newbit< >)($state $detect)
        $newbit$currentstate( ) :
            0S0[detect< no > state<S1>]
            0S1[detect< no > state<S2>]
            0S2[detect< no > state<S2>]
            0S3[detect< no > state<S4>]
            0S4[detect< no > state<S2>]
            0S5[detect< no > state<S1>]
            0S6[detect< no > state<S1>]
            1S0[detect< no > state<S0>]
            1S1[detect< no > state<S0>]
            1S2[detect< no > state<S3>]
            1S3[detect< no > state<S0>]
            1S4[detect< no > state<S5>]
            1S5[detect< no > state<S6>]
            1S6[detect< yes > state<S0>]]
```

Example 12.45

Code Detector State Machine

The code detector always asserts a yes or a no for the detect condition. A response filter expression, such as Example 12.16 shown earlier in this chapter, can receive the detect condition and only pass on the yes condition.

12.14 A Control Program

This example is an expression to control the behavior of a set of stoplights at an intersection. There is a main road and a side road forming a Tee. The traffic lights are green for the main road and red for the side road until a car is detected on the side road by a magloop switch. The lights then cycle to red for main road and green for side road to allow the car on the side road to enter the main road. Each cycle has a specific period. The main lights become amber for 5 seconds, the main lights are red and the side light green for 40 seconds, and the side light is amber for 5 seconds, then the main light becomes green and the side light red for 60 seconds before another control cycle is allowed.

There are two walk buttons controlling walk lights for the main road and for the side road. When the side road button is pushed, the side road light is red and the main light is green; the walk light for the side road will cycle to walk for 20 seconds and then don't walk for 10 seconds before allowing another control cycle.

When the main walk button is pushed, the main lights will cycle to red for the main road and red for the side road. The walk lights will then cycle to walk for 20 seconds and don't walk for 10 seconds. Then the main light will cycle back to green.

The control program is shown as Example 12.46. The sequencing behavior of the program is expressed with a single token flowing through the places named Nx in the expression. The Nx places form a structure of three rings coupled through the invocation of listen. The single token flows from listen into a control ring and sequences the expression's behaviors as it flows through the ring and then back to the listen invocation. The ring structure of the expression and its response to the switch inputs is shown in FIG. 165.

The input to listen is the token and content from the magloop switch or the walk buttons. The token input is received in the mutually exclusive places $N9, $N20 and $N25. The enclosing braces indicate that only one place will have content at a time, which is true by virtue of there being only one token. The switch and button destination places encompassed by double braces are arbitrated into the invocation. The source list of the listen invocation has three places encompassed by braces, indicating that only one place will have content: the single token. The definition of listen receives the token and directs it to a specific output according to the switch and button content. The token flowing through a specific output path enables and begins a specific control sequence. The control periods are expressed with an invocation of delay which receives the token and returns it after the specified period.

```
World[
    magloop< > mainbutton< > sidebutton< > startA< token >
    $mainlight $sidelight $mainwalklight $sidewalklight
        "listen for switch and buttons"
        listen({$N9 $N20 $N25} {{$magloop $mainbutton $sidebutton}})({N1< > N10< > N21< >})
        listen[(token< > signal< >)({$out1 $out2 $out3})
            $signal( ) :    magloop[out1<$token>]    mainbutton[out2<$token>]    sidebutton[out3<$token>] ]
        "cycle main lights"
        setlights($N1,AR)(N2< > mainlight< > sidelight< >) delay($N2, 5)(N3< >)
        setlights($N3,RG)(N4< > mainlight< > sidelight< >) delay($N4, 40)(N5< >)
        setlights($N5,RA)(N6< > mainlight< > sidelight< >) delay($N6, 5)(N7< >)
        setlights({$N7 $startC},GR)(N8< > mainlight< > sidelight< >) delay($N8 60)(N9< >)
            "cycle main walk light"
        setlights($N10,AR)(N11< > mainlight< > sidelight< >) delay($N11, 5)(N12< >)
        setlights($N12,RR)(N13< > mainlight< > sidelight< >) delay($N13, 5)(N14< >)
        setmainwalk($N14,W)(N15< > walklight< >) delay($N15, 20)(N16< >)
```

-continued

```
setmainwalk($N16,DW)(N17< > walklight< >) delay($N17, 10)(N18< >)
setlights($N18,GR)(N19< > mainlight< > sidelight< >) delay($N19, 60)(N20< >)
    "cycle side walk light"
setsidewalk($N21,W)(N22< > walklight< >) delay($N22, 20)(N23< >)
setsidewalk($N23,DW)(N24< > walklight< >) delay($N24, 10)(N25< >)
    "initialize walk lights"
setsidewalk($startA,DW)(startA1< > walklight< >) delay($startA1, 10)(startB< >)
setmainwalk($startB,DW)(starB1< > walklight< >) delay($startB1, 10)(startC< >)
setlights[(Nx< > color< >)($next $main $side)
    next<$Nx > $color( ) :
        GR[main<green> side<red>] AR[[main<amber> side<red>]
        RG[[main<red> side<green>] RA[[main<red> side<amber>]
        RR[[main<red> side<red>] ]
setmainwalk[($Nx< >,color< >)($next $mainwalklight)
    next<$Nx> $color( ) :
        W[walklight<WALK>]] DW[walklight<DON'T WALK>] ]
setsidewalk[($Nx< >,color< >)($next $sidewalklight)
    next<$Nx> $color( ) :
        W[walklight<WALK>]] DW[walklight<DON'T WALK>] ] ]
```

Example 12.46

Street Light Control Program

The expression is within a definition named world with no source list and no destination list: no input and no output. There are free source places and destination places within the definition. The free source places magloop, mainbutton and sidebutton represent the switches providing input to the control expression. The free destination places mainlight, sidelight, mainwalklight and sidewalklight represent the lights that are being controlled by the control expression. These free places are the interfaces of the expression. They can be considered the dangling wires to be connected.

The liveness of the expression derives from the flowing token and the switch inputs. The expression is started with a token content in the free source place named startA< > that flows through two invocations to initialize the walk lights. The token then enters the control paths and initializes the traffic lights through $startC. $N7 and $startC are encompassed in braces, indicating that only one will have content at a time. The token initially flows through the $startC place and afterward flows through the $N7 place.

12.15 LFSR

The binary Linear Feedback Shift Register (LFSR) shown in FIG. 166 is a complex cyclic association structure of invocations of XORs and invocations of buffers. Each buffer is initialized with 0 or 1. The expression of the LFSR is the association structure of invocations of XOR and BUF. In the graphic expression, the output of each function is named with a letter. In the string expression, the output of each invocation is named with the corresponding letter. Any number of invocations can associate with any source place of the LFSR from anywhere in the greater expression. Example 12.47 shows three external invocations associating with the LFSR.

```
World[
    invoc($K)(...) ...... invoc2($D)(...) ........ invoc3($F)(...)
    XOR($C,$D)(M< >)
    XOR($E,$F)(N< >)
    XOR($M,$N)(O< >)
    BUF($C)(D<0>)
    BUF($D)(E<1>)
    BUF($B)(C<0>)
    BUF($E)(F<0>)
    XOR($A,$B)(Q< >)
    XOR($G,$H)(R< >)
```

-continued

```
    XOR($Q,$R)(S< >)
    BUF($L)(A<0>)
    BUF($A)(B<0>)
    BUF($F)(G<1>)
    BUF($P)(H<0>)
    XOR($O,$G)(P< >)
    BUF($H)(J<1>)
    XOR($S,$J)(K< >)
    BUF ($K)(L<0>)    :
    XOR[(A< >B< >)<$A$B( )> : 00[0] 01[1] 10[1] 11[0] ]
    BUF[(content< >)($content)] ]
```

Example 12.47

Linear Feedback Shift Register

The LFSR could be isolated in a definition, but that would limit its accessibility. The LFSR is a wavefront source. The initialized values continually cycle around the rings of the LFSR, producing a steady stream of wavefronts to all associated destination places. Residing in the midst of a large expression, it can send wavefronts to many places simultaneously.

12.16 Summary

The Invocation language is a language of association relationships. Uncluttered with conventions and confusions, it captures the bare essentials and elegant simplicity of expressing concurrent distributed behavior from its most primitive form to expressions of arbitrary complexity. It encompasses all forms of process expression from logic circuits to mathematical computation, from cell metabolism to neuron networks and biological structures.

The language is presented in the context of a contemporary programming language, but there are many familiar programming concepts and constructs that are not included in the language.

There is no conception of sequence in the language. The language expresses generally concurrent behavior in terms of association relationships and flow boundaries coordinated in terms of completeness relationships.

There is no conception of explicit control in the language. The language assumes fully distributed locally autonomous behavior. Content flows spontaneously through paths of association, locally coordinating its flow from boundary to boundary in terms of completeness relationships. The notion of explicit control does not arise.

There are no predefined control operators in the language. Name formation is the primitive behavior of the language from which all expression of conditionality derives.

There is no predefined set of primitive symbols. Any set of symbols can be used. A small set of the available symbols must be reserved to express the syntax structures and the rest can be used to express correspondence names and content. The symbols used in this chapter are simply a convenient set of symbols familiar to most readers.

There are no predefined data types, data operators or data structures. What is commonly considered to be data and its operations are expressed from scratch in the language instead of being pre-defined. Expression in the language begins with value transform rules expressing the primitive interaction relationships among the available symbol values. Sets of value transform rules can be encapsulated within a definition expressing an operation on a data element. Further hierarchical definitions express more complex compositions of data and their behaviors.

There is no conception of separate addressable memory in the language and no notion of a variable as a reference to memory. Content of a resolving instance of a process is assumed to be maintained in the association paths of an expression. The notion of a separate addressable memory does not arise.

There is no conception of a sampleable state space. The language assumes fully determined locally autonomous behavior. "State transitions" can occur at any time. There are no predictable instants of stability to sample an extended state space. An expression is understood and trusted in terms of its fully determined symbolic behavior. The notion of state space is meaningless and unnecessary.

There is no conception of time reference or time relationship in the language. The behavior of an expression is purely in terms of symbolic behavior. There is no need for any global or local referent of time or of any form of time-related behavior within the language. Any relation to an external time referent is an implementation issue, not a language issue.

The invocation language provides a general solution to concurrent system design and to concurrent programming that is uniform and consistent at all levels of hierarchical composition from value interaction mapping tables to the highest levels of abstraction. Invocation expressions can be mapped to any convenient implementation environment from a direct implementation of the pipeline structure to a conventional sequential computer or to any flavor of distributed multiprocessing environment in between such as multiple core processors or sea of ALU processors. The invocation language is the key to scalable computing and to concurrent computing.

12.17 Reflections

Contemporary computer science is deeply flawed. One might think that the technical and commercial success of computers speaks to the robustness of the theoretical concepts supporting the enterprise, bu, far from delivering conceptual enlightenment, insight and support in building and using computers, contemporary theory injects unnecessary complexity, expense and risk into the enterprise. The success of electronic computers has been largely a matter of engineering determination and cleverness by the humans in the works, even as the theory has made the engineering more complex than necessary.

12.18 In the Beginning

The notion of mechanical computation has been knocking around mathematics since the thirteenth century. It came to fruition in the twentieth century with the formalization of mathematical computation in the notion of the algorithm and the Turing machine. The electronic computer was the embodiment of the mathematical notion of mechanical computation, the extension of an established mathematical idea. It seemed obvious that the computer was a mathematical object encompassed within the theoretical foundations of mathematics.

The problem is that the theoretical foundations of mathematics have not worked out very well as theoretical foundations for computer science. Chapter 1: "A Critical Review of the Notion of the Algorithm in Computer Science" criticizes the theoretical foundations of contemporary computer science and argues that computer science is not mathematics at all, that mathematicians and computer scientists are pursuing very different goals.

Computer science is primarily concerned with the nature of the expression of processes regardless of what particular process might be expressed.

Mathematics is primarily concerned with the nature of the behavior of a specific process regardless of how that process might be expressed.

Computer science is a science of process expression, quite distinct from mathematics, and the conceptual foundations of mathematics are not appropriate for computer science. A conceptual orientation that filters out variety of expression is not the best foundation for studying variety of expressivity.

Furthermore computer science aspires to encompass the symbolic computational processes of nature such as cell biology and brain function. There are no Turing machines in nature, no global clocks, no central memories. Nature is not binary, and it is not Boolean. If computer science wishes to more closely model nature, then it needs conceptual models more closely attuned to nature's expressions.

12.19 The Root Problem

Chapter 2: "The Simplicity of Concurrency" attacks the nuts and bolts of contemporary computer science head on. The conceptual difficulties of computer science can be traced to the mathematical notion of a function as a stateless mapping. Composed functions produce races and hazards. A time interval is added to isolate the unruly logic behavior, and further composition must be in terms of the time intervals, which can only be composed synchronously or sequentially. A sequence of operations requires explicit sequence control, and an addressable memory is required to park data awaiting its turn in sequence. The notion of a sampleable state space is introduced to provide a methodology of confidence.

12.20 The Labyrinth

This is a structure of interlinked, mutually supporting concepts forming a labyrinth that is difficult to escape. A conceptual view can defend itself by appearing ideally suited within its own context and making other conceptual views appear less than ideal. Sequentiality appears straightforward and much simpler than concurrency, but this is only if both sequentiality and concurrency are looked at in terms of sequentiality.

12.21 Exiting the Labyrinth

The only path to a different conceptual view is to start over from the primitive beginning. Chapter 2 introduces the NULL convention and the concept of state holding primitives that understand how to cooperate among themselves. A quite different conceptual view emerges.

A concurrent composition of state-holding primitives cooperate to deterministically coordinate the flow of resolution. There is no need of the concept of a time interval, no need of the notion of synchronous sequentiality, no need of explicit control, no need for a notion of an addressable memory and finally no need of the notion of a state space. Primitive state-holding functions are sufficient in themselves to build complex expressions in contrast to primitive stateless functions that must be supported with a Rube Goldberg structure of ad hoc concepts. One glimpses the simplicity of concurrency and the complexity of sequentiality.

Table 13.1 contrasts the two views of process expression. The left column lists the familiar notions that must be abandoned and the right column lists the new notions that must be embraced.

TALBE 13.1

A contrast of world views.

| Abandon the notions of | Embrace the notions of |
| --- | --- |
| Stateless functions | State-holding functions |
| Time interval | Logical completeness |
| Synchronicity | Distributed local behavior |
| Sequentiality | Concurrency |
| Explicit control | Cooperation |
| Common memory | Distributed content flow |
| Extended state space | Logical determinism |

12.22 Computer Gods

How is it that deeply flawed theoretical foundations have seemingly supported the greatest technological achievement in human history. The answer is the humans in the works. The success of the computer has been largely a matter of engineering cleverness and determination masking the shortcomings of concept.

The humans are another "presence" of the mathematical heritage: the symbol system defining human, the algorithm inventing human, the machine designing human and the pencil wielding human. The computer eliminated the pencil wielding human, but the others remain in the works.

If one only wants a working expression of a process, appeal to arbitrary sufficiency, if it is available, can be conveniently effective. However, if one is seeking insight into the nature of process expression itself, the presence of arbitrarily sufficient expressivity fundamentally undermines any such effort. Appeal to arbitrary sufficiency can reveal nothing about essential necessity. Saying a human does it in computer science is like saying a God does it in physics.

A human is an arbitrarily capable attribute that can make anything work, filling in the nooks and crannies of conceptual shortcomings. No theory can be falsified. Theories cannot be compared because all theories work equally well. The humans in the works both realize the computer and deny it theoretical closure.

But are the humans really necessary? Computing mechanisms and processes exist in nature and computer science aspires to encompass these processes, in particular, biological and neural processes. These processes are clearly naturally occurring phenomena, are decidedly not artifactual, and do not have humans in their works. If computer science is to encompass brains and other natural processes, it must eliminate its humans in the works.

Chapter 3: "Dehumanizing Computer Science" introduces the notion of the pure value expression within which expressions can spontaneously arise and persist. No human creators, inventors or designers are needed.

12.23 What's in a Name?

The notion of the variable is another idea from mathematics that sort of works but causes a lot of problems also. Chapter 4: "Transcending the Variable" sets the stage for a programming language purely in terms of association relationships by showing that a variable name is really expressing an association relationship. If a variable name is understood as expressing a direct association relationship rather than as a reference to memory, then the problems of ambiguous reference and side effects do not arise.

12.24 The Invocation Model

Chapter 5: "The Invocation Model" introduces the invocation model of process expression that characterizes process in terms of the expression and appreciation of differentness. The invocation model posits a primitive theng that asserts one at a time of two or more possible values. Theng represents spatial persistence and value represents symbolic mutability. Thengs can associate forming structures within which each theng is different by virtue of its place in the structure. Values interact according to value transform rules. A value is different by virtue of its interaction behavior with other values. Associated thengs and changing values are two different ways of expressing and appreciating differentness that cooperate to form expressions of indefinite complexity. Thengs associating and asserting values that change according to value transform rules prove sufficient to encompass all familiar forms of process expression. No additional concepts were introduced, and none were needed.

Process can be expressed purely in terms of value differentness, purely in terms of association differentness, or as a combination of association differentness and value differentness forming a spectrum of expression from pure value expression on one end to pure association expression on the other end with mixed expression in the middle.

While the behavior of pure value interaction can be discrete, directed and deterministic, associated thengs do not inherently exhibit directional, discrete or determined behavior. It was shown how to use value differentiation to achieve association expressions with discrete, directed and deterministic behavior with the NULL convention and the unit of association convention. The pure association expression was then presented that expresses a process purely in terms of association differentiation. With pure association expression emerged a new form of minimum value logic, 2 value NULL Convention Logic.

The invocation model and its spectrum of expression directly relates the expression forms of nature and of humans. Nature's expressions such as proteins in the cytoplasm, which use lots of values and little association structure, fall toward the pure value end of the spectrum. Nature's expression of the brain and DNA fall toward the pure association end of the spectrum. Humans are fond of the pure association end of the spectrum with large association structures and very few values.

Chapter 6: "Along the Spectrum" journeys across the spectrum with a single example process expressed at different places along the spectrum illustrating the pure forms of expression and the mixed forms of expression with a discussion of the relative efficiencies of the various forms.

12.25 Composing Differentness

Primitive differentnesses and primitive appreciations compose to form more complex expressions. Chapter 7: "Composing Boundaries" discusses the composition of complex expressions and the coordination of the composed behaviors for both association expressions and value expressions. Greater association expressions are composed by associating behavior boundaries of lesser expressions, forming a hierarchy of networks of composition boundaries that are also completeness boundaries, coordination boundaries and partition boundaries.

12.26 The Cycle

The cycle, a feedback relationship with spontaneously oscillating behavior, is introduced as a first level of explicit coordination in conjunction with the NULL convention. The cycle provides liveness to an expression as well as coordination behavior. Cycles can be interlinked. forming spontaneously behaving and fully coordinated pipeline structures. It was also shown that cycles can be expressed and linked to expression pipeline structures within a pure value expression.

12.27 The Last Composition

With any association composition there will be un-composed dangling boundaries. The last composition that encompasses the dangling boundaries of the association expression is a pure value expression. Association expression begins with primitive components within a pure value expression, and an association expression remains a component of the pure value expression. Appreciating differentness takes on new meaning for the association expression as it drifts through the content of the pure value expression.

While pure value composition was introduced as the top of the hierarchy of association composition, one can also find examples of pure value composition at intermediate levels of association expression. Biological bodies mix both forms of expression at different levels in different ways. Biology starts with a pure value expression in the cytoplasm bounded by the cell membrane. There are also isolated pure value expressions, organelles, within the content of the cytoplasm. Cells are associated into the hierarchical structures of tissues, organs and organisms, but this association of cells is also composed in terms of the pure value expression of the blood that associates universally with all cells. The alimentary canal is a pure value expression encompassed by an association expression.

12.28 Nature's Compositions

Association expressions spontaneously arise in nature within the pure value expressions of soil, sea and air. A primary organizing principle of spontaneous composition may be the fact of catastrophic failure. There are no halfway persistent expressions. There are no 99% persistent expressions. The successes are absolute successes. There is no progressive approach to persistence. Whatever succeeds arises suddenly with no precursor and no history of failure. A persistent locus may evolve after arising, but it did not evolve before arising. It seems exceptional because the failures that went before are not recorded. Nature does not learn from her mistakes. She just forges ahead with her successes. She may not have very pretty design rules, but she has a ruthlessly effective debugger and that may be sufficient. The question is, What are the possibilities and what is the capacity for experiment? If both are sufficiently large, possibilities will occur.

12.29 Time and Memory

An expression adrift in a greater pure value expression might find it useful to appreciate differentness through time. Appreciating differentness through time requires memory to associate a differentness from the past with a differentness in the future. Chapter 8: "Time and Memory" discusses the expression of differentness through time and its appreciation.

An association expression is an inherent referent for time. The successive presentations of input provides a more or less uniform tick of time interval. The structure of an association expression provides a referent of present, past and future for each wavefront flowing through the expression. An association expression can contain association structures that delay content and associate it with future wavefronts, allowing the appreciation of differentness through time.

Process expression can be viewed as a structure of memories of various persistences. The expression itself is a locus of persistence that is relatively stable from presentation to presentation. The presentations to the expression are transient in relation to the expression itself. They are temporarily maintained within the expression as they flow through the expression. The expression can include memories that are more transient than itself and less transient than its flowing presentations. Structures of association relationships among these memories of varying persistence form expressions that appreciate differentness through time.

12.30 The Arrogance of Bulk an association expression is a reffferent for differentnesses flowing through it. As the content of memories including the expression itself changes, the appreciation behavior of the expression changes, but it does not cease to be a referent of differentness. Any association expression of sufficient persistence and stride of appreciation, even if it is continually changing, becomes a de facto referent: an arrogant bulk projecting its appreciations on all it encounters.

12.31 Incidental Time

Not all expressions that extend through time with memory are appreciating differentness through time. Some expressions extend in time as an incidental aspect of expression. Chapter 9: "Incidental Time" discusses incidental extension in time that can be a strategy of enlivenment such as progressive interpretation of referential expressions or that can occur because of available resource limitations. The conventional computer extends expression in time for the purpose of general configurability and for convenience of implementation. A common reason for extending an expression in time is a "time/space trade-off" where it is cheaper to use a single autonomous expression over and over in sequence with lots of memory rather than implement the autonomous expression multiple times in a network of associations.

12.32 Points of View

An expression of a process begins with a point of view as to the differentnesses and their interaction. Chapter 10: "Points of View" presents and contrasts several points of view of process expression. The lead example expression is an eagle landing on a branch. The process is considered from the point of view of an observer with a projected spatial reference frame and differential equations. It is also considered from the point of view of the eagle as a pure association expression. Number as expression of differentness is discussed, and the notion of a single-digit number is introduced to contrast the view in terms of place-value numbers and the view in terms of pure association expression.

An observer is just an association expression interacting with another association expression projecting a point of view onto the observed expression. There are three points of view involved. The observer's view of its own intrinsic behaviors, the observer's view of its projection of metric onto the observed expression, and the observed expression's own view of its intrinsic behaviors. The problem of the observer is to find a projected metric that best characterizes the observed expression. The observer should also try to appreciate the point of view of the observed expression. The observer's quandary is that there is no meta referent of correctness, no teacher giving hints. There is no way for the observing expression to directly judge the efficacy of its projected metric or of its take on the point of view of the observed expression. There are only subtle clues such as consistency, coherence, simplicity, correspondence to experience, and so forth.

A point of view is formed in terms of its primitive concepts. The choice of stateless functions or of state-holding functions leads to dramatically different views of process expression. While every expression must adopt points of view, a point of view can create illusions, mask realities, and serve as a self-perpetuating referent in such a way that it can be very difficult to transcend the point of view. There is no one most general or universal point of view, and there is no definitive guide to an effective point of view.

12.33 Referential and Autonomous Expression

Chapter 11: "Referential and Autonomous Process Expression" discusses the notions of autonomous expression, which spontaneously behaves on its own merits, and referential expression, which does not spontaneously behave on its own merits but requires the assistance of an autonomous expression. Since it does not have to behave, referential expression can be partial in many convenient ways realizing economies of expression with appeals to universal conventions and consolidation of common expressions. Referential expressions can be integral components of autonomous expression, and they can be independent symbolic templates that can be mapped to many other forms of referential expression and artificial autonomous expressions.

12.34 The Invocation Language

Chapter 12: "The Invocation Language" presents a language of association relationships in terms of a string of symbols. It is the language of distributed concurrent behavior with uniform expressivity through all levels of hierarchical composition. It is the key to scalable and reliable distributed concurrent computing.

12.35 Comparisons

One might think that there should have been more discussion of comparisons between the invocation model and the current theory of computer science, but it is not possible to make meaningful comparisons. How does one compare a model of process within which state space is meaningless in terms of state space. How does one compare a model that is fundamentally distributed and concurrent in terms of strict sequence or in terms of a central memory. How does one speak of a model of spontaneous behavior in terms of explicit control. The gulf is too great. Any attempt at direct comparison would be a futile exercise in confusion and ambiguity.

12.36 Models of Concurrency

The most influential contemporary models of concurrency begin with sequentiality such as communicating sequential processes [1] and cooperating sequential processes [2]. There are models that attempt to directly model concurrency, but they are hampered by notions inherited from sequentiality.

12.37 Petri Nets

A Petri net is a token flow model of concurrent behavior [3]. It is a directed graph of alternating places (circles) and transitions (fat lines). A place can contain tokens. A transition takes tokens from an input place along an input arc of the transition and places tokens in an output place along an output arc of the transition. Each arc is assigned a token weight. The weights on input arcs indicate how many tokens must be in the associated place for the transition to fire. When a transition fires, it removes a number of tokens equal to the weights of its input arcs from each input place and sends the number of tokens equal to the weight of each output arc to each output place. Tokens flow along the directed arcs of the graph as transitions fire.

The behavior of the tokens is directed and discrete. A Petri net has a form of completeness behavior in that a transition only fires when there are enough tokens in the input places to satisfy the weights of the input arcs, but transitions fire indiscriminately of each other and, in particular, regardless of the state of receiving transitions. There seems to be a relationship between emptiness and fullness but this is not a completeness relationship. A place can contain any amount of tokens and a firing transition will not necessarily empty all the tokens from a place. If the input places of a transition have enough tokens to fire three times, the transition will fire three times in immediate succession sending tokens to its output places. The firings of transitions are not, themselves, coordinated. A transition fires when its input is satisfied regardless of the state of the receiving places allowing tokens to collide and pile up in places.

With an appropriate network structure and with a sufficiently sparse initial marking of tokens, one can tease coordinated deterministic behavior from component behaviors that are inherently nondeterministic in composition. If as a token flows, it trails emptiness immediately behind it, the tokens are kept far enough apart in the network by dependency relationships to avoid collisions. The alternation of the flow of completeness and emptiness through the network can effectively mimic a monotonic coordination protocol like the NULL convention and cycles. FIG. 167*a* shows a 2NCL pipeline of coupled cycles, and FIG. 167*b* shows the corresponding Petri net model. The weight of each arc is one. When a token enters the upper left place a token wavefront will flow through the expression mimicking the behavior of 2NCL cycles.

A Petri net is generally considered to be modeling control flow. It is only a partial model of overall behavior. It does not model data or data processes. Also the model of token flow does not correspond to available spontaneous behaviors such as voltage level transitions.

12.38 Data Flow

Data flow does model data and data processes [4]. Data flow has many similarities to the invocation model. A data flow expression is a network of linked operators through which data flows. There is a notion of coordinating data flow in terms of completeness relationships. An operator can proceed only when all its input links have data in them and its output link is empty. The requirement that the output link be empty corresponds to NULL, keeps successive wavefronts of data separated, and coordinates the flow of data through the network. The behavior of a data flow network is coordinated by the input completeness and output emptiness relationships as data flows through the network.

There is no notion of central memory, all state is maintained in the links connecting the operators. All behavior and all memory is distributed locally within the network. There is no globally influential behavior or data.

Since any operator with complete input can proceed, the data flow model is inherently concurrent. This rule of behavior appears to eliminate any explicit notion of control in the model, but there is a critical factor missing. There is no intrinsic means of directly expressing or appreciating completeness of input or emptiness of output in the definition of the links or of the operators. The notion of data remains one of continuous presentation and for the operators, which are typically defined to be functions, one of stateless mappings. There must still be a separate agent of control managing the flow of data through the operators. Completeness and emptiness is just a rule of behavior to be enforced somehow or other. It is not an intrinsic behavior of the model.

Typically a binary token flows along with data to indicate empty and full. A controller manages operator behaviors and flow of data in terms of the token flow. The flow of the token and the data still have to be carefully timed. While the data flow model has transcended the explicit control of sequence, it introduces the even more complex explicit control of concurrency and concurrent timing relationships. Data flow computers have not become economically viable because the gained performance benefit has never exceeded the increased costs of complex concurrency control. To achieve economic concurrency, the issues of critical timing and explicit control must be eliminated.

Data flow, as a network of linked operators, remains a one hierarchical level conception of concurrent behavior. An operator is not expressed internally as a data flow graph and a data flow graph does not abstract into an operator.

12.39 Asynchronous Circuit Design

Circuits of logic functions have always been inherently concurrent expressions with unruly behavior. One solution was to filter out the unruly behavior with a time interval and a clock. Asynchronous circuit design is an attempt to tame the unruliness of concurrent behavior with a means other than a time interval and a clock [5][6]. At the primitive level of logic circuit design there cannot be an explicit control expression. The logic has to behave on its own terms.

The C-element was introduced which provided a logic operator with state-holding behavior that could appreciate transitions between disjoint states. This enabled the notion of delay insensitive encoding of data, which is a form of the NULL convention. Asynchronous circuits were then expressed with a combination of Boolean functions and C-elements. The difficulty is that the stateless Boolean functions were retained. While such mixed expressions can be made to work, they are still very complex and involve many critical timing relationships. Asynchronous circuit design is also a single-level model that resides at the logic level.

12.40 Actors

At the upper level of abstraction lies actors: expressions that interact by sending and receiving messages [7]. Actors are not hierarchical. They do not compose to form new actors. The inside of an actor is a sequential program or a script, not one or more other actors. Actors do not aspire to conceptual primitivity. The model assumes a supporting system, not expressed as actors, that manages message traffic, the dynamic instantiation of actors and the interpretation of an actor's script.

12.41 Connectionism

Connectionism, or parallel distributed processing, or neural networks, or associative processing, are all attempts at pure association expressions that learn. The characterization of these networks is still in terms of continually presented data and continually acting stateless functions. The flow through an expression still needs to be timed and controlled.

12.42 Conclusion

The invocation model begins with the notion of differentness and its appreciation, with the primitive concepts of associated thengs asserting values that change according to value transform rules. While several conventions were introduced along the way, no new primitive concepts were introduced. Associating thengs and their changing values are sufficient to encompass the expressions of natural computation and the expressions of human computation in all their familiar forms.

The invocation model of process expression encompasses the expressions of humans and the expressions of nature in the same sense that aerodynamics encompasses the wing of a bird and the wing of an airplane. Computer science is not an artificial science, it is as natural as physics and chemistry. Contemporary computer science is simply distracted by a very narrow mathematical view of computing and cannot see beyond it.

It is as if aerodynamics had begun as "kite science." A science of the artificial with a fundamental concept being the notion of a tether. A kite cannot possibly fly unless it is tethered against the wind. Without the tether the kite must fall. The notion that a kite might create its own wind is not part of the "science." Computer science must create its own wind and soar beyond its current sequential vistas.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims

What is claimed is:

1. A circuit configured to effectuate dynamic behavior mapping:
   processing circuitry configured to:
      receive an input signal;
      receive a feedback signal from a feedback circuit; and
      processes the input signal and the feedback signal to generate an output behavior signal;
   feedback circuitry configured to:
      maintain a continuous positive signal;
      receive the output behavior signal;
      provide the feedback signal to the processing circuitry, comprising:
         setting the feedback signal to the continuous positive signal when the output behavior signal represents a positive status; and
         setting the feedback signal to the output behavior signal when the output behavior signal is not positive, wherein the feedback signal represents a non-positive status.

2. The circuit of claim 1, when the processing circuitry and the feedback circuitry are null convention logic circuits.

3. The circuit of claim 1, wherein the processing circuitry:
   maintains the output behavior signal in response to the feedback signal representing a positive status;
   changes the output behavior signal in response to the feedback signal representing a non-positive state.

4. The circuit of claim 1, wherein the feedback circuitry internally continually generates the continuous positive signal.

5. The circuit of claim 1, wherein the processing circuitry has a plurality of outputs, each output corresponding to a different behavior output signal, such that a change in the output behavior signal corresponds to a changing in which of the plurality of outputs is active.

6. The circuit of claim 1, wherein the plurality of outputs are in sequence, and the processing circuitry will switch to the next output in sequence, which represents a different behavior, in response to the feedback circuit representing a non-positive status.

7. The circuit of claim 1, wherein the processing circuit provides different output behaviors in sequence, and changes the output behavior signal to the next output behavior in the sequence in response to the feedback circuit representing a non-positive status.

8. The circuit of claim 1, wherein the feedback circuitry further comprises an arbiter that gives priority to a non-positive status, the feedback signal being based on the output of the arbiter.

9. The circuit of claim 1, wherein the feedback circuitry further comprises an arbiter that receives the output behavior signal and the continuous positive signal, and the gives priority to the received signal having a non-positive status, the feedback signal being based on the output of the arbiter.

10. The circuit of claim 9, wherein the output of the arbiter is the continuous positive signal when the output behavior signal represents a positive status, and the output of the arbiter is the output behavior signal when the output behavior signal is not positive.

11. The circuit of claim 1, wherein the processing circuit provides different output behaviors in sequence, and changes the output behavior signal to the next output behavior in random order in response to the feedback circuit representing a non-positive status.

12. The circuit of claim 1, wherein the continuous positive signal is constant during operation of the circuit.

13. The circuit of claim 1, wherein the continuous positive signal is generated independently from the output behavior signal.

14. The circuit of claim 1, wherein the input signal, the feedback signal, and the output behavior signals are all data signals.

* * * * *